US011573955B1

(12) United States Patent
James et al.

(10) Patent No.: US 11,573,955 B1
(45) Date of Patent: Feb. 7, 2023

(54) DATA-DETERMINANT QUERY TERMS

(71) Applicant: Splunk Inc., San Francisco, CA (US)

(72) Inventors: Alexander Douglas James, Sammamish, WA (US); Andrew Peters, Sammamish, WA (US); Arun Ramani, Bellevue, WA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 16/657,664

(22) Filed: Oct. 18, 2019

Related U.S. Application Data

(63) Continuation-in-part of application No. 16/264,299, filed on Jan. 31, 2019, now Pat. No. 11,392,578, which is a continuation-in-part of application No. 16/147,129, filed on Sep. 28, 2018, now Pat. No. 11,093,564, which is a continuation-in-part of application No. 15/967,587, filed on Apr. 30, 2018, now Pat. No. 11,106,734.

(51) Int. Cl.
*G06F 16/00* (2019.01)
*G06F 7/04* (2006.01)
*G06F 16/242* (2019.01)
*G06F 16/9035* (2019.01)
*G06F 16/2458* (2019.01)
*G06F 16/28* (2019.01)
*G06F 16/25* (2019.01)

(52) U.S. Cl.
CPC ........ *G06F 16/2423* (2019.01); *G06F 16/244* (2019.01); *G06F 16/2465* (2019.01); *G06F 16/258* (2019.01); *G06F 16/287* (2019.01); *G06F 16/9035* (2019.01)

(58) Field of Classification Search
CPC ............ G06F 16/2423; G06F 16/2465; G06F 16/287; G06F 16/9035; G06F 16/244; G06F 16/258
See application file for complete search history.

(56) References Cited

U.S. PATENT DOCUMENTS

| | | | |
|---|---|---|---|
| 5,742,809 A | 4/1998 | Hayashi et al. | |
| 5,895,465 A | * 4/1999 | Guha | G06F 16/2456 707/769 |
| 5,918,049 A | 6/1999 | Syvaniemi | |
| 5,963,932 A | 10/1999 | Jakobsson et al. | |
| 6,009,422 A | 12/1999 | Ciccarelli | |
| 6,134,559 A | 10/2000 | Brumme et al. | |
| 7,937,344 B2 | 5/2011 | Baum et al. | |

(Continued)

OTHER PUBLICATIONS

W3school.com SQL https://www.w3schools.com/sql/default.as (Year: 2017).*

(Continued)

*Primary Examiner* — Hosain T Alam
*Assistant Examiner* — Chongsuh Park
(74) *Attorney, Agent, or Firm* — Knobbe, Martens, Olson & Bear, LLP

(57) ABSTRACT

Systems and methods are disclosed for flexibly applying a query term to heterogeneous data. A query system can receive a query that includes a data-determinant query term. As the system executes the query it can generate interim search results. As the system query processes the interim search results based on the query, it can apply the data-determinant query term to records of the interims search results based on the structure of the records.

28 Claims, 25 Drawing Sheets

(56) References Cited

U.S. PATENT DOCUMENTS

| | | | |
|---|---|---|---|
| 7,979,453 B2 | 7/2011 | Jagannathan | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 9,348,880 B1* | 5/2016 | Kramer | G06F 16/258 |
| 10,055,410 B1 | 8/2018 | Dubbels et al. | |
| 10,127,258 B2 | 11/2018 | Lamas et al. | |
| 11,086,869 B1 | 8/2021 | Aleti et al. | |
| 11,093,564 B1 | 8/2021 | James et al. | |
| 11,157,498 B1 | 10/2021 | James et al. | |
| 11,238,049 B1 | 2/2022 | James et al. | |
| 11,392,578 B1 | 7/2022 | James et al. | |
| 2003/0018632 A1 | 1/2003 | Bays et al. | |
| 2003/0158841 A1 | 8/2003 | Britton et al. | |
| 2004/0215626 A1 | 10/2004 | Colossi et al. | |
| 2005/0165761 A1 | 7/2005 | Chan et al. | |
| 2005/0267871 A1 | 12/2005 | Marchisio et al. | |
| 2006/0004707 A1 | 1/2006 | Dettinger et al. | |
| 2006/0224587 A1 | 10/2006 | Zamir et al. | |
| 2007/0256060 A1 | 11/2007 | Ryu et al. | |
| 2008/0016057 A1 | 1/2008 | Bakalash et al. | |
| 2009/0157737 A1 | 6/2009 | Konik et al. | |
| 2010/0125565 A1 | 5/2010 | Burger et al. | |
| 2010/0223276 A1 | 9/2010 | Al-Shameri et al. | |
| 2011/0029498 A1 | 2/2011 | Ferguson et al. | |
| 2012/0323843 A1 | 12/2012 | Bice | |
| 2013/0191409 A1* | 7/2013 | Zeng | G06F 16/3322 707/767 |
| 2013/0268531 A1 | 10/2013 | Platt et al. | |
| 2014/0040710 A1 | 2/2014 | Smith | |
| 2014/0095472 A1 | 4/2014 | Lee et al. | |
| 2014/0181130 A1 | 6/2014 | Davis et al. | |
| 2014/0236889 A1 | 8/2014 | Vasan et al. | |
| 2014/0310249 A1 | 10/2014 | Kowalski | |
| 2014/0372406 A1 | 12/2014 | Hoffman | |
| 2015/0074081 A1 | 3/2015 | Falter et al. | |
| 2016/0253340 A1 | 9/2016 | Barth et al. | |
| 2017/0091345 A1 | 3/2017 | Brainerd et al. | |
| 2017/0168881 A1 | 6/2017 | Memar-Zahedani | |
| 2017/0277597 A1 | 9/2017 | Dillon et al. | |
| 2017/0315796 A1 | 11/2017 | Melnik et al. | |
| 2017/0344464 A1 | 11/2017 | Misra et al. | |
| 2017/0364568 A1 | 12/2017 | Reynolds et al. | |
| 2018/0089328 A1 | 3/2018 | Bath et al. | |
| 2018/0150362 A1 | 5/2018 | Lee et al. | |
| 2018/0232110 A1 | 8/2018 | Cheung et al. | |
| 2018/0267974 A1 | 9/2018 | Prabhakaran et al. | |
| 2018/0300349 A1 | 10/2018 | Munk et al. | |
| 2019/0098106 A1 | 3/2019 | Mungel et al. | |
| 2019/0377827 A1 | 12/2019 | Yen et al. | |
| 2021/0357470 A1 | 11/2021 | James | |
| 2022/0156267 A1 | 5/2022 | James et al. | |

OTHER PUBLICATIONS

Dofactory.com SQL https://www.dofactory.com/sql, (Year: 2018).*

C-sharpconer.com SQL https://www.c-sharpcorner.com/UploadFile/219d4d/stored-procedures-in-sql-server/ (Year: 2017).*

Mysqltutorial.org https://www.mysqltutorial.org/mysql-regular-expression-regexp.aspx/ (Year: 2017).*

Sqltutorial.org, sql-inner-join, Apr. 8, 2018, http://sqltutorial.org (Year: 2018).*

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Carraso, David, "Exploring Splunk," published by CITO Research, New York, NY, Apr. 2012.

SLAML 10 Reports, Workshop on Managing Systems via Log Analysis and Machine Learning Techniques, ;login: Feb. 2011 Conference Reports.

Splunk Enterprise 8.0.0 Overview, available online, retrieved May 20, 2020 from docs.splunk.com.

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Grover, et al., "Data Ingestion in AsterixDB," 18th International Conference on Extending Database Technology, Mar. 23-27, 2015, academia.edu, pp. 1-12 (2015).

Jensen et al., "A Highly Available Grid Metadata Catalog," 2009 International Conference on Advanced Information Networking and Applications, Bradford, pp. 419-426, doi: 10.1109/AINA.2009.108, May 2009.

Salesforce Count (fieldName) Sep. 8, 2015. Internet Archive/WayBackMachine: Force.com SOQLand SOSL Reference. https://developer.salesforce.com/docs/atlas.en-us.soql_sosl.meta/sopl_sosl/sforce_api_calls_soql_select_count.htm, in two pages.

Shi, et al., "Design and Implementation of a P2P Resourse Sharing System Based on Metadata Catalog," 2016 9th International Symposium on Computational Intelligence and Design (ISCID), Hangzhou, pp. 78-81, doi: 10.1109/ISCID.

Singh, et al., "A Metadata Catalog Service for Data Intensive Applications," (Nov. 2003) Proceedings of the ACM/EEE SC2003 Conference (SC '03).

U.S. Appl. No. 16/147,350, filed Sep. 28, 2018.

* cited by examiner

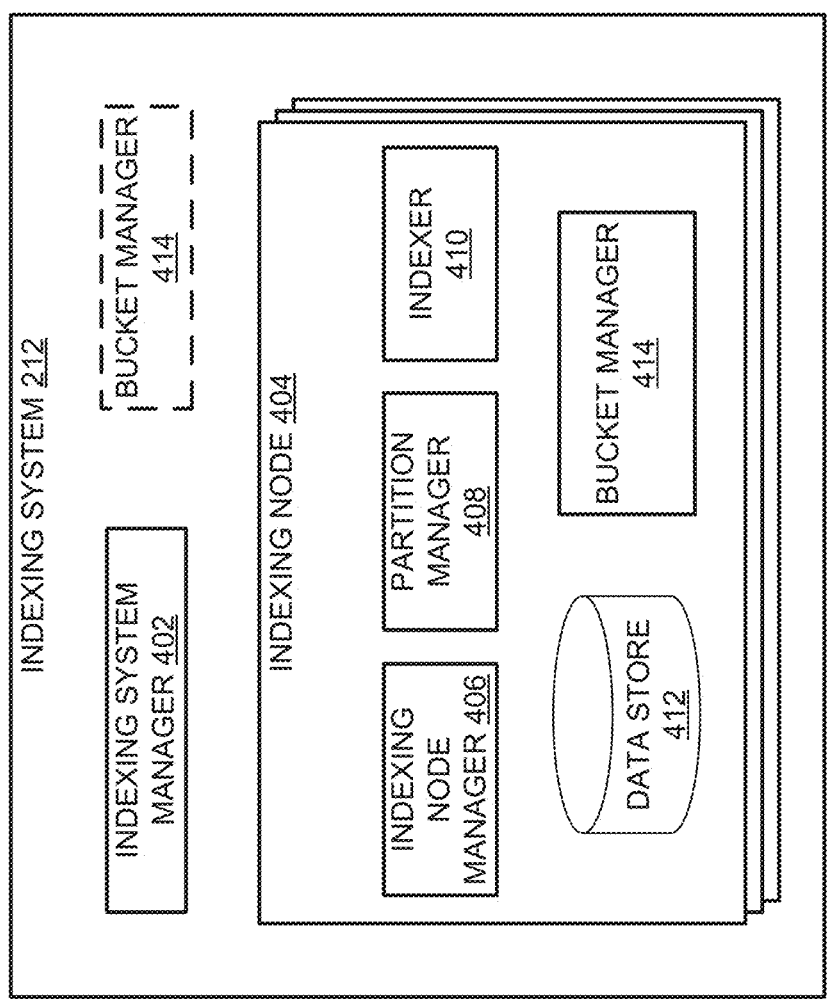

| Time 1135 | Host 1136 | Source 1137 | Source Type 1138 | Event 1139 |
|---|---|---|---|---|
| 1131 — 10/10/2000 1:55 p.m. | www1 | access.log | access_combined | 1140  1141  1142<br>127.0.0.1 - frank [10/Oct/2000:13:55:36-0700] "GET /apache.gif HTTP/1.0" [200] [2326] 0.0947<br>1143       1144  1145  1146 |
| 1132 — 10/10/2000 1:56 p.m. | www2 | access.log | access_combined | 127.0.0.1 - bob [10/Oct/2000:13:56:36-0700] "GET /mickey_mouse.gif HTTP/1.0" 200 2980 0.0899 |
| 1133 — 10/10/2000 1:57 p.m. | www2 | access.log | access_combined | 127.0.0.1 - carlos [10/Oct/2000:13:57:36-0700] "GET /donald_duck.gif HTTP/1.0" 200 2900 0.0857 |
| 1134 — 10/10/2000 1:58 p.m. | www2 | error.log | apache_error | [Sunday Oct 10 1:58:33 2010] [error] [client 127.10.1.1.015] File does not exist: /home/reba/public_html/images/daffy_duck.gif |

FIG. 11C

| Row | Time | | Host | Source | Source Type | Event |
|---|---|---|---|---|---|---|
| 55000 | 10/10/2016 | 1:55 p.m. | www1 | access.log | access_combined | 127.0.0.1 - frank [10/Oct/2016:13:55:36 -0700] "GET /apache.gif HTTP/1.0" 200 2326 0.0947  1331 |
| 55001 | 10/10/2016 | 1:56 p.m. | www2 | access.log | access_combined | 127.0.0.2 - bob [10/Oct/2016:13:56:36 -0700] "GET /mickey_mouse.gif HTTP/1.0" 200 2980 0.0899 |
| 55002 | 10/10/2016 | 1:57 p.m. | www2 | access.log | access_combined | 127.0.0.1 - eliza [10/Oct/2016:13:57:36 -0700]  1332 "GET /donald_duck.gif HTTP/1.0" 200 2900 0.0857 |
| 55003 | 10/10/2016 | 1:58 p.m. | www2 | error.log | apache_error | [Sunday Oct 10 1:58:33 2016] [error] [client 127.10.1.1.015] File does not exist: /home/reba/public_html/images/daffy_duck.gif |
| 55004 | 10/10/2016 | 1:59 p.m. | www1 | access.log | access_combined | 127.0.0.3 - virgil [10/Oct/2016:13:59:36 -0700] "GET /donald_duck.gif HTTP/1.0" 200 2900 0.0887  1333 |
| 55005 | 10/10/2016 | 2:00 p.m. | www1 | access.log | access_combined | 127.0.0.1 - matt [10/Oct/2016:14:00:36 -0700] "GET /goofy.gif HTTP/1.0" 200 2920 0.0987 |
| 55006 | 10/10/2016 | 2:01 p.m. | www2 | error.log | apache_error | [Sunday Oct 10 2:01:33 2016] [error] [client 127.10.1.1.03] File does not exist: /home/public_html/images/furby.gif |
| 55007 | 10/10/2016 | 2:02 p.m. | www1 | access.log | access_combined | 127.0.0.1 - jack [10/Oct/2016:14:02:36 -0700] "GET /muppets.gif HTTP/1.0" 200 5000 0.0667  1334 |

1323

| Event Reference Value | Field Name | Field Value |
|---|---|---|
| 55000 | clientip | 127.0.0.1 |
| 55002 | clientip | 127.0.0.1 |
| 55005 | clientip | 127.0.0.1 |
| 55007 | clientip | 127.0.0.1 |

1322

| Event Reference Value | Field Name | Field Value | User ID |
|---|---|---|---|
| 55000 | clientip | 127.0.0.1 | frank |
| 55005 | clientip | 127.0.0.1 | matt |

`from main select user ... | ... | group by user.department | ...`  1602

| Record | user.department | user.name | user.location |
|---|---|---|---|
| 1610 | Engineering | Eva L. | San Francisco, CA |
| 1611 | Engineering | Emerson L. | Washington, DC |
| 1612 | HR | Ezra K. | Boston, MA |

↑ 1604A

| Record | user |
|---|---|
| 1613 | { "department": Engineering, "name": Eliza J., "location": Arlington, VA } |
| 1614 | { "department": HR, "name": Emmeline R., "location": San Jose, CA } |
| 1615 | { "department": IT, "name": Eastwood F., "location": Seattle, WA } |

↑ 1604B

| Record | ID |
|---|---|
| 1616 | 1040954 |
| 1617 | 1040956 |
| 1618 | 1041955 |

DATA-DETERMINANT QUERY TERMS

RELATED APPLICATIONS

Any and all applications for which a foreign or domestic priority claim is identified in the Application Data Sheet as filed with the present application are incorporated by reference under 37 CFR 1.57 and made a part of this specification. This application also incorporates by reference U.S. patent application Ser. Nos. 16/264,299, 16/147,350, 15/967,581, 15/665,159, and 15/276,717, in their entirety.

FIELD

At least one embodiment of the present disclosure pertains to one or more tools for facilitating searching and analyzing large sets of data to locate data of interest.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include performance data, diagnostic data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it.

Although the availability of vastly greater amounts of diverse data on diverse data systems provides opportunities to derive new insights, it also gives rise to technical challenges to search and analyze the data. Tools exist that allow an analyst to search data systems separately and collect results over a network for the analyst to derive insights in a piecemeal manner. However, UI tools that allow analysts to quickly search and analyze large set of raw machine data to visually identify data subsets of interest, particularly via straightforward and easy-to-understand sets of tools and search functionality do not exist.

BRIEF DESCRIPTION OF THE DRAWINGS

The present disclosure is illustrated by way of example, and not limitation, in the figures of the accompanying drawings, in which like reference numerals indicate similar elements.

FIG. 4A is a block diagram illustrating an embodiment of an indexing system of the data intake and query system.

FIG. 11C provides a visual representation of the manner in which a pipelined search language or query operates, in accordance with example embodiments.

FIG. 13C illustrates an example of creating and using an inverted index, in accordance with example embodiments.

FIG. 16 is a block diagram illustrating an example of interim search results that include records with different structures that have heterogeneous data.

DETAILED DESCRIPTION

Figure 1:
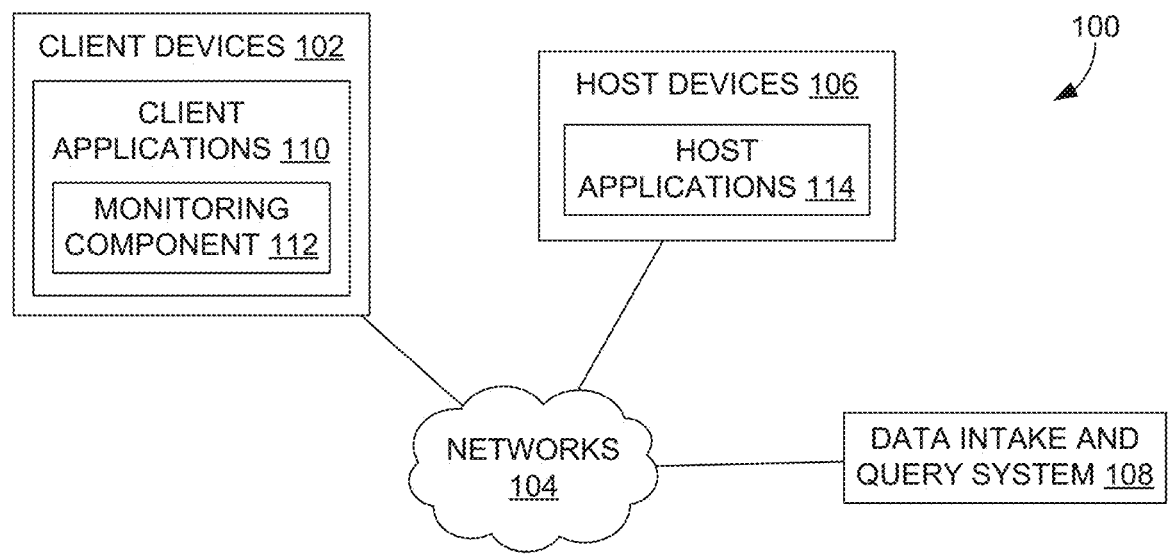
FIG. 1 is a block diagram of an example networked computer environment, in accordance with example embodiments.

Embodiments are described herein according to the following outline:
1.0. General Overview
2.0. Operating Environment
2.1. Host Devices
2.2. Client Devices
2.3. Client Device Applications
2.4. Data Intake and Query System Overview
3.0. Data Intake and Query System Architecture
3.1 Gateway
3.2. Intake System
   3.2.1 Forwarder
   3.2.2 Data Retrieval Subsystem
   3.2.3 Ingestion Buffer
   3.2.4 Streaming Data Processors
3.3. Indexing System
   3.3.1. Indexing System Manager
   3.3.2. Indexing Nodes
      3.3.2.1 Ingest Manager
      3.3.2.2 Partition Manager
      3.3.2.3 Indexer and Data Store
   3.3.3. Bucket Manager
3.4 Query System
   3.4.1. Query System Manager
   3.4.2. Search Head
      3.4.2.1 Search Master
      3.4.2.2 Search Manager
   3.4.3. Search Nodes
   3.4.4. Cache Manager
   3.4.5. Resource Monitor and Catalog
3.5. Common Storage
3.6. Data Store Catalog
3.7. Query Acceleration Data Store
3.8. Metadata Catalog
   3.8.1. Dataset Association Records
   3.8.2. Dataset Configuration Records
   3.8.3. Rule Configuration Records
   3.8.4. Annotations 3.8.4.1. Generating Annotations
      3.8.4.1.1. System Annotations Based on System Use
         3.8.4.1.1.1. Query Parsing
         3.8.4.1.1.2. Query Execution
         3.8.4.1.1.3. User Monitoring
         3.8.4.1.1.4. Application Monitoring
      3.8.4.1.2. System Annotations Based on Metadata Catalog Changes
      3.8.4.2. Example Annotations
         3.8.4.2.1. Field Annotations
         3.8.4.2.2. Inter-Field Relationship Annotations
         3.8.4.2.3. Inter-Dataset Relationship Annotations
         3.8.4.2.4. Dataset properties Annotations
         3.8.4.2.5. Normalization Annotations
         3.8.4.2.6. Unit Annotations
         3.8.4.2.7. Alarm Threshold Annotations
         3.8.4.2.8. Data Category Annotations
         3.8.4.2.9. User/Group Annotations
         3.8.4.2.10. Application Annotations
4.0. Data Intake and Query System Functions
4.1. Intake
   4.1.1 Publication to Intake Topic(s)
   4.1.2 Transmission to Streaming Data Processors
   4.1.3 Messages Processing
   4.1.4 Transmission to Subscribers
   4.1.5 Data Resiliency and Security
4.2. Indexing
4.3. Querying
   4.3.1. Example Metadata Catalog Processing
4.4. Data Ingestion, Indexing, and Storage Flow
   4.4.1. Input
   4.4.2. Parsing
   4.4.3. Indexing
4.5. Query Processing Flow
4.6. Pipelined Search Language
4.7. Field Extraction
4.8. Data Models
4.9. Acceleration Techniques
   4.9.1. Aggregation Technique
   4.9.2. Keyword Index
   4.9.3. High Performance Analytics Store
      4.9.3.1 Extracting Event Data Using Posting
   4.9.4. Accelerating Report Generation
4.10. Security Features
4.11. Data Center Monitoring
4.12. IT Service Monitoring
4.13. Other Architectures
5.0. Data-Determinant Query Terms
5.1. Interim Search Results Overview
5.2. Data-Determinant Query Term Overview
5.3. Example Application of a Data-Determinant Query Term
5.4. Data-Determinant Query Term Flow
6.0. Terminology 1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known time stamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, pre-defined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters form a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources (further discussed with respect to FIG. 19A).

In some embodiments, the configuration files and/or extraction rules described above can be stored in a catalog, such as a metadata catalog. In certain embodiments, the content of the extraction rules can be stored as rules or actions in the metadata catalog. For example, the identification of the data to which the extraction rule applies can be referred to a rule and the processing of the data can be referred to as an action.

2.0. Operating Environment

FIG. 1 is a block diagram of an example networked computer environment 100, in accordance with example embodiments. It will be understood that FIG. 1 represents one example of a networked computer system and other embodiments may use different arrangements.

The networked computer environment 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, the environment 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some embodiments, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In some embodiments, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In some embodiments, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In some embodiments, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some embodiments, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In some embodiments, the monitoring component 112 may also monitor and collect other device profile information including, for example, a type of client device, a manufacturer, and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Intake and Query System Overview

The data intake and query system 108 can process and store data received data from the data sources client devices 102 or host devices 106, and execute queries on the data in response to requests received from one or more computing devices. In some cases, the data intake and query system 108 can generate events from the received data and store the events in buckets in a common storage system. In response to received queries, the data intake and query system can assign one or more search nodes to search the buckets in the common storage.

In certain embodiments, the data intake and query system 108 can include various components that enable it to provide stateless services or enable it to recover from an unavailable or unresponsive component without data loss in a time efficient manner. For example, the data intake and query system 108 can store contextual information about its various components in a distributed way such that if one of the components becomes unresponsive or unavailable, the data intake and query system 108 can replace the unavailable component with a different component and provide the replacement component with the contextual information. In this way, the data intake and query system 108 can quickly recover from an unresponsive or unavailable component while reducing or eliminating the loss of data that was being processed by the unavailable component.

In some embodiments, the data intake and query system 108 can store the contextual information in a metadata catalog, as described herein. In certain embodiments, the contextual information can correspond to information that the data intake and query system 108 has determined or learned based on use. In some cases, the contextual information can be stored as annotations (manual annotations and/or system annotations), as described herein.

2.5 on-Premise and Shared Computing Resource Environments

In some environments, a user of a data intake and query system 108 may install and configure, on computing devices owned and operated by the user, one or more software applications that implement some or all of the components of the data intake and query system 108. For example, with reference to FIG. 2, a user may install a software application on server computers owned by the user and configure each server to operate as one or more components of the intake system 210, indexing system 212, query system 214, common storage 216, data store catalog 220, or query acceleration data store 222, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In certain embodiments, one or more of the components of the data intake and query system 108 can be implemented in a remote distributed computing system. In this context, a remote distributed computing system or cloud-based service can refer to a service hosted by one more computing resources that are accessible to end users over a network, for example, by using a web browser or other application on a client device to interface with the remote computing resources. For example, a service provider may provide a data intake and query system 108 by managing computing resources configured to implement various aspects of the system (e.g., intake system 210, indexing system 212, query system 214, common storage 216, data store catalog 220, or query acceleration data store 222, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a remote distributed computing system, the underlying hardware (non-limiting examples: processors, hard drives, solid-state memory, RAM, etc.) on which the components of the data intake and query system 108 execute can be shared by multiple customers or tenants as part of a shared computing resource environment. In addition, when implemented in a shared computing resource environment as a cloud-based service, various components of the system 108 can be implemented using containerization or operating-system-level virtualization, or other virtualization technique. For example, one or more components of the intake system 210, indexing system 212, or query system 214 can be implemented as separate software containers or container instances. Each container instance can have certain resources (e.g., memory, processor, etc.) of an underlying host computing system (e.g., server, microprocessor, etc.) assigned to it, but may share the same operating system and may use the operating system's system call interface. Each container may provide an isolated execution environment on the host system, such as by providing a memory space of the host system that is logically isolated from memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the data intake and query system 108 in a remote distributed system, shared computing resource environment, or as a cloud-based service can provide a number of benefits. In some cases, implementing the data intake and query system 108 in a remote distributed system, shared computing resource environment, or as a cloud-based service can make it easier to install, maintain, and update the components of the data intake and query system 108. For example, rather than accessing designated hardware at a particular location to install or provide a component of the data intake and query system 108, a component can be remotely instantiated or updated as desired. Similarly, implementing the data intake and query system 108 in a remote distributed system, shared computing resource environment, or as a cloud-based service can make it easier to meet dynamic demand. For example, if the data intake and query system 108 experiences significant load at indexing or search, additional compute resources can be deployed to process the additional data or queries. In an "on-premises" environment, this type of flexibility and scalability may not be possible or feasible.

In addition, by implementing the data intake and query system 108 in a remote distributed system, shared computing resource environment, or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the data intake and query system 108 and/or to other systems unrelated to the data intake and query system 108.

As mentioned, in an on-premises environment, data from one instance of a data intake and query system 108 is logically and physically separated from the data of another instance of a data intake and query system by virtue of each instance having its own designated hardware. As such, data from different customers of the data intake and query system is logically and physically separated from each other.

In a shared computing resource environment, one instance of a data intake and query system can be configured to process the data from one customer or tenant or from multiple customers or tenants. Even in cases where a separate instance of a data intake and query system is used for each customer, the underlying hardware on which the instances of the data intake and query system 108 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the data intake and query system 108 can maintain logical separation between tenant data. For example, the data intake and query system can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer's A hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the data intake and query system 108 can maintain the mutual exclusivity and/or independence between tenant data even as the tenant data is being processed, stored, and searched by the same underlying hardware. In certain cases, to maintain the mutual exclusivity and/or independence between the data of different tenants, the data intake and query system can use tenant identifiers to uniquely identify data associated with different tenants.

In a shared computing resource environment, some components of the data intake and query system can be instantiated and designated for individual tenants and other components can be shared by multiple tenants. In certain embodiments, a separate intake system 210, indexing system 212, and query system 214 can be instantiated for each tenant, whereas the common storage 216, data store catalog 220, metadata catalog 221, and/or acceleration data store 222, can be shared by multiple tenants. In some such embodiments, the common storage 216, data store catalog 220, metadata catalog 221, and/or acceleration data store 222, can maintain separate directories for the different tenants to ensure their mutual exclusivity and/or independence from each other. Similarly, in some such embodiments, the data intake and query system 108 can use different host computing systems or different isolated execution environments to process the data from the different tenants as part of the intake system 210, indexing system 212, and/or query system 214.

In some embodiments, individual components of the intake system 210, indexing system 212, and/or query system 214 may be instantiated for each tenant or shared by multiple tenants. For example, individual forwarders 302 and an output ingestion buffer 310 may be instantiated and designated for individual tenants, while the data retrieval subsystem 304, intake ingestion buffer 306, and/or streaming data processor 308, may be shared by multiple tenants. In certain embodiments, the data retrieval subsystem 304, intake ingestion buffer 306, streaming data processor 308, and output ingestion buffer 310 may be shared by multiple tenants.

In certain embodiments, an indexing system can be instantiated and designated for a particular tenant or shared by multiple tenants. As a non-limiting example, in certain cases, the embodiment of the indexing system 212 shown in FIG. 4A may be allocated for each tenant of the data intake and query system 108. As another non-limiting example, in some cases, the components of the embodiment of the indexing system 212 shown in FIG. 4B can be shared by multiple tenants.

In some embodiments where a separate indexing system 212 is instantiated and designated for each tenant, different resources can be reserved for different tenants. For example, Tenant A can be consistently allocated a minimum of four indexing nodes and Tenant B can be consistently allocated a minimum of two indexing nodes. In some such embodiments, the four indexing nodes can be reserved for Tenant A and the two indexing nodes can be reserved for Tenant B, even if Tenant A and Tenant B are not using the reserved indexing nodes.

In embodiments where an indexing system 212 is shared by multiple tenants, different resources can be dynamically assigned to different tenants. For example, if Tenant A has greater indexing demands, additional indexing nodes can be instantiated or assigned to Tenant A's data. However, as the demand decreases, the indexing nodes can be reassigned to a different tenant, or terminated. Further, in some embodiments, a component of the indexing system 212, such as an ingest manager 406, partition manager 408, and/or indexing node 404, can concurrently process data from the different tenants.

In some embodiments, one instance of query system 214 may be shared by multiple tenants. In some such cases, the same search head 504 can be used to process/execute queries for different tenants and/or the same search nodes 506 can be used to execute query for different tenants. Further, in some such cases, different tenants can be allocated different amounts of compute resources. For example, Tenant A may be assigned more search heads 504 or search nodes 506 based on demand or based on a service level arrangement than another tenant. However, once a search is completed the search head and/or nodes assigned to Tenant A may be assigned to Tenant B, deactivated, or their resource may be re-allocated to other components of the data intake and query system, etc.

In some cases, by sharing more components with different tenants, the functioning of the data intake and query system 108 can be improved. For example, by sharing components across tenants, the data intake and query system can improve resource utilization thereby reducing the amount of resources allocated as a whole. For example, if four indexing nodes, two search heads, and four search nodes are reserved for each tenant then those compute resources are unavailable for use by other processes or tenants, even if they go unused. In contrast, by sharing the indexing nodes, search heads, and search nodes with different tenants and instantiating additional compute resources, the data intake and query system can use fewer resources overall while providing improved processing time for the tenants that are using the compute resources. For example, if tenant A is not using any search nodes 506 and tenant B has many searches running, the data intake and query system 214 can use search nodes that would have been reserved for tenant A to service tenant B. In this way, the data intake and query system can decrease the number of compute resources used/reserved, while improving the search time for tenant B and improving compute resource utilization.

3.0. Data Intake and Query System Architecture

Figure 2:
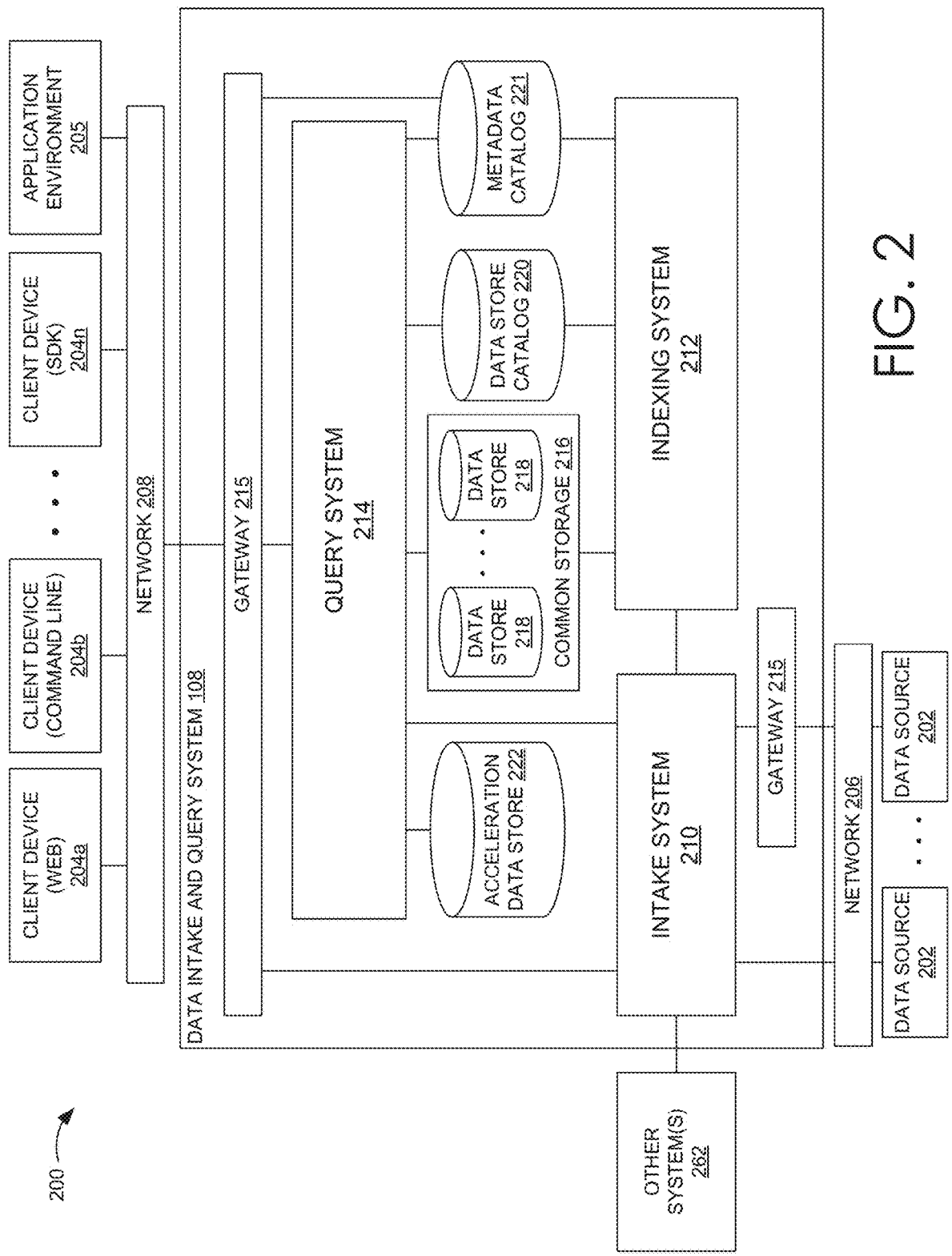
FIG. 2 is a block diagram of an example data intake and query system, in accordance with example embodiments.

FIG. 2 is a block diagram of an embodiment of a data processing environment 200. In the illustrated embodiment, the environment 200 includes data sources 202, client devices 204a, 204b ... 204n (generically referred to as client device(s) 204), and an application environment 205, in communication with a data intake and query system 108 via networks 206, 208, respectively. The networks 206, 208 may be the same network, may correspond to the network 104, or may be different networks. Further, the networks 206, 208 may be implemented as one or more LANs, WANs, cellular networks, intranetworks, and/or internetworks using any of wired, wireless, terrestrial microwave, satellite links, etc., and may include the Internet.

Each data source 202 broadly represents a distinct source of data that can be consumed by the data intake and query system 108. Examples of data sources 202 include, without limitation, data files, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), performance metrics, cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization technique or isolated execution environments.

As illustrated in FIG. 2, in some embodiments, the data sources 202 can communicate with the data to the intake system 210 via the network 206 without passing through the gateway 215. As a non-limiting example, if the intake system 210 receives the data from a data source 202 via a forwarder 302 (described in greater detail below), the intake system 210 may receive the data via the network 206 without going through the gateway 215. In certain embodiments, the data sources 202 can communicate the data to the intake system 210 via the network 206 using the gateway 215. As another non-limiting example, if the intake system 210 receives the data from a data source 202 via a HTTP intake point 322 (described in greater detail below), it may receive the data via the gateway 215. Accordingly, it will be understood that a variety of methods can be used to receive data from the data sources 202 via the network 206 or via the network 206 and the gateway 215.

The client devices 204 can be implemented using one or more computing devices in communication with the data intake and query system 108, and represent some of the different ways in which computing devices can submit queries to the data intake and query system 108. For example, the client device 204a is illustrated as communicating over an Internet (Web) protocol with the data intake and query system 108, the client device 204b is illustrated as communicating with the data intake and query system 108 via a command line interface, and the client device 204n is illustrated as communicating with the data intake and query system 108 via a software developer kit (SDK). However, it will be understood that the client devices 204 can communicate with, and submit queries to, the data intake and query system 108 in a variety of ways. For example, the client devices 204 can use one or more executable applications or programs from the application environment 205 to interface with the data intake and query system 108. The application environment 205 can include tools, software modules (e.g., computer executable instructions to perform a particular function), etc., to enable application developers to create computer executable applications to interface with the data intake and query system 108. For example, application developers can identify particular data that is of particular relevance to them. The application developers can use the application environment 205 to build a particular application to interface with the data intake and query system 108 to obtain the relevant data that they seek, process the relevant data, and display it in a manner that is consumable or easily understood by a user. The applications developed using the application environment 205 can include their own backend services, middleware logic, front-end user interface, etc., and can provide facilities for ingesting use case specific data and interacting with that data.

In certain embodiments, the developed applications can be executed by a computing device or in an isolated execution environment of an isolated execution environment system, such as Kubernetes, AWS, Microsoft Azure, Google Cloud, etc. In addition, some embodiments, the application environments 205 can provide one or more isolated execution environments in which to execute the developed applications. In some cases, the applications are executed in an isolated execution environment or a processing device unrelated to the application environment 205.

As a non-limiting example, an application developed using the application environment 205 can include a custom web-user interface that may or may not leverage one or more UI components provided by the application environment 205. The application could include middle-ware business logic, on a middle-ware platform of the developer's choice. Furthermore, as mentioned the applications implemented using the application environment 205 can be instantiated and execute in a different isolated execution environment or different isolated execution environment system than the data intake and query system 108. As a non-limiting example, in embodiments where the data intake and query system 108 is implemented using a Kubernetes cluster, the applications developed using the application environment 205 can execute in a different Kubernetes cluster (or other isolated execution environment system) and interact with the data intake and query system 108 via the gateway 215.

The data intake and query system 108 can process and store data received from the data sources 202 and execute queries on the data in response to requests received from the client devices 204. In the illustrated embodiment, the data intake and query system 108 includes a gateway 209, an intake system 210, an indexing system 212, a query system 214, common storage 216 including one or more data stores 218, a data store catalog 220, a metadata catalog 221, and a query acceleration data store 222. Although certain communication pathways are illustrated in FIG. 2, it will be understood that, in certain embodiments, any component of the data intake and query system 108 can interact with any other component of the data intake and query system 108. For example, the gateway 215 can interact with one or more components of the indexing system 212 and/or one or more components of the intake system 210 can communicate with the metadata catalog 221. Thus, data and/or commands can be communicated in a variety of ways within the data intake and query system 108.

As will be described in greater detail herein, the gateway 215 can provide an interface between one or more components of the data intake and query system 108 and other systems or computing devices, such as, but not limited to, client devices 204, the application environment 205, one or more data sources 202, and/or other systems 262. In some embodiments, the gateway 215 can be implemented using an application programming interface (API). In certain embodiments, the gateway 215 can be implemented using a representational state transfer API (REST API).

As mentioned, the data intake and query system 108 can receive data from different sources 202. In some cases, the data sources 202 can be associated with different tenants or customers. Further, each tenant may be associated with one or more indexes, hosts, sources, sourcetypes, or users. For example, company ABC, Inc. can correspond to one tenant and company XYZ, Inc. can correspond to a different tenant. While the two companies may be unrelated, each company may have a main index and test index (also referred to herein as a main partition or test partition) associated with it, as well as one or more data sources or systems (e.g., billing system, CRM system, etc.). The data intake and query system 108 can concurrently receive and process the data from the various systems and sources of ABC, Inc. and XYZ, Inc.

In certain cases, although the data from different tenants can be processed together or concurrently, the data intake and query system 108 can take steps to avoid combining or co-mingling data from the different tenants. For example, the data intake and query system 108 can assign a tenant identifier for each tenant and maintain a separation between the data using the tenant identifier. In some cases, the tenant identifier can be assigned to the data at the data sources 202, or can be assigned to the data by the data intake and query system 108 at ingest.

As will be described in greater detail herein, at least with reference to FIGS. 3A and 3B, the intake system 210 can receive data from the data sources 202, perform one or more preliminary processing operations on the data, and communicate the data to the indexing system 212, query system 214, or to other systems 262 (which may include, for example, data processing systems, telemetry systems, real-time analytics systems, data stores, databases, etc., any of which may be operated by an operator of the data intake and query system 108 or a third party).

The intake system 210 can receive data from the data sources 202 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc.

The intake system 210 can process the data based on the form in which it is received. In some cases, the intake system 210 can utilize one or more rules to process data and to make the data available to downstream systems (e.g., the indexing system 212, query system 214, etc.). Illustratively, the intake system 210 can enrich the received data. For example, the intake system may add one or more fields to the data received from the data sources 202, such as fields denoting the host, source, sourcetype, index, or tenant associated with the incoming data. In certain embodiments, the intake system 210 can perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

In some cases, the data processed by the intake system can be communicated or made available to the indexing system 212, the query system 214, and/or to other systems 262. In some embodiments, the intake system 210 communicates or makes available streams of data using one or more shards or partitions. For example, the indexing system 212 may read or receive data from one shard and another system may receive data from another shard. As another example, multiple systems may receive data from the same shard or partition.

As used herein, a partition can refer to a logical division of data. In some cases, the logical division of data may refer to a portion of a data stream, such as a shard from the intake system 210. In certain cases, the logical division of data can refer to an index or other portion of data stored in the data store 412 or common storage 216, such as different directories or file structures used to store data or buckets. Accordingly, it will be understood that the logical division of data referenced by the term partition will be understood based on the context of its use.

As will be described in greater detail herein, at least with reference to FIGS. 4A and 4B, the indexing system 212 can process the data and store it, for example, in common storage 216. As part of processing the data, the indexing system can identify timestamps associated with the data, organize the data into buckets or time series buckets, convert editable buckets to non-editable buckets, store copies of the buckets in common storage 216, merge buckets, generate indexes of the data, etc. In addition, the indexing system 212 can update the data store catalog 220 with information related to the buckets (pre-merged or merged) or data that is stored in common storage 216, and can communicate with the intake system 210 about the status of the data storage.

As will be described in greater detail herein, at least with reference to FIG. 5, the query system 214 can receive queries that identify a set of data to be processed and a manner of processing the set of data from one or more client devices 204, process the queries to identify the set of data, and execute the query on the set of data. In some cases, as part of executing the query, the query system 214 can use the data store catalog 220 to identify the set of data to be processed or its location in common storage 216 and/or can retrieve data from common storage 216 or the query acceleration data store 222. In addition, in some embodiments, the query system 214 can store some or all of the query results in the query acceleration data store 222.

As mentioned and as will be described in greater detail below, the common storage 216 can be made up of one or more data stores 218 storing data that has been processed by the indexing system 212. The common storage 216 can be configured to provide high availability, highly resilient, low loss data storage. In some cases, to provide the high availability, highly resilient, low loss data storage, the common storage 216 can store multiple copies of the data in the same and different geographic locations and across different types of data stores (e.g., solid state, hard drive, tape, etc.). Further, as data is received at the common storage 216 it can be automatically replicated multiple times according to a replication factor to different data stores across the same and/or different geographic locations. In some embodiments, the common storage 216 can correspond to cloud storage, such as Amazon Simple Storage Service (S3) or Elastic Block Storage (EBS), Google Cloud Storage, Microsoft Azure Storage, etc.

In some embodiments, indexing system 212 can read to and write from the common storage 216. For example, the indexing system 212 can copy buckets of data from its local or shared data stores to the common storage 216. In certain embodiments, the query system 214 can read from, but cannot write to, the common storage 216. For example, the query system 214 can read the buckets of data stored in common storage 216 by the indexing system 212, but may not be able to copy buckets or other data to the common storage 216. In some embodiments, the intake system 210 does not have access to the common storage 216. However, in some embodiments, one or more components of the intake system 210 can write data to the common storage 216 that can be read by the indexing system 212.

As described herein, in some embodiments, data in the data intake and query system 108 (e.g., in the data stores of the indexers of the indexing system 212, common storage 216, or search nodes of the query system 214) can be stored in one or more time series buckets. Each bucket can include raw machine data associated with a time stamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc. can be stored in respective files in or associated with a bucket. In certain cases, the group of files can be associated together to form the bucket.

The data store catalog 220 can store information about the data stored in common storage 216, such as, but not limited to an identifier for a set of data or buckets, a location of the set of data, tenants or indexes associated with the set of data, timing information about the data, etc. For example, in embodiments where the data in common storage 216 is stored as buckets, the data store catalog 220 can include a bucket identifier for the buckets in common storage 216, a location of or path to the bucket in common storage 216, a time range of the data in the bucket (e.g., range of time between the first-in-time event of the bucket and the last-in-time event of the bucket), a tenant identifier identifying a customer or computing device associated with the bucket, and/or an index (also referred to herein as a partition) associated with the bucket, etc. In certain embodiments, the data intake and query system 108 includes multiple data store catalogs 220. For example, in some embodiments, the data intake and query system 108 can include a data store catalog 220 for each tenant (or group of tenants), each partition of each tenant (or group of indexes), etc. In some cases, the data intake and query system 108 can include a single data store catalog 220 that includes information about buckets associated with multiple or all of the tenants associated with the data intake and query system 108.

The indexing system 212 can update the data store catalog 220 as the indexing system 212 stores data in common storage 216. Furthermore, the indexing system 212 or other computing device associated with the data store catalog 220 can update the data store catalog 220 as the information in the common storage 216 changes (e.g., as buckets in common storage 216 are merged, deleted, etc.). In addition, as described herein, the query system 214 can use the data store catalog 220 to identify data to be searched or data that satisfies at least a portion of a query. In some embodiments, the query system 214 makes requests to and receives data from the data store catalog 220 using an application programming interface ("API").

As will be described in greater detail herein, at least with reference to FIGS. 6 and 22-27, the metadata catalog 221 can store information about datasets used or supported by the data intake and query system 108 and/or one or more rules that indicate which data in a dataset to process and how to process the data from the dataset. The information about the datasets can include configuration information, such as, but not limited to the type of the dataset, access and authorization information for the dataset, location information for the dataset, physical and logical names or other identifiers for the dataset, etc. The rules can indicate how different data of a dataset is to be processed and/or how to extract fields or field values from different data of a dataset.

The metadata catalog 221 can also include one or more dataset association records. The dataset association records can indicate how to refer to a particular dataset (e.g., a name or other identifier for the dataset) and/or identify associations or relationships between the particular dataset and one or more rules or other datasets. In some embodiments, a dataset association record can be similar to a namespace in that it can indicate a scope of one or more datasets and the manner in which to reference the one or more datasets. As a non-limiting example, one dataset association record can identify four datasets: a "main" index dataset, a "test" index dataset, a "username" collection dataset, and a "username" lookup dataset. The dataset association record can also identify one or more rules for one or more of the datasets. For example, one rule can indicate that for data with the sourcetype "foo" from the "main" index dataset (or all datasets of the dataset association record), multiple actions are to take place, such as, extracting a field value for a "UID" field, and using the "username" lookup dataset to identify a username associated with the extracted "UID" field value. The actions of the rule can provide specific guidance as to how to extract the field value for the "UID" field from the sourcetype "foo" data in the "main" index dataset and how to perform the lookup of the username.

As described herein, the query system 214 can use the metadata catalog 221 to, among other things, interpret dataset identifiers in a query, verify/authenticate a user's permissions and/or authorizations for different datasets, identify additional processing as part of the query, identify one or more datasets from which to retrieve data as part of the query (also referred to herein as source datasets), determine how to extract data from datasets, identify configurations/definitions/dependencies to be used by search nodes to execute the query, etc.

In certain embodiments, the query system 214 can use the metadata catalog 221 to provide a stateless search service. For example, the query system 214 can use the metadata catalog 221 to dynamically determine the dataset configurations and rule configurations to be used to execute a query (also referred to herein as the query configuration parameters) and communicate the query configuration parameters to one or more search heads 504. If the query system 214 determines that an assigned search head 504 becomes unavailable, the query system 214 can communicate the dynamically determined query configuration parameters (and query to be executed) to another search head 504 without data loss and/or with minimal or reduced time loss.

In some embodiments, the metadata catalog 221 can be implemented using a database system, such as, but not limited to, a relational database system (non-limiting commercial examples: DynamoDB, Aurora DB, etc.). In certain embodiments, the database system can include entries for the different datasets, rules, and/or dataset association records. Moreover, as described herein, the metadata catalog 221 can be modified over time as information is learned about the datasets associated with or managed by the data intake and query system 108. For example, the entries in the database system can include manual or system annotations, as described herein.

The query acceleration data store 222 can store the results or partial results of queries, or otherwise be used to accelerate queries. For example, if a user submits a query that has no end date, the query system 214 can store an initial set of results in the query acceleration data store 222. As additional query results are determined based on additional data, the additional results can be combined with the initial set of results, and so on. In this way, the query system 214 can avoid re-searching all of the data that may be responsive to the query and instead search the data that has not already been searched.

3.1. Gateway and Authentication Flow

As described herein, the gateway 215 can provide an interface between one or more components of the data intake and query system 108 (non-limiting examples: one or more components of the intake system 210, one or more components of the indexing system 212, one or more components of the query system 214, common storage 216, the data store catalog 220, the metadata catalog 221 and/or the acceleration data store 222), and other systems or computing devices, such as, but not limited to, client devices 204, the application environment 205, one or more data sources 202, and/or other systems 262 (not illustrated). In some cases, one or more components of the data intake and query system 108 can include their own API. In such embodiments, the gateway 215 can communicate with the API of a component of the data intake and query system 108. Accordingly, the gateway 215 can translate requests received from an external device into a command understood by the API of the specific component of the data intake and query system 108. In this way, the gateway 215 can provide an interface between external devices and the API of the devices of the data intake and query system 108. In some implementations, components of the query system or other components may not be reachable through the gateway, or may be separately access-controlled. For example, in some implementations, the resource catalog(s) 418, 508 and the resource monitor(s) 420, 510 may be inaccessible from outside the gateway, and may be accessed by internal components.

In some embodiments, the gateway 215 can be implemented using an API, such as the REST API. In some such embodiments, the client devices 204 can communicate via one or more commands, such as GET, PUT, etc. However, it will be understood that the gateway 215 can be implemented in a variety of ways to enable the external devices and/or systems to interface with one or more components of the data intake and query system 108.

In certain embodiments, a client device 204 can provide control parameters to the data intake and query system 108 via the gateway 215. As a non-limiting example, using the gateway 215, a client device 204 can provide instructions to the metadata catalog 221, the intake system 210, indexing system 212, and/or the query system 214. For example, using the gateway 215, a client device 204 can instruct the metadata catalog 221 to add/modify/delete a dataset association record, dataset, rule, configuration, and/or action, etc. As another example, using the gateway 215, a client device 204 can provide a query to the query system 214 and receive results. As yet another example, using the gateway 215, a client device 204 can provide processing instructions to the intake system 210. As yet another example, using the gateway 215, one or more data sources 202 can provide data to the intake system 210. In some embodiments, one or more components of the intake system 210 can receive data from a data source 202 via the gateway 215. For example, in some embodiments, data received by the HTTP intake point 322 and/or custom intake points 332 (described in greater detail below) of the intake system 210 can be received via the gateway 215.

As mentioned, upon receipt of a request or command from an external device, the gateway 215 can determine the component of the data intake and query system 108 (or service) to handle the request. In some embodiments, the request or command can include an identifier for the component associated with the request or command. In certain embodiments, the gateway 215 can determine the component to handle the request based on the type of request or services requested by the command. For example, if the request or command relates to (or includes) a query, the gateway 215 can determine that the command is to be sent to a component of the query system 214. As another example, if the request or command includes data, such as raw machine data, metrics, or metadata, the gateway 215 can determine that the request or command is to be sent to a component of the intake system 210 (non-limiting examples: HTTP intake point 322 or other push-based publisher 320, custom intake point 332A or other pull-based publisher 330, etc.) or indexing system 212 (non-limiting example: indexing node 404, etc.). As yet another example, if the gateway 215 determines that the request or command relates to the modification of a dataset or rule, it can communicate the command or request to the metadata catalog 221.

Furthermore, in some cases, the gateway 215 can translate the request or command received from the external device into a command that can be interpreted by the component of the data intake and query system 108. For example, the request or command received by the gateway 215 may not be interpretable or understood by the component of the data intake and query system 108 that is to process the command or request. Moreover, as mentioned, in certain embodiments, one or more components of the data intake and query system 108 can use an API to interact with other components of the data intake and query system 108. Accordingly, the gateway 215 can generate a command for the component of the data intake and query system 108 that is to process the command or request based on the received command or request and the information about the API of the component of the data intake and query system 108 (or the component itself).

In some cases, the gateway 215 can expose a subset of components and/or a limited number of features of the components of the data intake and query system 108 to the external devices. For example, for the query system 214, the gateway 215, may expose the ability to submit queries but may not expose the ability to configure certain components of the query system 214, such as the resource catalog 510, resource monitor 508, and/or cache manager 516 (described in greater detail below). However, it will be understood that the gateway 215 can be configured to expose fewer or more components and/or fewer or more functions for the different components as desired. By limiting the components or commands for the components of the data intake and query system, the gateway 215 can provide improved security for the data intake and query system 108.

In addition to limiting the components or functions made available to external systems, the gateway 215 can provide authentication and/or authorization functionality. For example, with each request or command received by a client device and/or data source 202, the gateway 215 can authenticate the computing device from which the requester command was received and/or determine whether the requester has sufficient permissions or authorizations to make the request. In this way, the gateway 215 can provide additional security for the data intake and query system 108.

In some cases, the system 108 receives the request via an API. For example, a user can request access by entering a command that issues an API call to the system 108. In some cases, the API call or request can include the user's login information, such as a username and password, biometric data, or other credential, etc. In certain embodiments, the user's computer can make the API call based on a user accessing a particular URL or IP address, or entering login credentials on a webpage or login page.

In certain embodiments, the system 108 can authenticate the user by providing the credentials to an external authentication system that authenticates the user, etc. Based on a match of the received credentials with credentials of a known user, the system 108 can authenticate the user. In some cases, as part of authenticating the user the system 108 can determine the permissions of the users, such as, the datasets, or components of the system 108 that the user can access. In some cases, users can have different permissions to different components of the system. For example, one user may have access to the intake system 210, indexing system 212, and query system 214, and another user may only have access to the query system 214. As another example, one user may be identified as an administrator and have permissions to access and/or modify configuration files, etc., and another user may only have read-only permissions in order to execute queries and receive results of the queries.

After a user is authenticated, the system 108 may receive a request for a component of the data intake and query system 108. For example, the request may include a command to execute a query, modify/add/delete data in the metadata catalog 221 (e.g., dataset, rule, dataset association record, dataset configuration record, rule configuration record, data source, tenant information, user information, etc.), modify user permissions, process data, or modify a processing flow of data, etc. In some embodiments, the request for access and the request for the component can be part of the same API call or same request. For example, a request may include the login credentials of a user and a command for the component, etc.

Based on the authentication of the user, the system 108 can communicate the request to the component. In certain embodiments, the system 108 can modify the received request. For example, the component to receive the request may have its own API that uses different syntax or commands than the API of the system 108. In some such cases, the system 108 can modify the request for the component so that the component can properly understand the request and execute the action associated with the request. Furthermore, the component may require additional information that is not available to the user. In some such cases, the system 108 can include the additional information to the component.

In certain embodiments, a request may involve multiple components of the data intake and query system 108. In some cases, the components can perform the action concurrently or sequentially. For example, some actions may require that different steps be performed sequentially and others may allow for steps to be performed concurrently. In either case, the different components of the system can perform relevant actions based on the authentication by the system 108 and/or an authentication by the individual components, etc. In some embodiments, the component(s) can authenticate the user before performing the action. In some such embodiments, the component(s) can authenticate the user in a manner similar to that done by the system 108.

3.2. Intake System

As detailed below, data may be ingested at the data intake and query system 108 through an intake system 210 configured to conduct preliminary processing on the data, and make the data available to downstream systems or components, such as the indexing system 212, query system 214, third party systems, etc.

Figure 3A:
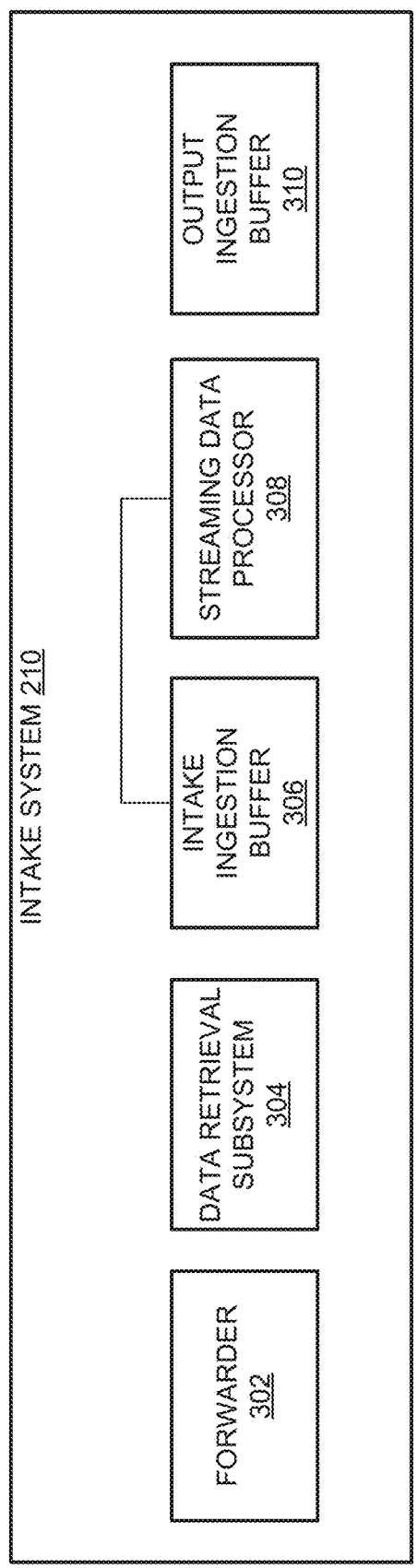
FIG. 3A is a block diagram of one embodiment an intake system.

One example configuration of an intake system 210 is shown in FIG. 3A. As shown in FIG. 3A, the intake system 210 includes a forwarder 302, a data retrieval subsystem 304, an intake ingestion buffer 306, a streaming data processor 308, and an output ingestion buffer 310. As described in detail below, the components of the intake system 210 may be configured to process data according to a streaming data model, such that data ingested into the data intake and query system 108 is processed rapidly (e.g., within seconds or minutes of initial reception at the intake system 210) and made available to downstream systems or components. The initial processing of the intake system 210 may include search or analysis of the data ingested into the intake system 210. For example, the initial processing can transform data ingested into the intake system 210 sufficiently, for example, for the data to be searched by a query system 214, thus enabling "real-time" searching for data on the data intake and query system 108 (e.g., without requiring indexing of the data). Various additional and alternative uses for data processed by the intake system 210 are described below.

Although shown as separate components, the forwarder 302, data retrieval subsystem 304, intake ingestion buffer 306, streaming data processors 308, and output ingestion buffer 310, in various embodiments, may reside on the same machine or be distributed across multiple machines in any combination. In one embodiment, any or all of the components of the intake system can be implemented using one or more computing devices as distinct computing devices or as one or more container instances or virtual machines across one or more computing devices. It will be appreciated by those skilled in the art that the intake system 210 may have more of fewer components than are illustrated in FIGS. 3A and 3B. In addition, the intake system 210 could include various web services and/or peer-to-peer network configurations or inter container communication network provided by an associated container instantiation or orchestration platform. Thus, the intake system 210 of FIGS. 3A and 3B should be taken as illustrative. For example, in some embodiments, components of the intake system 210, such as the ingestion buffers 306 and 310 and/or the streaming data processors 308, may be executed by one more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment. Accordingly, the hosted computing environment can include any proprietary or open source extensible computing technology, such as Apache Flink or Apache Spark, to enable fast or on-demand horizontal compute capacity scaling of the streaming data processor 308.

In some embodiments, some or all of the elements of the intake system 210 (e.g., forwarder 302, data retrieval subsystem 304, intake ingestion buffer 306, streaming data processors 308, and output ingestion buffer 310, etc.) may reside on one or more computing devices, such as servers, which may be communicatively coupled with each other and with the data sources 202, query system 214, indexing system 212, or other components. In other embodiments, some or all of the elements of the intake system 210 may be implemented as worker nodes as disclosed in U.S. patent application Ser. Nos. 15/665,159, 15/665,148, 15/665,187, 15/665,248, 15/665,197, 15/665,279, 15/665,302, and 15/665,339, each of which is incorporated by reference herein in its entirety (hereinafter referred to as "the Incorporated Applications").

As noted above, the intake system 210 can function to conduct preliminary processing of data ingested at the data intake and query system 108. As such, the intake system 210 illustratively includes a forwarder 302 that obtains data from a data source 202 and transmits the data to a data retrieval subsystem 304. The data retrieval subsystem 304 may be configured to convert or otherwise format data provided by the forwarder 302 into an appropriate format for inclusion at the intake ingestion buffer and transmit the message to the intake ingestion buffer 306 for processing. Thereafter, a streaming data processor 308 may obtain data from the intake ingestion buffer 306, process the data according to one or more rules, and republish the data to either the intake ingestion buffer 306 (e.g., for additional processing) or to the output ingestion buffer 310, such that the data is made available to downstream components or systems. In this manner, the intake system 210 may repeatedly or iteratively process data according to any of a variety of rules, such that the data is formatted for use on the data intake and query system 108 or any other system. As discussed below, the intake system 210 may be configured to conduct such processing rapidly (e.g., in "real-time" with little or no perceptible delay), while ensuring resiliency of the data.

3.2.1. Forwarder

The forwarder 302 can include or be executed on a computing device configured to obtain data from a data source 202 and transmit the data to the data retrieval subsystem 304. In some implementations, the forwarder 302 can be installed on a computing device associated with the data source 202 or directly on the data source 202. While a single forwarder 302 is illustratively shown in FIG. 3A, the intake system 210 may include a number of different forwarders 302. Each forwarder 302 may illustratively be associated with a different data source 202. A forwarder 302 initially may receive the data as a raw data stream generated by the data source 202. For example, a forwarder 302 may receive a data stream from a log file generated by an application server, from a stream of network data from a network device, or from any other source of data. In some embodiments, a forwarder 302 receives the raw data and may segment the data stream into "blocks", possibly of a uniform data size, to facilitate subsequent processing steps. The forwarder 302 may additionally or alternatively modify data received, prior to forwarding the data to the data retrieval subsystem 304. Illustratively, the forwarder 302 may "tag" metadata for each data block, such as by specifying a source, source type, or host associated with the data, or by appending one or more timestamp or time ranges to each data block.

In some embodiments, a forwarder 302 may comprise a service accessible to data sources 202 via a network 206. For example, one type of forwarder 302 may be capable of consuming vast amounts of real-time data from a potentially large number of data sources 202. The forwarder 302 may, for example, comprise a computing device which implements multiple data pipelines or "queues" to handle forwarding of network data to data retrieval subsystems 304.

3.2.2. Data Retrieval Subsystem

The data retrieval subsystem 304 illustratively corresponds to a computing device which obtains data (e.g., from the forwarder 302), and transforms the data into a format suitable for publication on the intake ingestion buffer 306. Illustratively, where the forwarder 302 segments input data into discrete blocks, the data retrieval subsystem 304 may generate a message for each block, and publish the message to the intake ingestion buffer 306. Generation of a message for each block may include, for example, formatting the data of the message in accordance with the requirements of a streaming data system implementing the intake ingestion buffer 306, the requirements of which may vary according to the streaming data system. In one embodiment, the intake ingestion buffer 306 formats messages according to the protocol buffers method of serializing structured data. Thus, the intake ingestion buffer 306 may be configured to convert data from an input format into a protocol buffer format. Where a forwarder 302 does not segment input data into discrete blocks, the data retrieval subsystem 304 may itself segment the data. Similarly, the data retrieval subsystem 304 may append metadata to the input data, such as a source, source type, or host associated with the data.

Generation of the message may include "tagging" the message with various information, which may be included as metadata for the data provided by the forwarder 302, and determining a "topic" for the message, under which the message should be published to the intake ingestion buffer 306. In general, the "topic" of a message may reflect a categorization of the message on a streaming data system. Illustratively, each topic may be associated with a logically distinct queue of messages, such that a downstream device or system may "subscribe" to the topic in order to be provided with messages published to the topic on the streaming data system.

In one embodiment, the data retrieval subsystem 304 may obtain a set of topic rules (e.g., provided by a user of the data intake and query system 108 or based on automatic inspection or identification of the various upstream and downstream components of the data intake and query system 108) that determine a topic for a message as a function of the received data or metadata regarding the received data. For example, the topic of a message may be determined as a function of the data source 202 from which the data stems. After generation of a message based on input data, the data retrieval subsystem can publish the message to the intake ingestion buffer 306 under the determined topic.

While the data retrieval subsystem 304 is depicted in FIG. 3A as obtaining data from the forwarder 302, the data retrieval subsystem 304 may additionally or alternatively obtain data from other sources, such as from the data source 202 and/or via the gateway 209. In some instances, the data retrieval subsystem 304 may be implemented as a plurality of intake points, each functioning to obtain data from one or more corresponding data sources (e.g., the forwarder 302, data sources 202, or any other data source), generate messages corresponding to the data, determine topics to which the messages should be published, and to publish the messages to one or more topics of the intake ingestion buffer 306.

Figure 3B:
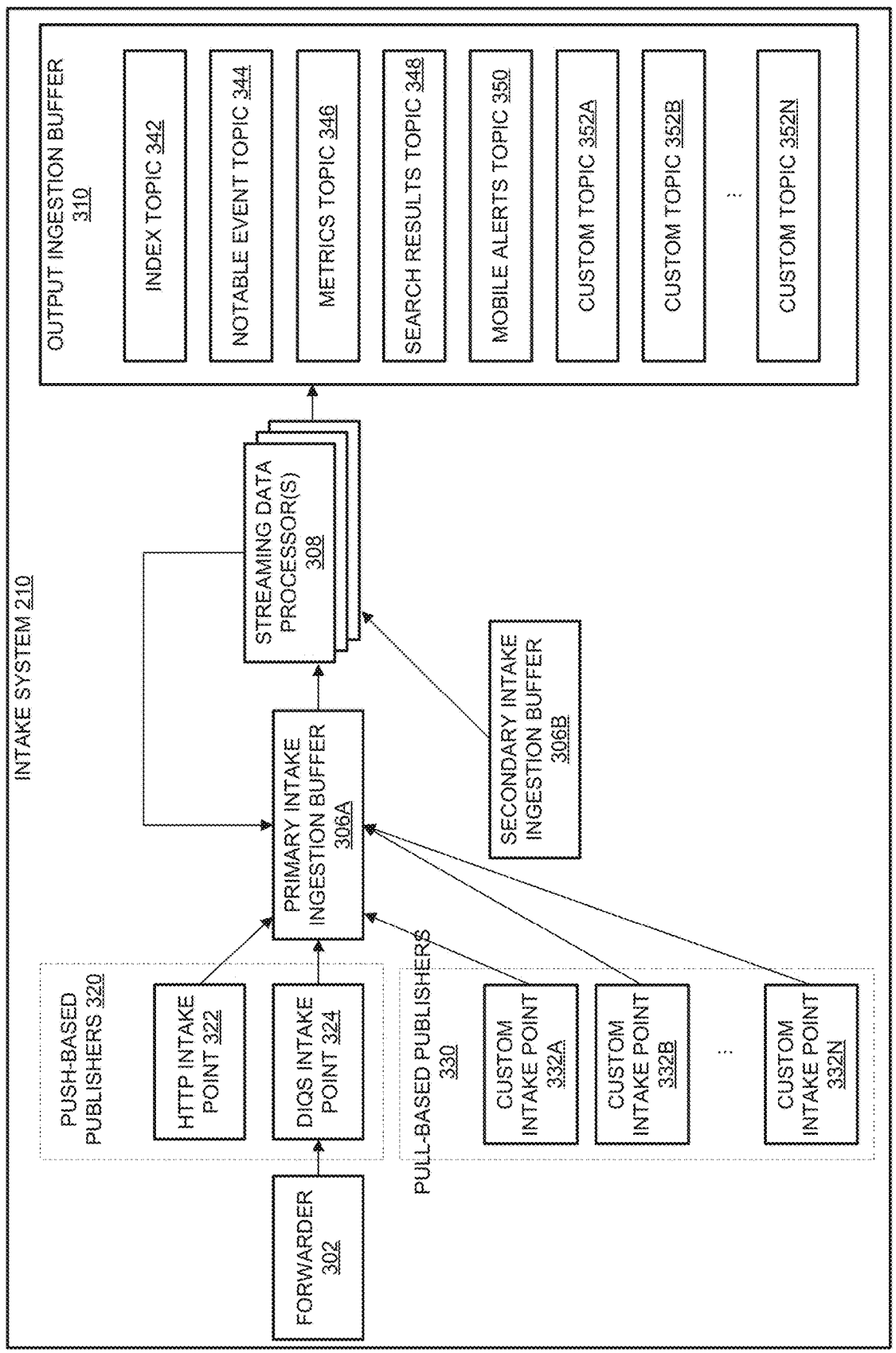
FIG. 3B is a block diagram of another embodiment of an intake system.

One illustrative set of intake points implementing the data retrieval subsystem 304 is shown in FIG. 3B. Specifically, as shown in FIG. 3B, the data retrieval subsystem 304 of FIG. 3A may be implemented as a set of push-based publishers 320 or a set of pull-based publishers 330. The illustrative push-based publishers 320 operate on a "push" model, such that messages are generated at the push-based publishers 320 and transmitted to an intake ingestion buffer 306 (shown in FIG. 3B as primary and secondary intake ingestion buffers 306A and 306B, which are discussed in more detail below). As will be appreciated by one skilled in the art, "push" data transmission models generally correspond to models in which a data source determines when data should be transmitted to a data target. A variety of mechanisms exist to provide "push" functionality, including "true push" mechanisms (e.g., where a data source independently initiates transmission of information) and "emulated push" mechanisms, such as "long polling" (a mechanism whereby a data target initiates a connection with a data source, but allows the data source to determine within a timeframe when data is to be transmitted to the data source).

As shown in FIG. 3B, the push-based publishers 320 illustratively include an HTTP intake point 322 and a data intake and query system (DIQS) intake point 324. The HTTP intake point 322 can include a computing device configured to obtain HTTP-based data (e.g., as JavaScript Object Notation, or JSON messages) to format the HTTP-based data as a message, to determine a topic for the message (e.g., based on fields within the HTTP-based data), and to publish the message to the primary intake ingestion buffer 306A. Similarly, the DIQS intake point 324 can be configured to obtain data from a forwarder 302, to format the forwarder data as a message, to determine a topic for the message, and to publish the message to the primary intake ingestion buffer 306A. In this manner, the DIQS intake point 324 can function in a similar manner to the operations described with respect to the data retrieval subsystem 304 of FIG. 3A.

In addition to the push-based publishers 320, one or more pull-based publishers 330 may be used to implement the data retrieval subsystem 304. The pull-based publishers 330 may function on a "pull" model, whereby a data target (e.g., the primary intake ingestion buffer 306A) functions to continuously or periodically (e.g., each n seconds) query the pull-based publishers 330 for new messages to be placed on the primary intake ingestion buffer 306A. In some instances, development of pull-based systems may require less coordination of functionality between a pull-based publisher 330 and the primary intake ingestion buffer 306A. Thus, for example, pull-based publishers 330 may be more readily developed by third parties (e.g., other than a developer of the data intake a query system 108), and enable the data intake and query system 108 to ingest data associated with third party data sources 202. Accordingly, FIG. 3B includes a set of custom intake points 332A through 332N, each of which functions to obtain data from a third-party data source 202, format the data as a message for inclusion in the primary intake ingestion buffer 306A, determine a topic for the message, and make the message available to the primary intake ingestion buffer 306A in response to a request (a "pull") for such messages.

While the pull-based publishers 330 are illustratively described as developed by third parties, push-based publishers 320 may also in some instances be developed by third parties. Additionally or alternatively, pull-based publishers may be developed by the developer of the data intake and query system 108. To facilitate integration of systems potentially developed by disparate entities, the primary intake ingestion buffer 306A may provide an API through which an intake point may publish messages to the primary intake ingestion buffer 306A. Illustratively, the API may enable an intake point to "push" messages to the primary intake ingestion buffer 306A, or request that the primary intake ingestion buffer 306A "pull" messages from the intake point. Similarly, the streaming data processors 308 may provide an API through which ingestions buffers may register with the streaming data processors 308 to facilitate pre-processing of messages on the ingestion buffers, and the output ingestion buffer 310 may provide an API through which the streaming data processors 308 may publish messages or through which downstream devices or systems may subscribe to topics on the output ingestion buffer 310. Furthermore, any one or more of the intake points 322 through 332N may provide an API through which data sources 202 may submit data to the intake points. Thus, any one or more of the components of FIGS. 3A and 3B may be made available via APIs to enable integration of systems potentially provided by disparate parties.

The specific configuration of publishers 320 and 330 shown in FIG. 3B is intended to be illustrative in nature. For example, the specific number and configuration of intake points may vary according to embodiments of the present application. In some instances, one or more components of the intake system 210 may be omitted. For example, a data source 202 may in some embodiments publish messages to an intake ingestion buffer 306, and thus an intake point 332 may be unnecessary. Other configurations of the intake system 210 are possible.

3.2.3. Ingestion Buffer(s)

The intake system 210 is illustratively configured to ensure message resiliency, such that data is persisted in the event of failures within the intake system 210. Specifically, the intake system 210 may utilize one or more ingestion buffers, which operate to resiliently maintain data received at the intake system 210 until the data is acknowledged by downstream systems or components. In one embodiment, resiliency is provided at the intake system 210 by use of ingestion buffers that operate according to a publish-subscribe ("pub-sub") message model. In accordance with the pub-sub model, data ingested into the data intake and query system 108 may be atomized as "messages," each of which is categorized into one or more "topics." An ingestion buffer can maintain a queue for each such topic, and enable devices to "subscribe" to a given topic. As messages are published to the topic, the ingestion buffer can function to transmit the messages to each subscriber, and ensure message resiliency until at least each subscriber has acknowledged receipt of the message (e.g., at which point the ingestion buffer may delete the message). In this manner, the ingestion buffer may function as a "broker" within the pub-sub model. A variety of techniques to ensure resiliency at a pub-sub broker are known in the art, and thus will not be described in detail herein. In one embodiment, an ingestion buffer is implemented by a streaming data source. As noted above, examples of streaming data sources include (but are not limited to) Amazon's Simple Queue Service ("SQS") or Kinesis™ services, devices executing Apache Kafka™ software, or devices implementing the Message Queue Telemetry Transport (MQTT) protocol. Any one or more of these example streaming data sources may be utilized to implement an ingestion buffer in accordance with embodiments of the present disclosure.

With reference to FIG. 3A, the intake system 210 may include at least two logical ingestion buffers: an intake ingestion buffer 306 and an output ingestion buffer 310. As noted above, the intake ingestion buffer 306 can be configured to receive messages from the data retrieval subsystem 304 and resiliently store the message. The intake ingestion buffer 306 can further be configured to transmit the message to the streaming data processors 308 for processing. As further described below, the streaming data processors 308 can be configured with one or more data transformation rules to transform the messages, and republish the messages to one or both of the intake ingestion buffer 306 and the output ingestion buffer 310. The output ingestion buffer 310, in turn, may make the messages available to various subscribers to the output ingestion buffer 310, which subscribers may include the query system 214, the indexing system 212, or other third-party devices (e.g., client devices 102, host devices 106, etc.).

Both the input ingestion buffer 306 and output ingestion buffer 310 may be implemented on a streaming data source, as noted above. In one embodiment, the intake ingestion buffer 306 operates to maintain source-oriented topics, such as topics for each data source 202 from which data is obtained, while the output ingestion buffer operates to maintain content-oriented topics, such as topics to which the data of an individual message pertains. As discussed in more detail below, the streaming data processors 308 can be configured to transform messages from the intake ingestion buffer 306 (e.g., arranged according to source-oriented topics) and publish the transformed messages to the output ingestion buffer 310 (e.g., arranged according to content-oriented topics). In some instances, the streaming data processors 308 may additionally or alternatively republish transformed messages to the intake ingestion buffer 306, enabling iterative or repeated processing of the data within the message by the streaming data processors 308.

While shown in FIG. 3A as distinct, these ingestion buffers 306 and 310 may be implemented as a common ingestion buffer. However, use of distinct ingestion buffers may be beneficial, for example, where a geographic region in which data is received differs from a region in which the data is desired. For example, use of distinct ingestion buffers may beneficially allow the intake ingestion buffer 306 to operate in a first geographic region associated with a first set of data privacy restrictions, while the output ingestion buffer 310 operates in a second geographic region associated with a second set of data privacy restrictions. In this manner, the intake system 210 can be configured to comply with all relevant data privacy restrictions, ensuring privacy of data processed at the data intake and query system 108.

Moreover, either or both of the ingestion buffers 306 and 310 may be implemented across multiple distinct devices, as either a single or multiple ingestion buffers. Illustratively, as shown in FIG. 3B, the intake system 210 may include both a primary intake ingestion buffer 306A and a secondary intake ingestion buffer 306B. The primary intake ingestion buffer 306A is illustratively configured to obtain messages from the data retrieval subsystem 304 (e.g., implemented as a set of intake points 322 through 332N). The secondary intake ingestion buffer 306B is illustratively configured to provide an additional set of messages (e.g., from other data sources 202). In one embodiment, the primary intake ingestion buffer 306A is provided by an administrator or developer of the data intake and query system 108, while the secondary intake ingestion buffer 306B is a user-supplied ingestion buffer (e.g., implemented externally to the data intake and query system 108).

As noted above, an intake ingestion buffer 306 may in some embodiments categorize messages according to source-oriented topics (e.g., denoting a data source 202 from which the message was obtained). In other embodiments, an intake ingestion buffer 306 may in some embodiments categorize messages according to intake-oriented topics (e.g., denoting the intake point from which the message was obtained). The number and variety of such topics may vary, and thus are not shown in FIG. 3B. In one embodiment, the intake ingestion buffer 306 maintains only a single topic (e.g., all data to be ingested at the data intake and query system 108).

The output ingestion buffer 310 may in one embodiment categorize messages according to content-centric topics (e.g., determined based on the content of a message).

Additionally or alternatively, the output ingestion buffer 310 may categorize messages according to consumer-centric topics (e.g., topics intended to store messages for consumption by a downstream device or system). An illustrative number of topics are shown in FIG. 3B, as topics 342 through 352N. Each topic may correspond to a queue of messages (e.g., in accordance with the pub-sub model) relevant to the corresponding topic. As described in more detail below, the streaming data processors 308 may be configured to process messages from the intake ingestion buffer 306 and determine which topics of the topics 342 through 352N into which to place the messages. For example, the index topic 342 may be intended to store messages, or data records, holding data that should be consumed and processed by the indexing system 212. The notable event topic 344 may be intended to store messages holding data that indicates a notable event at a data source 202 (e.g., the occurrence of an error or other notable event). The metrics topic 346 may be intended to store messages holding metrics data for data sources 202. The search results topic 348 may be intended to store messages holding data responsive to a search query. The mobile alerts topic 350 may be intended to store messages holding data for which an end user has requested alerts on a mobile device. A variety of custom topics 352A through 352N may be intended to hold data relevant to end-user-created topics.

As will be described below, by application of message transformation rules at the streaming data processors 308, the intake system 210 may divide and categorize messages from the intake ingestion buffer 306, partitioning or sharding the messages into output topics relevant to a specific downstream consumer. In this manner, specific portions of data input to the data intake and query system 108 may be "divided out" and handled separately, enabling different types of data to be handled differently, and potentially at different speeds. Illustratively, the index topic 342 may be configured to include all or substantially all data included in the intake ingestion buffer 306. Given the volume of data, there may be a significant delay (e.g., minutes or hours) before a downstream consumer (e.g., the indexing system 212) processes a message in the index topic 342. Thus, for example, searching data processed by the indexing system 212 may incur significant delay.

Conversely, the search results topic 348 may be configured to hold only messages corresponding to data relevant to a current query. Illustratively, on receiving a query from a client device 204, the query system 214 may transmit to the intake system 210 a rule that detects, within messages from the intake ingestion buffer 306A, data potentially relevant to the query. The streaming data processors 308 may republish these messages within the search results topic 348, and the query system 214 may subscribe to the search results topic 348 in order to obtain the data within the messages. In this manner, the query system 214 can "bypass" the indexing system 212 and avoid delay that may be caused by that system, thus enabling faster (and potentially real time) display of search results.

While shown in FIGS. 3A and 3B as a single output ingestion buffer 310, the intake system 210 may in some instances utilize multiple output ingestion buffers 310.

As described herein, in some embodiments, components of the intake system 210 can be reserved for a particular tenant or shared by multiple tenants. In some such embodiments, a separate output ingestion buffer 310 can be instantiated for each tenant or used by multiple tenants. In embodiments, where an output ingestion buffer 310 is assigned to a particular tenant, the output ingestion buffer 310 process data from only one tenant. In some such embodiments, the output ingestion buffer 310 may not receive or process data from any other tenants.

In certain embodiments, the output ingestion buffer 310 can be shared by multiple tenants. In some such embodiments, a partition or shard of the output ingestion buffer can 310 include data records associated with different tenants. For example, a first shard can include data records associated with Tenant A and Tenant B. As another example, the first shard may only include data from Tenant A and a second shard may only include data from Tenant B. In either case, the output ingestion buffer 310 can concurrently process data from different tenants. In some such embodiments, the output ingestion buffer 310 can provide the data from different tenants to the same or different components of the indexing system 212. For example, as described herein, the indexing system 212, or certain components thereof, can be reserved for a particular tenant or shared across multiple tenants. Accordingly, the output ingestion buffer 310 may provide the data to an indexing system 212 of a particular tenant or an indexing system 212 that is shared by multiple tenants.

3.2.4. Streaming Data Processors

As noted above, the streaming data processors 308 may apply one or more rules to process messages from the intake ingestion buffer 306A into messages on the output ingestion buffer 310. These rules may be specified, for example, by an end user of the data intake and query system 108 or may be automatically generated by the data intake and query system 108 (e.g., in response to a user query).

Illustratively, each rule may correspond to a set of selection criteria indicating messages to which the rule applies, as well as one or more processing sub-rules indicating an action to be taken by the streaming data processors 308 with respect to the message. The selection criteria may include any number or combination of criteria based on the data included within a message or metadata of the message (e.g., a topic to which the message is published). In one embodiment, the selection criteria are formatted in the same manner or similarly to extraction rules, discussed in more detail below. For example, selection criteria may include regular expressions that derive one or more values or a sub-portion of text from the portion of machine data in each message to produce a value for the field for that message. When a message is located within the intake ingestion buffer 306 that matches the selection criteria, the streaming data processors 308 may apply the processing rules to the message. Processing sub-rules may indicate, for example, a topic of the output ingestion buffer 310 into which the message should be placed. Processing sub-rules may further indicate transformations, such as field or unit normalization operations, to be performed on the message. Illustratively, a transformation may include modifying data within the message, such as altering a format in which the data is conveyed (e.g., converting millisecond timestamps values to microsecond timestamp values, converting imperial units to metric units, etc.), or supplementing the data with additional information (e.g., appending an error descriptor to an error code). In some instances, the streaming data processors 308 may be in communication with one or more external data stores (the locations of which may be specified within a rule) that provide information used to supplement or enrich messages processed at the streaming data processors 308. For example, a specific rule may include selection criteria identifying an error code within a message of the primary ingestion buffer 306A, and specifying that when the error code is detected within a message, that the streaming data processors 308 should conduct a lookup in an external data source (e.g., a database) to retrieve the human-readable descriptor for that error code, and inject the descriptor into the message. In this manner, rules may be used to process, transform, or enrich messages.

The streaming data processors 308 may include a set of computing devices configured to process messages from the intake ingestion buffer 306 at a speed commensurate with a rate at which messages are placed into the intake ingestion buffer 306. In one embodiment, the number of streaming data processors 308 used to process messages may vary based on a number of messages on the intake ingestion buffer 306 awaiting processing. Thus, as additional messages are queued into the intake ingestion buffer 306, the number of streaming data processors 308 may be increased to ensure that such messages are rapidly processed. In some instances, the streaming data processors 308 may be extensible on a per topic basis. Thus, individual devices implementing the streaming data processors 308 may subscribe to different topics on the intake ingestion buffer 306, and the number of devices subscribed to an individual topic may vary according to a rate of publication of messages to that topic (e.g., as measured by a backlog of messages in the topic). In this way, the intake system 210 can support ingestion of massive amounts of data from numerous data sources 202.

In some embodiments, an intake system 210 may comprise a service accessible to client devices 102 and host devices 106 via a network 104. For example, one type of forwarder 302 may be capable of consuming vast amounts of real-time data from a potentially large number of client devices 102 and/or host devices 106. The forwarder may, for example, comprise a computing device which implements multiple data pipelines or "queues" to handle forwarding of network data to indexers. A forwarder 302 may also perform many of the functions that are performed by an indexer. For example, a forwarder 302 may perform keyword extractions on raw data or parse raw data to create events. A forwarder 302 may generate time stamps for events. Additionally or alternatively, a forwarder 302 may perform routing of events to indexers. Data store 208 may contain events derived from machine data from a variety of sources all pertaining to the same component in an IT environment, and this data may be produced by the machine in question or by other components in the IT environment.

3.3. Indexing System

Figure 4B:
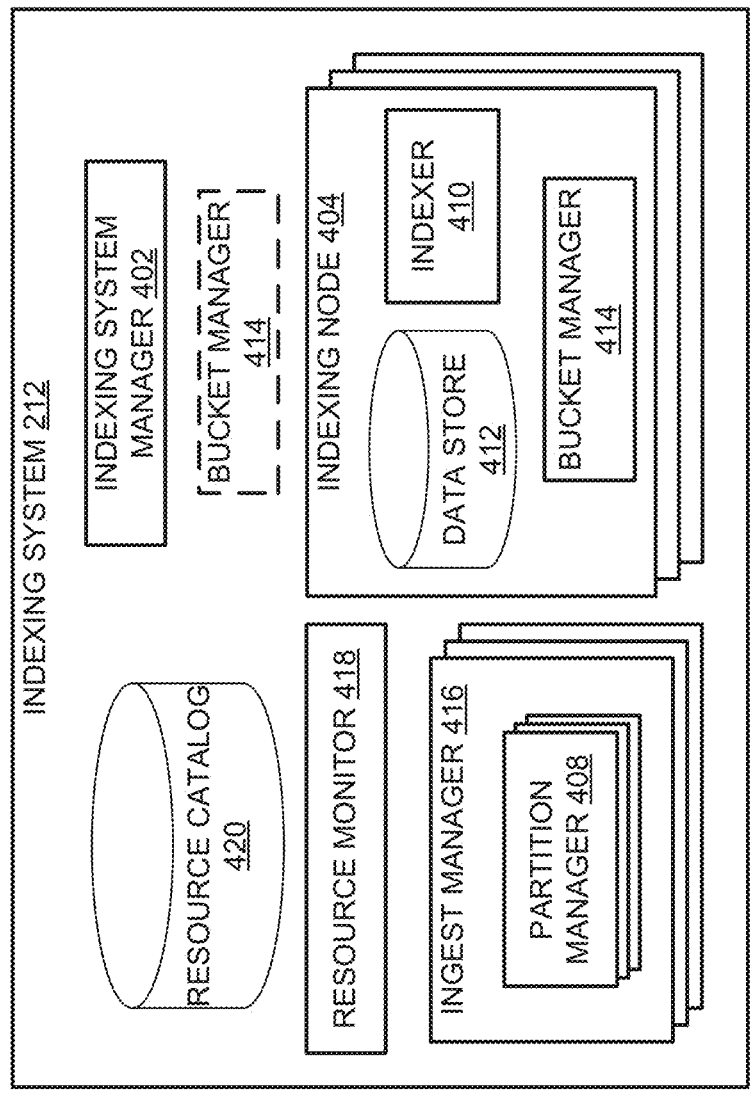
FIG. 4B is a block diagram illustrating an embodiment of an indexing system of the data intake and query system.

FIGS. 4A and 4B are block diagrams illustrating embodiment of an indexing system 212. As described herein, in some embodiments, an indexing system 212 can be instantiated for each distinct tenant. For example, in some cases, the embodiment of the indexing system 212 illustrated in FIG. 4A can be configured for a single tenant. In some such cases, each tenant can be assigned a separate indexing system manager 402, bucket manager 414, and indexing node(s) 404, including separate ingest manager(s) 406, partition managers 408, indexers 410, and data stores 412, etc. In such embodiments, the indexing node(s) 404, ingest manager(s) 406, and partition managers 408 may only process data associated with one tenant.

In certain embodiments, one or more components of the indexing system can be shared between multiple tenants. For example, in certain cases, the embodiment of the indexing system 212 illustrated in FIG. 4B can be configured for use by tenants. In some such cases, an ingest manager 406, partition manager 408, and/or indexing node 404 may concurrently receive and process data from multiple tenants. In addition, in the illustrated embodiment of FIG. 4B, the indexing system 212 can include a resource monitor 418 and a resource catalog 420.

It will be understood that the indexing system 212 can include fewer or more components. For example, in some embodiments, the common storage 216, the bucket manager 414, or the data store catalog 220 can form part of the indexing system 212, etc. In addition, although illustrated as part of the indexing system 212, it will be understood that the resource monitor 418 and the resource catalog 420 can, in some embodiments, be separate or independent of the indexing system 212. For example, in certain embodiments, the indexing system 212 and/or query system 214 can communicate with the resource monitor 418 and resource catalog 420 similar to the way in which the indexing system 212 and query system 214 can communicate with the data store catalog 220 and/or metadata catalog 221.

As detailed herein, the ingestion buffer 310 communicates one or more data streams to the indexing system 212 using multiple shards or partitions. The data from a particular partition can be referred to as, or include, one or more data records. In some cases, the data records from a particular partition correspond to data associated with different tenants, users, etc. In certain embodiments, the data records can include data to be processed by the indexing system 212 to generate one or more events or location information of the data to be processed by the indexing system 212 to generate one or more events. For example, the data records can include a file identifier and a pointer to the location of a file that includes the data to be processed by the indexing system 212 to generate one or more events. In some embodiments, the data records can include a tenant identifier that identifies the tenant associated with the file or data to be processed.

The indexing system 212 can receive, process, and store data corresponding to the shards or partitions. For example, the indexing system 212 can generate events that include a portion of machine data associated with a timestamp and store the events in buckets based on one or more of the timestamps, tenants, indexes, etc., associated with the data. Moreover, the indexing system 212 can include various components that enable it to provide a stateless indexing service, or indexing service that is able to rapidly recover without data loss if one or more components of the indexing system 212 become unresponsive or unavailable.

As described herein, each of the components of the indexing system 212 can be implemented using one or more computing devices as distinct computing devices or as one or more container instances or virtual machines across one or more computing devices. For example, in some embodiments, one or more the indexing system managers 402, the bucket managers 414, the resource catalog 420, the resource monitors 418, the ingest managers 406, and/or the indexing nodes 404 can be implemented as distinct computing devices with separate hardware, memory, and processors. In certain embodiments, one or more indexing system managers 402, bucket managers 414, resource catalogs 420, resource monitors 418, ingest managers 406, and/or indexing nodes 404 can be implemented on the same or across different computing devices as distinct container instances, with each container having access to a subset of the resources of a host computing device (e.g., a subset of the memory or processing time of the processors of the host computing device), but sharing a similar operating system. In some cases, the components can be implemented as distinct virtual machines across one or more computing devices, where each virtual machine can have its own unshared operating system but shares the underlying hardware with other virtual machines on the same host computing device.

3.3.1 Indexing System Manager

The indexing system manager 402 can monitor and manage the indexing nodes 404, and can be implemented as a distinct computing device, virtual machine, container, container of a pod, or a process or thread associated with a container. For example, the indexing system manager 402 can determine whether to generate an additional indexing node 404 based on a utilization rate or availability of the indexing nodes 404. In certain embodiments, the indexing system 212 can include one indexing system manager 402 to manage all indexing nodes 404 of the indexing system 212. In some embodiments, the indexing system 212 can include multiple indexing system managers 402 to manage the indexing nodes 404 of the indexing system 212. For example, an indexing system manager 402 can be instantiated for each computing device (or group of computing devices) configured as a host computing device for multiple indexing nodes 404.

The indexing system manager 402 can handle resource management, creation/destruction of indexing nodes 404, high availability, load balancing, application upgrades/rollbacks, logging and monitoring, storage, networking, service discovery, and performance and scalability, and otherwise handle containerization management of the containers of the indexing system 212. In certain embodiments, the indexing system manager 402 can be implemented using Kubernetes or Swarm.

In some cases, the indexing system manager 402 can monitor the available resources of a host computing device and request additional resources in a shared resource environment, based on workload of the indexing nodes 404 or create, destroy, or reassign indexing nodes 404 based on workload. Further, in some cases, the indexing system manager 402 system can assign indexing nodes 404 to handle data streams based on workload, system resources, etc. For example, in certain embodiments, the indexing system manager 402 can monitor or communicate with the resource catalog 420 to identify workload of one or more of the indexing nodes 404.

In some embodiments, such as where ingest manager(s) 406 are instantiated in a different isolated execution environment, container, or pod from the indexing nodes 404 (a non-limiting example is illustrated in FIG. 4B), the indexing system manager 402 can also perform any one or any combination of the aforementioned functions with respect to the ingest manager(s) 406. In some such embodiments, the indexing system 212 can include one indexing system manager 402 to manage the indexing nodes 404 and a second indexing system manager 402 to manage the ingest managers 406. However, it will be understood that in some cases a single indexing system manager 402 can manage the indexing nodes 404 and the ingest manager(s) 406 as desired.

3.3.2. Ingest Manager

One or more ingest managers 406 can receive the one or more data streams from the partitions (or shards). Each ingest manager 406 can be implemented as a distinct computing device, virtual machine, container, container of a pod, or a process or thread associated with a container. For example, in the illustrated embodiment of FIG. 4A, the ingest manager 406 is shown as part of an indexing node 404, such as a container of an indexing node pod. As another example, in the illustrated embodiment of FIG. 4A, the ingest manager 406 is shown as being separate from the indexing nodes 404, such as a container or pod that is separate from the indexing node container or pod.

Depending on the architecture of the indexing system 212, the functions of the ingest manager can vary. For example, when implemented as part of an indexing node, the ingest manager 406 can be used to distribute the data of one tenant between the indexing nodes 404 of that tenant. In such embodiments, the ingest manager can manage the processing of the data of the data stream(s) of a tenant by the indexing nodes 404 of that tenant. In some such embodiments, each indexing node 404 can include one or more ingest managers 406.

When instantiated separately from the indexing node 404, such as in a shared computing resource environment, the ingest manager(s) 406 can be used to distribute data associated with different tenants to different indexing nodes 404. In addition, in some such embodiments, the ingest manager(s) 406 be scaled separately or independently from the indexing nodes 404. For example, in some cases, the ingest manager 406 can have a 1:1 correspondence to indexing nodes 404. In other cases, the ingest managers 406 can have a one-to-many or many-to-one correspondence to indexing nodes 404. As will be described herein, in some cases, when instantiated separately from the indexing nodes, the ingest manager (or partition managers 408) can concurrently process data from multiple tenants and communicate the data from multiple tenants to different indexing nodes 404, each of which can concurrently process data from different tenants.

In certain embodiments, an ingest manager 406 can generate one or more partition managers 408 to manage the partitions or streams of data received from the intake system 210. For example, the ingest manager 406 can generate or assign a separate partition manager 408 for each partition or shard received from an output ingestion buffer 310. As another example, the ingest manager 406 can generate or assign a single partition manager 408 for multiple partitions.

In certain embodiments, data records can include a location marker. For example, the ingest manager 406 or partition manager 408 can receive (and/or store) the location markers in addition to or as part of the data records received from the ingestion buffer 310. Accordingly, the ingest manager 406 can track the location of the data in the ingestion buffer 310 that the ingest manager 406 (for example, a partition manager 408) has received from the ingestion buffer 310. In some embodiments, the ingest manager 406 stores the read pointers or location marker in one or more data stores, such as but not limited to, common storage 216, DynamoDB, S3, or another type of storage system, shared storage system, or networked storage system, etc. As the indexing nodes 404 are assigned to process data records, or as an indexing node 404 processes a data record, and the markers are updated by the intake system 210, the ingest manager 406 can be updated to reflect the changes to the read pointers or location markers. In this way, if a partition manager 408 becomes unresponsive or unavailable, the ingest manager 406 can assign a different partition manager 408 to manage the data stream without losing context of what data is to be read from the intake system 210. Accordingly, in some embodiments, by using the ingestion buffer 310 and tracking the location of the location markers in the shards of the ingestion buffer, the indexing system 212 can aid in providing a stateless indexing service.

In some embodiments, such as where the ingest manager 406 is implemented as part of an indexing node 404, the ingest manager 406 can be implemented as a background process, or daemon, in the indexing node 404 and the partition managers 408 can be implemented as threads, copies, or forks of the background process. In some cases, an ingest manager 406 can copy itself, or fork, to create a partition manager 408 or cause a template process to copy itself, or fork, to create each new partition manager 408, etc. This may be done for multithreading efficiency or for other reasons related to containerization and efficiency of managing indexers 410. In certain embodiments, the ingest manager 406 generates a new process for each partition manager 408. In some cases, by generating a new process for each partition manager 408, the ingest manager 406 can support multiple language implementations and be language agnostic. For example, the ingest manager 406 can generate a process for a partition manager 408 in python and create a second process for a partition manager 408 in golang, etc.

3.3.3. Partition Manager

A partition manager 408 can manage the distribution of the data records received from one or more partitions or shards of the ingestion buffer 310 to the indexing nodes 404. As mentioned, the ingest manager 406 can generate or assign one or more partition managers 408 for each partition or shard, or can assign a single partition manager 408 for more than one partition or shard. A partition manager 408 can be implemented as a distinct computing device, virtual machine, container, container of a pod, or a process or thread associated with a container. In some cases, the partition manager 408 can be implemented as part of the indexing node 404 (non-limiting example shown in FIG. 4A), as a sub-component of the ingest manager 406 (non-limiting example shown in FIG. 4B), or as a separate component of the indexing system 212.

In some cases, managing the distribution of data records can include, but is not limited to, communicating one or more data records, or portions thereof, to an indexing node 404 (for example, to an indexer 410) for processing, monitoring the indexing node 404, monitoring the size of data being processed by the indexing node 404, instructing the indexing node 404 to move the data to common storage 216, or reporting the storage of the data to the intake system 210.

A partition manager 408 can receive data records from one or more partition(s) and can distribute the data records to one or more indexing nodes 404. In certain embodiments, such as the embodiment shown in FIG. 4A, the partition manager 408 can assign data records to one or more indexing nodes 404 based on their availability.

In some embodiments, such as the embodiment shown in FIG. 4B, the partition manager 408 can communicate a data record to an indexing node 404 for processing based on a data identifier associated with the data record. In certain embodiments, the data records received from a partition of the intake system can be associated with different data identifiers (non-limiting examples: tenant identifier, data source identifier, sourcetype identifier, etc.). For example, the data records received from the ingestion buffer 310 can be associated with different tenants. In some cases, using the data identifier, the partition manager 408 can determine which indexing node 404 is to process a particular data record. For example, based on a tenant identifier, the partition manager 408 can communicate data records associated with the same tenant to the same indexing node 404 (or group of indexing nodes 404). Accordingly, a particular partition manager 408 can process data records from different tenants, data sources, or with different sourcetypes.

In some embodiments, the partition manager 408 can determine which indexing node 404 to process the data based on an indexing node assignment. In certain embodiments, the partition manager 408 can determine the indexing node assignment itself or receive the indexing node assignment from another component of the data intake and query system 108 or indexing system 212, such as the resource catalog 420 or resource monitor 418.

In some cases, the partition manager 408 can selectively and dynamically distribute data records associated with different tenants to different indexing nodes 404 for processing. Furthermore, in certain embodiments, the partition manager 408 and/or ingest manager 406 can track which indexing node 404 is assigned to process which data record. In this way, if an indexing node 404 fails or becomes unresponsive, the partition manager 408 can know which data records are to be reassigned to other indexing nodes 404. In some embodiments, the partition manager 408 receives data from a pub-sub messaging system, such as the ingestion buffer 310. As described herein, the ingestion buffer 310 can have one or more streams of data and one or more shards or partitions associated with each stream of data. Each stream of data can be separated into shards and/or other partitions or types of organization of data. In certain cases, each shard can include data from multiple tenants, indexes, etc. For example, one shard can include records from Tenants A, B, and C, and a second shard can include records from Tenants B, C, and D.

In some cases, each shard can correspond to data associated with a particular tenant, index, source, sourcetype, etc. Accordingly, in some embodiments, the indexing system 212 can include a partition manager 408 for individual tenants, indexes, sources, sourcetypes, etc. In some cases, based on the tenant identifier associated with a particular data record, the indexing system 212 can manage and process the data differently. For example, the indexing system 212 can assign more indexing nodes 404 to process data from one tenant than another tenant, or store buckets associated with one tenant or index more frequently to common storage 216 than buckets associated with a different tenant or index, etc.

In certain embodiments, each shard can include data associated with multiple tenants, indexes, sources, or sourcetypes. In some such embodiments, the partition manager 408 assigned to a particular shard can concurrently process data associated with multiple tenants, indexes, sources, or sourcetypes.

In some embodiments, a partition manager 408 receives data from one or more of the shards or partitions of the ingestion buffer 310. The partition manager 408 can forward one or more data records from the shards/partitions to indexing nodes 404 for processing. In some cases, the amount or size of the data record(s) coming through a partition may exceed the partition's (or ingestion buffer's 310) throughput. For example, 4 MB/s of data records may be sent to an ingestion buffer 310 for a particular partition, but the ingestion buffer 310 may be able to process only 2 MB/s of data per partition. Accordingly, in some embodiments, one or more data records can include a reference to a location in storage where the indexing node 404 can retrieve data. For example, a reference pointer to the data to be processed can be placed in the ingestion buffer 310 rather than putting the data to be processed itself into the ingestion buffer 310. The reference pointer can reference a chunk of data or a file that is larger than the throughput of the ingestion buffer 310 for that partition. In this way, the data intake and query system 108 can increase the throughput of individual partitions of the ingestion buffer 310. In some embodiments, the partition manager 408 can obtain the reference pointer from the ingestion buffer 310 and retrieve data from the referenced storage for processing. In certain embodiments, the partition manager 408 forwards the data record with the reference pointer to the indexing node 404 and the indexing node 404 retrieves the data from the referenced storage location. In some cases, the referenced storage to which reference pointers in the ingestion buffer 310 point can correspond to the common storage 216 or other shared storage or local storage. In some implementations, the chunks of data to which the reference pointers refer may be directed to common storage 216 from intake system 210, e.g., streaming data processor 308 or ingestion buffer 310.

In certain embodiments, as an indexing node 404 processes the data record(s), stores the data in buckets, and generates indexes of the data, the partition manager(s) 408 can monitor the indexing node 404 (and/or the indexer(s) 410). For example, a partition manager 408 can monitor the size of the data on an indexer 410 (inclusive or exclusive of the data store 412). In some cases, the size of the data on an indexer 410 can correspond to the data that is actually received from the particular partition of the intake system 210 (or retrieved using the data received from the particular partition), as well as data generated by the indexer 410 based on the received data (e.g., inverted indexes, summaries, etc.), and may correspond to one or more buckets. For instance, the indexer 410 may have generated one or more buckets for each tenant and/or index associated with data being processed in the indexer 410. In some cases, such as when multiple indexers 410 process the data records from the same index, the aggregated size of the data on each of those indexers 410 can correspond to the data that is actually received from the particular partition of the intake system 210, as well as data generated by the indexers 410 based on the received data.

Based on a bucket roll-over policy, the partition manager 408 can instruct the indexer(s) 410 to convert editable groups of data or buckets to non-editable groups or buckets and/or copy the data associated with the partition to common storage 216. In some embodiments, the bucket roll-over policy can indicate that the data, which may have been indexed by the indexer(s) 410 and stored in the data store 412 in various buckets, is to be copied to common storage 216 based on a determination that the size of the data satisfies a threshold size. In some cases, the bucket roll-over policy can include different threshold sizes for different data associated with different data identifiers identifying different tenants, data sources, sourcetypes, hosts, users, partitions, partition managers, or the like. In some implementations, the bucket roll-over policy may be modified by other factors, such as an identity of a tenant associated with one or more indexing nodes 404, system resource usage, which could be based on the pod(s) or other container(s) that contain the indexing node(s) 404, or one of the physical hardware layers with which the indexing node(s) 404 are running, or any other appropriate factor for scaling and system performance of indexing nodes 404 or any other system component.

In certain embodiments, the bucket roll-over policy can indicate data is to be copied to common storage 216 based on a determination that the amount of data (or a subset thereof) of the indexing node 404 satisfies a threshold amount. Further, the bucket roll-over policy can indicate that the one or more partition managers 408 or an indexing node 404 are to communicate with each other or with the ingest manager 406 or the ingest manager 406 to monitor the amount of data on the indexer 410 assigned to the indexing node 404 and determine that the amount of data on the indexer 410 (or data store 412) satisfies a threshold amount. Accordingly, based on the bucket roll-over policy, one or more of the partition managers 408 or the ingest manager 406 or the ingest manager 406 can instruct the indexer 410 to convert editable buckets to non-editable buckets and/or store the data.

In certain embodiments, the bucket roll-over policy can indicate that buckets are to be converted to non-editable buckets and stored in common storage 216 based on a collective size of buckets satisfying a threshold size. In some cases, the bucket roll-over policy can use different threshold sizes for conversion and storage. For example, the bucket roll-over policy can use a first threshold size to indicate when editable buckets are to be converted to non-editable buckets (e.g., stop writing to the buckets) and a second threshold size to indicate when the data (or buckets) are to be stored in common storage 216. In certain cases, the bucket roll-over policy can indicate that the partition manager(s) 408 are to send a single command to the indexing node(s) 404 or the indexer(s) 410 that causes the indexer(s) 410 to convert editable buckets to non-editable buckets and store the buckets in common storage 216.

The bucket roll-over policy can use other criteria to determine when buckets are to be converted and stored to common storage 216. For example, the bucket roll-over policy can indicate that buckets are to be rolled over at predetermined or dynamic time intervals with or without regard to size, etc.

Any one or any combination of the aforementioned bucket roll-over policies can be used for different data. In some cases, the indexers 410 can use different bucket roll-over policies for buckets associated with different data identifiers. For example, the bucket roll-over policy for buckets associated with Tenant A can use one threshold for determining when to roll buckets over to common storage and the bucket roll-over policy for buckets associated with Tenant B can use a different threshold. Accordingly, it will be understood that the indexers 410 and/or partition manager 408 can concurrently use/apply different bucket roll-over policies to different buckets.

Based on an acknowledgement that the data associated with a tenant, data source, sourcetype, host, user, partition, partition manager, or the like, has been stored in common storage 216, the partition manager 408 can communicate to the intake system 210, either directly or through the ingest manager 406 that the data has been stored and/or that the location marker or read pointer can be moved or updated. In some cases, the partition manager 408 receives the acknowledgement that the data has been stored from common storage 216 and/or from the indexing node 404, such as from the indexer 410. In certain embodiments, which will be described in more detail herein, the intake system 210 does not receive a communication that the data stored in intake system 210 has been read and processed until after that data has been stored in common storage 216.

The acknowledgement that the data has been stored in common storage 216 can also include location information about the data within the common storage 216. For example, the acknowledgement can provide a link, map, or path to the copied data in the common storage 216. Using the information about the data stored in common storage 216, the partition manager 408 can update the data store catalog 220. For example, the partition manager 408 can update the data store catalog 220 with an identifier of the data (e.g., bucket identifier, tenant identifier, partition identifier, etc.), the location of the data in common storage 216, a time range associated with the data, etc. In this way, the data store catalog 220 can be kept up-to-date with the contents of the common storage 216.

Moreover, as additional data is received from the intake system 210, the partition manager 408 can continue to communicate the data to the indexing nodes 404, monitor the size or amount of data on an indexer 410, instruct an indexer 410 to copy the data to common storage 216, communicate the successful storage of the data to the intake system 210, and update the data store catalog 220.

As a non-limiting example, consider the scenario in which the intake system 210 communicates a plurality of data records from a particular partition to the indexing system 212. The intake system 210 can track which data it has sent and a location marker for the data in the intake system 210 (e.g., a marker that identifies data that has been sent to the indexing system 212 for processing).

As described herein, the intake system 210 can retain or persistently make available the sent data until the intake system 210 receives an acknowledgement from the indexing system 212 that the sent data has been processed, stored in persistent storage (e.g., common storage 216), or is safe to be deleted. In this way, if an indexing node 404, ingest manager 406, or partition manager 408 assigned to process the sent data becomes unresponsive or is lost, e.g., due to a hardware failure or a crash, the data that was sent to the unresponsive component will not be lost. Rather, a different indexing node 404, ingest manager 406, or partition manager 408, can obtain and process the data from the intake system 210.

In some embodiments, as the data records from a partition of the ingest buffer 310 may be processed by different indexing nodes 404, the intake system 210 can retain or persistently make available a data record until the intake system 210 receives an acknowledgement from the indexing system 212 that the data record and other data records sent prior to the data record from the same partition have been processed. For example, if data records 1-5 are sent (in that order) to a partition manager 408 and distributed to five indexing nodes 404, the intake system 210 can retain data record 5 until it receives an acknowledgement that data records 1-4 have been processed and relevant data is stored in common storage 216. The intake system 210 can retain data record 5 even if the corresponding indexing node 404 completes its processing of data record 5 before the other indexing nodes 404 complete the processing of data records 1-4.

As the indexing system 212 stores the data in common storage 216, it can report the storage to the intake system 210. In response, the intake system 210 can update its marker to identify different data that has been sent to the indexing system 212 for processing, but has not yet been stored. By moving the marker, the intake system 210 can indicate that the previously-identified data has been stored in common storage 216, can be deleted from the intake system 210 or, otherwise, can be allowed to be overwritten, lost, etc. In certain embodiments, the indexing system 212 can report the storage of a particular data record once it determines that any records received prior to it from the same partition have also been stored.

With reference to the example above, in some embodiments, the ingest manager 406 can track the marker used by the ingestion buffer 310, and the partition manager 408 can receive data records from the ingestion buffer 310 and forward one or more data records to an indexing node 404, for example to an indexer 410, for processing (or use the data in the ingestion buffer to obtain data from a referenced storage location and forward the obtained data to the indexer). The partition manager 408 can monitor the amount of data being processed and instruct the indexing node 404 to copy the data to common storage 216. Once the data is stored in common storage 216, the partition manager 408 can report the storage to the ingestion buffer 310, so that the ingestion buffer 310 can update its marker. In addition, the ingest manager 406 can update its records with the location of the updated marker. In this way, if partition manager 408 become unresponsive or fails, the ingest manager 406 can assign a different partition manager 408 to obtain the data from the data stream without losing the location information, or if the indexer 410 becomes unavailable or fails, the ingest manager 406 can assign a different indexer 410 to process and store the data.

In some cases, the partition manager 408 dynamically distributes data records to different indexing nodes based on an indexing node assignment. In some embodiments, the partition manager 408 receives an indexing node assignment from the resource monitor 418, or other component of the data intake and query system 108 to determine which indexing node 404 to forward a data record. In certain embodiments, the partition manager 408 can determine the indexing node assignment itself, or include or consult an indexing node assignment listing that stores recent indexing node assignments. The table or list can be stored as a lookup table or in a database, etc.

In certain embodiments, the partition manager 408 can consult the indexing node assignment listing to determine whether a data identifier (non-limiting example: tenant identifier) relating to a particular data record to be distributed to an indexing node is already associated with a particular indexing node 404 or group of indexing nodes 404. If it is, the partition manager 408 can communicate the particular data record to the particular indexing node 404. If it is not, the partition manager 408 can determine the indexing node assignment or request one from the resource monitor 418, or other component of the data intake and query system 108 to determine which indexing node 404 to forward a data record.

In some cases, the indexing node assignment listing can include an indication of the data identifiers associated with data records that have been assigned to an indexing node 404 over a certain period of time, such as the last 15, 30, 60, or 90 seconds. In some cases, the indexing node assignment listing is cleared or deleted periodically, such as every 15, 30, 60, or 90 seconds be updated. In this way, the indexing node assignment listing can store the more recent indexing node assignments.

In some cases, a different indexing node assignment listing can be stored on or associated with each different partition manager 408. For example, a particular partition manager 408 can manage its own indexing node assignment listing by cataloging the indexing node assignments, which in some embodiments, can be received from the resource catalog 420. As another example, the ingest manager 406 can manage some or all of the indexing node assignment listings of the partition managers 408. In some cases, an indexing node assignment listing can be associated with some or all of the partition managers 408. For example, the ingest manager 406 or the partition managers 408 can manage the indexing node assignment listing by cataloging the indexing node assignments for all of the partition managers 408 associated with the ingest manager 406.

3.3.4. Indexing Nodes

The indexing nodes 404 can include one or more components to implement various functions of the indexing system 212. For example, in the illustrated embodiment of FIG. 4A, the indexing node 404 includes one or more ingest managers 406, partition managers 408, indexers 410, data stores 412, and/or bucket managers 414. As another example, in the illustrated embodiment of FIG. 4B, the indexing node 404 includes an indexer 410, a data store 412, and a bucket manager 414. As described herein, the indexing nodes 404 can be implemented on separate computing devices or as containers or virtual machines in a virtualization environment.

In some embodiments, an indexing node 404, can be implemented as a distinct computing device, virtual machine, container, pod, or a process or thread associated with a container, or using multiple-related containers. In certain embodiments, such as in a Kubernetes deployment, each indexing node 404 can be implemented as a separate container or pod. For example, one or more of the components of the indexing node 404 can be implemented as different containers of a single pod, e.g., on a containerization platform, such as Docker, the one or more components of the indexing node can be implemented as different Docker containers managed by synchronization platforms such as Kubernetes or Swarm. Accordingly, reference to a containerized indexing node 404 can refer to the indexing node 404 as being a single container or as one or more components of the indexing node 404 being implemented as different, related containers or virtual machines.

In certain embodiments, each indexing node 404 can include a monitoring module. In some cases, the monitoring modulate can communicate one or more of an indexing node identifier, metrics, status identifiers, network architecture data, or indexing node assignments to the resource monitor 418. For example, as described herein, the monitoring module can indicate a utilization rate of an indexing node 404, an amount of processing resources in use by an indexing node 404, an amount of memory used by an indexing node 404, an availability or responsiveness of an indexing node 404, etc.

3.3.4.1. Indexer and Data Store

As described herein, the indexer 410 can be the primary indexing execution engine, and can be implemented as a distinct computing device, container, container within a pod, etc. For example, the indexer(s) 410 can be tasked with parsing, processing, indexing, and storing the data received from the intake system 210 via the partition manager(s) 408. Specifically, in some embodiments, the indexer 410 can parse the incoming data to identify timestamps, generate events from the incoming data, group and save events into buckets, generate summaries or indexes (e.g., time series index, inverted index, keyword index, etc.) of the events in the buckets, and store the buckets in common storage 216.

As used herein, an index can refer to different data structures. In some cases, index can refer to a logical division of data similar to a partition. In certain cases, index can refer to a data structure, such as a file, that stores information about other data (non-limiting examples: a time series index, inverted index, keyword index). In addition, when used as a verb, index can refer to the processing and/or storing of data by the indexing system 212 and/or intake system 210. For example, in some cases, the indexing system 212 can index data associated with a particular index (non-limiting example: main index) to generate events and one or more indexes that include information about the generated events (non-limiting example: time series index). As part of the indexing, the generated events and indexes can be stored as part of or in association with the particular index. In some cases, one indexer 410 can be assigned to each partition manager 408 such that the single indexer 410 processes some or all of the data from its assigned partition manager 408. In certain embodiments, one indexer 410 can receive and process the data from multiple partition managers 408 in the indexing system. For example, with reference to FIG. 4A, one indexer 410 can receive and process the data from partition managers 408 on the same indexing node 404, on multiple indexing nodes 404, on the same ingest manager 406, or multiple ingest managers 406. As another example, with reference to FIG. 4B, an indexer 410 can receive and process data from multiple partition managers 408 and/or ingest managers 406. In some cases, multiple indexing nodes 404 or indexers 410 can be assigned to a single partition manager 408. In certain embodiments, the multiple indexing nodes 404 or indexers 410 can receive and process the data received from the single partition manager 408, as well as data from other partition managers 408.

In some embodiments, the indexer 410 can store the events and buckets in the data store 412 according to a bucket creation policy. The bucket creation policy can indicate how many buckets the indexer 410 is to generate for the data that it processes. In some cases, based on the bucket creation policy, the indexer 410 generates at least one bucket for each unique combination of a tenant and index (which may also be referred to as a partition) associated with the data that it processes. For example, if the indexer 410 receives data associated with three tenants A, B, C, then the indexer 410 can generate at least three buckets: at least one bucket for each of Tenant A, Tenant B, and Tenant C. As another example, if the indexer 410 receives data associated with index A of Tenant A from one partition or shard, and receives data associated with index A of Tenant A and index B of Tenant B from a second partition or shard, then the indexer 410 can generate at least two buckets: at least one bucket for Tenant A (including data corresponding to index A from partition 1 and partition 2) and Tenant B (including data corresponding to index B from partition 2).

In some cases, based on the bucket creation policy, the indexer 410 generates at least one bucket for each combination of tenant and index associated with the data that it processes. For example, if the indexer 410 receives data associated with three tenants A, B, C, each with two indexes X, Y, then the indexer 410 can generate at least six buckets: at least one bucket for each of Tenant A:Index X, Tenant A:Index Y, Tenant B:Index X, Tenant B:Index Y, Tenant C:Index X, and Tenant C:Index Y. Additional buckets may be generated for a tenant/index pair based on the amount of data received that is associated with the tenant/partition pair. It will be understood that the indexer 410 can generate buckets using a variety of policies. For example, the indexer 410 can generate one or more buckets for each tenant, partition, source, sourcetype, etc.

In some cases, if the indexer 410 receives data that it determines to be "old," e.g., based on a timestamp of the data or other temporal determination regarding the data, then it can generate a bucket for the "old" data. In some embodiments, the indexer 410 can determine that data is "old," if the data is associated with a timestamp that is earlier in time by a threshold amount than timestamps of other data in the corresponding bucket (e.g., depending on the bucket creation policy, data from the same partition and/or tenant) being processed by the indexer 410. For example, if the indexer 410 is processing data for the bucket for Tenant A:Index X having timestamps on 4/23 between 16:23:56 and 16:46:32 and receives data for the Tenant A:Index X bucket having a timestamp on 4/22 or on 4/23 at 08:05:32, then it can determine that the data with the earlier timestamps is "old" data and generate a new bucket for that data. In this way, the indexer 410 can avoid placing data in the same bucket that creates a time range that is significantly larger than the time range of other buckets, which can decrease the performance of the system as the bucket could be identified as relevant for a search more often than it otherwise would.

The threshold amount of time used to determine if received data is "old," can be predetermined or dynamically determined based on a number of factors, such as, but not limited to, time ranges of other buckets, amount of data being processed, timestamps of the data being processed, etc. For example, the indexer 410 can determine an average time range of buckets that it processes for different tenants and indexes. If incoming data would cause the time range of a bucket to be significantly larger (e.g., 25%, 50%, 75%, double, or other amount) than the average time range, then the indexer 410 can determine that the data is "old" data, and generate a separate bucket for it. By placing the "old" bucket in a separate bucket, the indexer 410 can reduce the instances in which the bucket is identified as storing data that may be relevant to a query. For example, by having a smaller time range, the query system 214 may identify the bucket less frequently as a relevant bucket then if the bucket had the large time range due to the "old" data. Additionally, in a process that will be described in more detail herein, time-restricted searches and search queries may be executed more quickly because there may be fewer buckets to search for a particular time range. In this manner, computational efficiency of searching large amounts of data can be improved. Although described with respect detecting "old" data, the indexer 410 can use similar techniques to determine that "new" data should be placed in a new bucket or that a time gap between data in a bucket and "new" data is larger than a threshold amount such that the "new" data should be stored in a separate bucket.

In some cases, based on a bucket roll-over policy, the indexer 410 periodically determines to convert editable groups of data or buckets to non-editable groups or buckets and/or copy the data associated with the partition or tenant identifier to common storage 216. For example, the bucket roll-over policy may indicate a time-based schedule so that the indexer 410 determines to copy and/or store the data every X number of seconds, or every X minute(s), and so forth.

In some embodiments, the bucket roll-over policy can indicate that the data, which may have been indexed by the indexer(s) 410 and stored in the data store 412 in various buckets, is to be copied to common storage 216 based on a determination that the size of the data satisfies a threshold size. In some cases, the bucket roll-over policy can include different threshold sizes for different data associated with different data identifiers identifying different tenants, data sources, sourcetypes, hosts, users, partitions, partition managers, or the like. The threshold amount can correspond to the amount of data being processed by the indexer 410 for any partition or any tenant identifier.

In some cases, the bucket roll-over policy may indicate that one or more buckets are to be rolled over based on a combination of a time-based schedule and size. For example, the bucket roll-over policy may indicate a time-based schedule in combination with a data threshold. For example, the indexer 410 can determine to copy the data to common storage 216 based on a determination that the amount of data stored on the indexer 410 satisfies a threshold amount or a determination that the data has not been copied in X number of seconds, X number of minutes, etc. Accordingly, in some embodiments, the indexer 410 can determine that the data is to be copied to common storage 216 without communication with the partition manager 408 or the ingest manager 416. In some implementations, the bucket roll-over policy may be modified by other factors, such as an identity of a tenant associated with one or more indexing nodes 404, system resource usage, which could be based on the pod(s) or other container(s) that contain the indexing node(s) 404, or one of the physical hardware layers with which the indexing node(s) 404 are running, or any other appropriate factor for scaling and system performance of indexing nodes 404 or any other system component.

In certain embodiments, the partition manager 408 can instruct the indexer 410 to copy the data to common storage 216 based on a bucket roll-over policy. For example, the partition manager 408 can monitor the size of the buckets and instruct the indexer 410 to copy the bucket to common storage 216. The threshold size can be predetermined or dynamically determined.

In certain embodiments, the partition manager 408 can monitor the size of multiple, or all, buckets associated with the indexes, indexing node(s) 404, or indexer(s) 410 being managed by the partition manager 408, and based on the collective size of the buckets satisfying a threshold size, instruct the indexer 410 to copy the buckets associated with the index to common storage 216. In certain cases, one or more partition managers 408, or ingest managers 406 can monitor the size of buckets across multiple, or all indexes, associated with one or more indexing nodes 404, and instruct the indexer(s) 410 to copy the buckets to common storage 216 based on the size of the buckets satisfying a threshold size.

As described herein, buckets in the data store 412 that are being edited by an indexer 410 can be referred to as hot buckets or editable buckets. For example, an indexer 410 can add data, events, and indexes to editable buckets in the data store 412, etc. Buckets in the data store 412 that are no longer edited by an indexer 410 can be referred to as warm buckets or non-editable buckets. In some embodiments, once an indexer 410 determines that a hot bucket is to be copied to common storage 216, it can convert the hot (editable) bucket to a warm (non-editable) bucket, and then move or copy the warm bucket to the common storage 216 based on a bucket roll-over policy. Once the warm bucket is moved or copied to common storage 216, an indexer 410 can notify a partition manager 408 that the data associated with the warm bucket has been processed and stored. As mentioned, a partition manager 408 can relay the information to the intake system 210. In addition, an indexer 410 can provide a partition manager 408 with information about the buckets stored in common storage 216, such as, but not limited to, location information, tenant identifier, index identifier, time range, etc. As described herein, a partition manager 408 can use this information to update the data store catalog 220. In certain embodiments, the indexer 410 can update the data store catalog 220. For example, the indexer 410 can update the data store catalog 220 based on the information it receives from the common storage 216 about the stored buckets.

3.3.4.2. Bucket Manager

The bucket manager 414 can manage the buckets stored in the data store 412, and can be implemented as a distinct computing device, virtual machine, container, container of a pod, or a process or thread associated with a container. In some cases, the bucket manager 414 can be implemented as part of the indexer 410, indexing node 404, the ingest manager 406, or as a separate component of the indexing system 212.

As described herein, the indexer 410 stores data in the data store 412 as one or more buckets associated with different tenants, indexes, etc. In some cases, the contents of the buckets are not searchable by the query system 214 until they are stored in common storage 216. For example, the query system 214 may be unable to identify data responsive to a query that is located in hot (editable) buckets in the data store 412 and/or the warm (non-editable) buckets in the data store 412 that have not been copied to common storage 216. Thus, query results may be incomplete or inaccurate, or slowed as the data in the buckets of the data store 412 are copied to common storage 216.

To decrease the delay between processing and/or indexing the data and making that data searchable, the indexing system 212 can use a bucket roll-over policy to determine when to convert hot buckets to warm buckets more frequently (or convert based on a smaller threshold size) and/or copy the warm buckets to common storage 216. While converting hot buckets to warm buckets more frequently or based on a smaller storage size can decrease the lag between processing the data and making it searchable, it can increase the storage size and overhead of buckets in common storage 216. For example, each bucket may have overhead associated with it, in terms of storage space required, processor power required, or other resource requirement. Thus, more buckets in common storage 216 can result in more storage used for overhead than for storing data, which can lead to increased storage size and costs. In addition, a larger number of buckets in common storage 216 can increase query times, as the opening of each bucket as part of a query can have certain processing overhead or time delay associated with it.

To decrease search times and reduce overhead and storage associated with the buckets (while maintaining a reduced delay between processing the data and making it searchable), the bucket manager 414 can monitor the buckets stored in the data store 412 and/or common storage 216 and merge buckets according to a bucket merge policy. For example, the bucket manager 414 can monitor and merge warm buckets stored in the data store 412 before, after, or concurrently with the indexer copying warm buckets to common storage 216.

The bucket merge policy can indicate which buckets are candidates for a merge or which bucket to merge (e.g., based on time ranges, size, tenant, index, or other identifiers), the number of buckets to merge, size or time range parameters for the merged buckets, and/or a frequency for creating the merged buckets. For example, the bucket merge policy can indicate that a certain number of buckets are to be merged, regardless of size of the buckets. As another non-limiting example, the bucket merge policy can indicate that multiple buckets are to be merged until a threshold bucket size is reached (e.g., 750 MB, or 1 GB, or more). As yet another non-limiting example, the bucket merge policy can indicate that buckets having a time range within a set period of time (e.g., 30 sec, 1 min., etc.) are to be merged, regardless of the number or size of the buckets being merged.

In addition, the bucket merge policy can indicate which buckets are to be merged or include additional criteria for merging buckets. For example, the bucket merge policy can indicate that only buckets having the same tenant identifier and/or index are to be merged, or set constraints on the size of the time range for a merged bucket (e.g., the time range of the merged bucket is not to exceed an average time range of buckets associated with the same source, tenant, partition, etc.). In certain embodiments, the bucket merge policy can indicate that buckets that are older than a threshold amount (e.g., one hour, one day, etc.) are candidates for a merge or that a bucket merge is to take place once an hour, once a day, etc. In certain embodiments, the bucket merge policy can indicate that buckets are to be merged based on a determination that the number or size of warm buckets in the data store 412 of the indexing node 404 satisfies a threshold number or size, or the number or size of warm buckets associated with the same tenant identifier and/or partition satisfies the threshold number or size. It will be understood, that the bucket manager 414 can use any one or any combination of the aforementioned or other criteria for the bucket merge policy to determine when, how, and which buckets to merge.

Once a group of buckets is merged into one or more merged buckets, the bucket manager 414 can copy or instruct the indexer 410 to copy the merged buckets to common storage 216. Based on a determination that the merged buckets are successfully copied to the common storage 216, the bucket manager 414 can delete the merged buckets and the buckets used to generate the merged buckets (also referred to herein as unmerged buckets or pre-merged buckets) from the data store 412 according to a bucket management policy.

In some cases, the bucket manager 414 can also remove or instruct the common storage 216 to remove corresponding pre-merged buckets from the common storage 216 according to the bucket management policy. The bucket management policy can indicate when the pre-merged buckets are to be deleted or designated as able to be overwritten from common storage 216 and/or in the data store 412.

In some cases, the bucket management policy can indicate that the pre-merged buckets are to be deleted immediately, once any queries relying on the pre-merged buckets are completed, after a predetermined amount of time, etc. Further, the bucket management policy can indicate different criteria for deleting data from common storage 216 and/or the data store 412.

In some cases, the pre-merged buckets may be in use or identified for use by one or more queries. Removing the pre-merged buckets from common storage 216 in the middle of a query may cause one or more failures in the query system 214 or result in query responses that are incomplete or erroneous. Accordingly, the bucket management policy, in some cases, can indicate to the common storage 216 that queries that arrive before a merged bucket is stored in common storage 216 are to use the corresponding pre-merged buckets and queries that arrive after the merged bucket is stored in common storage 216 are to use the merged bucket.

Further, the bucket management policy can indicate that once queries using the pre-merged buckets are completed, the buckets are to be removed from common storage 216. However, it will be understood that the bucket management policy can indicate removal of the buckets in a variety of ways. For example, per the bucket management policy, the common storage 216 can remove the buckets after on one or more hours, one day, one week, etc., with or without regard to queries that may be relying on the pre-merged buckets. In some embodiments, the bucket management policy can indicate that the pre-merged buckets are to be removed without regard to queries relying on the pre-merged buckets and that any queries relying on the pre-merged buckets are to be redirected to the merged bucket. It will be understood that the bucket manager 414 can use different bucket management policies for data associated with different data identifiers. For example, the bucket manager 414 can use one bucket management policy for data associated with a first tenant and use another bucket management policy for data associated with a second tenant. In this way, the bucket manager can concurrently use different bucket management policies for different data.

In addition to removing the pre-merged buckets and merged bucket from the data store 412 and removing or instructing common storage 216 to remove the pre-merged buckets from the data store(s) 218, the bucket manager 414 can update the data store catalog 220 or cause the indexer 410 or partition manager 408 to update the data store catalog 220 with the relevant changes. These changes can include removing reference to the pre-merged buckets in the data store catalog 220 and/or adding information about the merged bucket, including, but not limited to, a bucket, tenant, and/or partition identifier associated with the merged bucket, a time range of the merged bucket, location information of the merged bucket in common storage 216, etc. In this way, the data store catalog 220 can be kept up-to-date with the contents of the common storage 216.

3.3.5. Resource Catalog

The resource catalog 420 can store information relating to the indexing nodes 404 of the indexing system 212, such as, but not limited to, indexing node identifiers, metrics, status identifiers, network architecture data, or indexing node assignments. The resource catalog 420 can be maintained (for example, populated, updated, etc.) by the resource monitor 418. As mentioned, in some embodiments, the resource monitor 418 and resource catalog 420 can be separate or independent of the indexing system 212.

In some cases, the resource catalog 420 includes one or more indexing node identifiers. As mentioned, the indexing system 212 can include a plurality of indexing nodes 404. In some cases, the resource catalog 420 can include a different indexing node identifier for each indexing node 404 of the indexing system 212. In some cases, for example if the resource monitor 418 or the indexing system manager 402 generates a new indexing node 404, the resource monitor 418 can update the resource catalog 420 to include an indexing node identifier associated with the new indexing node 404. In some cases, for example, if an indexing node 404 is removed from the indexing system 212 or the indexing node 404 becomes unresponsive or unavailable, the resource monitor 418 can update the resource catalog 420 to remove an indexing node identifier associated with that indexing node 404. In this way, the resource catalog 420 can include up-to-date information relating to which indexing nodes 404 are instantiated in the indexing system 212.

In some cases, the resource catalog 420 includes one or more metrics associated with one or more of the indexing nodes 404 in the indexing system 212. For example, the metrics can include, but are not limited to, one or more performance metrics such as CPU-related performance metrics, memory-related performance metrics, availability performance metrics, or the like. For example, the resource catalog 420 can include information relating to a utilization rate of an indexing node 404, such as an indication of which indexing nodes 404, if any, are working at maximum capacity or at a utilization rate that satisfies utilization threshold, such that the indexing node 404 should not be used to process additional data for a time. As another example, the resource catalog 420 can include information relating to an availability or responsiveness of an indexing node 404, an amount of processing resources in use by an indexing node 404, or an amount of memory used by an indexing node 404.

In some cases, the information relating to the indexing nodes 404 includes one or more status identifiers associated with one or more of the indexing nodes 404 in the indexing system 212. For example, in some cases, a status identifier associated with one or more of the indexing nodes 404 can include information relating to an availability of an indexing node. For example, the information relating to the indexing nodes 404 can include an indication of whether an indexing node 404 is available or unavailable. In some instances, as described herein, this indication of availability can be based on a status update (or absence of a status update) from the indexing node 404. In some instances, an indexing node 404 is considered available if it is instantiated in the indexing system 212, provides periodic status updates to the resource monitor 418, and/or is responsive communications from the resource monitor 418. In some cases, an indexing node 404 is considered available if one or more metrics associated with the indexing node 404 satisfies a metrics threshold. For example, an indexing node 404 can considered available if a utilization rate of the indexing node 404 satisfies a utilization rate threshold. As another example, an indexing node 404 can considered available if an amount of memory used by or available to the indexing node 404 satisfies a memory threshold (non-limiting example: available memory >10% of total memory, etc.). As another example, an indexing node 404 can be considered available if an amount of available processing resources of the indexing node 404 satisfies a processing resources threshold (non-limiting example: CPU usage <90% of capacity, etc.). Similarly, in some cases, an indexing node 404 can be considered unavailable if one or more, or some or all, metrics associated with the indexing node 404 do not satisfy a metrics threshold.

In some cases, the information relating to the indexing nodes 404 includes information relating to a network architecture associated with one or more of the indexing nodes 404 in the indexing system 212. For example, information relating to a network architecture can include an indication of when, where, or on what host machine, an indexing node is instantiated. As another example, information relating to a network architecture can include an indication of a location of an indexing node 404, for example with reference to other indexing nodes 404. As another example, information relating to a network architecture can include an indication of computing resources shared with other indexing nodes 404, such as data stores, processors, I/O, etc.

In some cases, the information relating to the indexing nodes 404 includes information relating to one or more indexing node assignments. As described herein, an indexing node assignment can include an indication of a mapping between a particular indexing node 404 and an identifier (for example, a tenant identifier, a partition manager identifier, etc.) or between a particular node and a data record received from the intake system 210. In this way, an indexing node assignment can be utilized to determine to which indexing node 404 a partition manager 408 should send data to process. For example, an indexing node assignment can indicate that a particular partition manager 408 should send its data to one or more particular indexing nodes 404. As another example, an indexing node assignment can indicate that some or all data associated with a particular identifier (for example, data associated with a particular tenant identifier) should be forwarded to one or more a particular indexing node 404 for processing. In some cases, a processing device associated with the resource catalog 420 can determine an indexing node assignment and can store the indexing node assignment in the resource catalog 420. In some cases, an indexing node assignment, is not stored in the resource catalog 420. For example, each time the resource monitor 418 receives a request for an indexing node assignment from a partition manager 408, the resource monitor 418 can use information stored in the resource catalog 420 to determine the indexing node assignment, but the indexing node assignment may not be stored in the resource catalog 420. In this way, the indexing node assignments can be altered, for example if necessary based on information relating to the indexing nodes 404.

3.3.6 Resource Monitor

The resource monitor 418 can monitor indexing nodes 404, populate and maintain the resource catalog 420 with relevant information, receive requests for indexing node 404 availability or assignments, identify indexing nodes 404 that are available to process data, and/or communicate information relating to available indexing nodes (or indexing node assignments). The resource monitor 418 can be implemented as a distinct computing device, virtual machine, container, container of a pod, or a process or thread associated with a container.

The resource monitor 418 maintains the resource catalog 420. For example, the resource monitor 418 can communicate with or monitor the indexing nodes 404 to determine or identify information relating to the indexing nodes 404, such as indexing node identifiers, metrics, status identifiers, network architecture data, or indexing node assignments, that it can used to build or update the resource catalog 420. The resource monitor 418 can populate the resource catalog 420 and/or update it over time. For example, as information relating to the indexing nodes 404 changes for the different indexing nodes 404, the resource monitor 418 can update the resource catalog 420. In this way, the resource catalog 420 can retain an up-to-date database of indexing node information.

In some cases, the resource monitor 418 can maintain the resource catalog 420 by pinging the indexing nodes 404 for information or passively receiving it based on the indexing nodes 404 independently reporting the information. For instance, the resource monitor 418 can ping or receive information from the indexing nodes 404 at predetermined intervals of time, such as every 1, 2, 5, 10, 30, or 60 seconds. In addition or alternatively, the indexing nodes 404 can be configured to automatically send their data to the resource monitor 418 and/or the resource monitor 418 can ping a particular indexing node 404 after the passage of a predetermined period of time (for example, 1, 2, 5, 10, 30, or 60 seconds) since the resource monitor 418 requested and/or received data from that particular indexing node 404. In some cases, the resource monitor 418 can determine that an indexing node 404 is unavailable or failing based on the communications or absence of communications from the indexing node 404, and can update the resource catalog 420 accordingly.

The resource monitor 418 can identify available indexing nodes 404 and provide indexing node assignments for processing data records. In some embodiments, the resource monitor 418 can respond to requests from partition managers 408 for an indexing node to process one or more data records. As described herein, a partition manager 408 can receive data records from the ingestion buffer 310. For each data record (or for a group of data records), the partition manager 408 can request the resource monitor 418 for an indexing node 404 to process a particular data record or group of data records, such as data records from the same tenant. In some cases, the resource monitor can respond with an indexing node identifier that identifies an available indexing node for the partition manager 408 to send the data. In certain cases, the request can include a data identifier associated with the data to be processed, such as a tenant identifier. The resource monitor 418 can use the data identifier to determine which indexing node 404 is to process the data.

The resource monitor 418 can identify available indexing nodes using one or more of various techniques. For example, in some cases, the resource monitor 418 identifies an available indexing node 404 based on data in the resource catalog 420 such as, but not limited to, indexing node identifiers, metrics, status identifiers, network architecture data, or indexing node assignments. In some cases, the resource monitor 418 can determine that an indexing node 404 is available if data relating to that indexing node satisfies a certain threshold. For example, the resource monitor 418 can determine that an indexing node 404 is available if it is instantiated in the indexing system 212, has recently reported data to the resource monitor 418, and/or is responsive to communications from the resource monitor 418.

In some cases, the resource monitor 418 can determine that an indexing node 404 is available if one or more metrics associated with the indexing node 404 satisfies a metrics threshold. For example, the resource monitor 418 can determine that an indexing node 404 is available if a utilization rate of the indexing node 404 satisfies a utilization rate threshold and/or if an amount of available memory available to the indexing node 404 satisfies a memory threshold. As another example, the resource monitor 418 can determine that an indexing node 404 is available if an amount of available processing resources of the indexing node 404 satisfies a processing resources threshold. Similarly, in some cases, an indexing node 404 can be considered unavailable if one or more, or some or all, metrics associated with the indexing node 404 do not satisfy a metrics threshold.

In addition to identifying available indexing nodes 404, the resource monitor 418 can identify to which indexing node a particular data record or group of records is to be sent. The resource monitor 418 can map or assign a data record to an indexing node to using one or more techniques. In some embodiments, the resource monitor 418 can use an indexing node mapping policy to determine how to map, link, or associate an indexing node to a data record.

In some embodiments, the indexing node mapping policy can indicate that data records are to be assigned to indexing nodes randomly, based on an order (e.g., sequentially assign indexing nodes 404 as requests are received), based on previous assignments, based on a data identifier associated with the data records, etc.

As described herein, each data record transmitted by the ingestion buffer 310 can be associated with a data identifier that, for example, relates to a particular data source 202, tenant, index, or sourcetype. In some cases, the resource monitor 418 can use the data identifier associated with the data record to assign the data record to a particular indexing node 404. In the event, a partition manager 408 receives other data records associated with the same data identifier, it can communicate the other data records to the same indexing node 404 for processing.

In some embodiments, the resource catalog 420 can store an indexing node assignment listing that associates indexing nodes 404 with data identifiers. In some such embodiments, the indexing node mapping policy can indicate that the resource monitor 418 is to use the listing to determine whether a particular data identifier is associated with an indexing node 404. As a non-limiting example, if the resource monitor 418 receives a request from a partition manager 408 to map a data record associated with a data identifier to an indexing node, the resource monitor 418 can use the indexing node assignment listing to identify the indexing node that is to process the data record. In some such embodiments, the indexing node assignment listing can include multiple indexing nodes 404 associated with the data identifier and the resource monitor 418 can assign one of the indexing nodes 404 based on its determined availability (non-limiting example: metrics relating to that indexing node 404 satisfy one or more metrics thresholds). Accordingly, based on the data identifier and the determined availability of the indexing nodes, the resource monitor 418 can assign an indexing node 404 to process the data record.

As described herein, in some cases, partition managers 408 can also store an indexing node assignment listing. In certain embodiments, the indexing node assignment listing stored by the partition managers 408 can be the same as the indexing node assignment listing stored by the resource catalog 420. For example, the resource monitor 418 can generate the indexing node assignment listing for the resource catalog 420 and distribute the indexing node assignment listing to the instantiated partition managers 408. In some embodiments, the indexing node assignment listing stored by the partition managers 408 can be different from the indexing node assignment listing stored by the resource catalog 420. For example, the indexing node assignment listing stored by the resource catalog 420 can correspond to indexing node assignments across some or all partition managers 408, whereas the indexing node assignment listing for a particular partition manager 408 may only include the indexing node assignments for data that it (or a group of related partition managers 408) has processed.

As another example, in some embodiments, the indexing node mapping policy can indicate that the resource monitor 418 is to use a hash function or other function to map a data identifier (or data record) to a particular indexing node 404. In certain embodiments, the resource monitor 418 can hash the data identifier, and use the output of the hash to identify an available indexing node 404. For example, if there are three indexing nodes, the resource monitor 418 can assign the data record to one of the indexing nodes 404 based on a hash of a tenant identifier of the data. In this way, other data associated with the same tenant can be assigned to the same indexing nodes 404.

In certain embodiments, the indexing node mapping policy can indicate that the resource monitor 418 is to use a consistent hash to map the data identifier to an indexing node 404. As part of using a consistent hash, the resource monitor 418 can perform a hash on identifiers of the indexing nodes and map the hash values to a ring. The resource monitor 418 can then perform a hash on the data identifier (non-limiting example: tenant identifier). Based on the location of the resulting hash value on the ring, the resource monitor 418 can assign the data record to an indexing node. In certain cases, the resource monitor 418 can assign the data record based on the location of the hashed data identifier to the location of the hashed indexing node identifiers on the ring. For example, the resource monitor 418 can map the data identifier to the indexing node 404 whose hashed node identifier is closest to or next in line (in a particular direction) on the hash ring to the hashed data identifier. In some cases, the resource monitor 418 maps the data identifier to multiple indexing nodes 404, for example, by selecting two or more indexing nodes that have a position on the hash ring that is closest, or next in line, to the hash value of the data identifier when fitted on the hash ring. In some cases, the consistent hash function can be configured such that even with a different number of indexing nodes 404 being instantiated in the indexing system 212, the output of the hashing will consistently identify the same indexing node 404, or have an increased probability of identifying the same indexing node 404.

In some instances, the indexing node mapping policy can indicate that the resource monitor 418 is to map a data identifier to an indexing node 404 randomly, or in a simple sequence (e.g., a first indexing nodes 404 is mapped to a first data identifier, a second indexing node 404 is mapped to a second data identifier, etc.). In other instances, as discussed, the indexing node mapping policy can indicate that the resource monitor 418 is to map data identifiers to indexing nodes 404 based on previous mappings.

In certain embodiments, according to the indexing node mapping policy, indexing nodes 404 may be mapped to data identifiers based on overlaps of computing resources of the indexing nodes 404. For example, if a partition manager 408 is instantiated on the same host system as an indexing node 404, the resource monitor 418 can assign the data from the partition manager to the indexing node 404.

Accordingly, it will be understood that the resource monitor 418 can map any indexing node 404 to any data identifier, and that the indexing node mapping policy can indicate that the resource monitor 418 is to use any one or any combination of the above-described mechanisms to map data identifiers (or data records) to indexing nodes 404.

Based on the determined mapping of a data identifier to an indexing node 404, the resource monitor 418 can respond to a partition manager 408. The response can include an identifier for the assigned indexing node that is to process the data record or the data records associated with a particular data identifier. In certain embodiments, the response can include instructions that the identified indexing node 404 is to be used for a particular length of time, such as one minute, five minutes, etc.

3.4. Query System

Figure 5:
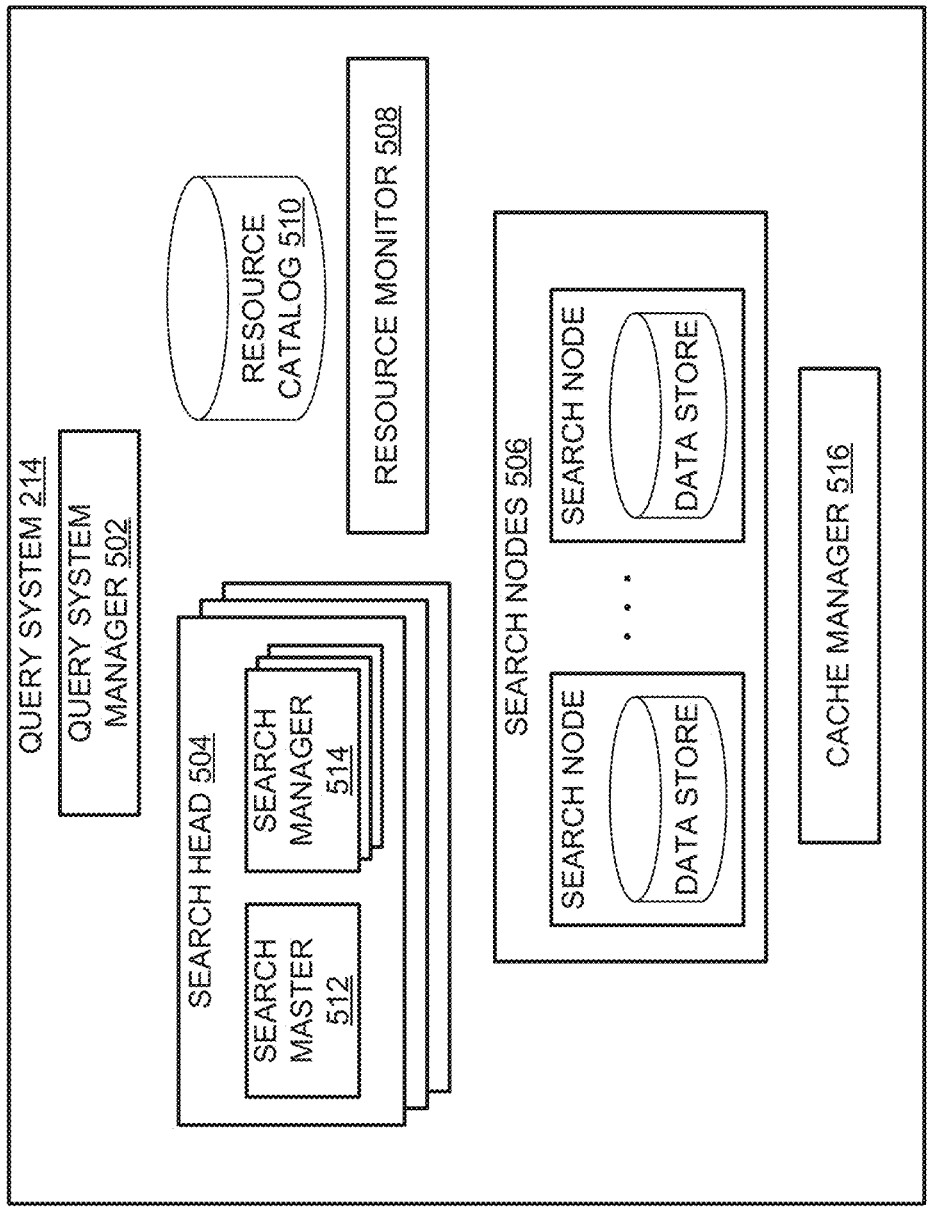
FIG. 5 is a block diagram illustrating an embodiment of a query system of the data intake and query system.

FIG. 5 is a block diagram illustrating an embodiment of a query system 214 of the data intake and query system 108. The query system 214 can receive, process, and execute queries from multiple client devices 204, which may be associated with different tenants, users, etc. Similarly, the query system 214 can execute the queries on data from the intake system 210, indexing system 212, common storage 216, acceleration data store 222, or other system. Moreover, the query system 214 can include various components that enable it to provide a stateless or state-free search service, or search service that is able to rapidly recover without data loss if one or more components of the query system 214 become unresponsive or unavailable.

In the illustrated embodiment, the query system 214 includes one or more query system managers 502 (collectively or individually referred to as query system manager 502), one or more search heads 504 (collectively or individually referred to as search head 504 or search heads 504), one or more search nodes 506 (collectively or individually referred to as search node 506 or search nodes 506), a resource monitor 508, and a resource catalog 510. However, it will be understood that the query system 214 can include fewer or more components as desired. For example, in some embodiments, the common storage 216, data store catalog 220, or query acceleration data store 222 can form part of the query system 214, etc.

As described herein, each of the components of the query system 214 can be implemented using one or more computing devices as distinct computing devices or as one or more container instances or virtual machines across one or more computing devices. For example, in some embodiments, the query system manager 502, search heads 504, and search nodes 506 can be implemented as distinct computing devices with separate hardware, memory, and processors. In certain embodiments, the query system manager 502, search heads 504, and search nodes 506 can be implemented on the same or across different computing devices as distinct container instances, with each container having access to a subset of the resources of a host computing device (e.g., a subset of the memory or processing time of the processors of the host computing device), but sharing a similar operating system. In some cases, the components can be implemented as distinct virtual machines across one or more computing devices, where each virtual machine can have its own unshared operating system but shares the underlying hardware with other virtual machines on the same host computing device.

3.4.1. Query System Manager

As mentioned, the query system manager 502 can monitor and manage the search heads 504 and search nodes 506, and can be implemented as a distinct computing device, virtual machine, container, container of a pod, or a process or thread associated with a container. For example, the query system manager 502 can determine which search head 504 is to handle an incoming query or determine whether to generate an additional search node 506 based on the number of queries received by the query system 214 or based on another search node 506 becoming unavailable or unresponsive. Similarly, the query system manager 502 can determine that additional search heads 504 should be generated to handle an influx of queries or that some search heads 504 can be de-allocated or terminated based on a reduction in the number of queries received.

In certain embodiments, the query system 214 can include one query system manager 502 to manage all search heads 504 and search nodes 506 of the query system 214. In some embodiments, the query system 214 can include multiple query system managers 502. For example, a query system manager 502 can be instantiated for each computing device (or group of computing devices) configured as a host computing device for multiple search heads 504 and/or search nodes 506.

Moreover, the query system manager 502 can handle resource management, creation, assignment, or destruction of search heads 504 and/or search nodes 506, high availability, load balancing, application upgrades/rollbacks, logging and monitoring, storage, networking, service discovery, and performance and scalability, and otherwise handle containerization management of the containers of the query system 214. In certain embodiments, the query system manager 502 can be implemented using Kubernetes or Swarm. For example, in certain embodiments, the query system manager 502 may be part of a sidecar or sidecar container that allows communication between various search nodes 506, various search heads 504, and/or combinations thereof.

In some cases, the query system manager 502 can monitor the available resources of a host computing device and/or request additional resources in a shared resource environment, based on workload of the search heads 504 and/or search nodes 506 or create, destroy, or reassign search heads 504 and/or search nodes 506 based on workload. Further, the query system manager 502 system can assign search heads 504 to handle incoming queries and/or assign search nodes 506 to handle query processing based on workload, system resources, etc. In some embodiments, the query system manager 502 system can assign search heads 504 to handle incoming queries based on a search head mapping policy, as described herein.

3.4.2. Search Head

As described herein, the search heads 504 can manage the execution of queries received by the query system 214. For example, the search heads 504 can parse the queries to identify the set of data to be processed and the manner of processing the set of data, identify the location of the data (non-limiting examples: intake system 210, common storage 216, acceleration data store 222, etc.), identify tasks to be performed by the search head and tasks to be performed by the search nodes 506, distribute the query (or sub-queries corresponding to the query) to the search nodes 506, apply extraction rules to the set of data to be processed, aggregate search results from the search nodes 506, store the search results in the query acceleration data store 222, return search results to the client device 204, etc.

As described herein, the search heads 504 can be implemented on separate computing devices or as containers or virtual machines in a virtualization environment. In some embodiments, the search heads 504 may be implemented using multiple-related containers. In certain embodiments, such as in a Kubernetes deployment, each search head 504 can be implemented as a separate container or pod. For example, one or more of the components of the search head 504 can be implemented as different containers of a single pod, e.g., on a containerization platform, such as Docker, the one or more components of the indexing node can be implemented as different Docker containers managed by synchronization platforms such as Kubernetes or Swarm. Accordingly, reference to a containerized search head 504 can refer to the search head 504 as being a single container or as one or more components of the search head 504 being implemented as different, related containers.

In the illustrated embodiment, the search heads 504 includes a search master 512 and one or more search managers 514 to carry out its various functions. However, it will be understood that the search heads 504 can include fewer or more components as desired. For example, the search head 504 can include multiple search masters 512.

In some embodiments, the search heads 504 can provide information to the resource monitor 508 in order to update the information stored in the resource catalog 510, which may include information such as an identifier for each search head 504, as well as availability information. For example, the information in the resource catalog 510 may identify and indicate search heads 504 that are instantiated and available (e.g., have sufficient bandwidth to process/execute a query), instantiated but are unavailable or unresponsive, and so forth. The updated information may indicate the amount of processing resources currently in use by each search head 504, the current utilization rate of each search head 504, the amount of memory currently used by each search head 504, the number of queries being processed/executed by a search head 504, etc. It should be noted that the information can be provided ad hoc or on a periodic basis. In some such embodiments, the information considered "current" (e.g., the amount of processing resources currently in use) may refer to the most-recent updated information (e.g., the information last provided), the accuracy of which may depend on the how recently the information as reported. The search heads 504 may provide information upon request (e.g., in response to a ping) or may provide information based on a set schedule (e.g., send information to the resource monitor 508 on a periodic basis).

3.4.2.1. Search Master

The search master 512 can manage the execution of the various queries assigned to the search head 504, and can be implemented as a distinct computing device, virtual machine, container, container of a pod, or a process or thread associated with a container. For example, in certain embodiments, as the search head 504 is assigned a query, the search master 512 can generate one or more search manager(s) 514 to manage the query. In some cases, the search master 512 generates a separate search manager 514 for each query that is received by the search head 504. In addition, once a query is completed, the search master 512 can handle the termination of the corresponding search manager 514.

In certain embodiments, the search master 512 can track and store the queries assigned to the different search managers 514. Accordingly, if a search manager 514 becomes unavailable or unresponsive, the search master 512 can generate a new search manager 514 and assign the query to the new search manager 514. In this way, the search head 504 can increase the resiliency of the query system 214, reduce delay caused by an unresponsive component, and can aid in providing a stateless searching service.

In some embodiments, the search master 512 is implemented as a background process, or daemon, on the search head 504 and the search manager(s) 514 are implemented as threads, copies, or forks of the background process. In some cases, a search master 512 can copy itself, or fork, to create a search manager 514 or cause a template process to copy itself, or fork, to create each new search manager 514, etc., in order to support efficient multithreaded implementations 3.4.2.2. Search Manager As mentioned, the search managers 514 can manage the processing and execution of the queries assigned to the search head 504, and can be implemented as a distinct computing device, virtual machine, container, container of a pod, or a process or thread associated with a container. In some embodiments, one search manager 514 manages the processing and execution of one query at a time. In such embodiments, if the search head 504 is processing one hundred queries, the search master 512 can generate one hundred search managers 514 to manage the one hundred queries. Upon completing an assigned query, the search manager 514 can await assignment to a new query or be terminated.

As part of managing the processing and execution of a query, and as described herein, a search manager 514 can parse the query to identify the set of data and the manner in which the set of data is to be processed (e.g., the transformations that are to be applied to the set of data), determine tasks to be performed by the search manager 514 and tasks to be performed by the search nodes 506, identify search nodes 506 that are available to execute the query, map search nodes 506 to the set of data that is to be processed, instruct the search nodes 506 to execute the query and return results, aggregate and/or transform the search results from the various search nodes 506, and provide the search results to a user and/or to the query acceleration data store 222.

In some cases, to aid in identifying the set of data to be processed, the search manager 514 can consult the data store catalog 220 (depicted in FIG. 2). As described herein, the data store catalog 220 can include information regarding the data stored in common storage 216. In some cases, the data store catalog 220 can include bucket identifiers, a time range, and a location of the buckets in common storage 216. In addition, the data store catalog 220 can include a tenant identifier and partition identifier for the buckets. This information can be used to identify buckets that include data that satisfies at least a portion of the query.

As a non-limiting example, consider a search manager 514 that has parsed a query to identify the following filter criteria that is used to identify the data to be processed: time range: past hour, partition: sales, tenant: ABC, Inc., keyword: Error. Using the received filter criteria, the search manager 514 can consult the data store catalog 220. Specifically, the search manager 514 can use the data store catalog 220 to identify buckets associated with the "_sales" partition and the tenant "ABC, Inc." and that include data from the "past hour." In some cases, the search manager 514 can obtain bucket identifiers and location information from the data store catalog 220 for the buckets storing data that satisfies at least the aforementioned filter criteria. In certain embodiments, if the data store catalog 220 includes keyword pairs, it can use the keyword "Error" to identify buckets that have at least one event that include the keyword "Error."

Accordingly, the data store catalog 220 can be used to identify relevant buckets and reduce the number of buckets that are to be searched by the search nodes 506. In this way, the data store catalog 220 can decrease the query response time of the data intake and query system 108. In addition, in some embodiments, using the bucket identifiers and/or the location information, the search manager 514 can identify and/or assign one or more search nodes 506 to search the corresponding buckets.

In some embodiments, the use of the data store catalog 220 to identify buckets for searching can contribute to the statelessness of the query system 214 and search head 504. For example, if a search head 504 or search manager 514 becomes unresponsive or unavailable, the query system manager 502 or search master 512, as the case may be, can spin up or assign an additional resource (e.g., new search head 504 or new search manager 514) to execute the query. As the bucket information is persistently stored in the data store catalog 220, data lost due to the unavailability or unresponsiveness of a component of the query system 214 can be recovered by using the bucket information in the data store catalog 220.

In certain embodiments, to identify search nodes 506 that are available to execute the query, the search manager 514 can consult the resource catalog 510. As described herein, the resource catalog 510 can include information regarding the search nodes 506 (and search heads 504). In some cases, the resource catalog 510 can include an identifier for each search node 506, as well as utilization and availability information. For example, the resource catalog 510 can identify search nodes 506 that are instantiated but are unavailable or unresponsive. In addition, the resource catalog 510 can identify the utilization rate of the search nodes 506. For example, the resource catalog 510 can identify search nodes 506 that are working at maximum capacity or at a utilization rate that satisfies utilization threshold, such that the search node 506 should not be used to execute additional queries for a time.

In addition, the resource catalog 510 can include architectural information about the search nodes 506. For example, the resource catalog 510 can identify search nodes 506 that share a data store and/or are located on the same computing device, or on computing devices that are co-located. In some embodiments, the search manager 514 can consult the resource monitor 508, which can retrieve the relevant information from the resource catalog 510 and provide it to the search manager 514.

Accordingly, in some embodiments, based on the receipt of a query, a search manager 514 can consult the resource catalog 510 (or the resource monitor 508) for search nodes 506 that are available to execute the received query. Based on the consultation of the resource catalog 510 (or the resource monitor 508), the search manager 514 can determine which search nodes 506 to assign to execute the query.

In some embodiments, the query system 214 (non-limiting examples: search manager 514 and/or resource monitor 508) can use a search node mapping policy to identify and/or assign search nodes 506 for a particular query or to access particular buckets as part of the query. In certain embodiments, the search node mapping policy can include sub-policies, such as a search head-node mapping policy and/or a search node-data mapping policy (described below).

Although reference is made herein to search manager 514 or resource monitor 508 identifying/assigning search nodes 506 for a particular query or bucket, it will be understood that any one any combination of the components of the query system 214 can make the assignments and/or use the search node mapping policy (or one of its sub-policies). For example, the search manager 514 can request one or more available search nodes 506 from the resource monitor 508 and then assign or map one or more of the available search nodes for the query, and/or assign the search nodes 506 to process particular buckets, etc. As another example, the search manager 514 can request one or more search nodes 506 and the resource monitor 508 can identify available search nodes 506, assign or map them to the search manager 514 for the query, inform the search manager 514 of the assigned search nodes 506, and/or assign the search nodes 506 to process particular buckets, etc. As another example, the resource monitor 508 may use a one search node mapping policy (e.g., search head-node mapping policy) to identify one or more search nodes 506 for a particular query and the search manager 514 may use a different search node mapping policy (e.g., search node-data mapping policy) to determine which buckets are to be accessed by which of the assigned search nodes, etc.

As part of the query execution, the search manager 514 can instruct the search nodes 506 to execute the query (or sub-query) on the assigned buckets. As described herein, the search manager 514 can generate specific queries or sub-queries for the individual search nodes 506. The search nodes 506 can use the queries to execute the query on the buckets assigned thereto.

In some embodiments, the search manager 514 stores the sub-queries and bucket assignments for the different search nodes 506. Storing the sub-queries and bucket assignments can contribute to the statelessness of the query system 214. For example, in the event an assigned search node 506 becomes unresponsive or unavailable during the query execution, the search manager 514 can re-assign the sub-query and bucket assignments of the unavailable search node 506 to one or more available search nodes 506 or identify a different available search node 506 from the resource catalog 510 to execute the sub-query. In certain embodiments, the query system manager 502 can generate an additional search node 506 to execute the sub-query of the unavailable search node 506. Accordingly, the query system 214 can quickly recover from an unavailable or unresponsive component without data loss and while reducing or minimizing delay.

During the query execution, the search manager 514 can monitor the status of the assigned search nodes 506. In some cases, the search manager 514 can ping or set up a communication link between it and the search nodes 506 assigned to execute the query. As mentioned, the search manager 514 can store the mapping of the buckets to the search nodes 506. Accordingly, in the event a particular search node 506 becomes unavailable or is unresponsive, the search manager 514 can assign a different search node 506 to complete the execution of the query for the buckets assigned to the unresponsive search node 506.

In some cases, as part of the status updates to the search manager 514, the search nodes 506 can provide the search manager with partial results and information regarding the buckets that have been searched. In response, the search manager 514 can store the partial results and bucket information in persistent storage. Accordingly, if a search node 506 partially executes the query and becomes unresponsive or unavailable, the search manager 514 can assign a different search node 506 to complete the execution, as described above. For example, the search manager 514 can assign a search node 506 to execute the query on the buckets that were not searched by the unavailable search node 506. In this way, the search manager 514 can more quickly recover from an unavailable or unresponsive search node 506 without data loss and while reducing or minimizing delay.

As the search manager 514 receives query results from the different search nodes 506, it can process the data. In some cases, the search manager 514 processes the partial results as it receives them. For example, if the query includes a count, the search manager 514 can increment the count as it receives the results from the different search nodes 506. In certain cases, the search manager 514 waits for the complete results from the search nodes before processing them. For example, if the query includes a command that operates on a result set, or a partial result set, e.g., a stats command (e.g., a command that calculates one or more aggregate statistics over the results set, e.g., average, count, or standard deviation, as examples), the search manager 514 can wait for the results from all the search nodes 506 before executing the stats command.

As the search manager 514 processes the results or completes processing the results, it can store the results in the query acceleration data store 222 or communicate the results to a client device 204. As described herein, results stored in the query acceleration data store 222 can be combined with other results over time. For example, if the query system 214 receives an open-ended query (e.g., no set end time), the search manager 515 can store the query results over time in the query acceleration data store 222. Query results in the query acceleration data store 222 can be updated as additional query results are obtained. In this manner, if an open-ended query is run at time B, query results may be stored from initial time A to time B. If the same open-ended query is run at time C, then the query results from the prior open-ended query can be obtained from the query acceleration data store 222 (which gives the results from time A to time B), and the query can be run from time B to time C and combined with the prior results, rather than running the entire query from time A to time C. In this manner, the computational efficiency of ongoing search queries can be improved.

3.4.2.2.1. Search Head-Node Mapping Policy

As described, the search node mapping policy can include one or more sub-policies. In certain embodiments, the search node mapping policy can include search head-node mapping policy, which can be used by the search manager 514 and/or resource monitor 508 to identify the search nodes 506 to use for a query or to assign search nodes 506 to a search head 504, to a search manager 514, or to a data identifier associated with the query. In some embodiments, the search head-node mapping policy can indicate that search nodes 506 are to be assigned for a particular query randomly, based on an order (e.g., sequentially assign search nodes 506 as queries are received), based on availability, based on previous assignments, based on a data identifier associated with the query, etc.

As described herein, each query received by the query system 214 can be associated with a data identifier that, for example, relates to a particular tenant, data source 202, index, or sourcetype, etc. In some cases, the resource monitor 508 can use the data identifier associated with a particular query to assign the search nodes 506 for the particular query.

In some embodiments, the resource catalog 510 can store a search node assignment listing that associates search nodes 506 with data identifiers. In some such embodiments, the search head-node mapping policy can indicate that the resource monitor 508 is to use the listing to determine whether a particular data identifier is associated with one or more search node(s) 506. As a non-limiting example, if the resource monitor 508 receives a request from a search manager 514 to map one or more search nodes 506 to a query associated with a data identifier, the resource monitor 508 can use the search node assignment listing to identify the search node(s) 506 that are to execute the query. In some such embodiments, the search node assignment listing can include multiple search nodes 506 associated with the data identifier and the resource monitor 508 can assign multiple search nodes 506 based on their determined availability (non-limiting example: metrics relating to that search node 506 satisfy one or more metrics thresholds). Accordingly, based on the data identifier and the determined availability of the search nodes 506, the resource monitor 508 can assign one or more search nodes 506 to execute the query.

In some cases, search heads 504 can store a search node assignment listing. In certain embodiments, the search node assignment listing stored by the search heads 504 can be the same as the search node assignment listing stored by the resource catalog 510. For example, the resource monitor 508 can generate the search node assignment listing for the resource catalog 510 and distribute the search node assignment listing to the instantiated search heads 504 and/or search managers 514. In some embodiments, the search node assignment listing stored by the search heads 504 can be different from the search node assignment listing stored by the resource catalog 510. For example, the search node assignment listing stored by the resource catalog 510 can correspond to search node assignments across some or all search heads 504 or search managers 514, whereas the search node assignment listing for a particular search head 504 or search manager 514 may only include the search node assignments for queries that it (or a group of related search heads 504) has processed.

As another example, in some embodiments, the search head-node mapping policy can indicate that the resource monitor 508 is to use a hash function or other function to map one or more particular search nodes 506 to a data identifier (or query) or search manager 514. In certain embodiments, the resource monitor 508 can hash the data identifier, and use the output of the hash to identify available search node(s) 506. For example, if there are ten search nodes 506 and three are to be used to execute a query associated with a particular tenant, the resource monitor 508 can assign three search nodes 506 to the search manager 514 that is managing the query based on a hash of a tenant identifier of the tenant. In this way, other queries associated with the same tenant can be assigned to the same search nodes 506, or the query system 214 can increase the likelihood that other queries associated with the same tenant can be assigned to the same search nodes 506.

In certain embodiments, the search head-node mapping policy can indicate that the resource monitor 508 is to use a consistent hash to map the search node(s) 506 to the search manager 514 for the query. As part of using a consistent hash, the resource monitor 508 can perform a hash on identifiers of the search nodes 506 and map the hash values to a hash ring. The resource monitor 508 can then perform a hash on the data identifier associated with the query (non-limiting example: tenant identifier of the tenant whose data is to be queried). Based on the location of the resulting hash value on the hash ring, the resource monitor 508 can assign one or more search nodes 506 for the query. In certain cases, the resource monitor 508 can assign one or more search nodes 506 for the query based on the location of the hashed data identifier to the location of the hashed search node identifiers on the hash ring. For example, if three search nodes 506 are to be used for the query, the resource monitor 508 can map the data identifier to the three search nodes 506 whose hashed node identifier is closest to or next in line (in a particular direction) on the hash ring to the hashed data identifier. In some cases, the resource monitor 508 maps the data identifier to multiple search nodes 506, for example, by selecting two or more search nodes 506 that have a position on the hash ring that is closest, or next in line, to the hash value of the data identifier when fitted on the hash ring. In some cases, the consistent hash function can be configured such that even with a different number of search nodes 506 being instantiated in the query system 214, the output of the hashing will consistently identify the same search node(s) 506, or have an increased probability of identifying the same search node(s) 506 for queries from the same tenants.

In some instances, the search head-node mapping policy can indicate that the resource monitor 508 is to map search node 506 for a query randomly, or in a simple sequence (e.g., a first search node(s) 506 is mapped to a first query, a second search node 506 is mapped to a second query, etc.). In other instances, as discussed, the search head-node mapping policy can indicate that the resource monitor 508 is to map search nodes 506 to queries/data identifiers/search manager 514 based on previous mappings.

In certain embodiments, according to the search head-node mapping policy, search nodes 506 may be mapped to queries/data identifiers/search managers 514 based on overlaps of computing resources of the search nodes 506. For example, if a search manager 514 is instantiated on the same host system as a search node 506, the resource monitor 508 can assign the search node 506 to the query that the search manager 514 is managing.

Accordingly, it will be understood that the resource monitor 508 can map any search node 506 to any query/data identifier/search manager 514, and that the search head-node mapping policy can indicate that the resource monitor 508 is to use any one or any combination of the above-described mechanisms to map search nodes 506 to search managers 514/queries/data identifiers.

Based on the determined query/data identifier/search manager 514 to search node(s) 506 mapping, the resource monitor 508 can respond to a search manager 514. The response can include an identifier for the assigned search nodes 506 that are to execute the query. In certain embodiments, the response can include instructions that the identified search node(s) 506 are to be used for some or all of the query execution.

In some embodiments, the resource monitor 508 can use different policies for queries associated with different data identifiers. For example, for queries associated with Tenant A, the resource monitor may use a consistent hashing algorithm to assign search nodes 506. For queries associated with Tenant B, the resource monitor may use a pre-configured set of search nodes 506 to execute the query. Similarly, the resource monitor 508 can assign different numbers of search nodes for different queries based on the data identifiers associated with the queries or based on some other priority indicator. For example, the resource monitor 508 may dynamically assign up to twelve search nodes for queries associated with Tenant A based on the size of the query (e.g., amount of data to be processed as part of the query) and may consistently assign four search nodes for queries associated with Tenant B regardless of the size of the query. In some cases, the number of search nodes 506 assigned can be based on a priority level associated with the data identifier or the query. For example, tenants or queries associated with a higher priority level can be allocated a larger number of search nodes 506. In certain cases, the priority level can be based on an indication received from a user, the identity of the tenant, etc.

3.4.2.2.1. Search Node-Data Mapping Policy

As described, the search node mapping policy can include a search node-data mapping policy, which can be used to map search nodes 506 to the data that is to be processed. In some embodiments, the search node-data mapping policy can indicate how search nodes 506 are to be assigned to data (e.g., buckets) and when search nodes 506 are to be assigned to (and instructed to search) the data or buckets. As mentioned, the search node-data mapping policy can be used alone or in conjunction with the search head-node mapping policy (non-limiting example: the number and identity of search nodes 506 for a query are identified based on a search head-node mapping policy and the data accessed by the assigned search nodes is determined based on a search node-data mapping policy) as part of the search node mapping policy.

In some cases, the search manager 514 can map the search nodes 506 to buckets that include data that satisfies at least a portion of the query. For example, in some cases, the search manager 514 can consult the data store catalog 220 to obtain bucket identifiers of buckets that include data that satisfies at least a portion of the query, e.g., as a non-limiting example, to obtain bucket identifiers of buckets that include data associated with a particular time range. Based on the identified buckets and search nodes 506, the search manager 514 can dynamically assign (or map) search nodes 506 to individual buckets according to a search node-data mapping policy.

In some embodiments, the search node-data mapping policy can indicate that the search manager 514 is to assign all buckets to search nodes 506 as a single operation. For example, where ten buckets are to be searched by five search nodes 506, the search manager 514 can assign two buckets to a first search node 506, two buckets to a second search node 506, etc. In another embodiment, the search node-data mapping policy can indicate that the search manager 514 is to assign buckets iteratively. For example, where ten buckets are to be searched by five search nodes 506, the search manager 514 can initially assign five buckets (e.g., one buckets to each search node 506), and assign additional buckets to each search node 506 as the respective search nodes 506 complete the execution on the assigned buckets.

Retrieving buckets from common storage 216 to be searched by the search nodes 506 can cause delay or may use a relatively high amount of network bandwidth or disk read/write bandwidth. In some cases, a local or shared data store associated with the search nodes 506 may include a copy of a bucket that was previously retrieved from common storage 216. Accordingly, to reduce delay caused by retrieving buckets from common storage 216, the search node-data mapping policy can indicate that the search manager 514 is to assign, preferably assign, or attempt to assign the same search node 506 to search the same bucket over time. In this way, the assigned search node 506 can keep a local copy of the bucket on its data store (or a data store shared between multiple search nodes 506) and avoid the processing delays associated with obtaining the bucket from the common storage 216.

In certain embodiments, the search node-data mapping policy can indicate that the search manager 514 is to use a consistent hash function or other function to consistently map a bucket to a particular search node 506. The search manager 514 can perform the hash using the bucket identifier obtained from the data store catalog 220, and the output of the hash can be used to identify the search node 506 assigned to the bucket. In some cases, the consistent hash function can be configured such that even with a different number of search nodes 506 being assigned to execute the query, the output will consistently identify the same search node 506, or have an increased probability of identifying the same search node 506. For example, as described herein, the hashing function can include placing the hash of the search node identifiers and the hash of the bucket identifiers on a hash ring, and assigning buckets to the search nodes based on the proximity of the hash of the bucket identifiers to the hash of the search node identifiers. In some In certain embodiments where the query system 214 uses a hash ring as part of a search head-node mapping policy and a hash ring as part of a search node-data mapping policy, the hash rings can be different. For example, the first hash ring can include hash values of the indexing node identifiers and the data identifier associated with the query, and the second hash ring can include hash values of the bucket identifiers and indexing node identifiers. In some such embodiments, the first hash ring can be used to assign search nodes 506 for the query and the second hash ring can be used to assign buckets to the search nodes 506 assigned for the query.

In some embodiments, the query system 214 can store a mapping of search nodes 506 to bucket identifiers. The search node-data mapping policy can indicate that the search manager 514 is to use the mapping to determine whether a particular bucket has been assigned to a search node 506. If the bucket has been assigned to a particular search node 506 and that search node 506 is available, then the search manager 514 can assign the bucket to the search node 506. If the bucket has not been assigned to a particular search node 506, the search manager 514 can use a hash function to identify a search node 506 for assignment. Once assigned, the search manager 514 can store the mapping for future use.

In certain cases, the search node-data mapping policy can indicate that the search manager 514 is to use architectural information about the search nodes 506 to assign buckets. For example, if the identified search node 506 is unavailable or its utilization rate satisfies a threshold utilization rate, the search manager 514 can determine whether an available search node 506 shares a data store with the unavailable search node 506. If it does, the search manager 514 can assign the bucket to the available search node 506 that shares the data store with the unavailable search node 506. In this way, the search manager 514 can reduce the likelihood that the bucket will be obtained from common storage 216, which can introduce additional delay to the query while the bucket is retrieved from common storage 216 to the data store shared by the available search node 506.

In some instances, the search node-data mapping policy can indicate that the search manager 514 is to assign buckets to search nodes 506 randomly, or in a simple sequence (e.g., a first search nodes 506 is assigned a first bucket, a second search node 506 is assigned a second bucket, etc.). In other instances, as discussed, the search node-data mapping policy can indicate that the search manager 514 is to assign buckets to search nodes 506 based on buckets previously assigned to search nodes 506, in a prior or current search. As mentioned above, in some embodiments each search node 506 may be associated with a local data store or cache of information (e.g., in memory of the search nodes 506, such as random access memory LRAM" 1, disk-based cache, a data store, or other form of storage). Each search node 506 can store copies of one or more buckets from the common storage 216 within the local cache, such that the buckets may be more rapidly searched by search nodes 506. The search manager 514 (or cache manager 516) can maintain or retrieve from search nodes 506 information identifying, for each relevant search node 506, what buckets are copied within local cache of the respective search nodes 506. In the event that the search manager 514 determines that a search node 506 assigned to execute a search has within its data store or local cache a copy of an identified bucket, the search manager 514 can preferentially assign the search node 506 to search that locally-cached bucket.

In still more embodiments, according to the search node-data mapping policy, search nodes 506 may be assigned based on overlaps of computing resources of the search nodes 506. For example, where a containerized search node 506 is to retrieve a bucket from common storage 216 (e.g., where a local cached copy of the bucket does not exist on the search node 506), such retrieval may use a relatively high amount of network bandwidth or disk read/write bandwidth. Thus, assigning a second containerized search node 506 instantiated on the same host computing device might be expected to strain or exceed the network or disk read/write bandwidth of the host computing device. For this reason, in some embodiments, according to the search node-data mapping policy, the search manager 514 can assign buckets to search nodes 506 such that two containerized search nodes 506 on a common host computing device do not both retrieve buckets from common storage 216 at the same time.

Further, in certain embodiments, where a data store that is shared between multiple search nodes 506 includes two buckets identified for the search, the search manager 514 can, according to the search node-data mapping policy, assign both such buckets to the same search node 506 or to two different search nodes 506 that share the data store, such that both buckets can be searched in parallel by the respective search nodes 506.

The search node-data mapping policy can indicate that the search manager 514 is to use any one or any combination of the above-described mechanisms to assign buckets to search nodes 506. Furthermore, the search node-data mapping policy can indicate that the search manager 514 is to prioritize assigning search nodes 506 to buckets based on any one or any combination of: assigning search nodes 506 to process buckets that are in a local or shared data store of the search nodes 506, maximizing parallelization (e.g., assigning as many different search nodes 506 to execute the query as are available), assigning search nodes 506 to process buckets with overlapping timestamps, maximizing individual search node 506 utilization (e.g., ensuring that each search node 506 is searching at least one bucket at any given time, etc.), or assigning search nodes 506 to process buckets associated with a particular tenant, user, or other known feature of data stored within the bucket (e.g., buckets holding data known to be used in time-sensitive searches may be prioritized). Thus, according to the search node-data mapping policy, the search manager 514 can dynamically alter the assignment of buckets to search nodes 506 to increase the parallelization of a search, and to increase the speed and efficiency with which the search is executed.

It will be understood that the search manager 514 can assign any search node 506 to search any bucket. This flexibility can decrease query response time as the search manager can dynamically determine which search nodes 506 are best suited or available to execute the query on different buckets. Further, if one bucket is being used by multiple queries, the search manager 515 can assign multiple search nodes 506 to search the bucket. In addition, in the event a search node 506 becomes unavailable or unresponsive, the search manager 514 can assign a different search node 506 to search the buckets assigned to the unavailable search node 506. In some embodiments, the resource monitor 508 can use different search node-data mapping policies for queries associated with different data identifiers. For example, for queries associated with Tenant A, the resource monitor may use a consistent hashing algorithm to assign buckets to search nodes 506. For queries associated with Tenant B, the resource monitor may iteratively assign buckets to search nodes 506 to execute the query. Similarly, as described herein with reference to the search head-node mapping policy, a different number of search nodes 506 can be assigned for queries based on a priority level of the query and/or the data identifier associated with the query.

3.4.3. Search Nodes

As described herein, the search nodes 506 can be the primary query execution engines for the query system 214, and can be implemented as distinct computing devices, virtual machines, containers, container of a pods, or processes or threads associated with one or more containers. Accordingly, each search node 506 can include a processing device and a data store, as depicted at a high level in FIG. 5. Depending on the embodiment, the processing device and data store can be dedicated to the search node (e.g., embodiments where each search node is a distinct computing device) or can be shared with other search nodes or components of the data intake and query system 108 (e.g., embodiments where the search nodes are implemented as containers or virtual machines or where the shared data store is a networked data store, etc.).

In some embodiments, the search nodes 506 can obtain and search buckets identified by the search manager 514 that include data that satisfies at least a portion of the query, identify the set of data within the buckets that satisfies the query, perform one or more transformations on the set of data, and communicate the set of data to the search manager 514. Individually, a search node 506 can obtain the buckets assigned to it by the search manager 514 for a particular query, search the assigned buckets for a subset of the set of data, perform one or more transformation on the subset of data, and communicate partial search results to the search manager 514 for additional processing and combination with the partial results from other search nodes 506.

In some cases, the buckets to be searched may be located in a local data store of the search node 506 or a data store that is shared between multiple search nodes 506. In such cases, the search nodes 506 can identify the location of the buckets and search the buckets for the set of data that satisfies the query.

In certain cases, the buckets may be located in the common storage 216. In such cases, the search nodes 506 can search the buckets in the common storage 216 and/or copy the buckets from the common storage 216 to a local or shared data store and search the locally stored copy for the set of data. As described herein, the cache manager 516 can coordinate with the search nodes 506 to identify the location of the buckets (whether in a local or shared data store or in common storage 216) and/or obtain buckets stored in common storage 216.

Once the relevant buckets (or relevant files of the buckets) are obtained, the search nodes 506 can search their contents to identify the set of data to be processed. In some cases, upon obtaining a bucket from the common storage 216, a search node 306 can decompress the bucket from a compressed format, and accessing one or more files stored within the bucket. In some cases, the search node 306 references a bucket summary or manifest to locate one or more portions (e.g., records or individual files) of the bucket that potentially contain information relevant to the search.

In some cases, the search nodes 506 can use all of the files of a bucket to identify the set of data. In certain embodiments, the search nodes 506 use a subset of the files of a bucket to identify the set of data. For example, in some cases, a search node 506 can use an inverted index, bloom filter, or bucket summary or manifest to identify a subset of the set of data without searching the raw machine data of the bucket. In certain cases, the search node 506 uses the inverted index, bloom filter, bucket summary, and raw machine data to identify the subset of the set of data that satisfies the query.

In some embodiments, depending on the query, the search nodes 506 can perform one or more transformations on the data from the buckets. For example, the search nodes 506 may perform various data transformations, scripts, and processes, e.g., a count of the set of data, etc.

As the search nodes 506 execute the query, they can provide the search manager 514 with search results. In some cases, a search node 506 provides the search manager 514 results as they are identified by the search node 506, and updates the results over time. In certain embodiments, a search node 506 waits until all of its partial results are gathered before sending the results to the search manager 514.

In some embodiments, the search nodes 506 provide a status of the query to the search manager 514. For example, an individual search node 506 can inform the search manager 514 of which buckets it has searched and/or provide the search manager 514 with the results from the searched buckets. As mentioned, the search manager 514 can track or store the status and the results as they are received from the search node 506. In the event the search node 506 becomes unresponsive or unavailable, the tracked information can be used to generate and assign a new search node 506 to execute the remaining portions of the query assigned to the unavailable search node 506.

The search nodes 506 may provide information to the resource monitor 508 in order to update the information stored in the resource catalog 510, which may include information such as an identifier for each search node 506, as well as availability, responsiveness, and utilization information. For example, the updated information in the resource catalog 510 may identify and indicate search nodes 506 that are instantiated and currently available (e.g., currently not being used to execute queries), instantiated but are currently unavailable or unresponsive, and so forth. The updated information may indicate the amount of processing resources currently in use by each search node 506, the current utilization rate of each search node 506, the amount of memory currently used by each search node 506, etc. The updated information may also indicate a node type associated with each search node 506, the cache hit ratio for each search node 506, and so forth. It should be noted that the information can be provided on-the-fly or on a periodic basis, and in the latter case, the information considered "current" (e.g., the amount of processing resources currently in use) may refer to the most-recent updated information (e.g., the information last provided), which can be accurate if updated information is provided relatively frequently. The search nodes 506 may provide information upon request (e.g., in response to a ping) or may provide information based on a set schedule (e.g., send information to the resource monitor 508 on a periodic basis).

3.4.4. Cache Manager

As mentioned, the cache manager 516 can communicate with the search nodes 506 to obtain or identify the location of the buckets assigned to the search nodes 506, and can be implemented as a distinct computing device, virtual machine, container, a pod, or a process or thread associated with a container.

In some embodiments, based on the receipt of a bucket assignment, a search node 506 can provide the cache manager 516 with an identifier of the bucket that it is to search, a file associated with the bucket that it is to search, and/or a location of the bucket. In response, the cache manager 516 can determine whether the identified bucket or file is located in a local or shared data store or is to be retrieved from the common storage 216.

As mentioned, in some cases, multiple search nodes 506 can share a data store. Accordingly, if the cache manager 516 determines that the requested bucket is located in a local or shared data store, the cache manager 516 can provide the search node 506 with the location of the requested bucket or file. In certain cases, if the cache manager 516 determines that the requested bucket or file is not located in the local or shared data store, the cache manager 516 can request the bucket or file from the common storage 216, and inform the search node 506 that the requested bucket or file is being retrieved from common storage 216.

In some cases, the cache manager 516 can request one or more files associated with the requested bucket prior to, or in place of, requesting all contents of the bucket from the common storage 216. For example, a search node 506 may request a subset of files from a particular bucket. Based on the request and a determination that the files are located in common storage 216, the cache manager 516 can download or obtain the identified files from the common storage 216.

In some cases, based on the information provided from the search node 506, the cache manager 516 may be unable to uniquely identify a requested file or files within the common storage 216. Accordingly, in certain embodiments, the cache manager 516 can retrieve a bucket summary or manifest file from the common storage 216 and provide the bucket summary to the search node 506. In some cases, the cache manager 516 can provide the bucket summary to the search node 506 while concurrently informing the search node 506 that the requested files are not located in a local or shared data store and are to be retrieved from common storage 216.

Using the bucket summary, the search node 506 can uniquely identify the files to be used to execute the query. Using the unique identification, the cache manager 516 can request the files from the common storage 216. Accordingly, rather than downloading the entire contents of the bucket from common storage 216, the cache manager 516 can download those portions of the bucket that are to be used by the search node 506 to execute the query. In this way, the cache manager 516 can decrease the amount of data sent over the network and decrease the search time.

As a non-limiting example, a search node 506 may determine that an inverted index of a bucket is to be used to execute a query. For example, the search node 506 may determine that all the information that it needs to execute the query on the bucket can be found in an inverted index associated with the bucket. Accordingly, the search node 506 can request the file associated with the inverted index of the bucket from the cache manager 516. Based on a determination that the requested file is not located in a local or shared data store, the cache manager 516 can determine that the file is located in the common storage 216.

As the bucket may have multiple inverted indexes associated with it, the information provided by the search node 506 may be insufficient to uniquely identify the inverted index within the bucket. To address this issue, the cache manager 516 can request a bucket summary or manifest from the common storage 216, and forward it to the search node 506. The search node 506 can analyze the bucket summary to identify the particular inverted index that is to be used to execute the query, and request the identified particular inverted index from the cache manager 516 (e.g., by name and/or location). Using the bucket manifest and/or the information received from the search node 506, the cache manager 516 can obtain the identified particular inverted index from the common storage 216. By obtaining the bucket manifest and downloading the requested inverted index instead of all inverted indexes or files of the bucket, the cache manager 516 can reduce the amount of data communicated over the network and reduce the search time for the query.

In some cases, when requesting a particular file, the search node 506 can include a priority level for the file. For example, the files of a bucket may be of different sizes and may be used more or less frequently when executing queries. For example, the bucket manifest may be a relatively small file. However, if the bucket is searched, the bucket manifest can be a relatively valuable file (and frequently used) because it includes a list or index of the various files of the bucket. Similarly, a bloom filter of a bucket may be a relatively small file but frequently used as it can relatively quickly identify the contents of the bucket. In addition, an inverted index may be used more frequently than raw data of a bucket to satisfy a query.

Accordingly, to improve retention of files that are commonly used in a search of a bucket, the search node 506 can include a priority level for the requested file. The cache manager 516 can use the priority level received from the search node 506 to determine how long to keep, or when to evict, the file from the local or shared data store. For example, files identified by the search node 506 as having a higher priority level can be stored for a greater period of time than files identified as having a lower priority level.

Furthermore, the cache manager 516 can determine what data and how long to retain the data in the local or shared data stores of the search nodes 506 based on a bucket caching policy. In some cases, the bucket caching policy can rely on any one or any combination of the priority level received from the search nodes 506 for a particular file, least recently used, most recent in time, or other policies to indicate how long to retain files in the local or shared data store.

In some instances, according to the bucket caching policy, the cache manager 516 or other component of the query system 214 (e.g., the search master 512 or search manager 514) can instruct search nodes 506 to retrieve and locally cache copies of various buckets from the common storage 216, independently of processing queries. In certain embodiments, the query system 214 is configured, according to the bucket caching policy, such that one or more buckets from the common storage 216 (e.g., buckets associated with a tenant or partition of a tenant) or each bucket from the common storage 216 is locally cached on at least one search node 506.

In some embodiments, according to the bucket caching policy, the query system 214 is configured such that at least one bucket from the common storage 216 is locally cached on at least two search nodes 506. Caching a bucket on at least two search nodes 506 may be beneficial, for example, in instances where different queries both require searching the bucket (e.g., because the at least search nodes 506 may process their respective local copies in parallel). In still other embodiments, the query system 214 is configured, according to the bucket caching policy, such that one or more buckets from the common storage 216 or all buckets from the common storage 216 are locally cached on at least a given number n of search nodes 506, wherein n is defined by a replication factor on the system 108. For example, a replication factor of five may be established to ensure that five copies of a bucket are locally cached across different search nodes 506.

In certain embodiments, the search manager 514 (or search master 512) can assign buckets to different search nodes 506 based on time. For example, buckets that are less than one day old can be assigned to a first group of search nodes 506 for caching, buckets that are more than one day but less than one week old can be assigned to a different group of search nodes 506 for caching, and buckets that are more than one week old can be assigned to a third group of search nodes 506 for caching. In certain cases, the first group can be larger than the second group, and the second group can be larger than the third group. In this way, the query system 214 can provide better/faster results for queries searching data that is less than one day old, and so on, etc. It will be understood that the search nodes can be grouped and assigned buckets in a variety of ways. For example, search nodes 506 can be grouped based on a tenant identifier, index, etc. In this way, the query system 214 can dynamically provide faster results based any one or any number of factors.

In some embodiments, when a search node 506 is added to the query system 214, the cache manager 516 can, based on the bucket caching policy, instruct the search node 506 to download one or more buckets from common storage 216 prior to receiving a query. In certain embodiments, the cache manager 516 can instruct the search node 506 to download specific buckets, such as most recent in time buckets, buckets associated with a particular tenant or partition, etc. In some cases, the cache manager 516 can instruct the search node 506 to download the buckets before the search node 506 reports to the resource monitor 508 that it is available for executing queries. It will be understood that other components of the query system 214 can implement this functionality, such as, but not limited to the query system manager 502, resource monitor 508, search manager 514, or the search nodes 506 themselves.

In certain embodiments, when a search node 506 is removed from the query system 214 or becomes unresponsive or unavailable, the cache manager 516 can identify the buckets that the removed search node 506 was responsible for and instruct the remaining search nodes 506 that they will be responsible for the identified buckets. In some cases, the remaining search nodes 506 can download the identified buckets from common storage 216 or retrieve them from the data store associated with the removed search node 506.

In some cases, the cache manager 516 can change the bucket-search node 506 assignments, such as when a search node 506 is removed or added. In certain embodiments, based on a reassignment, the cache manager 516 can inform a particular search node 506 to remove buckets to which it is no longer assigned, reduce the priority level of the buckets, etc. In this way, the cache manager 516 can make it so the reassigned bucket will be removed more quickly from the search node 506 than it otherwise would without the reassignment. In certain embodiments, the search node 506 that receives the new for the bucket can retrieve the bucket from the now unassigned search node 506 and/or retrieve the bucket from common storage 216.

3.4.5. Resource Monitor and Catalog

The resource monitor 508 can monitor search nodes and populate the resource catalog 510 with relevant information, and can be implemented as a distinct computing device, virtual machine, container, container of a pod, or a process or thread associated with a container.

Although the resource monitor 508 and resource catalog 510 are shown as separate components, it will be understood that they can be implemented as part of the same machine, host system, isolated execution environment, pod, container, virtual machine, etc. Furthermore, although separate resource monitors 418, 508 and resource catalog 420 and 510 are shown for the indexing system 212 and the query system 214, it will be understood that the resource monitors 418, 508 and resource catalog 420 and 510 can be implemented as part of the same machine, isolated execution environment, pod, container, etc. For example, the indexing system 212 and the query system 214 can interact with a resource monitor and resource catalog in a manner similar to which these systems (or their components) interact with the common storage 216, data store catalog 220, metadata catalog 221, etc. Thus, the illustrated embodiments, should not be construed as limiting the resource monitors 418, 508 and resource catalog 420 and 510 to a particular architecture or design.

In some cases, the resource monitor 508 can ping the search nodes 506 over time to determine their availability, responsiveness, and/or utilization rate. In certain embodiments, each search node 506 can include a monitoring module that provides performance metrics or status updates about the search node 506 to the resource monitor 508. For example, the monitoring module can indicate the amount of processing resources in use by the search node 506, the utilization rate of the search node 506, the amount of memory used by the search node 506, etc. In certain embodiments, the resource monitor 508 can determine that a search node 506 is unavailable or failing based on the data in the status update or absence of a state update from the monitoring module of the search node 506.

In certain embodiments, each search head 504 can include a monitoring module that provides performance metrics or status updates (e.g., availability information) about the search node 506 to the resource monitor 508, along with information such as an identifier for that search head 504. For example, the monitoring module can indicate the number of queries being processed by the search head 504, the amount of processing resources in use by the search head 504, the amount of memory used by the search head 504, and so forth. In certain embodiments, the resource monitor 508 can determine that a search head 504 is unavailable or failing based on the data in the status update or absence of a state update from the monitoring module of the search node 506. Thus, the resource monitor 508 may be able to identify and indicate search heads 504 that are instantiated and available (e.g., include sufficient bandwidth to process one or more additional queries), instantiated but are unavailable or unresponsive, and so forth. Using the information obtained from the search heads 504 and search nodes 506, the resource monitor 508 can populate the resource catalog 510 and update it over time.

As the availability, responsiveness, and/or utilization change for the different search heads 504 and/or search nodes 506, the resource monitor 508 can update the resource catalog 510. In this way, the resource catalog 510 can retain an up-to-date list of search heads 504 available to handle queries and/or search nodes 506 available to execute a query.

Furthermore, as search heads 504 and/or search nodes 506 are instantiated (or at other times), the newly-instantiated search heads 504 and/or search nodes 506 can provide information to the resource monitor 508, which can update the resource catalog 510 with information about the newly-instantiated search heads 504 and/or search nodes 506, such as, but not limited to its computing resources, utilization, network architecture (identification of machine where it is instantiated, location with reference to other search heads 504 and/or search nodes 506, computing resources shared with other search heads 504 and/or search nodes 506, such as data stores, processors, I/O, etc.), etc.

In some embodiments, based on the receipt of a particular query or a request from a search service or a component of the query system 214, the resource monitor 508 can identify a search head to process the particular query. In certain embodiments, the resource monitor 508 can identify the search head based on a search head mapping policy. The search head mapping policy can indicate one or more criteria for identifying or assigning a search head 504 for a query. In some cases, the search head mapping policy can indicate that a search head 504 should be assigned based on its availability, the number of concurrent searches that it is processing/managing, resource utilization, etc. As such, the query system 214 can dynamically assign search heads 504 to process queries. In some such cases, a search head 512 can process and manage queries associated with different tenants. By configuring the search head 512 to process queries associated with different tenants, the data intake and query system 108 can improve resource utilization and decrease the amount of resource used. For example, if a search head 504 is statically assigned to a tenant, then its resources may be unavailable to other tenants or other components of the data intake and query system 108, even if the tenant is not executing any searches. In contrast if a search head 504 is dynamically assigned to queries associated with different tenants then if a particular tenant is not executing any searches then the search head 504 that would otherwise be unused can be used to process/manage queries associated with other tenants thereby increasing the resource utilization of the data intake and query system 108 as a whole.

As described herein, the search manager 514 and/or resource monitor 508 can use the resource catalog 510 to identify search nodes 506 available to execute a query. In some embodiments, the search manager 214 and/or resource monitor 508 can communicate with the resource catalog 510 using an API. In some embodiments, the search manager 514 and/or resource monitor 508 assign search nodes 506 to execute queries based on one or more policies, such as a search node mapping policy, etc. Similar to the dynamic assignment of search heads 504 to queries associated with different tenants or data identifiers, dynamically assigning search nodes 506 to queries can significantly improve resource utilization and decrease compute resources used by the data intake and query system 108.

3.5. Common Storage

Returning to FIG. 2, the common storage 216 can be used to store data indexed by the indexing system 212, and can be implemented using one or more data stores 218.

In some systems, the same computing devices (e.g., indexers) operate both to ingest, index, store, and search data. The use of an indexer to both ingest and search information may be beneficial, for example, because an indexer may have ready access to information that it has ingested, and can quickly access that information for searching purposes. However, use of an indexer to both ingest and search information may not be desirable in all instances. As an illustrative example, consider an instance in which ingested data is organized into buckets, and each indexer is responsible for maintaining buckets within a data store corresponding to the indexer. Illustratively, a set of ten indexers may maintain 100 buckets, distributed evenly across ten data stores (each of which is managed by a corresponding indexer). Information may be distributed throughout the buckets according to a load-balancing mechanism used to distribute information to the indexers during data ingestion. In an idealized scenario, information responsive to a query would be spread across the 100 buckets, such that each indexer may search their corresponding ten buckets in parallel, and provide search results to a search head. However, it is expected that this idealized scenario may not always occur, and that there will be at least some instances in which information responsive to a query is unevenly distributed across data stores. As one example, consider a query in which responsive information exists within ten buckets, all of which are included in a single data store associated with a single indexer. In such an instance, a bottleneck may be created at the single indexer, and the effects of parallelized searching across the indexers may be minimized. To increase the speed of operation of search queries in such cases, it may therefore be desirable to store data indexed by the indexing system 212 in common storage 216 that can be accessible to any one or multiple components of the indexing system 212 or the query system 214.

Common storage 216 may correspond to any data storage system accessible to the indexing system 212 and the query system 214. For example, common storage 216 may correspond to a storage area network (SAN), network attached storage (NAS), other network-accessible storage system (e.g., a hosted storage system, such as Amazon S3 or EBS provided by Amazon, Inc., Google Cloud Storage, Microsoft Azure Storage, etc., which may also be referred to as "cloud" storage), or combination thereof. The common storage 216 may include, for example, hard disk drives (HDDs), solid state storage devices (SSDs), or other substantially persistent or non-transitory media. Data stores 218 within common storage 216 may correspond to physical data storage devices (e.g., an individual HDD) or a logical storage device, such as a grouping of physical data storage devices or a containerized or virtualized storage device hosted by an underlying physical storage device. In some embodiments, the common storage 216 may also be referred to as a shared storage system or shared storage environment as the data stores 218 may store data associated with multiple customers, tenants, etc., or across different data intake and query systems 108 or other systems unrelated to the data intake and query systems 108.

The common storage 216 can be configured to provide high availability, highly resilient, low loss data storage. In some cases, to provide the high availability, highly resilient, low loss data storage, the common storage 216 can store multiple copies of the data in the same and different geographic locations and across different types of data stores (e.g., solid state, hard drive, tape, etc.). Further, as data is received at the common storage 216 it can be automatically replicated multiple times according to a replication factor to different data stores across the same and/or different geographic locations.

In one embodiment, common storage 216 may be multi-tiered, with each tier providing more rapid access to information stored in that tier. For example, a first tier of the common storage 216 may be physically co-located with the indexing system 212 or the query system 214 and provide rapid access to information of the first tier, while a second tier may be located in a different physical location (e.g., in a hosted or "cloud" computing environment) and provide less rapid access to information of the second tier.

Distribution of data between tiers may be controlled by any number of algorithms or mechanisms. In one embodiment, a first tier may include data generated or including timestamps within a threshold period of time (e.g., the past seven days), while a second tier or subsequent tiers includes data older than that time period. In another embodiment, a first tier may include a threshold amount (e.g., n terabytes) or recently accessed data, while a second tier stores the remaining less recently accessed data.

In one embodiment, data within the data stores 218 is grouped into buckets, each of which is commonly accessible to the indexing system 212 and query system 214. The size of each bucket may be selected according to the computational resources of the common storage 216 or the data intake and query system 108 overall. For example, the size of each bucket may be selected to enable an individual bucket to be relatively quickly transmitted via a network, without introducing excessive additional data storage requirements due to metadata or other overhead associated with an individual bucket. In one embodiment, each bucket is 750 megabytes in size. Further, as mentioned, in some embodiments, some buckets can be merged to create larger buckets.

As described herein, each bucket can include one or more files, such as, but not limited to, one or more compressed or uncompressed raw machine data files, metadata files, filter files, indexes files, bucket summary or manifest files, etc. In addition, each bucket can store events including raw machine data associated with a timestamp.

As described herein, the indexing nodes 404 can generate buckets during indexing and communicate with common storage 216 to store the buckets. For example, data may be provided to the indexing nodes 404 from one or more ingestion buffers of the intake system 210. The indexing nodes 404 can process the information and store it as buckets in common storage 216, rather than in a data store maintained by an individual indexer or indexing node. Thus, the common storage 216 can render information of the data intake and query system 108 commonly accessible to elements of the system 108. As described herein, the common storage 216 can enable parallelized searching of buckets to occur independently of the operation of indexing system 212.

As noted above, it may be beneficial in some instances to separate data indexing and searching. Accordingly, as described herein, the search nodes 506 of the query system 214 can search for data stored within common storage 216. The search nodes 506 may therefore be communicatively attached (e.g., via a communication network) with the common storage 216, and be enabled to access buckets within the common storage 216.

Further, as described herein, because the search nodes 506 in some instances are not statically assigned to individual data stores 218 (and thus to buckets within such a data store 218), the buckets searched by an individual search node 506 may be selected dynamically, to increase the parallelization with which the buckets can be searched. For example, consider an instance where information is stored within 100 buckets, and a query is received at the data intake and query system 108 for information within ten buckets. Unlike a scenario in which buckets are statically assigned to an indexer, which could result in a bottleneck if the ten relevant buckets are associated with the same indexer, the ten buckets holding relevant information may be dynamically distributed across multiple search nodes 506. Thus, if ten search nodes 506 are available to process a query, each search node 506 may be assigned to retrieve and search within one bucket greatly increasing parallelization when compared to the low-parallelization scenarios (e.g., where a single indexer 206 is required to search all ten buckets).

Moreover, because searching occurs at the search nodes 506 rather than at the indexing system 212, indexing resources can be allocated independently to searching operations. For example, search nodes 506 may be executed by a separate processor or computing device than indexing nodes 404, enabling computing resources available to search nodes 506 to scale independently of resources available to indexing nodes 404. Additionally, the impact on data ingestion and indexing due to above-average volumes of search query requests is reduced or eliminated, and similarly, the impact of data ingestion on search query result generation time also is reduced or eliminated.

As will be appreciated in view of the above description, the use of a common storage 216 can provide many advantages within the data intake and query system 108. Specifically, use of a common storage 216 can enable the system 108 to decouple functionality of data indexing by indexing nodes 404 with functionality of searching by search nodes 506. Moreover, because buckets containing data are accessible by each search node 506, a search manager 514 can dynamically allocate search nodes 506 to buckets at the time of a search in order to increase parallelization. Thus, use of a common storage 216 can substantially improve the speed and efficiency of operation of the system 108.

3.6. Data Store Catalog

The data store catalog 220 can store information about the data stored in common storage 216, and can be implemented using one or more data stores. In some embodiments, the data store catalog 220 can be implemented as a portion of the common storage 216 and/or using similar data storage techniques (e.g., local or cloud storage, multi-tiered storage, etc.). In another implementation, the data store catalog 22—may utilize a database, e.g., a relational database engine, such as commercially-provided relational database services, e.g., Amazon's Aurora. In some implementations, the data store catalog 220 may use an API to allow access to register buckets, and to allow query system 214 to access buckets. In other implementations, data store catalog 220 may be implemented through other means, and maybe stored as part of common storage 216, or another type of common storage, as previously described. In various implementations, requests for buckets may include a tenant identifier and some form of user authentication, e.g., a user access token that can be authenticated by authentication service. In various implementations, the data store catalog 220 may store one data structure, e.g., table, per tenant, for the buckets associated with that tenant, one data structure per partition of each tenant, etc. In other implementations, a single data structure, e.g., a single table, may be used for all tenants, and unique tenant IDs may be used to identify buckets associated with the different tenants.

As described herein, the data store catalog 220 can be updated by the indexing system 212 with information about the buckets or data stored in common storage 216. For example, the data store catalog can store an identifier for a sets of data in common storage 216, a location of the sets of data in common storage 216, tenant or indexes associated with the sets of data, timing information about the sets of data, etc. In embodiments where the data in common storage 216 is stored as buckets, the data store catalog 220 can include a bucket identifier for the buckets in common storage 216, a location of or path to the buckets in common storage 216, a time range of the data in the bucket (e.g., range of time between the first-in-time event of the bucket and the last-in-time event of the bucket), a tenant identifier identifying a customer or computing device associated with the bucket, and/or an index or partition associated with the bucket, etc.

In certain embodiments, the data store catalog 220 can include an indication of a location of a copy of a bucket found in one or more search nodes 506. For example, as buckets are copied to search nodes 506, the query system 214 can update the data store catalog 220 with information about which search nodes 506 include a copy of the buckets. This information can be used by the query system 214 to assign search nodes 506 to buckets as part of a query.

In certain embodiments, the data store catalog 220 can function as an index or inverted index of the buckets stored in common storage 216. For example, the data store catalog 220 can provide location and other information about the buckets stored in common storage 216. In some embodiments, the data store catalog 220 can provide additional information about the contents of the buckets. For example, the data store catalog 220 can provide a list of sources, sourcetypes, or hosts associated with the data in the buckets.

In certain embodiments, the data store catalog 220 can include one or more keywords found within the data of the buckets. In such embodiments, the data store catalog can be similar to an inverted index, except rather than identifying specific events associated with a particular host, source, sourcetype, or keyword, it can identify buckets with data associated with the particular host, source, sourcetype, or keyword.

In some embodiments, the query system 214 (e.g., search head 504, search master 512, search manager 514, etc.) can communicate with the data store catalog 220 as part of processing and executing a query. In certain cases, the query system 214 communicates with the data store catalog 220 using an API. As a non-limiting example, the query system 214 can provide the data store catalog 220 with at least a portion of the query or one or more filter criteria associated with the query. In response, the data store catalog 220 can provide the query system 214 with an identification of buckets that store data that satisfies at least a portion of the query. In addition, the data store catalog 220 can provide the query system 214 with an indication of the location of the identified buckets in common storage 216 and/or in one or more local or shared data stores of the search nodes 506.

Accordingly, using the information from the data store catalog 220, the query system 214 can reduce (or filter) the amount of data or number of buckets to be searched. For example, using tenant or partition information in the data store catalog 220, the query system 214 can exclude buckets associated with a tenant or a partition, respectively, that is not to be searched. Similarly, using time range information, the query system 214 can exclude buckets that do not satisfy a time range from a search. In this way, the data store catalog 220 can reduce the amount of data to be searched and decrease search times.

As mentioned, in some cases, as buckets are copied from common storage 216 to search nodes 506 as part of a query, the query system 214 can update the data store catalog 220 with the location information of the copy of the bucket. The query system 214 can use this information to assign search nodes 506 to buckets. For example, if the data store catalog 220 indicates that a copy of a bucket in common storage 216 is stored in a particular search node 506, the query system 214 can assign the particular search node to the bucket. In this way, the query system 214 can reduce the likelihood that the bucket will be retrieved from common storage 216. In certain embodiments, the data store catalog 220 can store an indication that a bucket was recently downloaded to a search node 506. The query system 214 for can use this information to assign search node 506 to that bucket.

3.7. Query Acceleration Data Store

With continued reference to FIG. 2, the query acceleration data store 222 can be used to store query results or datasets for accelerated access, and can be implemented as, a distributed in-memory database system, storage subsystem, local or networked storage (e.g., cloud storage), and so on, which can maintain (e.g., store) datasets in both low-latency memory (e.g., random access memory, such as volatile or non-volatile memory) and longer-latency memory (e.g., solid state storage, disk drives, and so on). In some embodiments, to increase efficiency and response times, the accelerated data store 222 can maintain particular datasets in the low-latency memory, and other datasets in the longer-latency memory. For example, in some embodiments, the datasets can be stored in-memory (non-limiting examples: RAM or volatile memory) with disk spillover (non-limiting examples: hard disks, disk drive, non-volatile memory, etc.). In this way, the query acceleration data store 222 can be used to serve interactive or iterative searches. In some cases, datasets which are determined to be frequently accessed by a user can be stored in the lower-latency memory. Similarly, datasets of less than a threshold size can be stored in the lower-latency memory.

In certain embodiments, the search manager 514 or search nodes 506 can store query results in the query acceleration data store 222. In some embodiments, the query results can correspond to partial results from one or more search nodes 506 or to aggregated results from all the search nodes 506 involved in a query or the search manager 514. In such embodiments, the results stored in the query acceleration data store 222 can be served at a later time to the search head 504, combined with additional results obtained from a later query, transformed or further processed by the search nodes 506 or search manager 514, etc. For example, in some cases, such as where a query does not include a termination date, the search manager 514 can store initial results in the acceleration data store 222 and update the initial results as additional results are received. At any time, the initial results, or iteratively updated results can be provided to a client device 204, transformed by the search nodes 506 or search manager 514, etc.

As described herein, a user can indicate in a query that particular datasets or results are to be stored in the query acceleration data store 222. The query can then indicate operations to be performed on the particular datasets. For subsequent queries directed to the particular datasets (e.g., queries that indicate other operations for the datasets stored in the acceleration data store 222), the search nodes 506 can obtain information directly from the query acceleration data store 222.

Additionally, since the query acceleration data store 222 can be utilized to service requests from different client devices 204, the query acceleration data store 222 can implement access controls (e.g., an access control list) with respect to the stored datasets. In this way, the stored datasets can optionally be accessible only to users associated with requests for the datasets. Optionally, a user who provides a query can indicate that one or more other users are authorized to access particular requested datasets. In this way, the other users can utilize the stored datasets, thus reducing latency associated with their queries.

In some cases, data from the intake system 210 (e.g., ingested data buffer 310, etc.) can be stored in the acceleration data store 222. In such embodiments, the data from the intake system 210 can be transformed by the search nodes 506 or combined with data in the common storage 216

Furthermore, in some cases, if the query system 214 receives a query that includes a request to process data in the query acceleration data store 222, as well as data in the common storage 216, the search manager 514 or search nodes 506 can begin processing the data in the query acceleration data store 222, while also obtaining and processing the other data from the common storage 216. In this way, the query system 214 can rapidly provide initial results for the query, while the search nodes 506 obtain and search the data from the common storage 216.

It will be understood that the data intake and query system 108 can include fewer or more components as desired. For example, in some embodiments, the system 108 does not include an acceleration data store 222. Further, it will be understood that in some embodiments, the functionality described herein for one component can be performed by another component. For example, the search master 512 and search manager 514 can be combined as one component, etc.

3.8. Metadata Catalog

Figure 6:
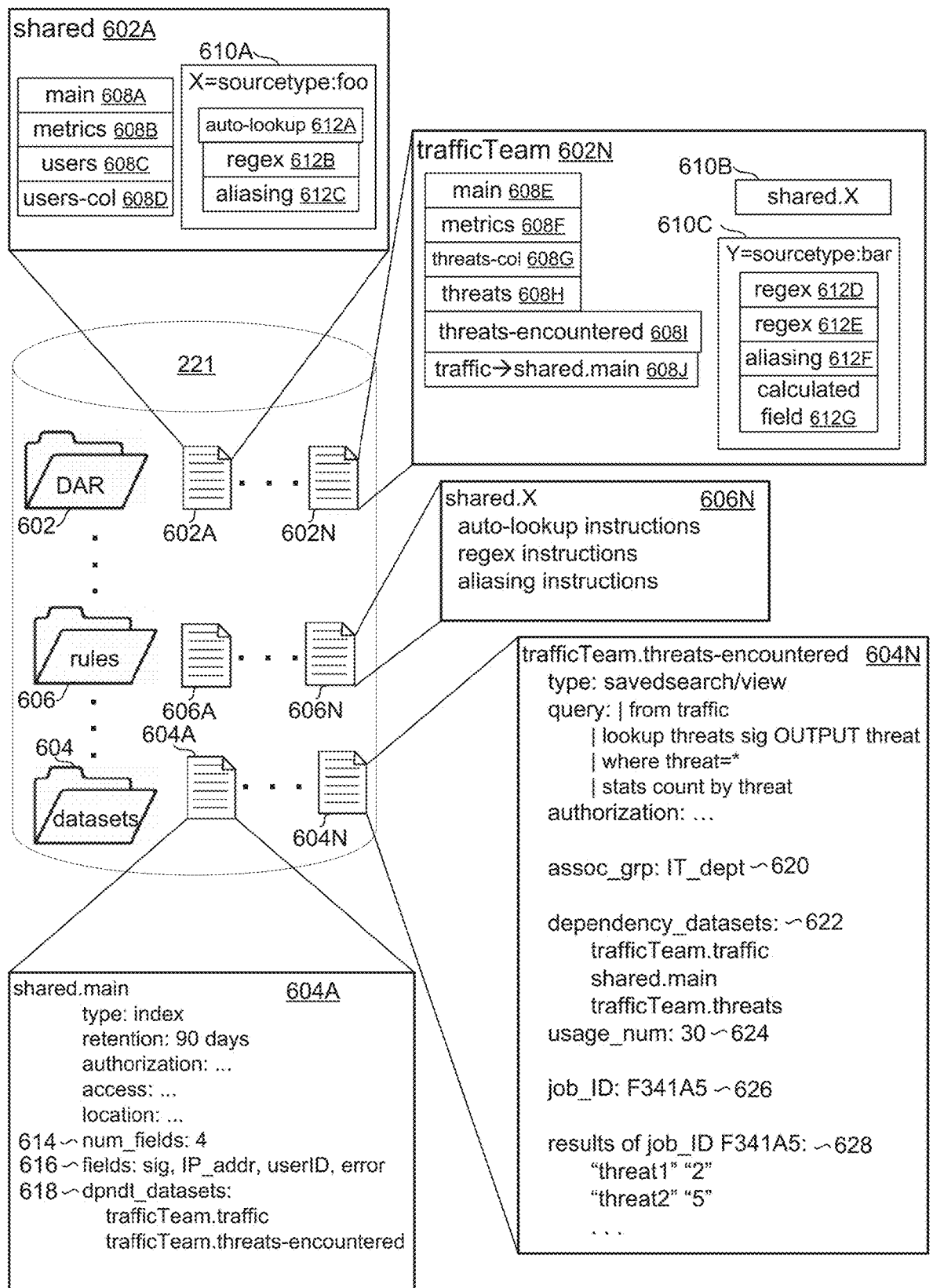
FIG. 6 is a block diagram illustrating an embodiment of a metadata catalog.

FIG. 6 is a block diagram illustrating an embodiment of a metadata catalog 221. The metadata catalog 221 can be implemented using one or more data stores, databases, computing devices, or the like. In some embodiments, the metadata catalog 221 is implemented using one or more relational databases, such as, but not limited to, Dynamo DB and/or Aurora DB.

As described herein, the metadata catalog 221 can store information about datasets and/or rules used or supported by the data intake and query system 108. Furthermore, the metadata catalog 221 can be used to, among other things, interpret dataset identifiers in a query, verify/authenticate a user's permissions and/or authorizations for different datasets, identify additional processing as part of the query, identify one or more source datasets from which to retrieve data as part of the query, determine how to extract data from datasets, identify configurations/definitions/dependencies to be used by search nodes to execute the query, etc.

In certain embodiments, the query system 214 can use the metadata catalog 221 to dynamically determine the dataset configurations and rule configurations to be used to execute the query (also referred to herein as the query configuration parameters). In certain embodiments, the query system 214 can use the dynamically determined query configuration parameters to provide a stateless search experience. For example, if the query system 214 determines that search heads 504 are to be used to process a query or if an assigned search head 504 becomes unavailable, the query system 214 can communicate the dynamically determined query configuration parameters (and query to be executed) to another search head 504 without data loss and/or with minimal or reduced time loss.

In the illustrated embodiment, the metadata catalog 221 stores one or more dataset association records 602, one or more dataset configuration records 604, and one or more rule configuration records 606. It will be understood, that the metadata catalog 221 can store more or less information as desired. Although shown in the illustrated embodiment as belonging to different folders or files, it will be understood, that the various dataset association records 602, dataset configuration records 604, and rule configuration records 606 can be stored in the same file, directory, and/or database. For example, in certain embodiments, the metadata catalog 221 can include one or more entries in a database for each dataset association record 602, dataset (or dataset configuration record 604), and/or rule (or rule configuration record 606). Moreover, in certain embodiments, the dataset configuration records 604 and/or the rule configuration records 606 can be included as part of the dataset association records 602.

In some cases, the metadata catalog 221 may not store separate dataset association records 602. Rather the datasets association records 602 shown in FIG. 6 can be considered logical associations between one or more dataset configuration records 604 and/or one or more rule configuration records 606. In some such embodiments, the logical association can be determined based on an identifier or entry of each dataset configuration record 604 and/or rule configuration record 606. For example, the dataset configuration records 604 and rule configuration records 606 that begin with "shared," can be considered part of the "shared" dataset association record 602A (even if separate data structure does not physically or logically exist on a data store) and the dataset configuration records 604 and rule configuration records 606 that begin with "trafficTeam," can be considered part of the "trafficTeam" dataset association record 602N.

In some embodiments, a user can modify the metadata catalog 221 via the gateway 215. For example, the gateway 215 can receive instruction from client device 204 to add/modify/delete dataset association records 602, dataset configuration records 604, and/or rule configuration records 606. The information received via the gateway 215 can be used by the metadata catalog 221 to create, modify, or delete a dataset association record 602, dataset configuration record 604, and/or a rule configuration record 606. However, it will be understood that the metadata catalog 221 can be modified in a variety of ways and/or without using the gateway 215.

In certain embodiments, the metadata catalog 221 can create, modify, or delete a dataset association record 602, dataset configuration record 604, and/or a rule configuration record 606 based on an explicit instruction to do so from a user.

In some embodiments, the metadata catalog 221 can create, modify, or delete a dataset association record 602, dataset configuration record 604, and/or a rule configuration record 606 based on a user's interaction with the system 108 and/or without an explicit instruction. For example, if a user enters a query in a user interface and then instructs the system 108 to execute the query, the metadata catalog 221 can create a dataset configuration record 604 based on the query and/or can add the query as a dataset to a dataset association record 602 (depending on the module that was used or identified when the query was executed). With continued reference to the example, the created dataset configuration record 604 can include the query and indicate that the type of dataset is a query, saved search, or view. In addition, the created dataset configuration record 604 can include authorization information for users that are allowed to use the query or that have access to the datasets referenced by the query, the identity of the user that entered the query, the identity of a group of users with which the user is associated, tenant information, dependency datasets, a job ID corresponding to the job ID created by the system 108 as part of executing the query, results of the query, and/or query results identifier corresponding to the query results (e.g., job ID or other identifier that can be used to identify the query results). More or less information can be determined and added to the dataset association record as desired.

Similarly, if a user enters a query, the metadata catalog 221, can edit the dataset configuration record 604. With continued reference to the example above, if another user enters the same query or the same user executes the query at a later time (with or without prompting by the system 108), the metadata catalog 221 can edit the corresponding dataset configuration 604. For example, the metadata catalog 221 can increment a count for the number of times the query has been used, add information about the users that have used the query, include a job ID, query results, and/or query results identifier, each time the query is executed, etc.

3.8.1. Dataset Association Records

As described herein, the dataset association records 602 can indicate how to refer to one or more datasets (e.g., provide a name or other identifier for the datasets), identify associations or relationships between a particular dataset and one or more rules or other datasets and/or indicate the scope or definition of a dataset. Accordingly, a dataset association record 602 can include or identify one or more datasets 608 and/or rules 610.

In certain embodiments, a dataset association record 602 can provide a mechanism to avoid conflicts in dataset and/or rule identifiers. For example, different dataset association records 602 can use the same name to refer to different datasets, however, the data intake and query system 108 can differentiate the datasets with the same name based on the dataset association record 602 with which the different datasets are associated. Accordingly, in some embodiments, a dataset can be identified using a logical identifier or name and/or a physical identifier or name. The logical identifier may refer to a particular dataset in the context of a particular dataset association record 602. The physical identifier may be used by the metadata catalog 221 and/or the data intake and query system 108 to uniquely identify the dataset from other datasets supported or used by the data intake and query system 108.

In some embodiments, the data intake and query system 108 can determine a physical identifier for a dataset using an identifier of the dataset association record 602 with which the dataset is associated. In some embodiments, the physical name can correspond to a combination of the logical name and the name of the dataset association record 602. In certain embodiments, the data intake and query system 108 can determine the physical name for a dataset by appending the name of the dataset association record 602 to the name of the dataset. For example, if the name of the dataset is "main" and it is associated with or part of the "shared" dataset association record 602, the data intake and query system 108 can generate a physical name for the dataset as "shared-.main" or "shared_main." In this way, if another dataset association record 602 "test" includes a "main" dataset, the "main" dataset from the "shared" dataset association record will not conflict with the "main" dataset from the "test" dataset association record (identified as "test.main" or "test_main"). It will be understood that a variety of ways can be used to generate or determine a physical name for a dataset. For example, the data intake and query system 108 can concatenate the logical name and the name of the dataset association record 602, use a different identifier, etc.

In some embodiments, the dataset association records 602 can also be used to limit or restrict access to datasets and/or rules. For example, if a user uses one dataset association record 602 they may be unable to access or use datasets and/or rules from another dataset association record 602. In some such embodiments, if a query identifies a dataset association record 602 for use but references datasets or rules of another dataset association record 602, the data intake and query system 108 can indicate an error.

In certain embodiments, datasets and/or rules can be imported from one dataset association record 602 to another dataset association record 602. Importing a dataset and/or rule can enable a dataset association record 602 to use the referenced dataset and/or rule. In certain embodiments, when importing a dataset and/or rule 610, the imported dataset and/or rule 610 can be given a different name for use in the dataset association record 602. For example, a "main" dataset in one dataset association record can be imported to another dataset association record and renamed "traffic." However, it will be understood that in some embodiments, the imported dataset 608 and/or rule 610 can retain the same name.

Accordingly, in some embodiments, the logical identifier for a dataset can vary depending on the dataset association record 602 used, but the physical identifier for the dataset may not change. For example, if the "main" dataset from the "shared" dataset association record is imported by the "test" dataset association record and renamed as "traffic," the same dataset may be referenced as "main" when using the "shared" dataset association record and may be referenced as "traffic" when using the "test" dataset association record. However, in either case, the data intake and query system 108 can recognize that, regardless of the logical identifier used, both datasets refer to the "shared.main" dataset.

In some embodiments, one or more datasets and/or rules can be imported automatically. For example, consider a scenario where a rule from the "main" dataset association record 602 is imported by the "test" dataset association record and references dataset "users." In such a scenario, even if the dataset "users" is not explicitly imported by the "test" dataset association record 602, the "users" dataset can be imported by the "test" dataset association record 602. In this way, the data intake and query system 108 can reduce the likelihood that an error occurs when an imported dataset and/or rule references a dataset and/or rule that was not explicitly imported.

In certain cases, when a dataset and/or rule is automatically imported, the data intake and query system 108 can provide limited functionality with respect to the automatically imported dataset and/or rule. For example, by explicitly importing a dataset and/or rule, a user may be able to reference the dataset and/or rule in a query, whereas if the dataset and/or rule is automatically imported, a user may not be able to reference the dataset and/or rule the query. However, the data intake and query system 108 may be able to reference the automatically imported dataset and/or rule in order to execute a query without errors.

Datasets of a dataset association record 602 can be associated with a dataset type. A dataset type can be used to differentiate how to interact with the dataset. In some embodiments, datasets of the same type can have similar characteristics or be interacted with in a similar way. For example, index datasets and metrics interactions datasets may be searchable, collection datasets may be searchable via a lookup dataset, view datasets may include query parameters or a query, etc. Non-limiting examples of dataset types include, but are not limited to: index (or partition), view, lookup, collections, metrics interactions, action service, interactions, four hexagonal coordinate systems, etc.

In some cases, the datasets may or may not refer to other datasets. In certain embodiments, a dataset may refer to no other datasets, one other dataset, or multiple datasets. A dataset that does not refer to another dataset may be referred to herein as a non-referential dataset, a dataset that refers to one dataset may be referred to as a single reference dataset, and a dataset that refers to multiple datasets may be referred to as a multi-reference dataset.

In certain embodiments, some datasets can include data of the data intake and query system 108. Some such datasets may also be referred to herein as source datasets. For example, index or partition datasets can include data stored in buckets as described herein. Similarly, collection datasets can include collected data. As yet another example metrics interactions datasets can include metrics data. In some cases, a source dataset may not refer to another dataset or otherwise identified as a non-referential dataset or non-referential source dataset. However, it will be understood that in certain embodiments, a source dataset can be a single reference dataset (or single reference source dataset) and/or a multi-reference dataset (or multi-reference source dataset).

In some embodiments, certain datasets can be used to reference data in a particular source dataset. Some such datasets may be referred to herein as source reference datasets. For example, a source dataset may include certain restrictions that preclude it from making its data searchable generally. In some such cases, a source reference dataset can be used to access the data of the source dataset. For example, a collection dataset may not make its data searchable except via a lookup dataset. As such, the collection dataset may be referred to as a source dataset and the lookup dataset may be referred to as a source reference dataset. In some embodiments, a source reference dataset can correspond to or be paired with a particular source dataset. In certain embodiments, each source reference dataset references only one other (source) dataset. In such embodiments, the source reference dataset can be referred to as a single reference dataset or single source reference dataset. However, it will be understood that source reference datasets can be configured in a variety of ways and/or may reference multiple datasets (and be referred to as a multi-reference dataset or multi-source reference dataset).

In certain embodiments, a dataset can include one or more query parameters. Some such datasets may be referred to as query datasets. For example, a view dataset can include a query that identifies a set of data and how to process the set of data and/or one or more query parameters. When referenced, the data intake and query system 108 can incorporate the query parameters of the query dataset into a query to be processed/executed by the query system 214. Similar to a query, a query dataset can reference one dataset (single reference dataset or single reference query dataset) or multiple datasets (multi-reference dataset or multi-reference query dataset) and/or include an instruction to access one or more datasets (e.g., from, lookup, search, etc.). Moreover, the query dataset can include multiple query parameters to process the data from the one or more datasets (e.g., union, stats, count by, sort by, where, etc.)

As mentioned, in some cases, a dataset 608 in a dataset association record 602 can be imported or inherited from another dataset association record 602. In some such cases, if the dataset association record 602 includes an imported dataset 608, it can identify the dataset 608 as an imported dataset and/or it can identify the dataset 608 as having the same dataset type as the corresponding dataset 608 from the other dataset association record 602.

Rules of a dataset association record 602 can identify types of data and one or more actions that are to be performed on the identified types of data. The rule can identify the data in a variety of ways. In some embodiments, the rule can use a field-value pair, index, or other metadata to identify data that is to be processed according to the actions of the rule. For example, a rule can indicate that the data intake and query system 108 is to perform three processes or extraction rules on data from the "main" index dataset (or multiple or all datasets of a dataset association record 602) with a field-value pair "sourcetype:foo." In certain cases, a rule can apply to one or more datasets of a dataset association record 602. In some cases, a rule can apply to all datasets of dataset association record 602. For example, the rule 610A can apply to all datasets of the shared dataset association record 602A or to all index type datasets of the shared dataset association record 602A, etc.

The actions of a rule can indicate a particular process that is to be applied to the data. Similar to dataset types, each action can have an action type. Action of the same type can have a similar characteristic or perform a similar process on the data. Non-limiting examples of action types include regex, aliasing, auto-lookup, and calculated field.

Regex actions can indicate a particular extraction rule that is to be used to extract a particular field value from a field of the identified data. Auto-lookup actions can indicate a particular lookup that is to take place using data extracted from an event to identify related information stored elsewhere. For example, an auto-lookup can indicate that when a UID value is extracted from an event, it is to be compared with a data collection that relates UIDs to usernames to identify the username associated with the UID. Aliasing actions can indicate how to relate fields from different data. For example, one sourcetype may include usernames in a "customer" field and another sourcetype may include usernames in a "user" field. An aliasing action can associate the two field names together or associate both field names with another field name, such as "username." Calculated field actions can indicate how to calculate a field from data in an event. For example, a calculated field may indicate that an average is to be calculated from the various numbers in an event and assigned to the field name "score_avg." It will be understood that additional actions can be used to process or extract information from the data as desired.

In the illustrated embodiment of FIG. 6, two dataset association records 602A, 602N (also referred to herein as dataset association record(s) 602), two dataset configuration records 604A, 604N (also referred to herein as dataset configuration record(s) 604), and two rule configuration records 606A, 606N (also referred to herein as rule configuration record(s) 606) are shown. However, it will be understood that fewer or more dataset association records 602 dataset configuration records 604, and/or rule definitions 606 can be included in the metadata catalog 221.

As mentioned, each dataset association record 602 can include a name (or other identifier) for the dataset association record 602, an identification of one or more datasets 608 associated with the dataset association record 602, and one or more rules 610. As described herein, the datasets 608 of a dataset association record 602 can be native to the dataset association record 602 or imported from another dataset association record 602. Similarly, rules of a dataset association record 602 can be native to the dataset association record 602 and/or imported from another dataset association record 602.

In the illustrated embodiment, the name of the dataset association record 602A is "shared" and includes the "main" dataset 608A, "metrics" dataset 608B, "users" dataset 608C, and "users-col" dataset 608D. In addition, the "main" dataset 608A and "metrics" dataset 608B are index datasets, the "users" dataset 608C is a lookup dataset associated with the collection "users-col" dataset 608D. Moreover, in the illustrated embodiment, the "main" dataset 608A, "metrics" dataset 608B, and "users-col" dataset 608D are non-referential source datasets and the "users" dataset 608C is a source reference dataset (and single reference dataset) that references the "users-col" dataset 608D.

In addition, in the illustrated embodiment, the dataset association record 602A includes the "X" rule 610A associated with the "main" dataset 608A and "metrics" dataset 608B. The "X" rule 610A uses a field-value pair "sourcetype:foo" to identify data that is to be processed according to an "auto lookup" action 612A, "regex" action 612B, and "aliasing" action 612C. Accordingly, in some embodiments, when data from the "main" dataset 608A is accessed, the actions 612A, 612B, 612C of the "X" rule 610A are applied to data of the sourcetype "foo."

Similar to the dataset association record 602A, the dataset association record 602N includes a name ("trafficTeam") and various native index datasets 608E, 608F ("main" and "metrics," respectively), a collection dataset 608G ("threats-col") and a lookup dataset 608H ("threats"), and a native rule 610C ("Y"). In addition, the dataset association record 602 includes a view dataset 608I ("threats-encountered"). The "threats-encountered" dataset 608I includes a query (shown in the dataset configuration record 604N) "|from traffic| lookup threats sig OUTPUT threat|where threat=*| stats count by threat" that references two other datasets 608J, 608H ("traffic" and "threats"). Thus, when the "threats-encountered" dataset 608I is referenced, the data intake and query system 108 can process and execute the identified query. Moreover, in the illustrated embodiment, the "main" dataset 608E, "metrics" dataset 608E, and "threats-col" dataset 608G are non-referential source datasets, the "threats" dataset 608H is a single source reference dataset (source reference and single reference dataset) that references the "threats-col" dataset 608G, and the "threats-encountered dataset" 608I is a multi-reference query dataset.

The dataset association record 602N also includes an imported "traffic" dataset 608J and an imported "shared.X" rule 610B. In the illustrated embodiment, the "traffic" dataset 608J corresponds to the "main" dataset 608A from the "shared" dataset association record 602A. As described herein, in some embodiments, to associate the "main" dataset 608A (from the "shared" dataset association record 602A) with the "traffic" dataset 608J (from the "trafficTeam" dataset association record 602N), the name of the dataset association record 602A ("shared") is placed in front of the name of the dataset 608A ("main"). However, it will be understood that a variety of ways can be used to associate a dataset 608 from one dataset association record 602 with the dataset 608 from another dataset association record 602. As described herein, by importing the dataset "main" dataset 608A, a user using the dataset association record 602 and can reference the "main" dataset 608A and/or access the data in the "main" dataset 608A.

Similar to the "main" dataset 608A, the "X" rule 610A is also imported by the "trafficTeam" dataset association record 602N as the "shared.X" rule 610B. As described herein, by importing "X" rule 610A, a user using the "trafficTeam" dataset association record 602N can use the "X" rule 610A. Furthermore, in some embodiments, if the "X" rule 610A (or a dataset) references other datasets, such as, the "users" dataset 608C and the "users-col" dataset 608D, these datasets can be automatically imported by the "trafficTeam" dataset association record 602N. However, a user may not be able to reference these automatically imported rules (datasets) in a query.

3.8.2. Dataset Configuration Records

The dataset configuration records 604 can include the configuration and/or access information for the datasets associated with the dataset association records 602 or otherwise used or supported by the data intake and query system 108. In certain embodiments, the metadata catalog 221 includes the dataset configuration records 604 for all of the datasets 608 used or supported by the data intake and query system 108 in one or more files or entries. In some embodiments, the metadata catalog 221 includes a separate file, record, or entry for each dataset 608 or dataset configuration record 604.

The dataset configuration record 604 for each dataset 608 can identify a physical and/or logical name for the dataset, a dataset type, authorization information indicating users or credentials that have to access the dataset, access information (e.g., IP address, end point, indexer information), and/or location information (e.g., physical location of data) to enable access to the data of the dataset, etc. Furthermore, depending on the dataset type, each dataset configuration record 604 can indicate custom fields or characteristics associated with the dataset. In some embodiments, index, metrics, lookup, and collection datasets may include location information, while view datasets do not. For example, in some cases view datasets may not have data except that which is access via an index, metrics, lookup, and collection datasets. Accordingly, the content and information for the dataset association records 602 can vary depending on the dataset type.

In the illustrated embodiment, the "shared.main" dataset configuration record 604A for the "shared.main" dataset 608A indicates that it is an index data type, and includes authorization information indicating the entities that have access to the "shared.main" dataset 608A, access information that enables the data intake and query system 108 to access the data of the "shared.main" dataset 608A, and location information that indicates the location where the data is located. In some cases, the location information and access information can overlap or be combined. In addition, the dataset configuration record 604A includes a retention period indicating the length of time in which data associated with the "shared.main" dataset 608A is to be retained by the data intake and query system 108. In some embodiments, because "shared.main" is imported into the "trafficTeam" dataset association record 602N as the dataset "traffic," it may also be identified as the "trafficTeam.traffic" dataset 608J. Accordingly, in some such embodiments, the dataset configuration record 604A may include an additional identifier for "trafficTeam.traffic" or as is shown in the illustrated embodiment, it may indicate that the "trafficTeam.traffic" dataset is a dependent dataset.

Similarly, in the illustrated embodiment, the "trafficTeam.threats-encountered" dataset configuration record 604N for the "trafficTeam.threats-encountered" dataset 608I indicates that it is a view type of dataset and includes authorization information indicating the entities that have access to it. In addition, the dataset configuration record 604N includes the query for the "trafficTeam.threats-encountered" dataset 608I.

The dataset configuration record 604 can also include additional information or metadata (also referred to herein as annotations). The annotations can correspond to user annotations added by a user or to system annotations that are automatically generated by the system.

In the illustrated embodiment of FIG. 6, the dataset configuration record 604A includes a system annotation 614 that indicates the number of identified fields of the "shared.main" dataset (4), system annotations 616 that identify the fields of the "shared.main" dataset (sig, IP_addr, userID, error), and a system annotation 618 that identifies the datasets that depend on the "shared.main" dataset ("trafficTeam.traffic" and "trafficTeam.threats-encountered"). In the illustrated embodiment, the dependent datasets annotation 618 includes reference to the "trafficTeam.traffic" dataset 608J even though it is only an identifier to import the "shared.main" dataset to the dataset association record 602N. However, in some embodiments, datasets that only import another dataset or are merely identifiers for another dataset may not be identified as dependent datasets and/or may not be included as part of a system annotation.

With further reference to the illustrated embodiment of FIG. 6, the dataset configuration record 604N includes a user annotation 620 that identifies a group associated with the dataset "trafficTeam.threats-encountered" 608I (also referred to herein as "threats-encountered"). This annotation can be used by the system to determine which group is responsible for the dataset 602N and/or should be charged for its use. The dataset configuration record 604N also includes a system annotation 622 that identifies the datasets on which the "threats-encountered" dataset depends ("trafficTeam.traffic," which is also "shared.main" and "trafficTeam.threats"), and a system annotation 624 that identifies the number of times the "threats-encountered" dataset 608I has been used and/or accessed. In some embodiments, because trafficTeam.traffic merely imports "shared.main" it may not be considered a related dataset or may be omitted from the dependency dataset annotation 622.

In some embodiments, the data intake and query system 108 (e.g., the query system 214) creates a job ID each time a query is run or executed (e.g., each time a dataset is used or accessed). The job ID may reference a specific query run at a specific time, or in reference to a specific time, and point to results of the query. The data intake and query system 108 (e.g., the query system 214) can store the job ID in a dataset configuration record that includes the query that is run. In general, a dataset configuration record associated with a dataset that is of the type "savedsearch/view" or any other type on which a query can be run includes at least one job ID once the query included in dataset configuration record is run at least once. For example, the query included in a dataset configuration record can be run one or more times. The dataset configuration record can include the job ID for the most recent query that is run, the job ID for the first query that is run, the job IDs for some, but not all, of the queries that are run, the job IDs for all of the queries that are run, and/or any combination thereof. With further reference to the illustrated embodiment of FIG. 6, the system annotation 624 indicates that the "trafficTeam.threats-encountered" dataset 608I has been used and/or accessed 30 times. Thus, the query included in the dataset configuration record 604N may have been run 30 times. In the illustrated embodiment, the dataset configuration record 604N includes a system annotation 626 that identifies a job ID ("F341A5") of the most recent query that is run on the "trafficTeam.threats-encountered" dataset 608I. In other embodiments not illustrated, however, the dataset configuration record 604N can include a system annotation 626 that identifies the job ID of the first query that is run on the "trafficTeam.threats-encountered" dataset 608I, job IDs of some, but not all, of the queries run on the "trafficTeam.threats-encountered" dataset 608I, job IDs of all of the queries run on the "trafficTeam.threats-encountered" dataset 608I, and/or any combination thereof.

In some embodiments, the data intake and query system 108 (e.g., the query system 214) includes in a dataset configuration record not only some or all of the job IDs of a query that is run or executed, but also the results of each executed query that has a job ID present in the dataset configuration record. With further reference to the illustrated embodiment of FIG. 6, the dataset configuration record 604N includes a system annotation 628 that identifies the results of the query associated with the job ID identified by the system annotation 626 ("F341A5"). For example, the most recent results of running the dataset configuration record 604N query on the "trafficTeam.threats-encountered" dataset 608I can be a count of 2 for "threat1," a count of 5 for "threat2," and so on. In other embodiments not illustrated, the dataset configuration record 604N can include the query result of the first query that is run on the "trafficTeam.threats-encountered" dataset 608I, the query results of some, but not all, of the queries that are run on the "trafficTeam.threats-encountered" dataset 608I, the query results of all of the queries that are run on the "trafficTeam.threats-encountered" dataset 608I, and/or any combination thereof. For example, if the dataset configuration record 604N includes one or more system annotations 626 identifying multiple job IDs, then the dataset configuration record 604N may also include one or more system annotations 628 identifying the results of each job ID identified by the system annotation(s) 626. The query results can be represented in a JSON format, as a table, or in some other format, as desired.

In addition to the job ID and query results, a dataset configuration record can store additional information related to a query, such as, but not limited to, the user that executed a query, the tenant associated with the query, the time the query was executed, or the time the job ID was created, etc. The system 108 can use this information to generate statistical information about different queries and/or provide recommendations to users. For example, the system 108 can provide query recommendations based on the most frequently used queries generally or by the user, or users from the same tenant, users with similar administrative privileges or access controls, etc.

It will be understood that fewer or more annotations can be included in the dataset configuration record 604N. For example, the dataset configuration record 604N can include the identity and number of fields used by the "threats-encountered" dataset.

It will be understood that more or less information or annotations can be included in each dataset configuration record 604. For example, the dataset configuration records 604 can indicate whether the dataset is a non-referential, single reference or multi-reference dataset and/or identify any datasets that it references (by the physical or logical identifier of the datasets or other mechanism), is dependent on or that depend on it, its usage, etc. As another example, the dataset configuration records 604 can identify one or more rules associated with the dataset. Additional information regarding example annotations that can be generated and/or included in dataset configuration records 604 or in the metadata catalog 221 are described herein.

Although not illustrated in FIG. 6, it will be understood that the metadata catalog 221 can include a separate dataset configuration record 604 for the datasets 608B, 608C, 608D, 608E, 608F, 608G, 608H, and 608J. Furthermore, it will be understood that the metadata catalog 221 can include data from multiple tenants. In some cases, the data (e.g., dataset association records, dataset configuration records, and/or rule configuration records, etc.) from different tenants can be logically and/or physically segregated within the metadata catalog 221.

In some embodiments, some datasets may not have a separate dataset configuration record 604. For example, imported datasets and/or view datasets may not include a separate dataset configuration record 604. In certain embodiments, view datasets can include a query identified in a dataset association record 602, but may not have a separate dataset configuration record 604 like index, metrics, collection, and/or lookup datasets.

In some embodiments, the dataset configuration record 604 for the "traffic" dataset 608J (or other imported datasets) can indicate that the "traffic" dataset 608J is an imported version of the "shared.main" dataset 608A. In certain cases, the dataset configuration record 604 for the "traffic" dataset 608J can include a reference to the dataset configuration record 604 for the "shared.main" dataset 608A and/or can include all of the configuration information for the "shared.main" dataset 608A. In certain embodiments, the metadata catalog 221 may omit a separate dataset configuration record 604 for the "traffic" dataset 608J because that dataset is an imported dataset of the "main" dataset 608A from the "share" dataset association record 602A.

As described herein, although the dataset association records 602A, 602N each include a "main" dataset 608B, 608E and a "metrics" dataset 608B, 608F, the data intake and query system 108 can differentiate between the datasets from the different dataset association records based on the dataset association record 602 associated with the datasets. For example, the metadata catalog 221 can include separate dataset configuration records 604 for the "shared.main" dataset 608A, "trafficTeam.main" dataset 608E, "shared.metrics" dataset 608B, and the "trafficTeam.metrics" dataset 608F.

3.8.3. Rule Configuration Records

The rule configuration records 606 can include the rules, actions, and instructions for executing the rules and actions for the rules referenced of the dataset association records 602 or otherwise used or supported by the data intake and query system 108. In some embodiments, the metadata catalog 221 includes a separate file or entry for each rule configuration record 606. In certain embodiments, the metadata catalog 221 includes the rule configuration records 606 for all of the rules 610 in one or more files or entries.

In the illustrated embodiment, a rule configuration records 606N is shown for the "shared.X" rule 610A. The rule configuration record 606N can include the specific parameters and instructions for the "shared.X" rule 610A. For example, the rule configuration record 606N can identify the data that satisfies the rule (sourcetype:foo of the "main" dataset 608A). In addition, the rule configuration record 606N can include the specific parameters and instructions for the actions associated with the rule. For example, for the "regex" action 612B, the rule configuration record 606N can indicate how to parse data with a sourcetype "foo" to identify a field value for a "customerID" field, etc. With continued reference to the example, for the "aliasing" action 612C, the rule configuration record 606N can indicate that the "customerID" field corresponds to a "userNumber" field in data with a sourcetype "roo." Similarly, for the "auto-lookup" action 612A, the rule configuration record 606N can indicate that the field value for the "customerID" field can be used to lookup a customer name using the "users" dataset 608C and "users-col" dataset 608D.

It will be understood that more or less information can be included in each rule configuration record 606. For example, the rule configuration records 606 can identify the datasets or dataset association records 602 to which the rule applies, indicate whether a rule is imported, indicate include authorizations and/or access information to use the rule, etc.

Similar to the dataset configuration records 604, the metadata catalog 221 can include rule configuration records 606 for the various rules 610 of the dataset association record 602 or other rules supported for use by the data intake and query system 108. For example, the metadata catalog 221 can include rule configuration record 606 for the "shared.X" rule 610A and the "trafficTeam.Y" rule 610C.

As described herein, the dataset association records 602, dataset configuration records 604, and/or rule configuration records 606 can be used by the system 108 to interpret dataset identifiers in a query, verify/authenticate a user's permissions and/or authorizations for different datasets, identify additional processing as part of the query, identify one or more source datasets from which to retrieve data as part of the query, determine how to extract data from datasets, identify configurations/definitions/dependencies to be used by search nodes to execute the query, etc.

In certain embodiments, the dataset association records 602, dataset configuration records 604, and/or rule configuration records 606 can be used to identify primary datasets and secondary datasets. The primary datasets can include datasets that are to be used to execute the query. The secondary datasets can correspond to datasets that are directly or indirectly referenced by the query but are not used to execute the query. Similarly, the dataset association records 602, dataset configuration records 604, and/or rule configuration records 606 can be used to identify rules (or primary rules) that are to be used to execute the query.

3.8.4. Annotations

In some embodiments, the system 108 stores data without type or as unstructured data. Thus, the system 108 may not "know" or have insight (e.g., include a table or other stored information) into the content of the data. For example, the system 108 may not have any insight into what fields (e.g., IP address, error code, userID, etc.) can be found in which datasets or what rules are related to what datasets. While it may be advantageous for a variety of reasons to store data without type or as unstructured data and use late binding schema to query the data, this can result in longer query times and the use of greater processing resources during query processing and execution. To decrease query times and/or processing resources used during a query, the system 108 can dynamically add information or metadata (also referred to herein as annotations) to the metadata catalog as it is learned.

In some embodiments, the annotations can be added to the dataset configuration records 604, the rule configuration records 606 or as a separate annotation entry in the metadata catalog 221, or elsewhere in the system 108. For example, as changes are made to the metadata catalog 221 or as queries are executed on the data, the system 108 can infer information or learn about the datasets and rules and update the dataset configuration records 604 and rule configuration records 606 with this information. In the illustrated embodiment of FIG. 6, dynamically generated annotations 614, 616, 618, 622, 624 are included as part of the dataset configuration records 604A, 604N. However, as mentioned, the annotations can be stored as a separate entry or data structure. For example, the system 108 can update or create an annotation entry for each annotation and store the annotations in a database, such as a relational database or table of the metadata catalog 221, or elsewhere in the system 108. When stored in a separate data structure, the annotations can identify any datasets or fields to which they are associated or related.

The updated datasets configuration records 604 (or annotation entries) can be used by the system 108 to propagate annotations to related datasets, protect datasets from deletion, improve portability, and make recommendations to a user and/or process additional queries as they are received, etc. In this way, the system 108 can provide an incrementally evolving schema or map of the data and can enable more efficient queries and/or reduce the amount of processing resources used during query execution.

3.8.4.1. Generating Annotations

In some cases, the annotations can be added to the metadata catalog 221 (in dataset configuration records 604 or as annotation entries) manually by a user or automatically by the system 108.

It will be understood that a user can manually add a variety of annotations (also referred to herein as "user annotations") to the metadata catalog 221, which can be used by the system 108 to dynamically make user recommendations, improve query processing, and/or search time. For example, a user can add or revise a dataset configuration record 604 to the metadata catalog 221 for a dataset. As part of adding/revising the dataset configuration record, the user can add annotations about the capabilities of the dataset source associated with the dataset (e.g., speed, bandwidth, parallelization, size, etc.), one or more fields of the dataset and one or more relationships between the fields, one or more datasets related to the new/revised dataset, users or groups associated with the dataset, units or preferred units for data from the dataset, etc.

In certain embodiments, the annotations can be added automatically by the system 108 in response to monitoring system 108 use and/or based on detected changes to the metadata catalog 221 (also referred to herein as "system annotations"). To generate the various system annotations, the system 108 can use one or more processes, threads, containers, isolated execution environments, etc. (generically referred to as processes). In some cases, the system 108 can use multiple processes to generate system annotations. For example, a separate process can be used to generate annotations based on parsing a query, monitoring query execution, monitoring user/groups, monitoring applications, etc. Similarly, separate processes can be used to generate annotations based on detected changes to the metadata catalog 221. For example, separate processes can be used to generate annotations in response to detecting the addition or removal of a field, dataset, unit or preferred unit, field-dataset relationship, inter-field relationship, inter-dataset relationship, etc.

Moreover, the various processes can communicate with each other to generate the system annotations. For example, consider the scenario where one process is used to generate annotations based on parsing a query and another process is used to generate annotations based on the identification of a new field or new field-dataset relationship in the metadata catalog 221. If the process that parses the query identifies and generates an annotation based on a new field for a dataset, it can alert the process that generates annotations based on new fields added to the dataset. In this way, the system 108 can effectively increase its knowledge or understanding of the data stored thereon, and use this understanding to facilitate more effective searching of the data.

3.8.4.1.1. System Annotations Based on System Use

A variety of system annotations can be generated based on monitoring system use. As non-limiting examples, system annotations can be automatically added to the metadata catalog 221 in response to parsing a query, executing a query, tracking user interactions with the system 108, tracking the use of different applications executing in the system 108, or other system use monitoring, etc.

The system annotations generated based on monitoring system use can be used for a variety of functions. For example, the system annotations generated based on monitoring system use can be used to track field use, dataset use, suggest fields or datasets to a user (e.g., frequently/infrequently used fields or datasets, related fields or datasets, similar fields or datasets, datasets that satisfy the criteria of another dataset, such as datasets that satisfy the field criteria of a view dataset, etc.), display similar datasets, suggest applications, identify groups or individuals responsible for the use of a particular dataset (e.g., determine charge back distribution), cost-based optimizations (e.g., when querying data from multiple datasets, how to prioritize which dataset to obtain first), propagate annotations to related datasets or fields, etc.

3.8.4.1.1.1. Query Parsing

In some cases, the system 108 can parse and extract metadata from queries to generate system annotations. The queries can correspond to queries entered by a user in a user interface or queries that form part of a dataset, such as a view dataset.

In some embodiments, the system 108 can use the syntax and semantics of a query to extract metadata from the query. For example, based on the known syntax of a query processing language, the system 108 can identify query commands and locations where information can be extracted, such as dataset names or identifiers, field names or identifiers, etc. Based on the syntax and semantics of the query, the system 108 can identify relationships between the datasets and fields of the query. Furthermore, the system 108 can iteratively parse the identified datasets to identify additional datasets, fields, relationships, etc. For example, the system 108 can use the dataset identifiers to identify and parse the corresponding dataset configuration records 604 to identify additional datasets, fields, and/or rules.

As a non-limiting example, with reference to the query "|from traffic| lookup threats sig OUTPUT threat|where threat=*| stats count by threat" of the "threats-encountered" dataset 602N, the system 108 can, based on a knowledge of the commands for the query language used, determine that "from," "lookup," "OUTPUT," "where," "stats," and "count by" are query commands. In addition, the system 108 can, based on the known syntax or semantics of the query language, determine that the words following the "from," and "lookup" commands are dataset names or identifiers and the words following "where," "stats," "count by," and "OUTPUT" are field names or identifiers, which may also be generally referred to as query terms or search terms. Similarly, the system 108 can determine that the second word following the "lookup" command is a field name or identifier. Accordingly, the system 108 can determine that the "threats-encountered" dataset 602N references datasets "trafficTeam.traffic" and "trafficTeam.threats" and fields "threat" and "sig." In addition, based on the dataset association records 602 or a dataset configuration record 604, the system 108 can determine that "trafficTeam.traffic" is the "shared.main" dataset imported from the dataset association record 602A.

In addition to identifying the identity of datasets and fields of the query, the system 108 can extract other metadata from the query, such as, but not limited to, field-dataset relationships, inter-dataset relationships, inter-field relationships, etc. In certain embodiments, the system 108 can identify relationships between the fields and datasets of the query. For example, based on the presence and placement of the field names "sig" and "threat" in the query, the system 108 can determine that the dataset "trafficTeam.traffic" (and "shared.main") includes a field "sig," and the dataset "trafficTeam.threats" includes the fields "sig" and "threat."

In some embodiments, the system 108 can determine inter-field relationships. For example, given that the field "sig" is included in both "trafficTeam.traffic" and "trafficTeam.threats," the system 108 can determine that there is a relationship between "sig" in "trafficTeam.traffic" (or "shared.main") and "sig" in "trafficTeam.threats" (e.g., that the two "sigs" correspond to each other).

Moreover, in some cases, the system 108 can determine inter-dataset relationships. In some embodiments, based on the presence of the "trafficTeam.traffic" and "trafficTeam.threats" datasets in the query of the "threats-encountered" dataset 602N, the system 108 can determine that the "threats-encountered" dataset 602N is related to and dependent on the "trafficTeam.traffic" and "trafficTeam.threats" datasets. For example, if the datasets "traffic" and "threats" do not exist or are not defined, the "threats-encountered" dataset may return an error or be unable to function properly. In addition, the system 108 can identify a relationship between the "traffic" and "threats" datasets. For example, given that the "traffic" and "threats" datasets both have the same field "sig," the system 108 can identify a foreign key relationship between them—similar to the inter-field relationship discussed above.

As additional datasets are identified, the system 108 can parse the corresponding dataset configuration records 604 to identify additional relationships. For example, the system 108 can determine that the "trafficTeam.threats" dataset is dependent on a "trafficTeam.threats-col" dataset, and that the "trafficTeam.traffic" (or "shared.main" dataset) is related to a rule "X," which is dependent on dataset "shared.users," which in turn depends on a dataset "shared.users-col." Accordingly, the system 108 can iteratively parse the dataset configurations to determine the relationships between the various rules and datasets of the system 108. Another non-limiting example of parsing a query and extracting information about the datasets and rules referenced by the query is given with reference to FIG. 10.

Based on the extracted metadata of the query (e.g., identity of fields and datasets, field-dataset relationships, inter-field relationships, inter-dataset relationships, etc.), the system 108 can generate one or more annotations. In some embodiments, the system 108 can generate an annotation for each piece of extracted metadata and/or each identified relationship. In certain embodiments, the system 108 can generate one or more annotations for any one or any combination of the identified fields and datasets, the identified field-dataset relationships, the identified inter-field relationships, and/or the identified inter-dataset relationships, etc.

As described herein, the annotations generated from the extracted metadata of the query can be used to track field use, dataset use, suggest fields or datasets to a user (e.g., frequently/infrequently used fields or datasets, related fields or datasets, similar fields or datasets, datasets that satisfy the criteria of another dataset, such as datasets that satisfy the field criteria of a view dataset, etc.), display similar datasets, suggest applications, identify groups or individuals responsible for the use of a particular dataset (e.g., determine charge back distribution), propagate annotations to related datasets or fields, etc.

3.8.4.1.1.2. Query Execution

In some embodiments, the system 108 can monitor system use during query execution. For example, during query execution, the system 108 can track which dataset is being accessed, the amount of data of the dataset being retrieved from a dataset source (e.g., the total number of data entries being retrieved, the number of data entries by field that are retrieved, the total amount of data being retrieved, etc.), the amount of processing resources used to retrieve data from the dataset source, the amount of time taken to obtain the data from the dataset source, the speed at which data is retrieved from the dataset source, whether a dataset source supports parallelization (e.g., whether the system 108 can extract data from the dataset source in parallel or serially), etc.

Based on the information that is tracked during query execution, the system 108 can generate one or more annotations. For example, based on the information, the system 108 can generate or update annotations about the speed and size of a dataset or dataset source (e.g., the number of data entries in the dataset, the number of data entries for each known field of the dataset, total size of the dataset or dataset source, etc.), the connectivity or latency with a dataset source, etc. In some embodiments, the system 108 can generate an annotation for each statistic that is monitored or generate an annotation for a group or all of the statistics being tracked. As described herein, the annotations can be stored as part of a dataset configuration record 604 or other annotation entry.

The annotations generated based on monitoring the system 108 during query execution can be used to track the speed and size of datasets and the capabilities of dataset sources. The system 108 can further use this information to generate cost-based optimizations during query execution. Consider the scenario where a query indicates that data from dataset A and dataset B are to be joined. The system 108 can use the annotations generated from monitoring the system 108 during query execution to determine which dataset to access first. For example, the annotations may indicate that for field 1, dataset A has significantly more data entries or is slower than dataset B. Thus, if the query includes a join of field 1, the system 108 can access dataset B first and use the information from dataset B to refine the data that is requested from dataset A. As another example, if another query indicates that field 2 of datasets A and B are to be used for a join and the annotations indicate that dataset B has significantly more data entries than dataset A, the system 108 can pull data from dataset A first and use it to refine the query for dataset B. Furthermore, the system 108 can use a combination of annotations to determine which dataset to access first. For example, if dataset B has significantly more data for field 3 than dataset A, but dataset A is significantly slower, the system 108 may determine that it will take less time and be more efficient to pull data from dataset B first and use that to refine the query for dataset A.

3.8.4.1.1.3. User Monitoring

In some embodiments, the system 108 can monitor users as they interact with the system 108. For example, the system 108 can monitor which users use the system 108, the duration of use, the frequency of use, which datasets are created, accessed, modified, or used by the user, which applications are used by the user, typical fields that are used by the user, etc. Similarly, if a user is part of a group, the system 108 can monitor the collective actions of the users of the group. This information can be used to generate user/group annotations. As described herein, the annotations can be stored as part of a dataset configuration record 604 or other annotation entry.

The system 108 can use the user/group annotations to track usage of the system 108 by user or group. Furthermore, the system 108 can use the user/group annotations to suggest fields, datasets, applications, etc. to the user or the group. For example, the system 108 can identify fields or datasets that are related to or similar to fields or datasets typically used by the user. As another example, if users with similar characteristics to the current user use certain fields, applications, or datasets, the system 108 can recommend these fields, application, or datasets to the user, etc. In this way, the system 108 can improve the users understanding of the data in the system 108 and enhance the user's ability to user or query data in the system.

3.8.4.1.1.4. Application Monitoring

In certain embodiments, the system can monitor applications used on the system 108. For example, the system 108 can monitor which applications are available on the system 108, which datasets or dataset sources are used by the application, the frequency of use of applications, an identification of applications that are frequently used together, an identity of users or user types that use particular applications, etc. This information can be used to generate annotations.

The system 108 can use the annotations generated by monitoring applications to track the usage of the applications and to make suggestions to users. For example, if multiple users of a group frequently use one or more applications, the system 108 can recommend the applications to other users of the group. As another example, if one user of a group begins using and spends significant time on one application compared to time spent on other applications before beginning use of the "new" application, the system 108 can recommend the "new" application to other members of the group. In this way, the system 108 can propagate knowledge about the system 108 and applications to various users and improve their understanding of the system 108 and how to use it effectively.

3.8.4.1.2. System Annotations Based on Changes to the Metadata Catalog

As mentioned, in some embodiments, system 108 annotations can be added automatically to the metadata catalog 221 in response to changes in the metadata catalog 221. The changes may be the result of a manual change by a user, such as a user annotation, or an automated change by the system 108, such as a system 108 annotation. For example, when a user adds or revises information about a first dataset, the system 108 can compare information about the first dataset with other information of other datasets to identify potential relationships or similarities. If a relationship or similarity is detected, the system 108 can add an annotation to the dataset configuration record 604 (or annotation entry) of the first dataset as well as to the dataset configuration records 604 of the other identified datasets. As another example, if the system 108 updates information for the first dataset based on a query, the system 108 can identify other datasets that are related to the first dataset and update metadata of the other identified datasets. In this way, as the system 108 is used, it can learn about the datasets, and use the information to improve search time or search capabilities. As described herein, in some cases, the system 108 can use one or more processes to identify the change to the metadata catalog 221 and generate additional annotations based on the change.

In some embodiments, based on the addition of a dataset, the system 108 can identify fields of the dataset, related datasets (datasets on which the dataset depends), similar datasets (e.g., datasets with similar fields), dataset to which the new dataset can be mapped (e.g., view datasets to which the new dataset can be mapped), etc. In certain embodiments, if the added dataset is a view dataset that includes a query, the system 108 can process the query as described above to generate one or more annotations.

In certain embodiments, based on the addition of a field-dataset relationship annotation or the identification of a field of a dataset, the system 108 can determine a total number of fields of the dataset, identify similar datasets and/or datasets to which the dataset can be mapped, and generate corresponding annotations. For example, based on the addition of the field "userID" to the dataset "Logons," the system 108 can identify other datasets with a "userID" field. If found, the system 108 can generate an annotation for the dataset "Logons" and/or the other dataset to indicate a similar field is located in each dataset. As another example, based on the addition of the field "userID" to the dataset "Logons," the system 108 can identify view datasets that use the field "userID" to generate a view or interface. If the view dataset uses additional fields that are also found in the "Logons" dataset, the system 108 can generate an annotation for the dataset "Logons" and/or the other dataset to indicate that the view dataset may be related or usable with the "Logons" dataset or that the "Logon" dataset may be mapped to the view dataset.

In certain embodiments, based on the addition of an inter-field relationship or inter-dataset annotation, the system 108 can identify additional inter-field and inter-dataset relationships. For example, if dataset A is dependent on dataset B and dataset B is dependent on dataset C, the system 108 can determine that dataset A is dependent on dataset B and generate an additional inter-dataset annotation indicating A's dependency on C. As another example, if field "userID" of dataset B is related to field "ID" of dataset C and a new relationship between field "ID" of dataset C and field "UID" of dataset D, the system 108 can determine that "userID" of dataset B is related to "UID" of dataset D.

In addition, based on the addition of an inter-dataset annotation, the system 108 can propagate one or more annotations. For example, if an alarm threshold, unit, or preferred unit is associated with a metrics dataset A and an inter-dataset relationship annotation is added that relates metrics dataset A with metrics dataset B, the system 108 can propagate the alarm threshold, unit, and/or preferred unit to metrics dataset B. Specifically, if an annotation for metric cpu_speed of dataset A indicates that the units are Hz and the preferred units are GHz, the system 108 can propagate the Hz and GHz units/preferred units to a corresponding cpu_speed metric of dataset B. Similarly, if a data category annotation for a dataset or field of a dataset indicates that the information is confidential, then based on an inter-field relationship that indicates another field is derived from the confidential field or an inter-dataset relationship that indicates another dataset uses the confidential information, the system 108 can propagate the data category annotation to the related field or dataset.

In some embodiments, based on the addition of an inter-dataset annotation, the system 108 can generate an annotation indicating that the dataset that is depended on should not be deleted so long as the dependent dataset exists or an annotation indicating that if the dataset that is depended on is deleted then the dependent dataset should also be deleted. The system can also use an inter-dataset annotation to generate an annotation that indicates the total number (and identity) of datasets that depend on a particular dataset, or the total number (and identity) of datasets on which the particular dataset depends.

In certain embodiments, based on an update to the field use for a field, the system 108 can compare the field use of the field with the field use of other fields and determine the popularity of the fields. Based on the popularity, the system 108 can generate one or more annotations indicating the popularity of the fields. Similarly, the system 108 can use the dataset use and application use to generate annotations indicating the popularity of different datasets and applications, respectively. In addition, using the user or group information, the system 108 can determine the popularity of fields, datasets, and/or applications for a particular user or group.

In certain embodiments, based on a change/addition of a unit or preferred unit for a dataset, the system 108 can identify related datasets and generate annotations for the units and preferred units for the related datasets. Similarly, the system 108 can generate annotations for one or more datasets or fields in response to change/additions of alarm thresholds or data category (e.g., use restrictions) annotations to a related dataset or field.

3.8.4.2. Example Annotations

As mentioned, the metadata catalog 221 can include annotations or information about the datasets, fields, users, or applications of the system 108 and can be revised as additional information is learned. Non-limiting examples of annotations that can be added to the dataset configuration records 604, other configurations, annotation tables or entries, or other locations of the metadata catalog 221 or system 108, include but are not limited to, the identification and use of fields in a dataset, number of fields in a dataset, related fields, related datasets, number (and identity) of dependent datasets, number (and identity) of datasets depended on, capabilities of a dataset or related dataset source or provider, the identification of datasets with similar configurations or fields, units or preferred units of data obtained from a dataset, alarm thresholds, data categories (e.g., restrictions), users or groups, applications, popular field, datasets, and applications (in total or by user or group), etc. In certain cases, the annotations can be added as the system 108 monitors system use (e.g., processing queries, monitoring query execution, user interaction, etc.) or as the system 108 detects changes to the metadata catalog 221 (e.g., one manual/automated change can lead to another automated change), etc.

3.8.4.2.1. Field Annotations

The metadata catalog 221 can store various annotations about the fields found in datasets. For example, the metadata catalog 221 can include an identification of the dataset associated with a field (or field-dataset relationship), the number of fields of a dataset (or field count), an identification of all fields of a dataset, the frequency of use of the different fields, users of the field, etc. As described herein, the information about the fields of a dataset can be stored as part of a dataset configuration record 604 or as part of a separate data structure. When stored as a separate data structure, the data structure can identify the datasets that include the field or are otherwise associated with or related to the field.

The number and identity of fields of a dataset can be identified in a variety of ways. In some cases, a user can manually include or add a field to the metadata catalog 221 (e.g., the dataset configuration record 604 or an annotation entry). For example, the user may add or relate a regex rule to a dataset. The regex rule can define how to extract field values for the field from the dataset. Based on the information in the regex rule, the system 108 can identify the field and increment the number of fields associated with the dataset.

In some embodiments, the system 108 can parse a query to identify fields of a dataset. As described herein, in parsing the query, the system 108 can identify phrases or use the syntax of the query to identify (and count the number of) fields. For example, with reference to the query "| from traffic| lookup threats sig OUTPUT threat|where threat=*| stats count by threat." of threats-encountered dataset 602N, the system 108 can, based on the query language used, identify "from" and "lookup" as commands and determine that the words after "from" and "lookup," respectively, identify a dataset and the words after "threats" and "OUTPUT," respectively, identify a field. Accordingly, the system 108 can infer that the dataset "traffic" has a field "sig" and a dataset "threats" has fields "sig" and "threat." In some embodiments, based on this inference, the system 108 can update the dataset configuration record 604 of the dataset "traffic" or generate a field-dataset relationship annotation in the metadata catalog 221 with field information that identifies "sig" as a field associated with dataset "traffic." Similarly, the system 108 can update the metadata catalog 221 with a field-dataset annotation that identifies "sig" and "threat" as fields of the dataset "threats." Additionally, the system 108 can identify other fields in a query based on the syntax of the query. With each new field, the system 108 can update the corresponding dataset configuration record 604 and/or update a table that stores field information of fields in the system 108.

As queries are executed or the fields are used, the system 108 can further revise the dataset configuration records 604 or field entries to reflect the use of the fields over time. In this way, the system 108 can track the fields in the system 108, the relationship of the fields to datasets, and the frequency of use of the fields.

The system 108 can use the metadata related to the fields for a variety of functions. In some cases, the system 108 can use the metadata related to the fields to make field recommendations to a user, identify datasets with similar fields, suggest datasets for use together, identify datasets with a particular field, etc.

In some embodiments, as a user is typing a query related to a dataset, the system 108 can use the identified fields of the dataset to indicate to the user which fields are known about that dataset. In this way, the system 108 can provide insight into the content of a dataset as the user enters a query. Moreover, based on information of which fields are used most frequently, the system 108 can recommend or more prominently display a field to the user. For example, if the system 108 has determined (and the dataset configuration record 604 indicates) that the dataset "main" has at least three fields: "userID," "IP address," and "errorCode," then as the user is typing out the query "from main group by . . . " the system 108 can display "userID," "IP address," and "errorCode." Furthermore, if the system 108 has determined that "userID" is the most frequently used field (in total, by the user, or by a group associated with the user) related to "main" and/or most frequently used after "group by," then the system 108 can suggest "userID" first or place it more prominently relative to the other fields. In this way, the system 108 can aid the user in crafting a query for the system 108 to execute based on information that the system 108 has iteratively learned about the data.

In certain cases, the system 108 can use the annotations related to the fields to identify datasets with similar fields and suggest use of datasets for views for queries. For example, if a first dataset with fields: "userID," "productID," and "viewTime," is used to generate a view (or mapped to a view dataset), the system 108 can use the dataset configuration records 604 to compare the fields of the first dataset with fields of other datasets. If a second dataset is identified that includes the fields "userID," "productID," and "viewTime," the system 108 can recommend the second dataset to the user for viewing and/or annotate the dataset configuration records 604 of the first and second dataset to indicate the existence of another dataset with similar fields. As another example, if a first dataset is a view dataset that uses the fields "userID," "productID," and "viewTime" from a second dataset to generate a view or UI, the system 108 can identify other datasets with the fields "userID," "productID," and "viewTime," and suggest the identified datasets to the user of the view dataset. In this way, the system 108 can track similar datasets and identify potentially related datasets.

In some cases, a user may want to execute a query using a particular field. As the user enters a field identifier, the system 108 can suggest or identify datasets that include the particular field. In this way, the system 108 can aid the user in understanding the content of the data based on information that the system has iteratively learned about the data.

In certain embodiments, the system 108 can use the number of fields to estimate a size of a particular dataset.

3.8.4.2.2. Inter-Field Relationship Annotations

The metadata catalog 221 can store information about relationships between fields of datasets. In certain embodiments, the relationships can correspond to one field being derived from another field, fields with matching, corresponding, or correlating field values, etc. As described herein, annotations about the relationship between fields of datasets can be stored as part of a dataset configuration record 604 or as part of a separate data structure. When stored as a separate data structure, the data structure can identify the datasets that include the field or are otherwise associated with or related to the field.

In some cases, when storing the inter-field relationship annotations, the system 108 can store an ID for the relationship (e.g., name or unique name for the relationship), identifiers for the datasets associated with the related fields, and identifiers for the fields of the datasets that are related. In addition, the system 108 can store a relationship type. In some embodiments, the relationship type may be an exact relationship, such that field values of the different fields match (e.g., the field value for a "UID" field of one dataset matches the field value for an "ID" field of another dataset). In certain embodiments, the relationship type may be correlated, such as a field value of "time" in one dataset that is the most recent in time and before a field value of "time" in another dataset. In some embodiments, the relationship type may be a complex relationship, such as the combination of field values from multiple fields in one dataset to one field value of one field in another dataset.

The relationships between fields can be identified in a variety of ways. In some cases, a user can manually include or add an inter-field relationship annotation to the metadata catalog 221 (e.g., the dataset configuration record 604 or an annotation entry).

In some embodiments, the system 108 can parse a query or dataset to identify relationships between fields. Similar to the identification of fields described herein, the system 108 can use the syntax of the query to identify relationships between fields. For example, with continued reference to the query of the threats-encountered dataset 602N, based on the identification of a "sig" field in the datasets "traffic" and "threats," the system 108 can determine that there is a relationship or foreign-key relationship between the "sig" field of "traffic" and the "sig" field of "threats." In some such cases, based on the existence of the "sig" field in both datasets and its use in the same query, the system 108 can determine that field values in the "sig" field of "traffic" match the field values in the "sig" field of "threats." As such, the system 108 can identify and store information about the relationship in the metadata catalog 221.

As another example, based on a query or parsing a dataset, the system 108 can identify fields derived from other fields. For example, a query may initially refer to a field "salary." Field values of the field "salary," may be transformed and/or combined with other data as part of the query and later referenced as the field "sum." In some such cases, by parsing the syntax of the query, the system 108 can identify the relationship between "sum" and "salary" and identify "sum" as a field derived from "salary." As such, the system 108 can identify and store information about the relationship in the metadata catalog 221.

In certain embodiments, the system 108 can identify inter-field relationships based on changes to the metadata catalog 221. For example, if the metadata catalog 221 identifies a relationship between fields A and B (e.g., field B is derived from field A) and a new inter-field relationship annotation is added indicating a relationship between fields B and C (e.g., field C is derived from field B), the system 108 can determine and generate an inter-field relationship annotation for fields A and C (e.g., field C is derived from field A).

The system 108 can use the inter-field relationship annotations to propagate additional annotations. With continued reference to the "sum" and "salary" field example above, if the "salary" field is indented as personally identifiable information or is otherwise subject to restrictions, the system 108 can use the relationship information to also mark the "sum" field as PII or restricted. As another example, if units or preferred units are identified for one field, the system 108 can use the identification of related fields to automatically identify units or preferred units for the field. By iteratively learning and storing information about relationships between fields, the system 108 can iteratively learn about the various connections between fields and improve compliance with data restrictions.

3.8.4.2.3. Inter-Dataset Relationship Annotations

The metadata catalog 221 can store annotations about relationships between datasets. In some embodiments, a dataset configuration record 604 of a first dataset can include the number and/or identification of related datasets, such as datasets that depend on the first dataset or datasets on which the first dataset depends. For example, if a first dataset refers to or uses data from a second dataset, the dataset configuration record 604 of the first dataset and the second dataset can identify the first dataset as being dependent on the second dataset. In certain embodiments, certain metrics data may be identified as being related to certain raw machine data datasets. As such the dataset configuration records 604 of the metrics data and raw machine data datasets can identify each other as being related. As described herein, in some cases, fields of different datasets may be related or correspond to each other. As such, based on the relationship between the fields, the metadata catalog 221 can identify the datasets as being related. As described herein, annotations about the relationship between fields of datasets can be stored as part of a dataset configuration record 604 or as part of a separate data structure. When stored as a separate data structure, the data structure can identify the datasets that include the field or are otherwise associated with or related to the field.

The relationships between datasets can be identified in a variety of ways. In some cases, a user can manually include or add a relationship between datasets to a dataset configuration record 604 and/or an annotation entry.

In certain embodiments, the system 108 can parse a query or dataset to identify relationships between datasets. For example, with continued reference to the threat-encountered dataset 602N, the system 108 can parse the query "|from traffic| lookup threats sig OUTPUT threat|where threat=*| stats count by threat." In parsing the query, the system 108 can use the syntax of the query language to identify datasets and relationships. For example, "from" and "lookup" can be commands and words following those commands can identify datasets. Accordingly, the system 108 can identify the datasets "trafficTeam.traffic" (which is the "shared.main" dataset imported from dataset association record 602A) and "trafficTeam.threats" from the query. Furthermore, the system 108 can determine that the threats-encountered dataset 602N is dependent on the "trafficTeam.traffic" and "trafficTeam.threats" datasets given that those datasets are used in the threats-encountered query. In other words, without the datasets "trafficTeam.traffic" and "trafficTeam.threats," the "threats-encountered" dataset would not function properly or would return an error.

In addition, the system 108 can identify a relationship between the "trafficTeam.traffic" and "trafficTeam.threats" datasets. For example, given that the "trafficTeam.traffic" and "trafficTeam.threats" datasets both have the same field "sig," the system 108 can identify a foreign key relationship between them and store a corresponding annotation—similar to the inter-field relationship field annotation.

In certain embodiments, the system 108 can identify inter-dataset relationships based on changes to the metadata catalog 221. For example, if the metadata catalog 221 identifies a relationship between dataset A and B (non-limiting examples: (1) dataset B depends from dataset A, (2) dataset A can be mapped to dataset B, (3) dataset A and B have similar fields) and a new inter-field relationship annotation is added indicating a relationship between datasets B and C (non-limiting examples: (1) dataset C depends from dataset B, (2) dataset C can be mapped to dataset B, (3) dataset B can be mapped to dataset C), the system 108 can determine and generate an inter-dataset relationship annotation for datasets A and C (non-limiting examples: (1) dataset C depends from dataset A, (2) dataset A and C have similar fields, (3) dataset A can be mapped to dataset C).

The inter-dataset relationship annotations can be used for a variety of functions. In some cases, the system 108 can use the inter-dataset relationship annotations to generate additional annotations (e.g., additional inter-dataset relationships as described above), to propagate annotations from one dataset to another dataset (e.g., if units or preferred units are identified for dataset one then the units or preferred units may also be used for related dataset two), to lock datasets from or identify datasets for deletion (e.g., if dataset one depends on dataset two then dataset two should not be deleted or if dataset one depends on dataset two and dataset two is to be deleted then dataset one should also be deleted).

In certain embodiments, the system 108 can use the inter-dataset relationship annotations to propagate annotations from one dataset to another. For example, if dataset one is annotated as containing restricted information, the system 108 can use the inter-dataset relationship annotations to identify and annotate other datasets that depend from dataset one. As another example, if data from one dataset is annotated with a particular unit or preferred unit (e.g., MB instead of bytes), the system 108 can use the inter-dataset relationship annotations to identify other datasets that can be similarly annotated. Similarly, alarm thresholds for one dataset may be propagated to related datasets, etc.

3.8.4.2.4. Dataset Properties Annotations

The metadata catalog 221 can store annotations about the properties of a dataset, such as, but not limited to, an (estimated) size of a dataset, the usage of the dataset, and/or the capabilities of the dataset or dataset source. In some embodiments as users interact with the datasets, the system 108 can track when a dataset is used, the frequency of its use, the users or groups that use the dataset, etc. In addition, as a dataset is used, the metadata catalog 221 can estimate its size as it learns about the number of fields in the dataset and/or track the amount of data obtained from the dataset. In some cases, as data is extracted from datasets or dataset sources, the system 108 can monitor the performance of the dataset or dataset source. For example, the system 108 can monitor the speed of the dataset source, its bandwidth, network connectivity, etc. Based on this information, the system 108 can determine a cost to access a particular dataset. The cost may refer to time, computing resources, etc. This information can be stored as an annotation entry or as part of a dataset configuration record 604 as described herein.

Using the usage annotations, the system 108 can make recommendations to a user. For example, based on the frequency of use of dataset one or the number of datasets that refer to or depend from dataset one, the system 108 can recommend that dataset one be used for a particular query by the user.

Using the estimated size, speed, cost, or capability of a dataset, the system 108 can allocate resources for a query that depends on the dataset. For example, the system 108 can allocate more resources if it determines that the dataset is relatively large, slow, or supports parallelization, or allocate fewer resources if it determines that the dataset is relatively small or fast or does not support parallelization, etc. In addition, the system 108 can use the capabilities of the dataset to perform cost-based optimizations. For example, if, based on a query, the system 108 is to join data from dataset A and dataset B, based on the size, speed, etc. of the datasets, the system 108 can determine which dataset to access first. If, for example, dataset A is smaller or faster than dataset B, the system 108 can determine that dataset A should be accessed first and the results of dataset A can be used to refine the query to dataset B.

3.8.4.2.5. Normalization Annotations

The metadata catalog 221 can store normalization annotations about the datasets. In some cases, datasets may not be explicitly related, but may include similar data or fields. In some such cases, the system 108 can analyze the datasets to identify similar datasets or dataset that include similar data or fields.

In some cases, the metadata catalog 221 can identify similar datasets by comparing fields of datasets. As field annotations are added to the metadata catalog 221, as described herein, the system 108 can compare the fields of one dataset with the fields of another dataset. If a threshold number of fields are the same, then the system 108 can generate a normalization annotation (or inter-dataset relationship annotation) indicating that the datasets include similar data. The threshold number can be based on the total number of fields in one or both datasets or the number of fields used in another dataset, such as a view dataset.

In certain embodiments, as datasets are added, such as a view dataset that references dataset 1, the fields used by the view dataset can be compared with the fields of other datasets in the metadata catalog 221. If dataset 2 includes the same or similar fields to those used by the view dataset from dataset 1, the system 108 can generate a normalization annotation (or inter-dataset relationship annotation) indicating the similarity of dataset 2 to dataset 1 and/or indicate that dataset 2 could be used with the view dataset.

The normalization annotations can be used by the system 108 to make suggestions to a user about which datasets can be used with other datasets, such as view datasets, or to suggest that a user review a dataset. For example, as a user views an interface resulting from multiple fields from dataset 1 being mapped to a view dataset, the system 108 can recommend to the user that dataset 2 may provide additional results that may be helpful to the user's analysis of dataset 1.

3.8.4.2.6. Unit Annotations

The metadata catalog 221 can store unit annotations about the datasets or fields of the datasets. In some cases, the system 108 can identify the unit annotations based on user input and/or based on analysis of related datasets. In certain embodiments, a user can indicate that data from a particular dataset or field has a particular unit and/or has a preferred unit. For example, a user can indicate that the unit for a particular metric is Hz and/or that the preferred unit for the metric is MHz or GHz. The unit and/or preferred unit can be stored by the system 108 as a unit annotation. As described herein, the unit annotation can be stored as part of a dataset configuration record 604 and/or annotation entry.

In some embodiments, the system 108 can determine unit annotations based on changes to the metadata catalog 221. For example, if datasets A and B (or a field or metric of dataset A and B) are related and a new annotation is added indicating a preferred unit for dataset A (or a metric or field of dataset A), the system 108 can automatically determine and generate an annotation for dataset B (or a metric or field of dataset B) indicating the same preferred unit.

The unit annotations can be used by the system 108 to convert and/or display the data in a particular way. For example, if the unit annotation for a field or metric is identified as a byte and the preferred unit is a gigabyte, the system 108 can convert the bytes from the dataset to gigabytes and display the data as a gigabyte. Furthermore, the system 108 can propagate a unit annotation from one dataset to other datasets. In certain embodiments, the system 108 can identify fields or datasets related to the annotated field or dataset and propagate the unit annotation to the identified field or dataset.

3.8.4.2.7. Alarm Threshold Annotations

The metadata catalog 221 can store alarm threshold annotations about the datasets or fields of the datasets. In some cases, the system 108 can identify the alarm threshold annotations based on user input or based on previous user actions. For example, a user can indicate that when a particular metric or value satisfies a threshold, a person should be alerted or an alarm sounded.

In some embodiments, the system 108 can determine alarm threshold annotations based on changes to the metadata catalog 221. For example, if datasets A and B (or a field or metric of dataset A and B) are related and a new annotation is added indicating an alarm threshold for dataset A (or a metric or field of dataset A), the system 108 can automatically determine and generate an annotation for dataset B (or a metric or field of dataset B) indicating the same alarm threshold.

The alarm threshold annotations can be used by the system 108 to generate alarms or automatically execute a query. For example, based on an alarm threshold being satisfied, the system 108 can execute a query that surfaces information related to the alarm threshold. In addition, the system 108 can propagate the alarm thresholds to related datasets or fields.

3.8.4.2.8. Data Category Annotations

The metadata catalog 221 can store data category annotations about the datasets or fields of the datasets. In some cases, the system 108 can identify the data category (or use restriction) annotations based on user input. For example, a user can indicate that a particular field or dataset includes personally identifiable information, should be separately tracked or monitored, etc. Based on the identification, the system 108 can store a data category annotation for that field or dataset.

In some embodiments, the system 108 can determine data category annotations based on changes to the metadata catalog 221. For example, if datasets A and B (or a field or metric of dataset A and B) are related and a new annotation is added indicating a data category for dataset A (or a metric or field of dataset A), the system 108 can automatically determine and generate an annotation for dataset B (or a metric or field of dataset B) indicating the same data category. For instance, consider a scenario where dataset A includes a "social_security_num" field and a data category annotation indicating that the field is PII, and dataset B includes an "ID" field. If the metadata catalog is updated to reflect that the "ID" field is derived from the "social_security_num" field, then the system can automatically propagate the data category for the "social_security_num" field to the "ID" field.

The data category annotations can be used by the system 108 to track how certain data is being used and/or for compliance purposes. For example, the system can monitor PII data and generate alerts if it is not properly stored or processed.

3.8.4.2.9. User/Group Annotations

The metadata catalog 221 can store user or group annotations. In some cases, the system 108 can identify the user/group annotations based on user input. For example, a user can indicate that a particular user or group is associated with a particular dataset. In certain embodiments, the system 108 can generate the user/group annotations based on usage information. For example, the system 108 can track which datasets are accessed by which users or groups of users. This information can be stored as user/group annotations. As yet another example, if a particular user or group is the most frequent user of a dataset, the system 108 can relate the user or group to the dataset and generate a user/group annotation.

The user/group annotations can be used by the system 108 to determine how usage time should be allocated between parties. For example, if twenty users have access to a dataset, the system 108 can track which of the users or groups used the dataset most frequently and should be charged for the usage.

3.8.4.2.10. Application Annotations

The metadata catalog 221 can store application annotations. In certain embodiments, the system 108 can generate the application annotations based on usage information. For example, the system 108 can track which applications are used by which users and with what datasets. This information can be stored as application annotations as part of a dataset configuration record 604 or annotation entry.

The application annotations can be used by the system 108 to make recommendations to users. For example, if a threshold number of users frequently use three applications and a different user frequently uses two of the three applications, the system 108 can recommend the third application to the user.

4.0. Data Intake and Query System Functions

As described herein, the various components of the data intake and query system 108 can perform a variety of functions associated with the intake, indexing, storage, and querying of data from a variety of sources. It will be understood that any one or any combination of the functions described herein can be combined as part of a single routine or method. For example, a routine can include any one or any combination of one or more data ingestion functions, one or more indexing functions, and/or one or more searching functions.

4.1 Intake

Figure 7:
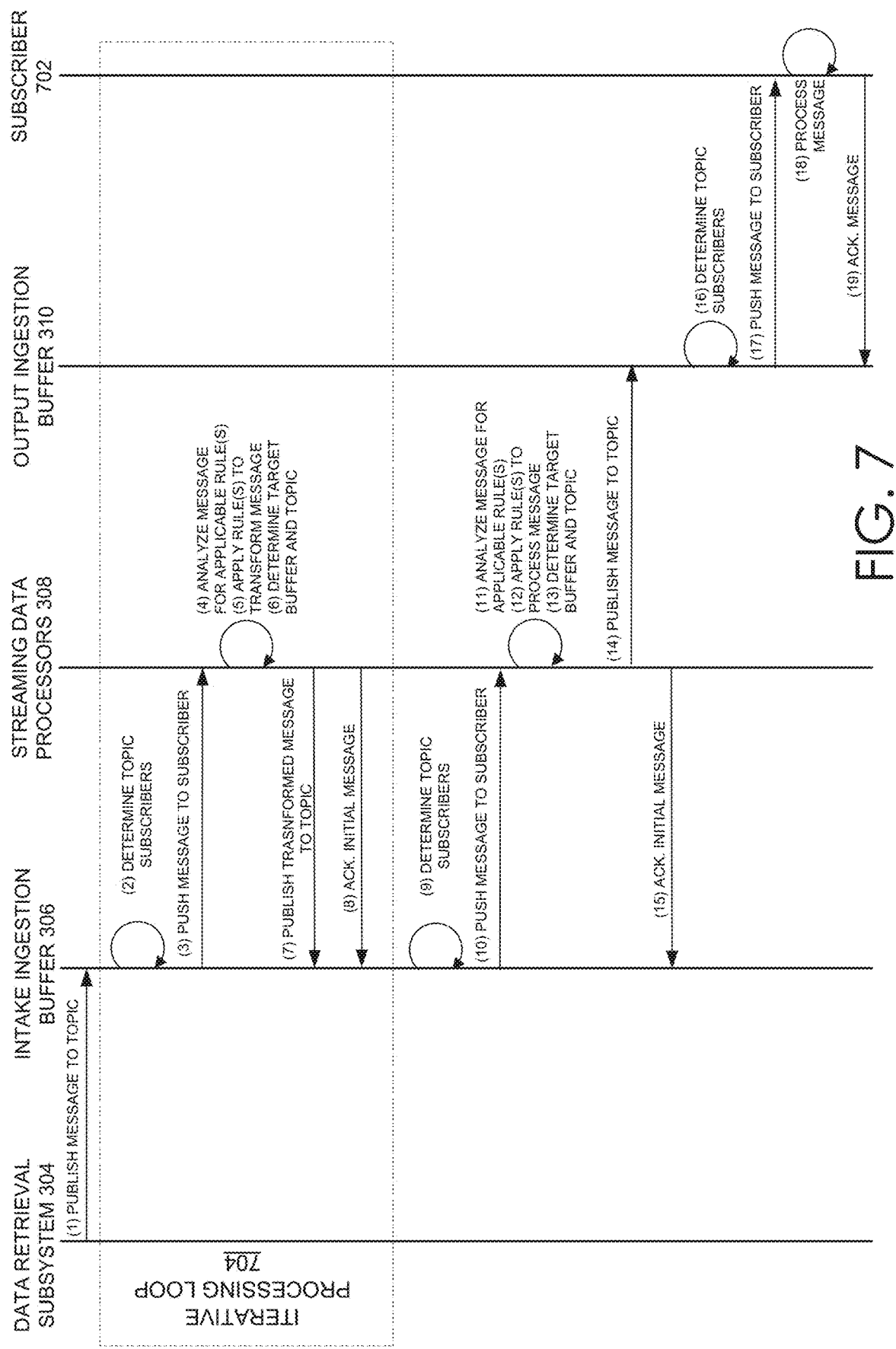
FIG. 7 is a data flow diagram depicting illustrative interactions for processing data through an intake system, in accordance with example embodiments.

As discussed above, ingestion into the data intake and query system 108 can be facilitated by an intake system 210, which functions to process data according to a streaming data model, and make the data available as messages on an output ingestion buffer 310, categorized according to a number of potential topics. Messages may be published to the output ingestion buffer 310 by a streaming data processors 308, based on preliminary processing of messages published to an intake ingestion buffer 306. The intake ingestion buffer 306 is, in turn, populated with messages by one or more publishers, each of which may represent an intake point for the data intake and query system 108. The publishers may collectively implement a data retrieval subsystem 304 for the data intake and query system 108, which subsystem 304 functions to retrieve data from a data source 202 and publish the data in the form of a message on the intake ingestion buffer 306. A flow diagram depicting an illustrative embodiment for processing data at the intake system 210 is shown at FIG. 7. While the flow diagram is illustratively described with respect to a single message, the same or similar interactions may be used to process multiple messages at the intake system 210.

4.1.1 Publication to Intake Topic(s)

As shown in FIG. 7, processing of data at the intake system 210 can illustratively begin at (1), where a data retrieval subsystem 304 or a data source 202 publishes a message to a topic at the intake ingestion buffer 306. Generally described, the data retrieval subsystem 304 may include either or both push-based and pull-based publishers. Push-based publishers can illustratively correspond to publishers which independently initiate transmission of messages to the intake ingestion buffer 306. Pull-based publishes can illustratively correspond to publishers which await an inquiry by the intake ingestion buffer 306 for messages to be published to the buffer 306. The publication of a message at (1) is intended to include publication under either push- or pull-based models.

As discussed above, the data retrieval subsystem 304 may generate the message based on data received from a forwarder 302 and/or from one or more data sources 202. In some instances, generation of a message may include converting a format of the data into a format suitable for publishing on the intake ingestion buffer 306. Generation of a message may further include determining a topic for the message. In one embodiment, the data retrieval subsystem 304 selects a topic based on a data source 202 from which the data is received, or based on the specific publisher (e.g., intake point) on which the message is generated. For example, each data source 202 or specific publisher may be associated with a particular topic on the intake ingestion buffer 306 to which corresponding messages are published. In some instances, the same source data may be used to generate multiple messages to the intake ingestion buffer 306 (e.g., associated with different topics).

4.1.2 Transmission to Streaming Data Processors

After receiving a message from a publisher, the intake ingestion buffer 306, at (2), determines subscribers to the topic. For the purposes of example, it will be associated that at least one device of the streaming data processors 308 has subscribed to the topic (e.g., by previously transmitting to the intake ingestion buffer 306 a subscription request). As noted above, the streaming data processors 308 may be implemented by a number of (logically or physically) distinct devices. As such, the streaming data processors 308, at (2), may operate to determine which devices of the streaming data processors 308 have subscribed to the topic (or topics) to which the message was published.

Thereafter, at (3), the intake ingestion buffer 306 publishes the message to the streaming data processors 308 in accordance with the pub-sub model. This publication may correspond to a "push" model of communication, whereby an ingestion buffer determines topic subscribers and initiates transmission of messages within the topic to the subscribers. While interactions of FIG. 7 are described with reference to such a push model, in some embodiments, a pull model of transmission may additionally or alternatively be used. Illustratively, rather than an ingestion buffer determining topic subscribers and initiating transmission of messages for the topic to a subscriber (e.g., the streaming data processors 308), an ingestion buffer may enable a subscriber to query for unread messages for a topic, and for the subscriber to initiate transmission of the messages from the ingestion buffer to the subscriber. Thus, an ingestion buffer (e.g., the intake ingestion buffer 306) may enable subscribers to "pull" messages from the buffer. As such, interactions of FIG. 7 (e.g., including interactions (2) and (3) as well as (9), (10), (16), and (17) described below) may be modified to include pull-based interactions (e.g., whereby a subscriber queries for unread messages and retrieves the messages from an appropriate ingestion buffer).

4.1.3 Messages Processing

On receiving a message, the streaming data processors 308, at (4), analyze the message to determine one or more rules applicable to the message. As noted above, rules maintained at the streaming data processors 308 can generally include selection criteria indicating messages to which the rule applies. This selection criteria may be formatted in the same manner or similarly to extraction rules, discussed in more detail below, and may include any number or combination of criteria based on the data included within a message or metadata of the message, such as regular expressions based on the data or metadata.

On determining that a rule is applicable to the message, the streaming data processors 308 can apply to the message one or more processing sub-rules indicated within the rule. Processing sub-rules may include modifying data or metadata of the message. Illustratively, processing sub-rules may edit or normalize data of the message (e.g., to convert a format of the data) or inject additional information into the message (e.g., retrieved based on the data of the message). For example, a processing sub-rule may specify that the data of the message be transformed according to a transformation algorithmically specified within the sub-rule. Thus, at (5), the streaming data processors 308 applies the sub-rule to transform the data of the message.

In addition or alternatively, processing sub-rules can specify a destination of the message after the message is processed at the streaming data processors 308. The destination may include, for example, a specific ingestion buffer (e.g., intake ingestion buffer 306, output ingestion buffer 310, etc.) to which the message should be published, as well as the topic on the ingestion buffer to which the message should be published. For example, a particular rule may state that messages including metrics within a first format (e.g., imperial units) should have their data transformed into a second format (e.g., metric units) and be republished to the intake ingestion buffer 306. At such, at (6), the streaming data processors 308 can determine a target ingestion buffer and topic for the transformed message based on the rule determined to apply to the message. Thereafter, the streaming data processors 308 publishes the message to the destination buffer and topic.

For the purposes of illustration, the interactions of FIG. 7 assume that, during an initial processing of a message, the streaming data processors 308 determines (e.g., according to a rule of the data processor) that the message should be republished to the intake ingestion buffer 306, as shown at (7). The streaming data processors 308 further acknowledges the initial message to the intake ingestion buffer 306, at (8), thus indicating to the intake ingestion buffer 306 that the streaming data processors 308 has processed the initial message or published it to an intake ingestion buffer. The intake ingestion buffer 306 may be configured to maintain a message until all subscribers have acknowledged receipt of the message. Thus, transmission of the acknowledgement at (8) may enable the intake ingestion buffer 306 to delete the initial message.

It is assumed for the purposes of these illustrative interactions that at least one device implementing the streaming data processors 308 has subscribed to the topic to which the transformed message is published. Thus, the streaming data processors 308 is expected to again receive the message (e.g., as previously transformed the streaming data processors 308), determine whether any rules apply to the message, and process the message in accordance with one or more applicable rules. In this manner, interactions (2) through (8) may occur repeatedly, as designated in FIG. 7 by the iterative processing loop 402. By use of iterative processing, the streaming data processors 308 may be configured to progressively transform or enrich messages obtained at data sources 202. Moreover, because each rule may specify only a portion of the total transformation or enrichment of a message, rules may be created without knowledge of the entire transformation. For example, a first rule may be provided by a first system to transform a message according to the knowledge of that system (e.g., transforming an error code into an error descriptor), while a second rule may process the message according to the transformation (e.g., by detecting that the error descriptor satisfies alert criteria). Thus, the streaming data processors 308 enable highly granulized processing of data without requiring an individual entity (e.g., user or system) to have knowledge of all permutations or transformations of the data.

After completion of the iterative processing loop 402, the interactions of FIG. 7 proceed to interaction (9), where the intake ingestion buffer 306 again determines subscribers of the message. The intake ingestion buffer 306, at (10), the transmits the message to the streaming data processors 308, and the streaming data processors 308 again analyze the message for applicable rules, process the message according to the rules, determine a target ingestion buffer and topic for the processed message, and acknowledge the message to the intake ingestion buffer 306, at interactions (11), (12), (13), and (15). These interactions are similar to interactions (4), (5), (6), and (8) discussed above, and therefore will not be re-described. However, in contrast to interaction (13), the streaming data processors 308 may determine that a target ingestion buffer for the message is the output ingestion buffer 310. Thus, the streaming data processors 308, at (14), publishes the message to the output ingestion buffer 310, making the data of the message available to a downstream system.

FIG. 7 illustrates one processing path for data at the streaming data processors 308. However, other processing paths may occur according to embodiments of the present disclosure. For example, in some instances, a rule applicable to an initially published message on the intake ingestion buffer 306 may cause the streaming data processors 308 to publish the message out ingestion buffer 310 on first processing the data of the message, without entering the iterative processing loop 402. Thus, interactions (2) through (8) may be omitted.

In other instances, a single message published to the intake ingestion buffer 306 may spawn multiple processing paths at the streaming data processors 308. Illustratively, the streaming data processors 308 may be configured to maintain a set of rules, and to independently apply to a message all rules applicable to the message. Each application of a rule may spawn an independent processing path, and potentially a new message for publication to a relevant ingestion buffer. In other instances, the streaming data processors 308 may maintain a ranking of rules to be applied to messages, and may be configured to process only a highest ranked rule which applies to the message. Thus, a single message on the intake ingestion buffer 306 may result in a single message or multiple messages published by the streaming data processors 308, according to the configuration of the streaming data processors 308 in applying rules.

As noted above, the rules applied by the streaming data processors 308 may vary during operation of those processors 308. For example, the rules may be updated as user queries are received (e.g., to identify messages whose data is relevant to those queries). In some instances, rules of the streaming data processors 308 may be altered during the processing of a message, and thus the interactions of FIG. 7 may be altered dynamically during operation of the streaming data processors 308.

While the rules above are described as making various illustrative alterations to messages, various other alterations are possible within the present disclosure. For example, rules in some instances be used to remove data from messages, or to alter the structure of the messages to conform to the format requirements of a downstream system or component. Removal of information may be beneficial, for example, where the messages include private, personal, or confidential information which is unneeded or should not be made available by a downstream system. In some instances, removal of information may include replacement of the information with a less confidential value. For example, a mailing address may be considered confidential information, whereas a postal code may not be. Thus, a rule may be implemented at the streaming data processors 308 to replace mailing addresses with a corresponding postal code, to ensure confidentiality. Various other alterations will be apparent in view of the present disclosure.

4.1.4 Transmission to Subscribers

As discussed above, the rules applied by the streaming data processors 308 may eventually cause a message containing data from a data source 202 to be published to a topic on an output ingestion buffer 310, which topic may be specified, for example, by the rule applied by the streaming data processors 308. The output ingestion buffer 310 may thereafter make the message available to downstream systems or components. These downstream systems or components are generally referred to herein as "subscribers." For example, the indexing system 212 may subscribe to an indexing topic 342, the query system 214 may subscribe to a search results topic 348, a client device 102 may subscribe to a custom topic 352A, etc. In accordance with the pub-sub model, the output ingestion buffer 310 may transmit each message published to a topic to each subscriber of that topic, and resiliently store the messages until acknowledged by each subscriber (or potentially until an error is logged with respect to a subscriber). As noted above, other models of communication are possible and contemplated within the present disclosure. For example, rather than subscribing to a topic on the output ingestion buffer 310 and allowing the output ingestion buffer 310 to initiate transmission of messages to the subscriber 702, the output ingestion buffer 310 may be configured to allow a subscriber 702 to query the buffer 310 for messages (e.g., unread messages, new messages since last transmission, etc.), and to initiate transmission of those messages form the buffer 310 to the subscriber 702. In some instances, such querying may remove the need for the subscriber 702 to separately "subscribe" to the topic.

Accordingly, at (16), after receiving a message to a topic, the output ingestion buffer 310 determines the subscribers to the topic (e.g., based on prior subscription requests transmitted to the output ingestion buffer 310). At (17), the output ingestion buffer 310 transmits the message to a subscriber 702. Thereafter, the subscriber may process the message at (18). Illustrative examples of such processing are described below, and may include (for example) preparation of search results for a client device 204, indexing of the data at the indexing system 212, and the like. After processing, the subscriber can acknowledge the message to the output ingestion buffer 310, thus confirming that the message has been processed at the subscriber.

4.1.5 Data Resiliency and Security

In accordance with embodiments of the present disclosure, the interactions of FIG. 7 may be ordered such that resiliency is maintained at the intake system 210. Specifically, as disclosed above, data streaming systems (which may be used to implement ingestion buffers) may implement a variety of techniques to ensure the resiliency of messages stored at such systems, absent systematic or catastrophic failures. Thus, the interactions of FIG. 7 may be ordered such that data from a data source 202 is expected or guaranteed to be included in at least one message on an ingestion system until confirmation is received that the data is no longer required.

For example, as shown in FIG. 7, interaction (8) —wherein the streaming data processors 308 acknowledges receipt of an initial message at the intake ingestion buffer 306—can illustratively occur after interaction (7) —wherein the streaming data processors 308 republishes the data to the intake ingestion buffer 306. Similarly, interaction (15) —wherein the streaming data processors 308 acknowledges receipt of an initial message at the intake ingestion buffer 306—can illustratively occur after interaction (14) —wherein the streaming data processors 308 republishes the data to the intake ingestion buffer 306. This ordering of interactions can ensure, for example, that the data being processed by the streaming data processors 308 is, during that processing, always stored at the ingestion buffer 306 in at least one message. Because an ingestion buffer 306 can be configured to maintain and potentially resend messages until acknowledgement is received from each subscriber, this ordering of interactions can ensure that, should a device of the streaming data processors 308 fail during processing, another device implementing the streaming data processors 308 can later obtain the data and continue the processing.

Similarly, as shown in FIG. 7, each subscriber 702 may be configured to acknowledge a message to the output ingestion buffer 310 after processing for the message is completed. In this manner, should a subscriber 702 fail after receiving a message but prior to completing processing of the message, the processing of the subscriber 702 can be restarted to successfully process the message. Thus, the interactions of FIG. 7 can maintain resiliency of data on the intake system 108 commensurate with the resiliency provided by an individual ingestion buffer 306.

While message acknowledgement is described herein as an illustrative mechanism to ensure data resiliency at an intake system 210, other mechanisms for ensuring data resiliency may additionally or alternatively be used.

As will be appreciated in view of the present disclosure, the configuration and operation of the intake system 210 can further provide high amounts of security to the messages of that system. Illustratively, the intake ingestion buffer 306 or output ingestion buffer 310 may maintain an authorization record indicating specific devices or systems with authorization to publish or subscribe to a specific topic on the ingestion buffer. As such, an ingestion buffer may ensure that only authorized parties are able to access sensitive data. In some instances, this security may enable multiple entities to utilize the intake system 210 to manage confidential information, with little or no risk of that information being shared between the entities. The managing of data or processing for multiple entities is in some instances referred to as "multi-tenancy."

Illustratively, a first entity may publish messages to a first topic on the intake ingestion buffer 306, and the intake ingestion buffer 306 may verify that any intake point or data source 202 publishing to that first topic be authorized by the first entity to do so. The streaming data processors 308 may maintain rules specific to the first entity, which the first entity may illustrative provide through authenticated session on an interface (e.g., GUI, API, command line interface (CLI), etc.). The rules of the first entity may specify one or more entity-specific topics on the output ingestion buffer 310 to which messages containing data of the first entity should be published by the streaming data processors 308. The output ingestion buffer 310 may maintain authorization records for such entity-specific topics, thus restricting messages of those topics to parties authorized by the first entity. In this manner, data security for the first entity can be ensured across the intake system 210. Similar operations may be performed for other entities, thus allowing multiple entities to separately and confidentially publish data to and retrieve data from the intake system.

4.2. Indexing

Figure 8:
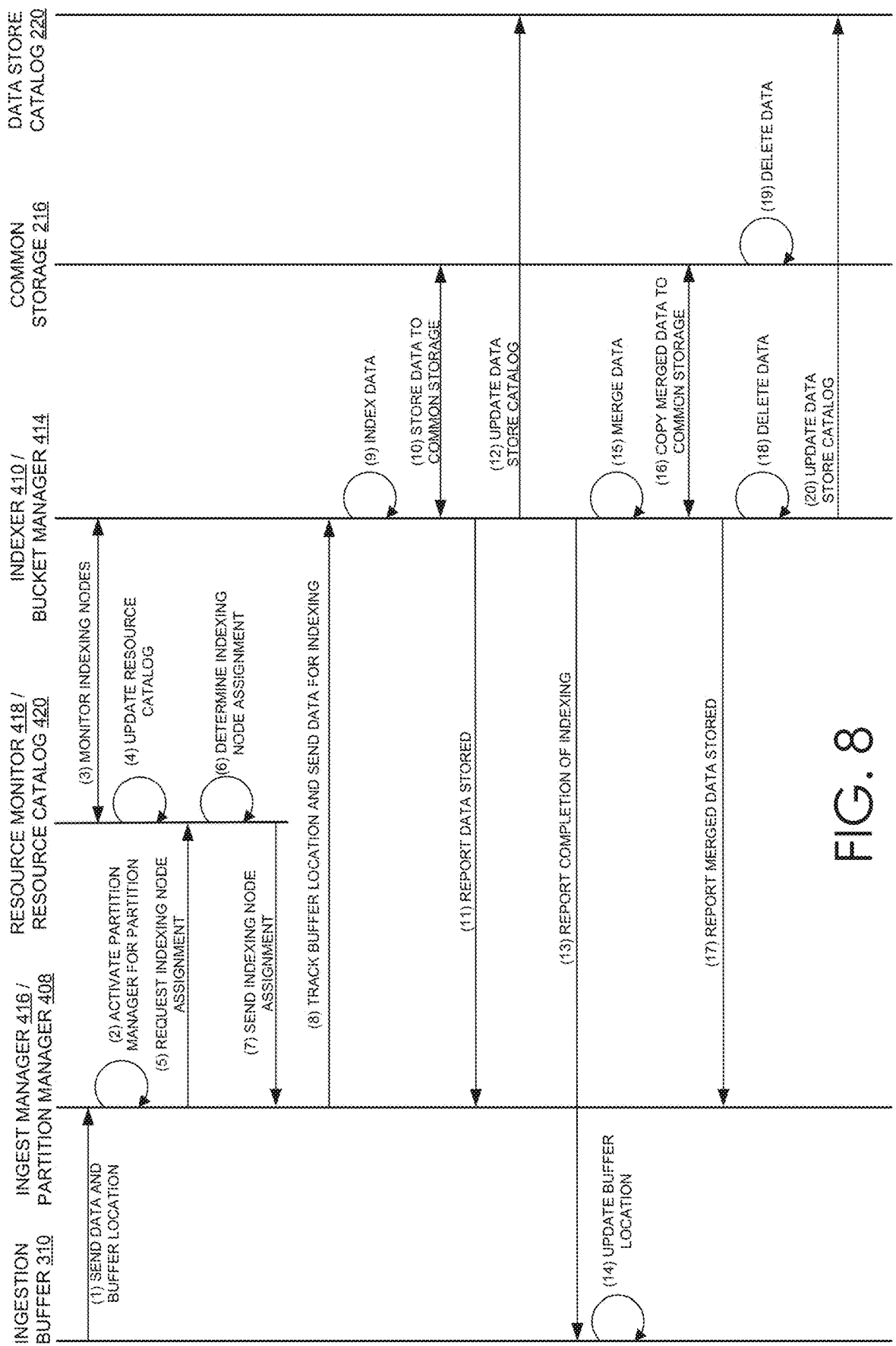
FIG. 8 is a data flow diagram illustrating an embodiment of the data flow and communications between a variety of the components of the data intake and query system during indexing.

FIG. 8 is a data flow diagram illustrating an embodiment of the data flow and communications between a variety of the components of the data intake and query system 108 during indexing. Specifically, FIG. 8 is a data flow diagram illustrating an embodiment of the data flow and communications between an ingestion buffer 310, an ingest manager 406, a partition manager 408, a resource monitor 418, a resource catalog 420, an indexing node 404 or an indexer 410 or bucket manager 414, common storage 216, and/or a data store catalog 220. However, it will be understood, that in some of embodiments, one or more of the functions described herein with respect to FIG. 8 can be omitted, performed in a different order and/or performed by a different component of the data intake and query system 108. Accordingly, the illustrated embodiment and description should not be construed as limiting.

At (1), the ingestion buffer 310 of the intake system 210 sends data records and buffer locations using one or more partitions to the ingest manager 406. A buffer location can refer to the location in the ingestion buffer 310 where a particular data record can be accessed. In some embodiments, a data record can include data associated with a particular tenant or a reference to a location (e.g. physical or logical directory, file name, etc.) that stores the data associated with the tenant that is to be processed by the indexing system 212. In certain embodiments, the data record can also include a data identifier for the data, such as a tenant identifier identifying the tenant to which the data (either in the data record or at the location referenced by the data record) is associated. The data in the data record or in the location referenced by the data record can include any one or any combination of: raw machine data, structured data, unstructured data, performance metrics data, correlation data, data files, directories of files, data sent over a network, event logs, registries, JSON blobs, XML data, data in a data model, report data, tabular data, messages published to streaming data sources, data exposed in an API, data in a relational database, sensor data, image data, or video data, etc.

In some embodiments, the ingestion buffer 310 can operate according to a pub-sub messaging service. As such, the ingestion buffer 310 can communicate the data records of the one or more partitions to the ingest manager 406, and also ensure that the data records of the partitions are available for additional reads until the ingestion buffer 310 receives an acknowledgement from a partition manager 408 or an indexing node 404 that the data can be removed. In some cases, the ingestion buffer 310 can use one or more read pointers or location markers to track data that has been communicated to the ingest manager 406 but that has not been acknowledged for removal. Accordingly, based on the location markers, the ingestion buffer 310 can retain a portion of its data persistently until it receives confirmation that the data can be deleted or has been stored in common storage 216. As the ingestion buffer 310 receives acknowledgments, it can update the location markers. In some cases, the ingestion buffer 310 can include at least one location marker for each partition. In this way, the ingestion buffer 310 can separately track the progress of the data reads in the different partitions.

In certain embodiments, the ingest manager 406 or partition managers 408 can receive (and/or store) the location markers in addition to or as part of the data records received from the ingestion buffer 310. Accordingly, the ingest manager 406 can track the location of the data in the ingestion buffer 310 that the ingest manager 406 has received from the ingestion buffer 310. In this way, if a partition manager 408 becomes unavailable or fails, the ingest manager 406 can assign a different partition manager 408 to manage the data from the ingestion buffer 310 and provide the partition manager 408 with a location from which the partition manager 408 can obtain the data. Similarly, if an indexing node 404 becomes unavailable or fails, the partition manager 408 or resource monitor 418 can assign a different indexing node 404 to process or manage data from the ingestion buffer 310 and provide the indexing node 404 with a location from which the indexing node 404 can obtain the data record from the ingestion buffer 310.

At (2), the ingest manager 406 activates a partition manager 408 for a partition. As described herein, the ingest manager 406 can receive data records from the ingestion buffer 310 across multiple partitions. In some embodiments, the ingest manager 406 can activate (for example, generate or assign) a particular partition manager 408 for a particular partition of the ingestion buffer 310. In this way, the particular partition manager 408 receives the data records corresponding to the particular partition of the ingestion buffer 310. In some cases, the ingest manager 406 activates a different partition manager 408 for each of the partitions of the ingestion buffer 310. In some cases, the ingest manager 406 activates a partition manager 408 to manage data records from multiple partitions. In some embodiments, the ingest manager 406 can activate a partition manager 408 based on the output of an additional partition from the intake system 210, based on a partition manager 408 becoming unresponsive or unavailable, etc. In some embodiments, the partition manager 408 can be a copy of the ingest manager 406 or a copy of a template process. In certain embodiments, the partition manager 408 can be instantiated in a separate container from the ingest manager 406.

At (3), the resource monitor 418 monitors the indexing nodes 404 of the indexing system 212. As described herein, monitoring the indexing nodes 404 can include requesting and/or receiving status information from the indexing nodes 404. In some embodiments, the resource monitor 418 passively receives status information from the indexing nodes 404 without explicitly requesting the information. For example, the indexing nodes 404 can be configured to periodically send status updates to the resource monitor. In certain embodiments, the resource monitor 418 receives status information in response to requests made by the resource monitor 418. As described herein, the status information can include any one or any combination of indexing node identifiers, metrics (e.g., CPU utilization, available memory), network architecture data, or indexing node assignments, etc.

At (4), the resource monitor 418 can use the information received from the indexing nodes 404 to update the resource catalog 420. As the status of indexing nodes 404 change over time, the resource monitor 418 can update the resource catalog 420. In this way, the resource monitor 418 can maintain the resource catalog 420 with information about the indexing nodes 404 of the indexing system 212.

It will be understood that (3) and (4) may be repeated together periodically, according to a schedule, policy, or algorithm, such that the current (or reasonably current) availability, responsiveness, and/or utilization rate of the indexing nodes 404 and/or indexers 410 is stored in resource catalog 420. For example, a time-based schedule may be used so that (3) and (4) may be performed every X number of seconds, or every X minute(s), and so forth. The performance of (3) on a periodic basis may be referred to as a "heartbeat."

At (5), a partition manager 408 assigned to distribute one or more data records from a partition of the ingestion buffer 310 to one or more indexers 410 requests an indexing node assignment from the resource monitor 418 and/or resource catalog 420. In some cases, the partition manager 408 requests an indexing node assignment based on an indexing node mapping policy. The indexing node mapping policy can use any one or any combination of data identifiers, time period, etc. to indicate how indexing nodes 404 should be assigned to process data records. In some cases, based on the indexing node mapping policy, the partition manager 408 requests an indexing node assignment for each data record or for a group of data records. For example, the partition manager 408 can request an indexing node assignment for some or all data records associated with the same tenant identifier or other data identifier. In some such cases, the partition manager 408 can include the data identifier associated with the data record(s) in its request for an indexing node assignment.

In certain cases, based on the indexing node mapping policy, the partition manager 408 requests an indexing node assignment for a particular amount of time, such as one minute, five minutes, etc. In some embodiments, based on the indexing node mapping policy, the partition manager 408 can request an indexing node assignment for data records based on a combination of data identifiers and time. For example, the partition manager can request an indexing node assignment for data records associated with the same tenant identifier for one minute, five minutes, etc.

In certain embodiments, based on the indexing node mapping policy, the partition manager 408 requests an indexing node identifier for the indexing node 404 that is to process a data record or group of data records. As described herein, the indexing node identifier can include an IP address, location address, or other identifier that can be used to identify a particular indexing node that is to process the data record or group of data records.

At (6) the resource monitor 418 identifies the indexing node assignment based on the indexing node mapping policy. As described herein, the indexing node mapping policy can use a variety of techniques to make an indexing node assignment. In some cases, the indexing node mapping policy can indicate that indexing node assignments are to be made based on any one or any combination of: a data identifier associated with the data record(s), availability of indexing nodes or other information from the resource catalog 420 such as indexing node identifiers associated with the indexing nodes 404, a hashing or consistent hashing scheme, a time period, etc.

In some embodiments, based on the indexing node policy, the resource monitor assigns one or a group of indexing nodes 404 to process data records with the same data identifier (e.g., tenant identifier). In certain embodiments, based on the indexing node mapping policy, the resource monitor 418 assigns data records with the same data identifier to the same indexing node 404 (or group of indexing nodes 404) for a particular time interval.

In some embodiments, based on the indexing node mapping policy, the resource monitor 418 identifies available indexing nodes using the information from the resource catalog 420 and assigns one of the available indexing nodes 404 to process the data record. As described herein, the resource monitor 418 can identify an available indexing node using various techniques. For example, the resource monitor 418 can consult the resource catalog 420 to identify an available indexing node.

In certain embodiments, based on the indexing node mapping policy, the resource monitor 418 maps the data identifier to one or more indexing nodes 404 and then makes the indexing node assignment based on the availability of the one or more indexing nodes 404. In some cases, the resource monitor 418 identifies available indexing nodes 404 and then maps the data identifier to one or more of the available indexing nodes 404. In some embodiments, based on the indexing node mapping policy, the resource monitor 418 maps the data identifier to one or more indexing nodes 404 using a hash or consistent hash scheme. In certain embodiments, based on the indexing node mapping policy and for a particular time interval, the resource monitor 418 identifies the indexing node assignment for data records associated with the same tenant using a consistent hash that maps the tenant identifier to indexing node identifiers on a hash ring.

In some cases, based on the indexing node mapping policy, a new indexing node can be generated and assigned to process the data record. For example, if the resource monitor 418 determines that there are insufficient indexing nodes 404 or that the indexing nodes are too busy (e.g., satisfy a utilization threshold), the resource monitor 418 can request that a new indexing node 404 be instantiated and assign the newly instantiated indexing node 404 to process the data record.

At (7), the resource monitor 418 communicates the indexing node assignment to the partition manager 408. In some cases, the indexing node assignment can include an identifier of the indexing node 404 that is to process the data record. In certain embodiments, the indexing node assignment can include other information, such as a time interval for which the assignment is to last, a backup indexing node 404 in the event the assigned indexing node 404 is not available or fails, etc. The partition manager 408 can use the information from the indexing node assignment to communicate the data records to a particular indexing node.

In some embodiments, (5), (6), and (7) can be omitted. For example, instead of requesting and receiving an indexing node assignment from the resource monitor 418, the partition manager 408 can consult an indexing node assignment listing that identifies recent indexing node assignments. The indexing node assignment listing can include a table or list of data identifiers and indexing nodes 404 that have processed, or are assigned to process, data associated with the data identifiers. The table or list can be stored as a lookup table or in a database, etc. In some embodiments, if the partition manager 408 determines that an indexing node 404 is already assigned to process data associated with the data identifier, the partition manager 408 can omit (5), (6), and (7), and send the data to the assigned indexing node 404 for processing. In certain embodiments, if the partition manager 408 determines that an indexing node 404 is not assigned to process data associated the data identifier, the partition manager 408 can proceed with steps (5), (6), and (7), and store the results of the indexing node assignment in the indexing node assignment listing.

In certain embodiments, indexing node assignments can be temporary. For example, indexing nodes 404 can be dynamically added or removed from the indexing system 212. Accordingly, to accommodate the change in indexing nodes 404, the indexing node assignments can be periodically redone. To facilitate the reassignment, the indexing node assignment listing can be cleared or deleted periodically. For example, each 15, 30, 60, or 90 seconds, the indexing node assignment listing can be cleared or removed. In certain embodiments, the indexing node assignment listing can include a timestamp indicating when a particular assignment was made. After a predetermined time period, the particular indexing node assignment can be deleted. Accordingly, different entries of the indexing node assignment listing can change at different times.

In some cases, a different indexing node assignment listing can be stored on or associated with each different partition manager 408. For example, a particular partition manager 408 can manage its own indexing node assignment listing by cataloging the indexing node assignments received from the resource monitor 418. As another example, the ingest manager 406 can manage some or all of the indexing node assignment listings of its partition managers 408. In some cases, an indexing node assignment listing can be associated with some or all of the partition managers 408. For example, the ingest manager 406 or the partition managers 408 can manage the indexing node assignment listing by cataloging the indexing node assignments received from the resource monitor 418.

At (8), the ingest manager 406 tracks the buffer location and the partition manager(s) 408 communicate the data to the indexer(s) 410. As described herein, the ingest manager 406 can track (and/or store) the buffer location for the various partitions received from the ingestion buffer 310. In addition, as described herein, the partition manager 408 can forward the data received from the ingestion buffer 310 to the indexer(s) 410 for processing. In various implementations, as previously described, the data from ingestion buffer 310 that is sent to the indexer(s) 410 may include a path to stored data, e.g., data stored in common storage 216 or another common storage, which is then retrieved by the indexer 410 or another component of the indexing node 404.

As described herein, in some embodiments, the partition manager 408 can communicate different records to different indexing nodes 404. For example, the partition manager 408 can communicate records associated with one tenant (or one data identifier) to one indexing node 404 and records associated with another tenant (or another data identifier) to another indexing node 404. Accordingly, the partition manager 408 can concurrently distribute data associated with different tenants to different indexing nodes 404 for processing. In some cases, data records associated with different tenants can be communicated to the same indexing node 404 for processing. For example, based on the indexing node mapping policy, the same indexing node 404 may be mapped to data from different tenants. As such, the partition manager 406 can communicate data from different tenants to the same indexing node 404. As a corollary, an indexing node 404 can receive and concurrently process data from different tenants.

At (9), the indexer 410 processes the data records. As described herein, in some cases, the data records include the data that is to be further processed by the indexing node 404. In some such embodiments, the indexing node 404 can process the data in the data records. In certain embodiments, the data records include a reference to the data that is to be further processed by the indexing node 404. In some such embodiments, the indexing node 404 can access and process the data using the reference in the data record. As described herein, the indexer 410 can perform a variety of functions, enrichments, or transformations on the data as it is indexed. For example, the indexer 410 can parse the data, identify events from the data, identify and associate timestamps with the events, associate metadata or one or more field values with the events, group events (e.g., based on time, partition, and/or tenant ID, etc.), etc. Furthermore, the indexer 410 can generate buckets based on a bucket creation policy and store the events in the hot buckets, which may be stored in a data store 412 of the indexing node 404 associated with that indexer 410 (see FIGS. 4A and/or 4B). As described herein, when generating buckets, the indexer 410 can generate separate buckets for data associated with different tenants and/or indexes.

With reference to (1), (8), and (9), it will be understood that data associated with different data identifiers can be concurrently received, distributed, and/or processed by the same partition of the ingestion buffer 310, the same partition manager 408 and/or the same indexer 410. Similarly, data associated with the same data identifier can be concurrently received, distributed, and/or processed by different partitions of the ingestion buffer 310, different partition managers 408 and/or different indexers 410.

With reference to (1), it will be understood that data records associated with different identifiers can be found in the same partition of the ingestion buffer 310 and that data records associated with the same data identifier can be found across different partitions of the ingestion buffer 310. For example, Partition 1 of ingestion buffer 310 can include data from Tenant A and Tenant B, and Partition 2 can include data from Tenant A and Tenant C.

With reference to (1) and (8), one partition manager 408 can receive and distribute data associated with different data identifiers, and different partition managers 408 can receive and distribute data associated with the same data identifier. With continued reference to the example, Partition Manager 1 associated with Partition 1 can process and distribute data from Tenant A and Tenant B (the data from Partition 1) and Partition Manager 2 association with Partition 2 can process and distribute data from Tenant A and Tenant C (the data from Partition 2).

With reference to (9), indexing nodes 404 can receive and concurrently process data associated with the same data identifier from different partition managers 408 (or from the same partition manager 408) and data associated with different data identifiers from the same partition manager 408 (or from different partition managers 408). With continued reference to the example above, based on an indexing node mapping policy, Indexer 1 can be assigned to receive and process Tenant A data from Partition Managers 1 and 2, and to receive and process Tenant C data from Partition Manager 2.

At (10), the indexer 410 copies and/or stores the data to common storage 216. For example, the indexer 410 can determine (and/or the partition manager 408 can instruct the indexer 410) to copy the data to common storage 216 based on a bucket roll-over policy. The bucket roll-over policy can use any one or any combination of bucket size, data size, time period, etc. to determine that the data is to be copied to common storage 216.

In some cases, based on the bucket roll-over policy, the indexer 410 periodically determines that the data is to be copied to common storage 216. For example, the bucket roll-over policy may indicate a time-based schedule so that the indexer 410 determines to copy and/or store the data every X number of seconds, or every X minute(s), and so forth. As another example, the bucket roll-over policy may indicate that one or more buckets are to be rolled over based on size. Accordingly, in some embodiments, the indexer 410 can determine to copy the data to common storage 216 based on a determination that the amount of data stored on the indexer 410 satisfies a threshold amount. The threshold amount can correspond to the amount of data being processed by the indexer 410 for any partition or any tenant identifier. In some cases, the bucket roll-over policy may indicate that one or more buckets are to be rolled over based on a combination of a time-based schedule and size. For example, the bucket roll-over policy may indicate a time-based schedule in combination with a data threshold. For example, the indexer 410 can determine to copy the data to common storage 216 based on a determination that the amount of data stored on the indexer 410 satisfies a threshold amount or a determination that the data has not been copied in X number of seconds, X number of minutes, etc. Accordingly, in some embodiments, the indexer 410 can determine that the data is to be copied to common storage 216 without communication with the partition manager 408 or the ingest manager 416.

In some cases, based on the bucket roll-over policy, the partition manager 408 can instruct the indexer 410 to copy the data to common storage 216. For example, the bucket roll-over policy may indicate that one or more buckets are to be rolled over based on time and/or size. In some such cases, the partition manager 408 can determine to instruct the indexer 410 to copy the data to common storage 216 based on a determination that the amount of data stored on the indexer 410 satisfies a threshold amount. The threshold amount can correspond to the amount of data associated with the partition that is managed by the partition manager 408 or the amount of data being processed by the indexer 410 for any partition. For example, the indexer 410 can report and/or the partition manager 408 can monitor the size of the data being indexed to the partition manager 408 and/or the size of data being processed by the indexer 410 for any partition or any tenant identifier.

In some such cases, the indexer 410 can report the size of the data in the aggregate and/or the size of the data for each data identifier. For example, the indexer 410 can include the size of the data being processed for one tenant and the size of the data being processed for a different tenant.

In some cases, the indexer 410 can routinely provide a status update to the partition manager 408 regarding the data. The status update can include, but is not limited to the size of the data, the number of buckets being created, the amount of time since the buckets have been created, etc. In some embodiments, the indexer 410 can provide the status update based on one or more thresholds being satisfied (e.g., one or more threshold sizes being satisfied by the amount of data being processed, one or more timing thresholds being satisfied based on the amount of time the buckets have been created, one or more bucket number thresholds based on the number of buckets created, the number of hot or warm buckets, number of buckets that have not been stored in common storage 216, etc.).

In certain cases, the indexer 410 can provide an update to the partition manager 408 regarding the size of the data that is being processed by the indexer 410 in response to one or more threshold sizes being satisfied. For example, each time a certain amount of data is added to the indexer 410 (e.g., 5 MB, 10 MB, etc.), the indexer 410 can report the updated size to the partition manager 408. In some cases, the indexer 410 can report the size of the data stored thereon to the partition manager 408 once a threshold size is satisfied.

In certain embodiments, the indexer 410 reports the size of the data being indexed to the partition manager 408 based on a query by the partition manager 408. In certain embodiments, the indexer 410 and partition manager 408 maintain an open communication link such that the partition manager 408 is persistently aware of the amount of data on the indexer 410.

In some cases, a partition manager 408 monitors the data processed by the indexer 410. For example, the partition manager 408 can track the size of the data on the indexer 410 that is associated with the partition being managed by the partition manager 408. In certain cases, one or more partition managers 408 can track the amount or size of the data on the indexer 410 that is associated with any partition being managed by the ingest manager 406 or that is associated with the indexing node 404.

Any one or any combination of the aforementioned reporting or monitoring can be done for different data or data associated with different data identifiers. For example, the indexers 410 can use one reporting scheme for data associated with one tenant and another reporting scheme for data associated with a different tenant. Similarly, the indexers 410 can separately report information for different data. Furthermore, the partition manager 408 can monitor/track the data processed by the indexer 410 for different data identifiers.

In some cases, the partition manager 408 can instruct the indexer 410 to copy the data that corresponds to the partition being managed by the partition manager 408 to common storage 216 based on the size of the data that corresponds to the partition satisfying the threshold amount. In certain embodiments, the partition manager 408 can instruct the indexer 410 to copy the data associated with any partition being processed by the indexer 410 to common storage 216 based on the amount of the data from the partitions that are being processed by the indexer 410 satisfying the threshold amount and/or an amount of time that has passed since a bucket was stored to common storage 216, etc.

As described herein, the partition manager and/or indexer 410 can use different bucket roll-over policies for buckets associated with different data identifiers. For example, the indexer 410 can use one bucket roll-over policy (or thresholds) for buckets associated with one tenant and a bucket roll-over policy (or thresholds) for buckets associated with a different tenant. As such, an indexer 410 may copy data associated with one data identifier more or less frequently than data associated with another identifier, or use different criteria to determine when to copy data associated with the different data identifiers.

As part of storing the data to common storage 216, the indexer 410 can verify or obtain acknowledgements that the data is stored successfully. In some embodiments, the indexer 410 can determine information regarding the data stored in the common storage 216. For example, the information can include location information regarding the data that was stored to the common storage 216, bucket identifiers of the buckets that were copied to common storage 216, as well as additional information, e.g., in implementations in which the ingestion buffer 310 uses sequences of records as the form for data storage, the list of record sequence numbers that were used as part of those buckets that were copied to common storage 216.

When storing the data to common storage 216, the indexer 410 can physically and/or logically separate data or buckets associated with different data identifiers. For example, the indexer 410 can store buckets associated with Tenant A in a separate directory, file structure, or data store from buckets associated with Tenant B. In this way, the indexer 410 can maintain the mutual exclusivity and/or independence between data from different tenants. Similarly, the indexer 410 can physically and/or logically separate data or buckets associated with different indexes of a tenant.

At (11), the indexer 410 reports or acknowledges to the partition manager 408 that the data is stored in the common storage 216. In various implementations, this can be in response to periodic requests from the partition manager 408 to the indexer 410 regarding which buckets and/or data have been stored to common storage 216. The indexer 410 can provide the partition manager 408 with information regarding the data stored in common storage 216 similar to the data that is provided to the indexer 410 by the common storage 216. In some cases, (11) can be replaced with the common storage 216 acknowledging or reporting the storage of the data to the partition manager 408 and/or the indexer 410.

At (12), the indexer 410 updates the data store catalog 220. As described herein, the indexer 410 can update the data store catalog 220 with information regarding the data or buckets stored in common storage 216. For example, the indexer 410 can update the data store catalog 220 to include location information, a bucket identifier, a time range, and tenant and partition information regarding the buckets copied to common storage 216, etc. In this way, the data store catalog 220 can include up-to-date information regarding the buckets stored in common storage 216.

At (13), the partition manager 408 reports the completion of the storage to the ingestion buffer 310 and/or another data store (for example, DynamoDB) that stores that stores the location marker information, and at (14), the ingestion buffer 310 updates the buffer location or marker and/or the another store updates it marker. Accordingly, in some embodiments, the ingestion buffer 310 and/or the another database system can maintain the location marker for a particular data record until the ingestion buffer 310 (or other data store) receives an acknowledgement that the data that the ingestion buffer 310 sent to the indexing node 404 has been indexed by the indexing node 404 and stored to common storage 216. In addition, the updated buffer location or marker can be communicated to and stored by the ingest manager 406. In this way, a data intake and query system 108 can use the ingestion buffer 310 to provide a stateless environment for the indexing system 212. For example, as described herein, if an ingest manager 406, partition manager 408, indexing node 404 or one of its components (e.g., indexer 410, data store 412, etc.) becomes unavailable or unresponsive before data from the ingestion buffer 310 is copied to common storage 216, the indexing system 212 can generate or assign a new component, to process the data that was assigned to the now unavailable component while reducing, minimizing, or eliminating data loss.

At (15), a bucket manager 414, which may form part of the indexer 410, the indexing node 404, or indexing system 212, merges multiple buckets into one or more merged buckets. As described herein, to reduce delay between processing data and making that data available for searching, the indexer 410 can convert smaller hot buckets to warm buckets and copy the warm buckets to common storage 216. However, as smaller buckets in common storage 216 can result in increased overhead and storage costs, the bucket manager 414 can monitor warm buckets in the indexer 410 and merge the warm buckets into one or more merged buckets.

In some cases, the bucket manager 414 can merge the buckets according to a bucket merge policy. As described herein, the bucket merge policy can indicate which buckets are candidates for a merge (e.g., based on time ranges, size, tenant, index, or other identifiers, etc.), the number of buckets to merge, size or time range parameters for the merged buckets, a frequency for creating the merged buckets, etc. It will be understood that the bucket manager 414 can use different bucket merge policies for data associated with different data identifiers. For example, the bucket manager 414 can merge buckets associated with one tenant using a first bucket merge policy and buckets associated with a second tenant using a second bucket merge policy.

At (16), the bucket manager 414 stores and/or copies the merged data or buckets to common storage 216, and obtains information about the merged buckets stored in common storage 216. Similar to (7), the obtained information can include information regarding the storage of the merged buckets, such as, but not limited to, the location of the buckets, one or more bucket identifiers, tenant or partition identifiers, etc. At (17), the bucket manager 414 reports the storage of the merged data to the partition manager 408, similar to the reporting of the data storage at (11).

At (18), the indexer 410 deletes data from the data store (e.g., data store 412). As described herein, once the merged buckets have been stored in common storage 216, the indexer 410 can delete corresponding buckets that it has stored locally according to a bucket management policy. For example, the indexer 410 can delete the merged buckets from the data store 412, as well as the pre-merged buckets (buckets used to generate the merged buckets). By removing the data from the data store 412, the indexer 410 can free up additional space for additional hot buckets, warm buckets, and/or merged buckets.

At (19), the common storage 216 deletes data according to a bucket management policy. As described herein, once the merged buckets have been stored in common storage 216, the common storage 216 can delete the pre-merged buckets stored therein. In some cases, as described herein, the common storage 216 can delete the pre-merged buckets immediately, after a predetermined amount of time, after one or more queries relying on the pre-merged buckets have completed, or based on other criteria in the bucket management policy, etc. In certain embodiments, a controller at the common storage 216 handles the deletion of the data in common storage 216 according to the bucket management policy. In certain embodiments, one or more components of the indexing node 404 delete the data from common storage 216 according to the bucket management policy. However, for simplicity, reference is made to common storage 216 performing the deletion. As described herein, it will be understood that different bucket management policies can be used for data associated with different data identifiers. For example, the indexer 410 or common storage 216 can use one bucket management policy for buckets associated with one tenant and another bucket management policy for buckets associated with a different tenant.

At (20), the indexer 410 updates the data store catalog 220 with the information about the merged buckets. Similar to (12), the indexer 410 can update the data store catalog 220 with the merged bucket information. The information can include, but is not limited to, the time range of the merged buckets, location of the merged buckets in common storage 216, a bucket identifier for the merged buckets, tenant and partition information of the merged buckets, etc. In addition, as part of updating the data store catalog 220, the indexer 410 can remove reference to the pre-merged buckets. Accordingly, the data store catalog 220 can be revised to include information about the merged buckets and omit information about the pre-merged buckets. In this way, as the search managers 514 request information about buckets in common storage 216 from the data store catalog 220, the data store catalog 220 can provide the search managers 514 with the merged bucket information.

As mentioned previously, in some of embodiments, one or more of the functions described herein with respect to FIG. 8 can be omitted, performed in a variety of orders and/or performed by a different component of the data intake and query system 108. For example, the indexer 410 can (12) update the data store catalog 220 before, after, or concurrently with the deletion of the data in the (18) indexer 410 or (19) common storage 216. Similarly, in certain embodiments, the indexer 410 can (15) merge buckets before, after, or concurrently with (10)-(14), etc. As another example, the partition manager 408 can perform (12) and/or (14). In some cases, the indexer 410 can update the data store catalog 220 before, after, or concurrently with (17)-(19), etc.

In some cases, (1)-(4) can be performed in any order, or concurrently with each other. For example, the ingest manager 416 can generate the partition managers 408 before or after receiving data from the ingestion buffer 310, while the resource monitor 418 concurrently monitors the indexers 410 and updates the resource catalog 420.

In certain embodiments, such as when an indexing system 212 is instantiated for a single tenant, (3)-(7) may be omitted. For example, in some such embodiments, the indexing system 212 may not include a resource monitor 418 and/or resource catalog 420 and/or the indexing system 212 may have dedicated indexing nodes 404 for the tenant. In some such cases, the partition manager 408 can be configured to send the data to a particular indexer 410.

As another example, in some cases, the partition manager 408 may not request an indexer assignment from the resource monitor 418. In some such cases, the ingest manager 406 or partition manager 408 can determine the indexer assignment. For example, the ingest manager 406 or partition manager 408 can use an indexing node mapping policy to identify an indexer 410 to process a particular data record. As another example, the partition manager 408 may use an indexing node assignment listing to determine that a data record associated with a data identifier has already been assigned to a particular indexer 410. In some such cases, the partition manager 408 can communicate the data record to the particular indexer 410 without requesting an indexer assignment from the resource monitor 418.

In some embodiments, the one or more components of the indexing system 212 and/or the ingestion buffer 310 can concurrently process data from multiple tenants. For example, each partition of the ingestion buffer 310 can include data records associated with different tenants. In some cases, a data record can include data associated with one tenant and different data records can include data from different tenants. In certain cases, a data record can include location and/or identification information of data or a file with data from a particular tenant and/or a tenant identifier corresponding to the particular tenant. For each data record, the partition manager 408 can request an indexing node assignment to process the data record, the resource monitor 418 can provide an indexing node assignment for the data record, and the assigned indexing node 404 can process the data record (including any data referenced by the data record). The ingest manager 406/partition manager 408, the resource monitor 418, and/or the indexer 410 can concurrently process multiple data records in this manner. As different data records can be associated with different tenants, the ingest manager 406 ingest manager 406/partition manager 408, the resource monitor 418, and/or the indexer 410 can concurrently process data associated with different tenants.

In certain embodiments, the components of the indexing system 212 may only process data from one tenant. For example, the ingestion buffer 310 can be configured to only process data from one tenant. Correspondingly, the data records received and processed by the ingest manager 406/partition manager 408 and/or indexer 410 can correspond to the same tenant. In some embodiments in which the components of the indexing system 212 only process data from one tenant, the resource monitor 418 and/or resource catalog 420 (and corresponding (3), (4), (5), (6)) can be omitted. In some such embodiments, the ingest manager 406/partition manager 408 may form part of an indexing node 404 as illustrated at FIG. 4A and/or the data records from the partition manager 408 can be sent to one of a group of indexers 410 designated for the particular tenant using a load balancing scheme. Further, in some embodiments in which the components of the indexing system 212 only process data from one tenant, separate ingestion buffer(s) 310, ingest manager(s) 406/partition manager(s) 408, resource monitor(s) 418, resource catalog 420, indexer(s) 410, and bucket manager(s) 414 can be instantiated for each tenant.

4.3. Querying

Figure 9:
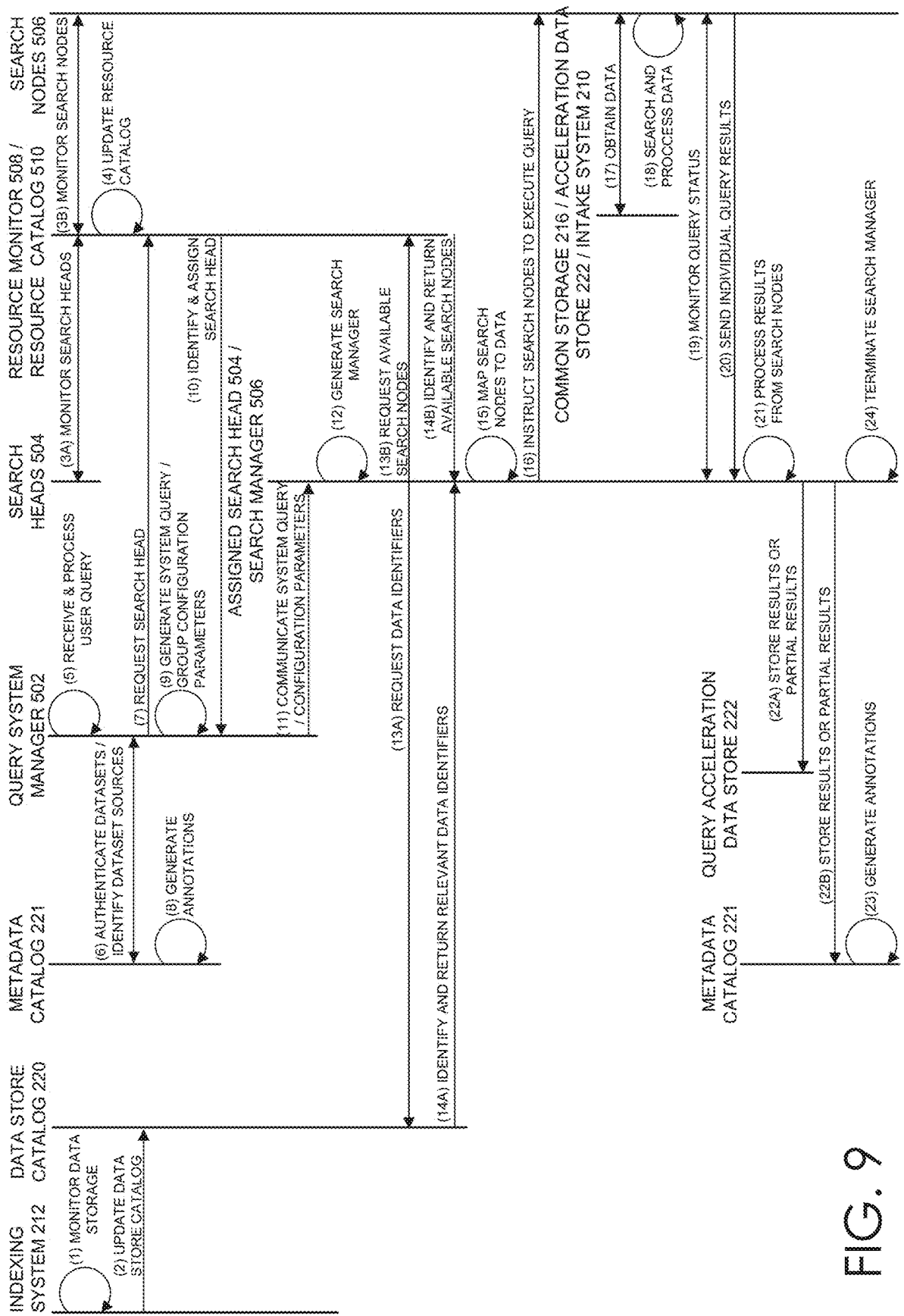
FIG. 9 is a data flow diagram illustrating an embodiment of the data flow and communications between a variety of the components of the data intake and query system during execution of a query.

FIG. 9 is a data flow diagram illustrating an embodiment of the data flow and communications between a variety of the components of the data intake and query system 108 in relation to a query. Specifically, FIG. 9 is a data flow diagram illustrating an embodiment of the data flow and communications between the indexing system 212, data store catalog 220, metadata catalog 221, query system manager 502, search head(s) 504, resource monitor 508, resource catalog 510, search nodes 506, common storage 216, and the query acceleration data store 222. However, it will be understood, that in some of embodiments, one or more of the functions described herein with respect to FIG. 9 can be omitted, performed in a different order and/or performed by a different component of the data intake and query system 108. For example, in some embodiments, the steps identified as being performed by the query system manager 502 and search head 504 can be performed by the same component (e.g., the query system manager 502, the search head 504, or another component of the data intake and query system 108). In some such embodiments, (6) can be omitted. Accordingly, the illustrated embodiment and description should not be construed as limiting.

Further, it will be understood that the various functions described herein with respect to FIG. 9 can be performed by one or more distinct components of the data intake and query system 108. For example, for simplicity, reference is made to a search head 504 performing one or more functions. However, it will be understood that these functions can be performed by one or more components of the search head 504, such as, but not limited to, the search master 512 and/or the search manager 514. Similarly, reference is made to the indexing system 212 performing one or more functions. However, it will be understood that the functions identified as being performed by the indexing system 212 can be performed by one or more components of the indexing system 212.

At (1) and (2), the indexing system 212 monitors the storage of processed data and updates the data store catalog 220 based on the monitoring. As described herein, one or more components of the indexing system 212, such as the partition manager 408 and/or the indexer 410 can monitor the storage of data or buckets to common storage 216. As the data is stored in common storage 216, the indexing system 212 can obtain information about the data stored in the common storage 216, such as, but not limited to, location information, bucket identifiers, tenant identifier (e.g., for buckets that are single tenant) etc. The indexing system 212 can use the received information about the data stored in common storage 216 to update the data store catalog 220.

Furthermore, as described herein, in some embodiments, the indexing system 212 can merge buckets into one or more merged buckets, store the merged buckets in common storage 216, and update the data store catalog to 220 with the information about the merged buckets stored in common storage 216.

At (3A) the resource monitor 508 monitors some or all of the search heads 504 and (3B) search nodes 506 (in the query system 214), including the specific search head 504 and search nodes 506 used to execute the query, and (4) updates the resource catalog 510. As described herein, the resource monitor 508 can monitor the availability, responsiveness, and/or utilization rate of the search heads 504 and search nodes 506. Based on the status of the search heads 504 and the search nodes 506, the resource monitor 508 can update the resource catalog 510. In this way, the resource catalog 510 can retain information regarding a current status of each of the search heads 504 and the search nodes 506 in the query system 214. It will be understood that (3A), (3B), and (4) may be repeated together periodically, according to a schedule, policy, or algorithm, such that the current (or reasonably current) availability, responsiveness, and/or utilization rate of the search heads 504 and the search nodes 506 is stored in resource catalog 510. For example, a time-based schedule may be used so that (3A), (3B), and (4) may be performed every X number of seconds, or every X minute(s), and so forth. The performance of (3A), (3B), and (4) on a periodic basis may be referred to as a "heartbeat."

The monitoring of the search heads 504 and search nodes 506 may allow for improved resource utilization through the implementation of dynamic resource scaling. Resource scaling can be performed by provisioning additional search heads 504 and/or search nodes 506 ("spinning up") or decommissioning idle search heads 504 and/or search nodes 506 ("spinning down") based on various individual or aggregate capacity utilization metrics, such as CPU/memory utilization, the number of concurrent running searches, and so forth. For example, each search head 504 and each search node 506 may periodically report (e.g., for a "heartbeat") its status to the resource monitor 508, including information such as CPU/memory utilization and capacity, an indication of whether the search head is processing a search request (or if the search node is processing the execution of a query), and so forth. Provisioning and decommissioning resources can be performed based on applying an algorithm or a policy to the capacity utilization metrics. For instance, there may be different thresholds used for provisioning and decommissioning resources. Thus, if many resources are being utilized and a particular tenant requires more capacity than is available, additional resources can be spun up to meet that demand, or if not many resources are being utilized, resources can be spun down to a minimum threshold of idle computing.

In some embodiments one or more search heads 504, can be spun up or based on search utilization. For instance, the current number of concurrently running searches may be known (e.g., from "heartbeats" received from the search heads). For instance, if based on the number of search heads allocated 32 searches can be executed concurrently and only 20 searches are being concurrently executed the query system 214 that about 60% of the search head capacity is being utilized. An upper threshold can be set (e.g., above 80% capacity) and once that threshold is satisfied, the number of search heads can be increased (e.g., by 5 additional search heads). Once those new search heads are provisioned, they can start reporting (e.g., via "heartbeat") to the resource monitor 508 and the status of those search heads 504 can be tracked. In embodiments in which information associated with a search request (e.g., extraction rules, and so forth) are independently stored in a catalog (e.g., a metadata catalog 221) rather than passed as metadata associated with the search request to be locally stored on a search head, spinning up additional search heads 504, the query system 214 may be able to spin up a search head 504 relatively quickly given that configuration management and synchronization between search heads 504 may not be required and available search heads can be freely assigned to handle any search request associated with any tenant.

A lower threshold can also be set (e.g., below 20% capacity) and once capacity utilization decreases below the lower threshold, idle search heads 504 or search nodes 506 can be decommissioned. In some cases, there may be a floor or minimum number of search heads that must be available at all times (e.g., 32 total search heads). For spinning down search heads 504, in some embodiments, the only requirement may be that a search head 504 must stop processing a search request before it can be removed. In some embodiments, spinning up or down the number of search heads 504 can be performed by the query system manager 502.

In the case of the search nodes 506, additional search nodes 506 may be spun up or spun down based on capacity utilization and/or based on the number of queries being executed. In some embodiments, a search node 506 may be allocated to one query at a time. In some such embodiments, if more queries are requested than there are available search nodes or if the a threshold number of the total instantiated search nodes 506 are in use, the query system 214 can instantiate an additional number of search nodes 506.

In certain embodiments, such as where a search node 506 is concurrently assigned to multiple queries, spinning search nodes 506 up or down can be based on capacity or resource utilization. For instance, the total CPU/memory utilization and capacity across the search nodes 506 can be determined (e.g., by aggregating the individual CPU/memory utilization and capacity for each search node). An upper threshold can be set (e.g., above 80% utilization of total CPU/memory capacity) and once that threshold is exceeded, the number of search nodes can be increased (e.g., by 20 additional search nodes 506). Once the new search nodes 506 are provisioned, they can start reporting (e.g., via "heartbeat") to the resource monitor 508 and the status of those search nodes 506 can be tracked. The new search nodes 506 can then available to be assigned to a search head 504 (or search manager 514) to execute a query. As described in greater detail herein, a variety of factors can be considered when assigning search nodes 506.

A lower threshold can also be set (e.g., below 20% utilization of total CPU/memory capacity) and once utilization drops below that lower threshold, certain search nodes may be decommissioned (e.g., search nodes that were recently spun up). In some cases, there may be a set of search nodes 506 that cannot be spun down first (e.g., the search nodes with high cache hit ratio). In some embodiments, spinning up or down the number of search heads 504 can be performed by the query system manager 502.

At (5), a search service or query system manager 502 receives and processes a user query. The user query can correspond to a query received from a client device 204 and can include one or more query parameters. In some cases, the user query can be received via the gateway 215 and/or via the network 208. The query can identify (and the query parameters can include) a set of data and manner processing the set of data. In certain embodiments the set of data of a query can include multiple datasets. For example, the set of data of the query can include one or more source datasets, source reference datasets and/or query datasets. In turn a dataset can include one or more queries (or subqueries). For example, a query dataset can be identified as at least a portion of the set of data of a received query, and can include a query (or subquery) that identifies a set of data and a manner of processing the set of data. As another example, the query dataset could reference one or more additional query datasets that in turn include one or more subqueries.

Furthermore, the query can include at least one dataset identifier and/or dataset association record identifier. In some embodiments, the dataset identifier can be a logical identifier of a dataset. In certain embodiments, the dataset identifier and/or dataset association record identifier can follow a particular query parameter, such as "from" "datasetID," "moduleID," etc. In some embodiments, the dataset identifier and/or dataset association record identifier can be included as a parameter of a command received by the query system manager 502. For example, in some embodiments, the data intake and query system 108 can receive the query as one parameter and the dataset identifier and/or the dataset association record as another parameter.

As part of processing the user query, the query system manager 502 can identify the dataset identifier(s) and/or the dataset association record identifier. In some embodiments, the query system manager 502 can parse the query to identify the dataset identifier and/or dataset association record identifier. For example, the query system manager 502 can identify "from" (or some other query parameter) in the query and determine that the subsequent string is the dataset identifier. Furthermore, it will be understood that the query system manager 502 can identify multiple dataset identifier(s) and/or dataset association record identifier(s) as part of processing the user query.

At (6), the query system manager 502 communicates with the metadata catalog 221 to authenticate the datasets identified in the query (and other datasets parsed during the query processing), identify primary datasets (e.g. datasets with configurations used to execute the query), secondary datasets (datasets referenced directly or indirectly by the query but that do not include configurations used to execute the query) and/or identify query configuration parameters.

In some embodiments, upon identifying a dataset association record 602 associated with the query, the query system manager 502 uses the dataset association record 602 to identify additional information associated with the user query, such as one or more datasets and/or rules. In some embodiments, using the dataset association record, the query system manager 502 can determine whether a user associated with the query has the authorizations and/or permissions to access the datasets identified in the query.

Once the query system manager 502 identifies the dataset of the dataset association record 602 referenced in the query, the query system manager 502 can determine whether the identified dataset identifies one or more additional datasets (e.g., is a single or multi-reference dataset), includes additional query parameters, is a source dataset, a secondary dataset, and/or a primary dataset that will be used by the data intake and query system to execute the query.

In the event, the dataset is a single or multi-reference dataset, with each additional dataset identified, the query system manager 502 can recursively review information about the dataset to determine whether it is a non-referential, single, or multi-reference dataset, a secondary dataset, and/or a primary dataset until it has identified any dataset referenced directly or indirectly by the query (e.g., all primary and secondary datasets). For example, as described in herein, the dataset identifier used in the user query may refer to a dataset that is from another dataset association record. Based on the determination that the dataset is imported, the query system manager 502 can review the other dataset association record to identify any additional datasets, identify configuration parameter (e.g., access information, dataset type, etc.) of the imported dataset, and/or determine whether the referenced dataset was imported from a third dataset. The query system manager 502 can continue to review the dataset association records 602 until it has identified the dataset association record where the dataset is native.

As another example, the dataset identifier in the user query may refer to a multi-reference dataset, such as a query dataset that refers to one or more source datasets, source reference datasets, and/or other query datasets. Accordingly, the query system manager 502 can recursively review the datasets referred to in the multi-reference dataset until it identifies datasets that do not rely on any other datasets (e.g., non-referential datasets) and/or identifies the source datasets that include the data that forms at least a portion of the set of data or other primary datasets.

With each new dataset identified from the dataset association records, the query system manager 502 can authenticate the dataset. As part of authenticating the datasets, the query system manager 502 can determine whether the dataset referred to is imported by the dataset association record and/or whether the user has the proper credentials, authorizations, and/or permissions to access the dataset.

In addition to identifying additional datasets, the query system manager 502 can identify additional query parameters. For example, one or more datasets, such as a query dataset, may include additional query parameters. Accordingly, as the query system manager 502 parses the various datasets, it can identify additional query parameters that are to be processed and/or executed.

Furthermore, as the query system manager 502 parses the dataset association records 602, it can identify one or more rules that are to be used to process data from one or more datasets. As described herein, the rules can be imported by different dataset association records 602. Accordingly, the query system manager 502 can recursively parse the rules to identify the dataset association record 602 from which the rule originated. Furthermore, as the query system manager 502 parses the dataset association records 602 and identifies additional rules, it can determine whether the user has the proper credentials permissions etc. to access the identified rules. In addition, the query system manager 502 can identify one or more datasets associated with the rules (e.g., that reference, use, are referenced by, or used by, the additional rules). As described herein, in some embodiments these datasets may not be explicitly imported in a dataset association record, but may be automatically included as part of the query processing process.

In addition to identifying the various datasets and/or rules associated with the query, the query system manager 502 can identify the configurations associated with the datasets and rules associated with the query. In some embodiments, the query system manager 502 can use the dataset configuration records 604 and/or rule configuration records 606 to identify the relevant configurations for the datasets and/or rules associated with the query. For example, the query system manager 502 can refer to the dataset configuration records 604 to identify the dataset types of the various datasets associated with the query. In some embodiments, based on the dataset type, the query system manager 502 can determine how to interact with or generate commands for the dataset. For example, for a lookup dataset, the query system manager may generate a "lookup" command, for an "index" dataset, the query system manager may generate a "search" command, and for a metrics interaction dataset, the query system manager may generate an "mstats" command.

As described herein, in some embodiments, the dataset configuration records 604 and rule configuration records 606 can include a physical identifier for the datasets and/or rules. Accordingly, in some embodiments, the query system manager 502 can obtain the physical identifiers for each of the datasets and/or rules associated with the query. In certain embodiments, the query system manager 502 can determine the physical identifiers for each of the datasets and/or rules associated with the query based on the logical name and dataset association record 602 associated with the dataset or rule. For example, in certain embodiments, the physical identifier can correspond to a combination of the logical identifier of the dataset and the logical identifier of the associated dataset association record.

In some embodiments, when identifying the rule configuration records 606 and/or dataset configuration records 604, the query system manager 502 can obtain a subset of the dataset configuration records 604 and/or rule configuration records 606 in the metadata catalog 221 and/or a subset of the dataset configuration records 604 and/or rule configuration records 606 associated with the dataset association records 602 identified by the query or referenced while processing the query. In certain embodiments, the query system manager 502 obtains only the dataset configuration records 604 and/or rule configuration records 606 that are needed to process the query or only the primary dataset configuration records 604 and primary rule configuration records 606. For example, if the dataset association record 602 reference three datasets and two rules, but the query only uses one of the datasets and one of the rules, the query system manager 502 can obtain the dataset configuration record 604 of the dataset referenced and the rule configuration record 606 in the query but not the dataset configuration records 604 and rule configuration records 606 of the datasets and rule not referenced in or used by the query.

At (7), the query system manager 502 requests a search head. As described herein the search heads 504 can be dynamically assigned to process queries associated with different tenants. Accordingly, prior to a search head 504 processing a query, the query system manager 502 or search service can request an identification of a search head for the (system) query from the resource monitor 508. In some cases, (7) can be done before, after, or concurrently with (6). For example, the query system manager 502 can request the search head 504 before, after, or concurrently with authenticating the datasets and/or identifying dataset sources.

At (8), the metadata catalog 221 generates annotations. As described herein, the metadata catalog 221 can generate annotations based on interactions with or changes to the metadata catalog 221. For example, based on the authentication of the datasets and identify the dataset sources, the metadata catalog 221 can generate one or more annotations. The annotations can include, but are not limited to, updating the number of times a dataset is used, updating a dataset configuration record based on the search, generating a dataset configuration record based on the query, identifying the user associated with the query, storing a job ID associated with the query in a dataset configuration record, etc. As described herein, in some cases, the metadata catalog 221 can generate annotations based on the content of a query. For example, if the query indicates that a dataset includes a particular field, the metadata catalog 221 can generate an annotation for the corresponding dataset configuration record that identifies the field as a field of the dataset, etc. In certain cases, (8) can be done before, after, or concurrently with (7), (9), or other steps. In certain embodiments, the metadata catalog 221 generates the annotations as soon as an interaction or change occurs. In some embodiments, the metadata catalog 221 waits until the query is complete before generating annotations, or generates all annotations at a predetermined time, etc.

At (9), the query system manager 502 generates a system query and/or groups query configuration parameters. The query configuration parameters can include the dataset configuration records 604 corresponding to the primary datasets and/or the rule configuration records 606 corresponding to the rules associated with the query or primary rules. In some cases, (9) can be done before, after, or concurrently with (7), (8), (10), and the like. In certain embodiments (9) is done after (6) and before (11).

In some embodiments, the system query can be based on the user query, one or more primary or secondary datasets, the physical name of a primary dataset(s), the dataset type of the primary dataset(s), additional query parameters identified from the datasets, and/or based on information about the search head 504, etc. In certain embodiments, the system query corresponds to the user query modified to be compatible with the search head 504. For example, in some embodiments, the search head 504 may not be able to process one or more commands in the system query. Accordingly, the query system manager 502 can replace the commands unsupported by the search head 504 with commands that are supported by the search head 504.

In some embodiments, as the system query parses the dataset association records 602 and/or dataset configuration records 604, it identifies the datasets to be included in the query. In certain embodiments, the query system manager 502 identifies the datasets to be included based on the dataset identifier(s) included in the query. For example, if the query identifies a source dataset or source reference dataset, the query system manager 502 can include an identifier for the source dataset or source reference dataset in the system query. Similarly, if the query identifies a single or multi-reference dataset, the query system manager 502 can include an identifier for the single or multi-reference dataset in the system query and/or may include an identifier for one or more (primary) datasets referenced by the single or multi-reference dataset in the system query In some embodiments, the query system manager 502 identifies the datasets to be included based on the dataset identifier(s) included in the query and/or one or more query parameters of a dataset referenced by the query. For example, if the query identifies (or references) a query dataset, the query system manager 502 can include the query parameters (including any referenced primary datasets) of the query dataset in the query. As another example, the query system manager 502 can recursively parse the query parameters (including any referenced datasets) of the query dataset to identify primary datasets and instructions for processing data from (or referenced by) the primary datasets, and include the identified primary datasets and instructions for processing the data in the query. Similarly, if a query dataset references one or more single reference or multi-reference datasets, the query system manager 502 can recursively process the single reference or multi-reference datasets referenced by the query dataset until it identifies the query parameters referenced by any dataset referenced by the query dataset and the primary datasets that include (or reference) the data to be processed according to the identified query parameters.

In certain embodiments, the system query replaces any logical dataset identifier of the user query (such as a query dataset) with the physical dataset identifier of a primary dataset or source dataset identified from the metadata catalog 221. For example, if the logical name of a dataset is "main" and the dataset association record 602 is "test," the query system manager 502 can replace "main" with "test.main" or "test_main," as the case may be. Accordingly, the query system manager 502 can generate the system query based on the physical identifier of the primary datasets or source datasets.

In some embodiments, the query system manager 502 generates the system query based on the dataset type of one or more primary datasets, source datasets, or other datasets to be referenced in the system query. For example, datasets of different types may be interacted with using different commands and/or procedures. Accordingly, the query system manager 502 can include the command associated with the dataset type of the dataset in the query. For example, if the dataset type is an index type, the query system manager 502 can replace a "from" command with a "search" command. Similarly, if the dataset type is a lookup type, the query system manager 502 can replace the "from" command with a "lookup" command. As yet another example, if the dataset type is a metrics interactions type, the query system manager 502 can replace the "from" command with an "mstats" command. As yet another example, if the dataset type is a view dataset, the query system manager 502 can replace the "from" and dataset identifier with a query identified by the view dataset. Accordingly, in certain embodiments, the query system manager 502 can generate the system query based on the dataset type of one or more primary datasets.

In certain embodiments, the query system manager 502 does not include identifiers for any secondary datasets used to parse the user query. In some cases, as the query system manager 502 parses the dataset referenced by a query, it can determine whether a dataset associated with the query will be used to execute the query. If not, the dataset can be omitted from the system query. For example, if a query dataset includes query parameters, which reference two source datasets, the query system manager 502 can include the query parameters and identifiers for the two source dataset in the system query. Having included the content of the query dataset in the query, the query system manager 502 can determine that no additional information or configurations from the query dataset will be used by the query or to execute the query. Accordingly, the query system manager 502 can determine that the query dataset is a secondary dataset and omit it from the query.

In some embodiments, the query system manager 502 includes only datasets (or source datasets or source reference datasets) explicitly referenced in the user query or in a query parameter of another dataset in the system query. For example, if the user query references a "main" source dataset, the "main" source dataset will only be included in the query. As another example, if the user query (or a query parameter of another dataset, such as a query dataset) includes a "main" source dataset and a "test" source reference dataset, only the "main" source dataset and "test" source reference dataset, will be included in the system query. However, it will be understood that the query system manager 502 can use a variety of techniques to determine whether to include a dataset in the system query.

In certain embodiments, the query system manager 502 can identify query configuration parameters (configuration parameters associated with the query) based on the primary datasets and/or rules associated with the query. For example, as the query system manager 502 parses the dataset configuration records 604 of the datasets referenced (directly or indirectly) by the user query it can determine whether the dataset configuration records 604 are to be used to execute the system query.

In some cases, to determine whether the dataset configuration record 604 is to be used to execute the query, the query system manager 502 can parse a generated system query. In parsing the system query, the query system manager 502 can determine that the datasets referenced in the system query will be used to execute the system query. Accordingly, the query system manager 502 can obtain the dataset configuration records 604 corresponding to the datasets referenced in the system query. For example, if a system query references the "test.main" dataset, the query system manager 502 can obtain the dataset configuration record 604 of the "test.main" dataset.

In addition, in some cases, the query system manager can identify any datasets referenced by the datasets in the system query and obtain the dataset configuration records 604 of the datasets referenced by the datasets in the system query. For example, if the system query references a "users" source reference dataset, the query system manager 502 can identify the source dataset referenced by the "users" source reference dataset and obtain the corresponding dataset configuration records 604, as well as the dataset configuration record 604 for the "users" source reference dataset.

In certain embodiments, the query system manager 502 can identify and obtain dataset configuration records 604 for any source dataset(s) and source reference dataset(s) referenced (directly or indirectly) by the query.

In some embodiments, the query system manager 502 can identify and obtain rules configurations 606 for any rules referenced by: the (system or otherwise) query, a dataset included in the system (or other generated) query, a dataset for which a dataset configuration record 604 is obtained as part of the query configuration parameters, and/or a dataset association record referenced (directly or indirectly) by the user query. In some cases, the query system manager 502 includes all rules associated with the dataset association record(s) associated with the query in the query configuration parameters. In certain cases, the query system manager 502 includes a subset of the rules associated with the dataset a dataset association record(s) associated with the query. For example, the query system manager 502 can include rule configuration records 606 for only the rules referenced by or associated with a dataset that is also being included in the query configuration parameters.

As described herein, the query system manager 502 can obtain the dataset configuration records 604 and/or rule configuration records 606 from the metadata catalog 221 based on a dynamic parsing of the user query. Accordingly, in some embodiments, the query system manager 502 can dynamically identify the query configuration parameters to be used to process and execute the query.

At (10), the resource monitor 508 can assign a search head 504 for the query. In some embodiments, the resource monitor 508 can dynamically select a search head 504 and assign it in response to the search request based on a search head mapping policy. For example, based on the search head mapping policy, the resource monitor 508 may identify a search head 504 for the query based on a current availability, responsiveness, and/or utilization rate of the search heads 504 identified in the resource catalog 510. As described herein, the resource catalog 510 can include metrics like concurrent search count, CPU/memory capacity, and so forth. In some embodiments, based on the search head mapping policy, the research catalog 510 may be queried to identify an available search head 504 with free capacity for processing the search request.

There may be numerous benefits associated with dynamically (e.g., in response to a request) selecting and assigning, based on availability and utilization, the search head 504 for the search request, instead of using a pre-assigned search head 504 (e.g., to specific tenants). Pre-assigning resources to tenants (or based on data identifiers) may result in resource utilization issues, whereas dynamically assigning search heads 504 can improve resource utilization by allowing for the implementation of dynamic resource scaling based on resource utilization. In addition, dynamically assigning search heads 504 for queries can enable a search head 504 to be shared across tenants, thereby reducing the amount of compute resources used by the data intake and query system 108 and increase resource utilization. For instance, when pre-assigning resources, there may be various business or implementation rationales which dictate a maximum amount of resources that can be provided to any individual tenant, as well as a minimum amount of resources that must always be allocated for each tenant. However, some tenants may require more capacity than can be statically reserved or assigned to them. Similarly, some tenants may be overprovisioned resources if they request fewer searches than expected. In such cases, their provisioned search heads 504 may sit idle. In contrast, by dynamically assigning search heads 504 for incoming queries, available search heads 504 can be used to process search requests from different tenants or process queries associated with different data identifiers.

At (11), the query system manager 502 communicates the system query and/or query configuration parameters to the search head 504. As described herein, in some embodiments, the query system manager can communicate the system query to the search head 504. In certain embodiments, the query system manager 502 can communicate the query configuration parameters to the search head 504. Accordingly, the query system manager 502 can communicate either the system query, the query configuration parameters, or both.

In certain embodiments, by dynamically determining and communicating the query configuration parameters to the search head 504, the query system manager 502 can provide a stateless search experience. For example, if the search head 504 becomes unavailable, the query system manager 502 can communicate the dynamically determined query configuration parameters (and/or query to be executed) to another search head 504 without data loss and/or with minimal or reduced time loss. Furthermore, by dynamically assigning a search head 504 to queries associated with different tenants, the data intake and query system 108 can improve resource utilization and decrease resources used.

The assigned search head 504 receives and processes the query and (12) generates a search manager 514. In some embodiments, once the search head 504 is selected (non-limiting example: based on a search head mapping policy), the query can be forwarded to it from the resource monitor 508 query system manager 502, etc. As described herein, in some cases, a search master 512 can generate the search manager 514. For example, the search master 512 can spin up or instantiate a new process, container, or virtual machine, or copy itself to generate the search manager 514, etc. As described herein, in some embodiments, the search manager 514 can perform one or more of functions described herein with reference to FIG. 9 as being performed by the search head 504 to process and execute the query.

The search head 504 (13A) requests data identifiers from the data store catalog 220. As described, the data store catalog 220 can include information regarding the data stored in common storage 216. Accordingly, the search head 504 can query the data store catalog 220 to identify data or buckets that include data that satisfies at least a portion of the query.

The search head 504 (13B) requests an identification of available search nodes from the resource monitor 508 and/or resource catalog 510. As described herein, the resource catalog 510 can include information regarding the search nodes 506 of the query system 214. The search head 504 can either directly query the resource catalog 510 in order to identify a number of search nodes available to execute the query, or the search head 504 may send a request to the resource monitor 508, which will identify a number of search nodes available to execute the query by consulting the resource catalog 510. In some cases, the (13A) and (13B) requests can be done concurrently or in any order.

In some cases, the search head 504 requests a search node assignment based on a search node mapping policy. The search node mapping policy can use any one or any combination of data identifiers associated with the query, search node identifiers, priority levels, etc. to indicate how search nodes 506 should be assigned for a query. In some cases, based on the search node mapping policy, the search head 504 requests a search node assignment for the query. In some such cases, the search head 504 can include the data identifier associated with the query in its request for a search node assignment.

At (14A), the data store catalog 220 provides the search head 504 with an identification of data that satisfies at least a portion of the query. As described herein, in response to the request from the search head 504, the data store catalog 220 can be used to identify and return identifiers of buckets in common storage 216 and/or location information of data in common storage 216 that satisfy at least a portion of the query or at least some filter criteria (e.g., buckets associated with an identified tenant or partition or that satisfy an identified time range, etc.).

In some cases, as the data store catalog 220 can routinely receive updates by the indexing system 212, it can implement a read-write lock while it is being queried by the search head 504. Furthermore, the data store catalog 220 can store information regarding which buckets were identified for the search. In this way, the data store catalog 220 can be used by the indexing system 212 to determine which buckets in common storage 216 can be removed or deleted as part of a merge operation.

At (14B), the resource catalog 510 (or the resource monitor 508, by consulting the resource catalog 510) provides the search head 504 with a search node assignment and/or an identification of available search nodes 506. As described herein, in response to the request from the search head 504, the resource catalog 510 and/or the resource monitor 508 can be used to identify and return identifiers for search nodes 506 that are available to execute the query. In some embodiments, the resource monitor 508 or resource catalog 510 determines the search node assignment based on a search node mapping policy, which can include a search head-node mapping policy. As described herein, the search node assignment can be based on numerous factors, including the availability and utilization of each search node 506, a data identifier associated with the query, search node identifiers, etc.

There may be numerous benefits associated with dynamically (e.g., in response to a request) selecting and assigning the search nodes 506 for executing the query, in a manner that factors in availability and utilization rather than relying on pre-assigned search nodes (e.g., to specific tenants). Pre-assigning resources to tenants may result in resource utilization issues, whereas dynamically assigning search nodes 506 can improve resource utilization by allowing for the implementation of dynamic resource scaling based on resource utilization, as previously mentioned, and also enabling search nodes to be shared across tenants and allocated based on demand. For instance, when pre-assigning resources, there may be various business or implementation rationales which dictate a maximum amount of resources that can be provided to any individual tenant, as well as a minimum amount of resources that must always be allocated for each tenant. However, some tenants may require more capacity than statically provided to them. Or, there may be overprovisioning if some tenants do not request any searches, since the search nodes 506 assigned to those tenants may sit idle. In contrast, under dynamic assignment, search nodes 506 can be selected based on availability and shared between tenants to execute queries.

As previously discussed, the search head-node mapping policy may also consider additional factors beyond availability and utilization of the different search nodes. For instance, the total number of search nodes 506 being assigned to execute the query can vary and be determined during assignment of search nodes 506, such that the maximum number of search nodes 506 being assigned is dynamic. The number of search nodes 506 being assigned can be based on a static configuration, based on an algorithm run at the time the search nodes are being identified, and so forth. For instance, there may be a global static configuration (e.g., always return X number of search nodes 506 in this scenario). Or there may be a data identifier-specific static configuration (e.g., return at least or no more than X number of search nodes 506 if the search request is associated with tenant Y), such that the number of search nodes 506 to assign to the search head 504 for executing the query may be preconfigured based on the data identifier associated with the query (non-limiting example, a tenant identifier associated with the query). Alternatively, the number of search nodes 506 being assigned may be specified in the query, either as an absolute number of search nodes (e.g., X number of search nodes), as a percentage of resources (e.g., 20% of the total number of search nodes or 20% of the number of search nodes with sufficient capacity), and so forth. Thus, the resource monitor 508 and/or the resource catalog 510 may wait until there are a sufficient number of search nodes 506 with availability that meets the requested number of search nodes 506 before assigning those search nodes 506 to execute the query, or the resource monitor 508 and/or the resource catalog 510 may have additional search nodes 506 spun up to meet the required number of search demands.

Furthermore, since data identifiers, such as tenant identifiers, are mapped to search nodes 506, similar queries for a specific tenant may be associated with data stored in similar sets of buckets. In other words, some of the data for a specific tenant may reside in a local or shared data store between search nodes 506 from an earlier query (e.g., the search nodes 506), and it may be desirable to assign additional queries for that tenant to those search nodes (e.g., the search nodes 506). Thus, the search head-node mapping policy may additionally attempt to repeatedly choose, for a specific tenant, the same search nodes 506 or as many of the same search nodes as possible that were used for previous queries for that tenant in order to take advantage of caching. For example, if the query system 214 receives two queries associated with a specific tenant and the same number of search nodes 506 are to be used for both queries, the same search nodes 506 can be assigned to the first query and the second query (either concurrently or consecutively). However, if the set of available search nodes 506 has changed between the two queries, then the search head-node mapping policy may indicate that a minimum amount of different search nodes 506 should be introduced for the second query. This affinity for using the same search nodes 506 can exist even when the search head 504 changes. For example, queries associated with the same data identifier can be assigned to various different search heads 504, but the same search nodes 506 or similar search nodes 506 (e.g., used in previous queries) can be used with the different search heads 504.

As described herein, in some embodiments, using a consistent hashing algorithm, the query system 214 can increase the likelihood that the same search nodes 506 will be used to execute queries associated with the same data identifiers. For example, as described herein, a hash can be performed on a tenant identifier associated with the tenant requesting the search, and the output of the hash can be used to identify the search nodes 506 assigned to that tenant to use for the query. In some implementations, the hash may be a consistent hash or use a hash ring, to increase the likelihood that the same search nodes 506 are selected for the queries associated with the same data identifier. In some cases, the consistent hash function can be configured such that even with a different number of search nodes 506 being assigned to execute the query, the output can consistently identify some of the same search nodes 506 to execute the query, or have an increased probability of identifying some of the same search nodes 506 for the query.

In some embodiments, all the search nodes 506 may be mapped out to various different tenants (e.g., using tenant identifiers), such that each search node 506 can be mapped to one or more specific tenants. Thus, in certain embodiments, a specific tenant can have a group of one or more search nodes 506 assigned to it.

At (15) the search head 504 maps the identified search nodes 506 to the data according to a search node mapping policy, which can include a search node-data mapping policy. In some cases, per the search node-data mapping policy, the search head 504 can dynamically map search nodes 506 to the identified data or buckets. As described herein, the search head 504 can map the identified search nodes 506 to the identified data or buckets at one time or iteratively as the buckets are searched according to the search node-data mapping policy. In certain embodiments, per the search node-data mapping policy, the search head 504 can map the identified search nodes 506 to the identified data based on previous assignments, data stored in a local or shared data store of one or more search heads 504, network architecture of the search nodes 506, a hashing algorithm, etc.

In some cases, as some of the data may reside in a local or shared data store between the search nodes 506, the search head 504 can attempt to map that was previously assigned to a search node 506 to the same search node 506. In certain embodiments, to map the data to the search nodes 506, the search head 504 uses the identifiers, such as bucket identifiers, received from the data store catalog 220. In some embodiments, the search head 504 performs a hash function to map a bucket identifier to a search node 506. In some cases, the search head 504 uses a consistent hash algorithm, similar to a consistent hashing used to assign search nodes 506 to queries using a data identifier, to increase the probability of mapping a bucket identifier to the same search node 506.

In certain embodiments, the search head 504 or query system 214 can maintain a table or list of bucket mappings to search nodes 506. In such embodiments, per the search node-data mapping policy, the search head 504 can use the mapping to identify previous assignments between search nodes and buckets. If a particular bucket identifier has not been assigned to a search node 506, the search head 504 can use a hash algorithm to assign it to a search node 506. In certain embodiments, prior to using the mapping for a particular bucket, the search head 504 can confirm that the search node 506 that was previously assigned to the particular bucket is available for the query. In some embodiments, if the search node 506 is not available for the query, the search head 504 can determine whether another search node 506 that shares a data store with the unavailable search node 506 is available for the query. If the search head 504 determines that an available search node 506 shares a data store with the unavailable search node 506, the search head 504 can assign the identified available search node 506 to the bucket identifier that was previously assigned to the now unavailable search node 506.

At (16), the search head 504 instructs the search nodes 506 to execute the query. As described herein, based on the assignment of buckets to the search nodes 506, the search head 504 can generate search instructions for each of the assigned search nodes 506. These instructions can be in various forms, including, but not limited to, JSON, DAG, etc. In some cases, the search head 504 can generate sub-queries for the search nodes 506. Each sub-query or instructions for a particular search node 506 generated for the search nodes 506 can identify any one or any combination of: the buckets that are to be searched, the filter criteria to identify a subset of the set of data to be processed, and the manner of processing the subset of data, etc. Accordingly, the instructions can provide the search nodes 506 with the relevant information to execute their particular portion of the query.

At (17), the search nodes 506 obtain the data to be searched. As described herein, in some cases the data to be searched can be stored on one or more local or shared data stores of the search nodes 506. In some embodiments, the data to be searched is located in the intake system 210 and/or the acceleration data store 222. In certain embodiments, the data to be searched is located in the common storage 216. In such embodiments, the search nodes 506 or a cache manager 516 can obtain the data from the common storage 216.

In some cases, the cache manager 516 can identify or obtain the data requested by the search nodes 506. For example, if the requested data is stored on the local or shared data store of the search nodes 506, the cache manager 516 can identify the location of the data for the search nodes 506. If the requested data is stored in common storage 216, the cache manager 516 can obtain the data from the common storage 216. As another example, if the requested data is stored in the intake system 210 and/or the acceleration data store 222, the cache manager 516 can obtain the data from the intake system 210 and/or the acceleration data store 222.

As described herein, in some embodiments, the cache manager 516 can obtain a subset of the files associated with the bucket to be searched by the search nodes 506. For example, based on the query, the search node 506 can determine that a subset of the files of a bucket are to be used to execute the query. Accordingly, the search node 506 can request the subset of files, as opposed to all files of the bucket. The cache manager 516 can download the subset of files from common storage 216 and provide them to the search node 506 for searching.

In some embodiments, such as when a search node 506 cannot uniquely identify the file of a bucket to be searched, the cache manager 516 can download a bucket summary or manifest that identifies the files associated with the bucket. The search node 506 can use the bucket summary or manifest to uniquely identify the file to be used in the query. The common storage 216 can then obtain that uniquely identified file from common storage 216.

At (18), the search nodes 506 search and process the data. As described herein, the sub-queries or instructions received from the search head 504 can instruct the search nodes 506 to identify data within one or more buckets and perform one or more transformations on the data. Accordingly, each search node 506 can identify a subset of the set of data to be processed and process the subset of data according to the received instructions. This can include searching the contents of one or more inverted indexes of a bucket or the raw machine data or events of a bucket, etc. In some embodiments, based on the query or sub-query, a search node 506 can perform one or more transformations on the data received from each bucket or on aggregate data from the different buckets that are searched by the search node 506.

At (19), the search head 504 monitors the status of the query of the search nodes 506. As described herein, the search nodes 506 can become unresponsive or fail for a variety of reasons (e.g., network failure, error, high utilization rate, etc.). Accordingly, during execution of the query, the search head 504 can monitor the responsiveness and availability of the search nodes 506. In some cases, this can be done by pinging or querying the search nodes 506, establishing a persistent communication link with the search nodes 506, or receiving status updates from the search nodes 506 (non-limiting example: the "heartbeat"). In some cases, the status can indicate the buckets that have been searched by the search nodes 506, the number or percentage of remaining buckets to be searched, the percentage of the query that has been executed by the search node 506, etc. In some cases, based on a determination that a search node 506 has become unresponsive, the search head 504 can assign a different search node 506 to complete the portion of the query assigned to the unresponsive search node 506.

In certain embodiments, depending on the status of the search nodes 506, the search manager 514 can dynamically assign or re-assign buckets to search nodes 506. For example, as search nodes 506 complete their search of buckets assigned to them, the search manager 514 can assign additional buckets for search. As yet another example, if one search node 506 is 95% complete with its search while another search node 506 is less than 50% complete, the query manager can dynamically assign additional buckets to the search node 506 that is 95% complete or re-assign buckets from the search node 506 that is less than 50% complete to the search node that is 95% complete. In this way, the search manager 514 can improve the efficiency of how a computing system performs searches through the search manager 514 increasing parallelization of searching and decreasing the search time.

At (20), the search nodes 506 send individual query results to the search head 504. As described herein, the search nodes 506 can send the query results as they are obtained from the buckets and/or send the results once they are completed by a search node 506. In some embodiments, as the search head 504 receives results from individual search nodes 506, it can track the progress of the query. For example, the search head 504 can track which buckets have been searched by the search nodes 506. Accordingly, in the event a search node 506 becomes unresponsive or fails, the search head 504 can assign a different search node 506 to complete the portion of the query assigned to the unresponsive search node 506. By tracking the buckets that have been searched by the search nodes and instructing different search node 506 to continue searching where the unresponsive search node 506 left off, the search head 504 can reduce the delay caused by a search node 506 becoming unresponsive, and can aid in providing a stateless searching service.

At (21), the search head 504 processes the results from the search nodes 506. As described herein, the search head 504 can perform one or more transformations on the data received from the search nodes 506. For example, some queries can include transformations that cannot be completed until the data is aggregated from the different search nodes 506. In some embodiments, the search head 504 can perform these transformations.

At (22A), the search head 504 communicates or stores results in the query acceleration data store 222. As described herein, in some cases some, all, or a copy of the results of the query can be stored in the query acceleration data store 222. The results stored in the query acceleration data store 222 can be combined with other results already stored in the query acceleration data store 222 and/or be combined with subsequent results. For example, in some cases, the query system 214 can receive ongoing queries, or queries that do not have a predetermined end time. In such cases, as the search head 504 receives a first set of results, it can store the first set of results in the query acceleration data store 222. As subsequent results are received, the search head 504 can add them to the first set of results, and so forth. In this way, rather than executing the same or similar query data across increasingly larger time ranges, the query system 214 can execute the query across a first time range and then aggregate the results of the query with the results of the query across the second time range. In this way, the query system can reduce the amount of queries and the size of queries being executed and can provide query results in a more time efficient manner. At (22B), the search head 504 communicates the results to the metadata catalog 221. In some cases, (22A) and (22B) can be done concurrently.

At (23), the metadata catalog 221 generates annotations. As mentioned, the metadata catalog 221 can generate annotations each time changes are made to it. Accordingly, based on the receipt of the query results, the metadata catalog 221 can generate annotations that include the query results. As described herein, in some cases, query results can be stored in the metadata catalog 221. In some such embodiments, the query results can be accessed at a later time without re-executing the query. In this way, the data intake and query system can reduce the compute resources used. In certain embodiments, the metadata catalog 221 can generate annotations based on the content of the query results. For example, if the query results identify one or more fields associated with a dataset, the metadata catalog 221 can generate annotations for the corresponding dataset configuration record that identify the fields of the dataset, etc. Further, the results may result in additional annotations to other queries, etc.

At (24), the search head 504 terminates the search manager 514. As described herein, in some embodiments a search head 504 or a search master 512 can generate a search manager 514 for each query assigned to the search head 504. Accordingly, in some embodiments, upon completion of a search, the search head 504 or search master 512 can terminate the search manager 514. In certain embodiments, rather than terminating the search manager 514 upon completion of a query, the search head 504 can assign the search manager 514 to a new query. In some cases, (24) can be performed before, after, or concurrently with (23).

As mentioned previously, in some of embodiments, one or more of the functions described herein with respect to FIG. 9 can be omitted, performed in a variety of orders and/or performed by a different component of the data intake and query system 108. For example, the search head 504 can monitor the status of the query throughout its execution by the search nodes 506 (e.g., during (17), (18), and (20)). Similarly, (1), (2), (3A), (3B), and (4), can be performed concurrently with each other and/or with any of the other steps. In some cases, are being performed consistently or repeatedly. Steps (13A) and (13B) and steps (14A) and (14B) can be performed before, after, or concurrently with each other. Further, (13A) and (14A) can be performed before, after, or concurrently with (14A) and (14B). As yet another example, (17), (18), and (20) can be performed concurrently. For example, a search node 506 can concurrently receive one or more files for one bucket, while searching the content of one or more files of a second bucket and sending query results for a third bucket to the search head 504. Similarly, the search head 504 can (15) map search nodes 506 to buckets while concurrently (15) generating instructions for and instructing other search nodes 506 to begin execution of the query. In some cases, such as when the set of data is from the intake system 210 or the acceleration data store 222, (13A) and (14A) can be omitted. Furthermore, in some such cases, the data may be obtained (17) from the intake system 210 and/or the acceleration data store 222.

In some embodiments, such as when one or more search heads 504 and/or search nodes 506 are statically assigned to queries associated to a tenant and/or with a particular data identifier, (3A), (3B), (7), and (10) may be omitted. For example, in some such embodiments, there may only be one search head 504 associated with the data identifier or tenant. As such, the query system 214 may not dynamically assign a search head 504 for the query. In certain embodiments, even where search heads 504 and/or search nodes 506 are statically assigned to a tenant or a data identifier, (3A), (3B), (7), and (10) may be used to determine which of multiple search heads 504 assigned to the tenant or data identifier is to be used for the query, etc.

In certain embodiments, the query system can use multiple sub-policies of a search node mapping policy to identify search nodes for a query and/or to process data. For example, the query system 214 may use a search head-node mapping policy to identify search nodes 506 to use in the query and/or may use a search node-data policy to determine which of the assigned search nodes 506 is to be used to process certain data of the query. In some cases, the search node mapping policy may only include a search head-node mapping policy or a search node-data policy to identify search nodes 506 for the query, etc. Moreover, it will be understood that any one or any combination of the components of the query system 214 can be used to implement a search node mapping policy. For example, the resource monitor 508 or search head 504 can implement the search node mapping policy, or different portions of the search node mapping policy, as desired.

4.3.1. Example Metadata Catalog Processing

Figure 10:
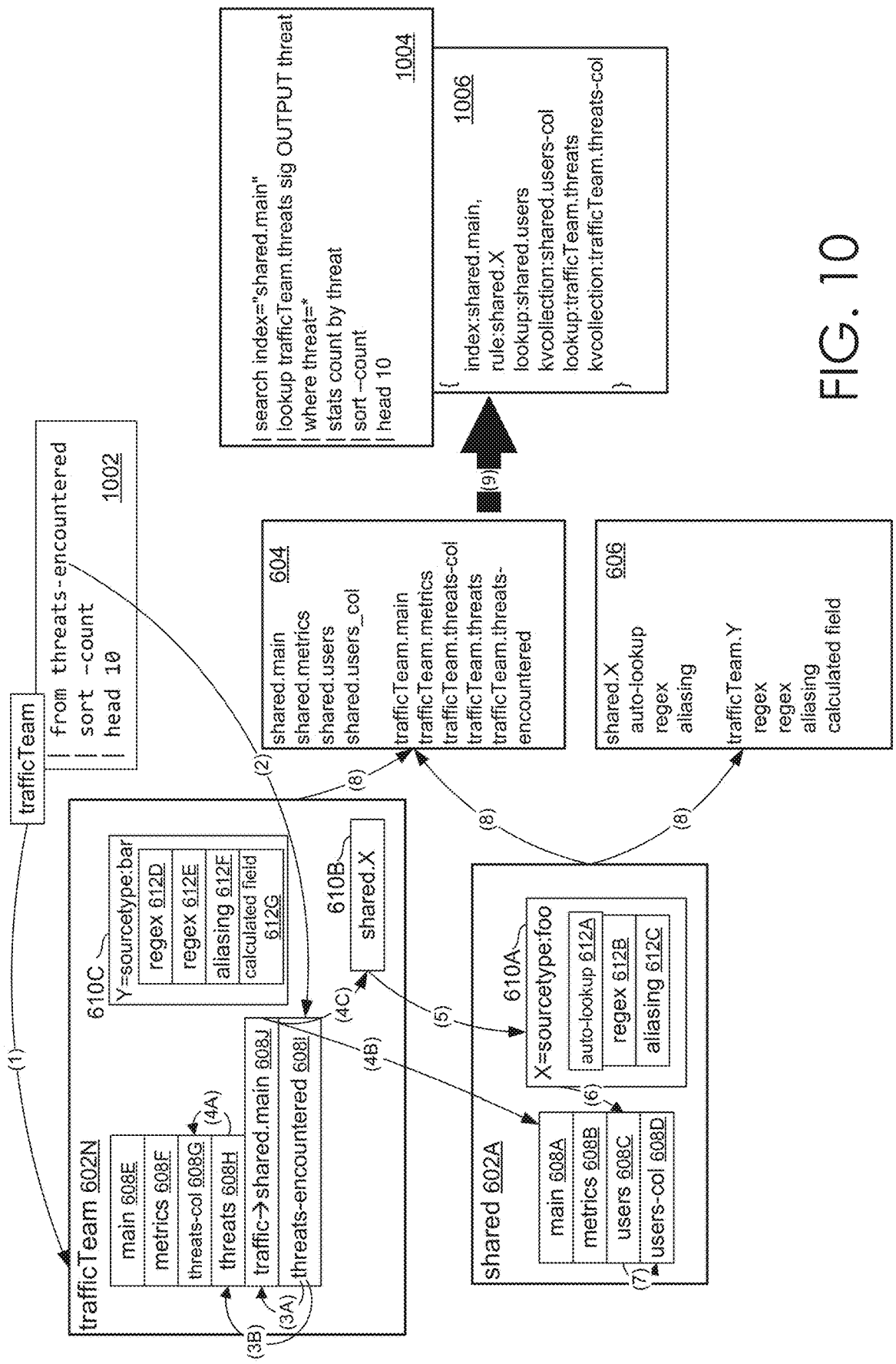
FIG. 10 is a data flow diagram illustrating an embodiment of the data flow for identifying query datasets and query configuration parameters for a particular query.

FIG. 10 is a data flow diagram illustrating an embodiment of the data flow for identifying primary datasets, secondary datasets, and query configuration parameters for a particular query 1002. In the illustrated embodiment, the query system manager 502 receives the query 1002, which includes the following query parameters "|from threats-encountered-|sort-count|head 10." In addition, "trafficTeam" is identified as the identifier of a dataset association record 602N associated with the query 1002.

Based on the identification of "trafficTeam" as the dataset association record identifier, the query system manager 502 (1) determines that the "trafficTeam" dataset association record 602N is associated with the query, is to be searched, and/or determines a portion of the physical name for datasets (or dataset configuration records 604) to be searched.

In addition, based on the query 1002, the query system manager 502 identifies "threats-encountered" as a logical dataset identifier. For example, the query system manager 502 can determine that a dataset identifier follows the "from" command. Accordingly, at (2), the query system manager 502 parses the "threats-encountered" dataset 608I (or associated dataset configuration record 604). As part of parsing the "threats-encountered" dataset 608I, the query system manager 502 determines that the "threats-encountered" dataset 608I is a multi-reference query dataset that references two additional datasets 608J and 608H ("traffic" and "threats"). In some embodiments, the query system manager 502 can identify the related datasets 608J and 608H based on a system annotation in the dataset configuration record 604N and/or based on parsing the query of the dataset configuration record 604N. Based on the identification of the additional datasets, the query system manager 502 parses the "traffic" dataset 608J and the "threats" dataset 608H (or associated dataset configuration record 604) at (3A) and (3B), respectively. Based on parsing the "threats" dataset 608H (or association dataset configuration record 604), the query system manager 502 determines that the "threats" dataset 608H is a single source reference dataset that references or relies on the "threats-col" dataset 608G. In certain cases, the query system manager 502 can identify the "threats-col" dataset 608G based on an annotation in the dataset configuration record 604 associated with the "threats" dataset 608H. Accordingly, at (4A) query system manager 502 parses the "threats-col" dataset 608G (or associated dataset configuration record 604). Based on parsing the "threats-col" dataset 608G, the query system manager 502 determines that the "threats-col" dataset 608G is a non-referential source dataset.

Based on parsing the "traffic" dataset 608J, the query system manager 502 determines that the "traffic" dataset 608J is an imported dataset that corresponds to the "main" dataset 608A of the "shared" dataset association record 602A, which may also be referred to as the "shared.main" dataset 608A. In some cases, the query system manager 502 can identify the "shared.main" dataset 608A based on the definition of the "traffic" dataset 608J in the dataset association record 602N or based on an annotation in a dataset configuration record 604 associated with the dataset "traffic" 608H. Accordingly, at (4B), the query system manager 502 parses the "shared.main" dataset 608A (or associated dataset configuration record 604). Based on parsing the "shared.main" dataset 608A, the query system manager 502 determines that the "shared.main" dataset 608A is a non-referential source dataset. In some embodiments, based on parsing the "shared.main" dataset 608A, the query system manager 502 can determine that the rule "shared.X" 610A is related to the "shared.main" dataset 608A and begin parsing the rule "shared.X" 610A based on the identification. This may be done in place of or concurrently with step (4C) and (5) described below.

As part of parsing the "traffic" dataset 608J, the query system manager 502 also determines that the "shared.X" rule 610B is associated with the "traffic" dataset 608J (e.g., based on its presence in the dataset association record 602N and/or based on another indication of a relationship, such as an annotation in a rule configuration record 606 for the "shared.X" rule 610B or an annotation in a dataset configuration record 604 for the "shared.main" dataset 608A), and at (4C), parses the "shared.X" rule 610B (which may include parsing the rule configuration record 606 of the "shared.X" rule 610B). Based on parsing the "shared.X" rule 610B, the query system manager 502 determines that the "shared.X" rule 610B is imported from the "shared" dataset association record 602A and at (5) parses the "X" rule 610A of the dataset association record 602A. Based on parsing the "X" rule 610A (or associated rule configuration record 606), the query system manager 502 determines that the "X" rule 610A references the "users" dataset 608C, and at (6) parses the "users" dataset 608C (or associated dataset configuration record 604). Based on parsing the "users" dataset 608C, the query system manager 502 determines that the "users" dataset 608C references the "users-col" dataset 608D and at (7) parses the "users-col" dataset 608D. Based on parsing the "users-col" dataset 608D, the query system manager 502 determines that the "users-col" dataset 608D is a non-referential source dataset.

In some embodiments, each time the query system manager 502 identifies a new dataset, it can identify the dataset as a dataset associated with the query. As the query system manager 502 processes the dataset, it can determine whether the dataset is a primary dataset or a secondary dataset. For example, if a view dataset merely references other datasets or includes additional query parameters and the configurations of the view dataset will not be used (or needed) to execute the query parameters or access the referenced datasets, it can be identified as a secondary dataset and omitted as a primary dataset. With reference to the illustrated embodiment, the query system manager 502 may identify "threats-encountered" dataset 608I as being associated with the query based on its presence in the user query 1002. However, once the query system manager 502 determines that the "threats-encountered" dataset 608I adds additional query parameters to the query 1002, but does not include data and/or will not be used to execute the query, it can identify the "threats-encountered" dataset 608I as secondary dataset but not a primary dataset (and may or may not keep the query parameters).

As described herein, in some cases, the query system manager 502 determines the physical names of the primary datasets based on dataset association records 602A, 602N. For example, the query system manager 502 can use the names or identifiers of the dataset association records 602A, 602N to determine the physical names of the primary datasets and/or rules associated with the query. Using the physical names of the primary datasets and/or rules associated with the query, the query system manager 502 (8) identifies the dataset configuration records 604 from various dataset configuration records 604 and rule configuration records 606 from various rule configuration records 606 for inclusion as query configuration parameters 1006. In some embodiments, the query system manager 502 can determine the dataset types of the primary datasets and other query configuration parameters associated with the primary datasets and rules associated with the query using the dataset configuration records 604 and rule configuration records 606.

In the illustrated embodiment, the query system manager 502 can determine that the datasets 608B, 608E, and 608F are not datasets associated with the query as they were not referenced (directly or indirectly) by the query 1002. Conversely, in the illustrated embodiment, the query system manager 502 determines that datasets 608A, 608C, 608D, 608G, 608H, 608I, and 608J are datasets associated with the query as they were referenced (directly or indirectly) by the query 1002.

In addition, in the illustrated embodiment, the query system manager 502 determines that the "shared.main," "shared.users," "shared.users-col," "trafficTeam.threats," and "trafficTeam.threat-col" datasets 608A, 608C, 608D, 608H, 608G, respectively, are primary datasets as they will be used to execute or process the system query 1004 and that the "trafficTeam.threats-encountered" dataset 608I and "trafficTeam.traffic" dataset 608J are secondary datasets as they will not be used to process/execute the query. Moreover, the query system manager 502 determines that the rule "shared.X" is associated with the query and/or will be used to process/execute the system query.

As mentioned, although, the "threats-encountered" and "traffic" datasets 608I, 608J, respectively, were identified as part of the processing, the query system manager 502 determines not to include them as primary datasets as they are not source datasets or will not be used to execute the system query. Rather, the "threats-encountered" and "traffic" datasets 608I, 608J were used to identify other datasets and query parameters. For example, the "threats-encountered" dataset 608I is a view dataset that includes additional query parameters that reference two other datasets, and the "traffic" dataset 608J is merely the name of the "shared.main" dataset 608A imported into the "trafficTeam" dataset association record 602N.

Based on the acquired information, the query system manager 502 (9) generates the system query 1004 and/or the query configuration parameters 1006 for the query. With reference to the system query 1004, the query system manager 502 has included query parameters identified from the "threats-encountered dataset" in the system query 1004 and replaced the logical identifiers of datasets in the query with physical identifiers of the datasets (e.g., replaced "threats-encountered" with "shared.main" and "trafficTeam-.threats"). In addition, the query system manager 502 includes commands specific to the dataset type of the datasets in the query (e.g., "from" replaced with "search" for the "shared.main" dataset 608A and "lookup" included for the lookup "trafficTeam.threats" dataset 608H). Accordingly, the system query 1004 is configured to be communicated to the search head 504 for processing and execution.

Moreover, based on the information from the metadata catalog 221, the query system manager 502 is able to generate the query configuration parameters 1006 for the query to be executed by the data intake and query system 108. In some embodiments, the query configuration parameters 1006 include dataset configuration records 604 (or portions thereof) associated with: datasets identified in the query 1004, datasets referenced by the datasets identified in the query 1004, and/or datasets referenced by a rule or rule configuration record 606 included (or identified for inclusion) in the query configuration parameters 1006. In certain embodiments, the query configuration parameters 1006 include dataset configuration records 604 (or portions thereof) associated with the primary datasets. In some cases, when including dataset configuration records 604, the query system manager 502 may omit certain portions of the dataset configuration records 604. For example, the query system manager 502 may omit one or more annotations, such as the annotations identifying relationships between datasets or fields, etc. In certain embodiments, the query system manager 502 includes a reference to the various dataset configuration records 604 rather than a copy of the dataset configuration records 604.

In some embodiments, the query configuration parameters 1006 includes rule configuration records 606 of rules associated with: the query (referenced directly or indirectly), datasets identified in the query 1004, and/or datasets (or dataset configuration records 604) identified in the query configuration parameters 1006.

In some cases, the query system manager 502 can iteratively identify dataset configuration records 604 and/or rules configurations 606 for inclusion in the query configuration parameters 1006. As a non-limiting example, the query system manager 502 can include a first dataset configuration record 604 in the query configuration parameters 1006 (e.g., of a dataset referenced in the query to be executed). The query system manager 502 can then include dataset configuration records 604 or rule configuration records 606 of any datasets referenced by the first dataset (or corresponding configuration 604). The query system manager 502 can iteratively include dataset and rule configuration records 604, 606 corresponding to datasets or rules referenced by an already included rule or dataset (or corresponding configurations 604, 606) until the relevant dataset and rule configuration records 606 are included in the query configuration parameters 1006. In certain embodiments, only configurations corresponding to primary datasets and primary rules are included in the query configuration parameters 1006. Less or additional information or configurations can be included in the query configuration parameters 1006.

As another non-limiting example and with reference to the illustrated embodiment, the query system manager 502 can include the "shared.main" dataset configuration record 604 and "trafficTeam.threats" dataset configuration record 604 in the query configuration parameters 1006 based on their presence in the query 1004. Based on a determination that the "trafficTeam.threats-col" dataset configuration record 604 is referenced by the "trafficTeam.threats" dataset (or corresponding configuration 604), the query system manager 502 can include the "trafficTeam.threats-col" dataset configuration record 604 in the query configuration parameters 1006.

Based on a determination that the "shared.X" rule is referenced by the "shared.main" dataset 608A or a determination that the "shared.X" rule is included in the dataset association record 602N, the query system manager 502 can include the "shared.X" rule configuration record 606 in the query configuration parameters 1006. Furthermore, based on a determination that the "shared.users" dataset 608C is referenced by the "shared.X" rule (inclusive of any action of the "shared.X" rule or corresponding configuration 606), the query system manager 502 can include the "shared.users" dataset 608C in the query configuration parameters 1006. Similarly, the query system manager 502 can include the "shared.users-col" dataset 608D in the query configuration parameters 1006 based on a determination that it is referenced by the "shared.users" dataset 608C.

In the illustrated embodiment, the query system manager 502 determines that the datasets "shared.main," "shared.users," "shared.users-col," "trafficTeam.threats," and "trafficTeam.threat-col" are primary datasets. Accordingly, the query system manager 502 includes the dataset configuration records 604 corresponding to the identified primary datasets as part of the query configuration parameters 1006. Similarly, the query system manager 502 determines that the "shared.X" rule is associated with the query and/or will be used to process/execute the query and includes the corresponding rule configuration record 606 as part of the query configuration parameters 1006.

In the illustrated embodiment, the query to be executed by the data intake and query system 108 corresponds to the system query 1004, however, it will be understood that in other embodiments, the query system manager 502 may identify the query configuration parameters 1006 for the query and may not translate the user query to the system query 1004. Thus, the query configuration parameters 1006 can be used to execute a system query, a user query, or some other query generated from the user query 1002.

As mentioned, in some embodiments, the metadata catalog 221 may not store separate dataset association records 602. Rather, the datasets association records 602 illustrated in FIG. 10 can be considered a logical association between one or more dataset configuration records 604 and/or one or more rule configuration records 606. In certain embodiments, the datasets 608 and/or rules 610 of each dataset association record 602 may be references to dataset configuration records 604 and/or rule configuration records 606. Accordingly, in some embodiments, rather than moving from or parsing different portions of a dataset association record 602, it will be understood that the query system manager 502 can parse different dataset configuration records 604 and/or rule configuration records 606 based on the identified physical identifier for the dataset or rule. For example, (2) may refer to parsing the "trafficTeam.threats-encountered" dataset configuration record 604, (3A) and (3B) may refer to parsing the "trafficTeam.traffic" and "trafficTeam.threats" dataset configuration records 604, respectively, (4A) and (4B) may refer to parsing the "trafficTeam.threats-col" and "shared.main," dataset configuration records 604, respectively, (4C) may refer to parsing the "trafficTeam.shared.X" (or "shared.X") rule configuration record 606, (5) may refer to parsing the "shared.X" rule configuration record 606 (or be combined with (4C)), (6) may refer to parsing the "shared.users" dataset configuration record 604, and (7) may refer to parsing the "shared.users-col" dataset configuration record 604. Thus, as the query system manager 502 parses different datasets 608 or rules 610, it can do so using the dataset configuration records 604 and rule configuration records 606, respectively. Moreover, in some such embodiments (8) may be omitted (or considered as part of each parsing step) as the query system manager 502 references the relevant dataset configuration records 604 and rule configuration records 606 throughout the review or parsing process. Based on the review of the various dataset configuration records 604 and rule configuration records 606, the query system manager 502 can (9) generate the system query 1004 and/or the query configuration parameters 1006.

Furthermore, when parsing the dataset configuration records 604 or rule configuration records 606, the system can use one or more annotations to identify related datasets. For example, the system can determine that the "threats-encountered" dataset 608I depends on and/or is related to the "traffic" dataset 608J and "threats" dataset 608H based on one or more annotations, such as an inter-dataset relationship annotation, in the dataset configuration record 604N. In some embodiments, using the annotations in the dataset configuration records 604, the system can more quickly traverse between the different datasets and identify the primary datasets for the query 1002.

In certain embodiments, as the system parses the query 1002, it can extract metadata and generate additional annotations for one or more dataset configuration records 604 and rule configuration records 606. For example, the query 1002 can be referred to as a dataset "job." Based on its reference to "threats-encountered," the system can determine that the dataset "job" is dependent on "threats-encountered" and generate an annotation based on the determined relationship. The system can generate one or more additional annotations for the dataset "job" as described herein. In some embodiments the annotations can be stored for future use or reference. For example, for each query that is entered, the system can generate a dataset configuration record 606 and store the annotations generated for the query.

In addition, if the system has not already generated annotations for other datasets referenced by the query (e.g., when the various datasets are added to the metadata catalog 221), then the system can generate annotations as it traverses the datasets as part of parsing the query 1002. For example, as described herein, the system can generate annotations for the dataset configuration record 604N indicating that the "threats-encountered" dataset 608I is dependent on the "traffic" and "threats" datasets 608H, 608J, respectively. As also described herein, the system can determine a relationship between the field "sig" of the "traffic" dataset 608J and the field "sig" of the "threats" dataset 608H. Likewise, the system can determine inter-dataset relationships between the "traffic" and "main" datasets 608J and 608A, the "threats-col" and "threats" datasets 608G and 608H, and the "users" and "users-col" datasets 608C and 608D. In a similar way, the system can determine a rule-dataset relationship between rule "X" 610A and dataset "users" 608C, etc. The system can use the various determined relationships to generate annotations for corresponding dataset and rule configuration records 604, 606, respectively. In some embodiments, the generated annotations can be used to more efficiently parse and execute the query if it is executed again, to generate suggestions for the user, and/or to enable the user to gain a greater understanding of the data associated with, stored by, or managed by the system.

4.4. Data Ingestion, Indexing, and Storage Flow

Figure 11A:
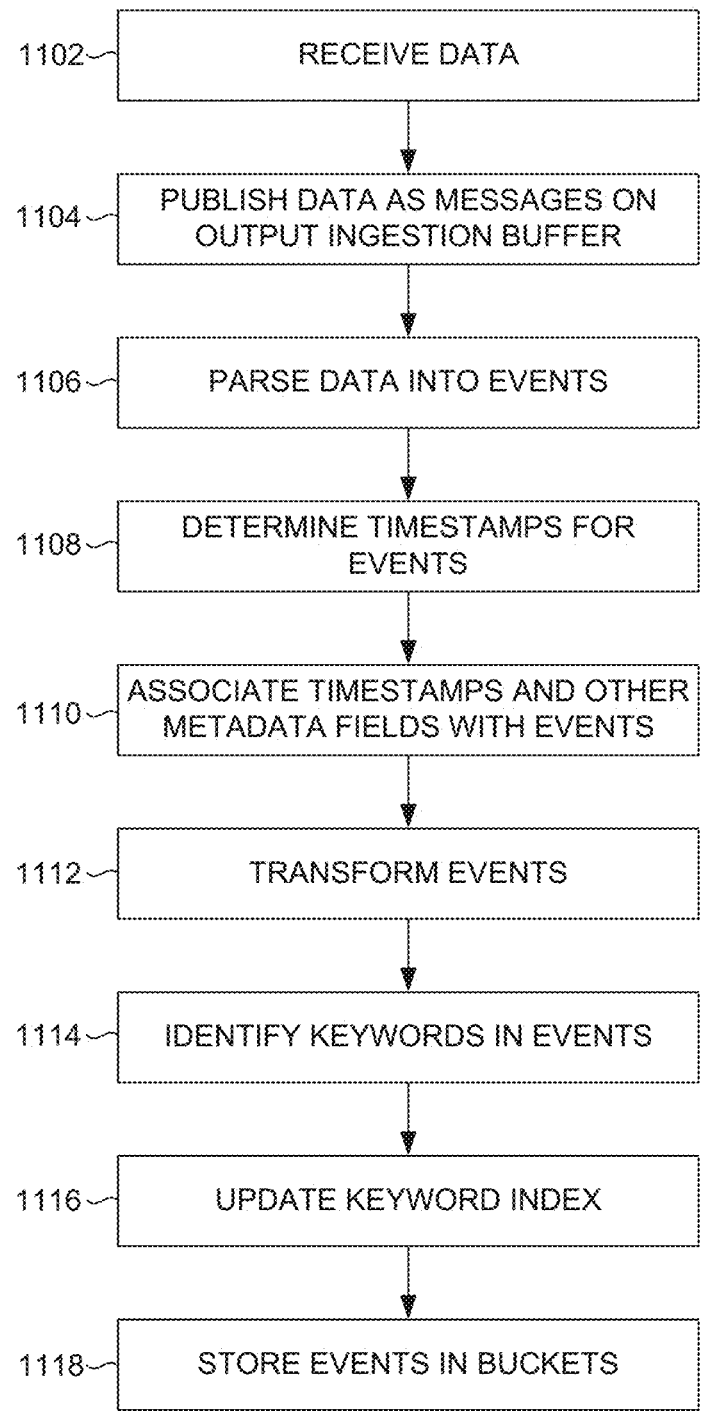
FIG. 11A is a flow diagram of an example method that illustrates how indexers process, index, and store data received from intake system, in accordance with example embodiments.

FIG. 11A is a flow diagram of an example method that illustrates how a data intake and query system 108 processes, indexes, and stores data received from data sources 202, in accordance with example embodiments. The data flow illustrated in FIG. 11A is provided for illustrative purposes only; it will be understood that one or more of the steps of the processes illustrated in FIG. 11A may be removed or that the ordering of the steps may be changed. Furthermore, for the purposes of illustrating a clear example, one or more particular system components are described in the context of performing various operations during each of the data flow stages. For example, the intake system 210 is described as receiving and processing machine data during an input phase; the indexing system 212 is described as parsing and indexing machine data during parsing and indexing phases; and a query system 214 is described as performing a search query during a search phase. However, other system arrangements and distributions of the processing steps across system components may be used.

4.4.1. Input

At block 1102, the intake system 210 receives data from an input source, such as a data source 202 shown in FIG. 2. The intake system 210 initially may receive the data as a raw data stream generated by the input source. For example, the intake system 210 may receive a data stream from a log file generated by an application server, from a stream of network data from a network device, or from any other source of data. In some embodiments, the intake system 210 receives the raw data and may segment the data stream into messages, possibly of a uniform data size, to facilitate subsequent processing steps. The intake system 210 may thereafter process the messages in accordance with one or more rules, as discussed above for example with reference to FIGS. 7 and 8, to conduct preliminary processing of the data. In one embodiment, the processing conducted by the intake system 210 may be used to indicate one or more metadata fields applicable to each message. For example, the intake system 210 may include metadata fields within the messages, or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a source type related to the message. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps.

At block 504, the intake system 210 publishes the data as messages on an output ingestion buffer 310. Illustratively, other components of the data intake and query system 108 may be configured to subscribe to various topics on the output ingestion buffer 310, thus receiving the data of the messages when published to the buffer 310.

4.4.2. Parsing

At block 1106, the indexing system 212 receives messages from the intake system 210 (e.g., by obtaining the messages from the output ingestion buffer 310) and parses the data of the message to organize the data into events. In some embodiments, to organize the data into events, the indexing system 212 may determine a source type associated with each message (e.g., by extracting a source type label from the metadata fields associated with the message, etc.) and refer to a source type configuration corresponding to the identified source type. The source type definition may include one or more properties that indicate to the indexing system 212 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexing system 212, the indexing system 212 may infer a source type for the data by examining the structure of the data. Then, the indexing system 212 can apply an inferred source type definition to the data to create the events.

At block 1108, the indexing system 212 determines a timestamp for each event. Similar to the process for parsing machine data, an indexing system 212 may again refer to a source type definition associated with the data to locate one or more properties that indicate instructions for determining a timestamp for each event. The properties may, for example, instruct the indexing system 212 to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 1110, the indexing system 212 associates with each event one or more metadata fields including a field containing the timestamp determined for the event. In some embodiments, a timestamp may be included in the metadata fields. These metadata fields may include any number of "default fields" that are associated with all events, and may also include one more custom fields as defined by a user. Similar to the metadata fields associated with the data blocks at block 1104, the default metadata fields associated with each event may include a host, source, and source type field including or in addition to a field storing the timestamp.

At block 1112, the indexing system 212 may optionally apply one or more transformations to data included in the events created at block 1106. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

FIG. 11C illustrates an illustrative example of how machine data can be stored in a data store in accordance with various disclosed embodiments. In other embodiments, machine data can be stored in a flat file in a corresponding bucket with an associated index file, such as a time series index or "TSIDX." As such, the depiction of machine data and associated metadata as rows and columns in the table of FIG. 11C is merely illustrative and is not intended to limit the data format in which the machine data and metadata is stored in various embodiments described herein. In one particular embodiment, machine data can be stored in a compressed or encrypted formatted. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

As mentioned above, certain metadata, e.g., host 1136, source 1137, source type 1138 and timestamps 1135 can be generated for each event, and associated with a corresponding portion of machine data 1139 when storing the event data in a data store, e.g., data store 208. Any of the metadata can be extracted from the corresponding machine data, or supplied or defined by an entity, such as a user or computer system. The metadata fields can become part of or stored with the event. Note that while the time-stamp metadata field can be extracted from the raw data of each event, the values for the other metadata fields may be determined by the indexing system 212 or indexing node 404 based on information it receives pertaining to the source of the data separate from the machine data.

While certain default or user-defined metadata fields can be extracted from the machine data for indexing purposes, all the machine data within an event can be maintained in its original condition. As such, in embodiments in which the portion of machine data included in an event is unprocessed or otherwise unaltered, it is referred to herein as a portion of raw machine data. In other embodiments, the port of machine data in an event can be processed or otherwise altered. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various default fields.

In FIG. 11C, the first three rows of the table represent events 1131, 1132, and 1133 and are related to a server access log that records requests from multiple clients processed by a server, as indicated by entry of "access.log" in the source column 1137.

In the example shown in FIG. 11C, each of the events 1131-1133 is associated with a discrete request made from a client device. The raw machine data generated by the server and extracted from a server access log can include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the gif file requested by the client) and the time spent 1146 to serve the request in microseconds. As seen in FIG. 11C, all the raw machine data retrieved from the server access log is retained and stored as part of the corresponding events 1131-1133 in the data store.

Event 1134 is associated with an entry in a server error log, as indicated by "error.log" in the source column 1137 that records errors that the server encountered when processing a client request. Similar to the events related to the server access log, all the raw machine data in the error log file pertaining to event 1134 can be preserved and stored as part of the event 1134.

Saving minimally processed or unprocessed machine data in a data store associated with metadata fields in the manner similar to that shown in FIG. 11C is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

4.4.3. Indexing

At blocks 1114 and 1116, the indexing system 212 can optionally generate a keyword index to facilitate fast keyword searching for events. To build a keyword index, at block 1114, the indexing system 212 identifies a set of keywords in each event. At block 1116, the indexing system 212 includes the identified keywords in an index, which associates each stored keyword with reference pointers to events containing that keyword (or to locations within events where that keyword is located, other location identifiers, etc.). When the data intake and query system 108 subsequently receives a keyword-based query, the query system 214 can access the keyword index to quickly identify events containing the keyword.

In some embodiments, the keyword index may include entries for field name-value pairs found in events, where a field name-value pair can include a pair of keywords connected by a symbol, such as an equals sign or colon. This way, events containing these field name-value pairs can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2".

At block 1118, the indexing system 212 stores the events with an associated timestamp in a local data store 208 and/or common storage 216. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

The indexing system 212 may be responsible for storing the events contained in various data stores 218 of common storage 216. By distributing events among the data stores in common storage 216, the query system 214 can analyze events for a query in parallel. For example, using map-reduce techniques, each search node 506 can return partial responses for a subset of events to a search head that combines the results to produce an answer for the query. By storing events in buckets for specific time ranges, the indexing system 212 may further optimize the data retrieval process by enabling search nodes 506 to search buckets corresponding to time ranges that are relevant to a query. In some embodiments, each bucket may be associated with an identifier, a time range, and a size constraint. In certain embodiments, a bucket can correspond to a file system directory and the machine data, or events, of a bucket can be stored in one or more files of the file system directory. The file system directory can include additional files, such as one or more inverted indexes, high performance indexes, permissions files, configuration files, etc.

In some embodiments, each indexing node 404 (e.g., the indexer 410 or data store 412) of the indexing system 212 has a home directory and a cold directory. The home directory stores hot buckets and warm buckets, and the cold directory stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexing node 404 may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexing node 404 may store old, archived data in a frozen bucket that is not capable of being searched at search time. In some embodiments, a frozen bucket may be stored in slower and/or larger memory, such as a hard disk, and may be stored in offline and/or remote storage.

In some embodiments, an indexing node 404 may not include a cold directory and/or cold or frozen buckets. For example, as warm buckets and/or merged buckets are copied to common storage 216, they can be deleted from the indexing node 404. In certain embodiments, one or more data stores 218 of the common storage 216 can include a home directory that includes warm buckets copied from the indexing nodes 404 and a cold directory of cold or frozen buckets as described above.

Moreover, events and buckets can also be replicated across different indexing nodes 404 and data stores 218 of the common storage 216.

Figure 11B:
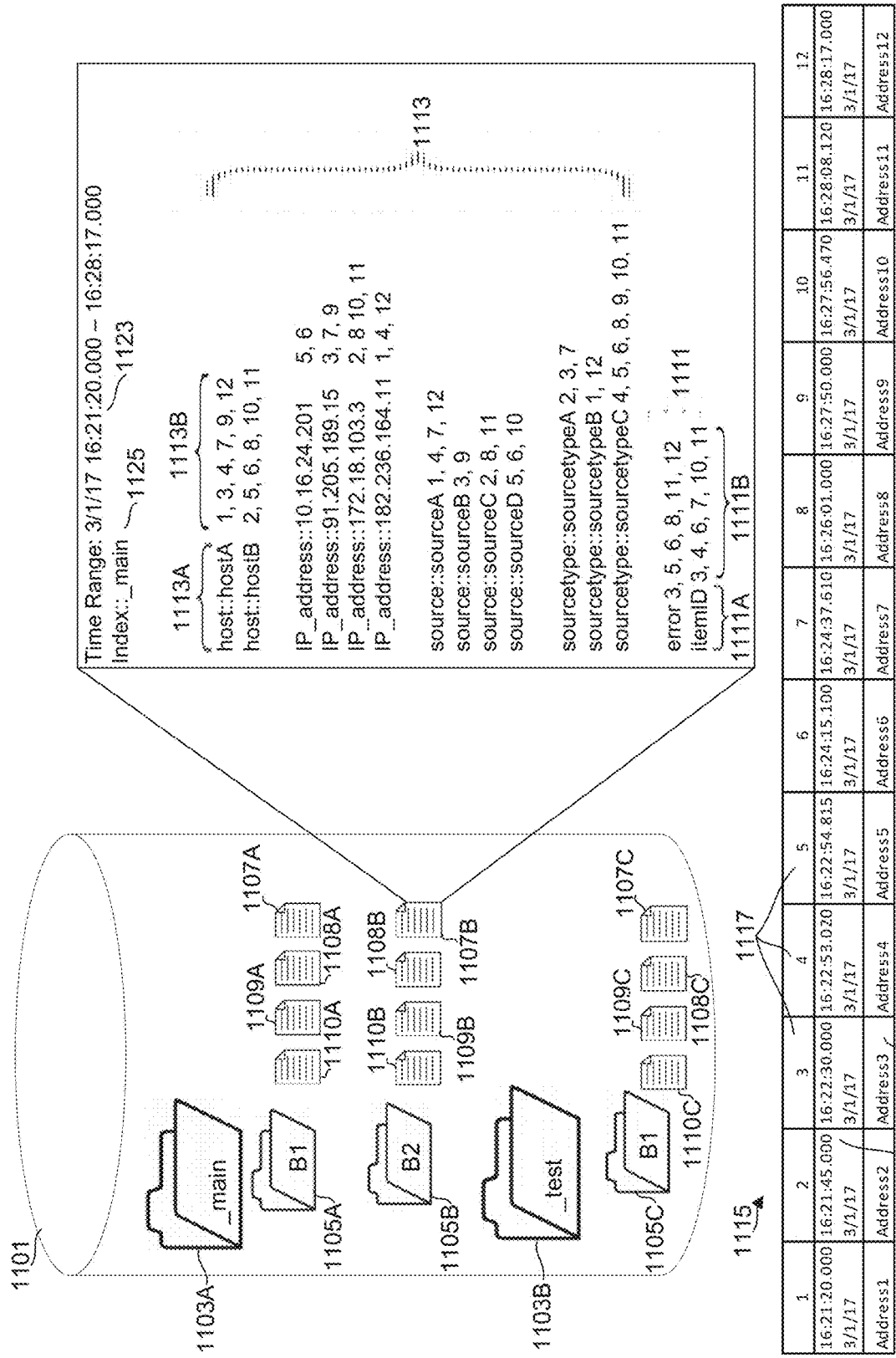
FIG. 11B is a block diagram of a data structure in which time-stamped event data can be stored in a data store, in accordance with example embodiments.

FIG. 11B is a block diagram of an example data store 1101 that includes a directory for each index (or partition) that contains a portion of data stored in the data store 1101, and a sub-directory for one or more buckets of the index. FIG. 11B further illustrates details of an embodiment of an inverted index 1107B and an event reference array 1115 associated with inverted index 1107B.

The data store 1101 can correspond to a data store 218 that stores events in common storage 216, a data store 412 associated with an indexing node 404, or a data store associated with a search node 506. In the illustrated embodiment, the data store 1101 includes a _main directory 1103A associated with a _main partition and a _test directory 1103B associated with a _test partition. However, the data store 1101 can include fewer or more directories. In some embodiments, multiple indexes can share a single directory or all indexes can share a common directory. Additionally, although illustrated as a single data store 1101, it will be understood that the data store 1101 can be implemented as multiple data stores storing different portions of the information shown in FIG. 11B. For example, a single index or partition can span multiple directories or multiple data stores, and can be indexed or searched by multiple search nodes 506.

Furthermore, although not illustrated in FIG. 11B, it will be understood that, in some embodiments, the data store 1101 can include directories for each tenant and sub-directories for each partition of each tenant, or vice versa. Accordingly, the directories 1103A and 1103B illustrated in FIG. 11B can, in certain embodiments, correspond to sub-directories of a tenant or include sub-directories for different tenants.

In the illustrated embodiment of FIG. 11B, two sub-directories 1105A, 1105B of the _main directory 1103A and one sub-directory 1103C of the _test directory 1103B are shown. The sub-directories 1105A, 1105B, 1105C can correspond to buckets of the partitions associated with the directories 1103A, 1103B. For example, the sub-directories 1105A and 1105B can correspond to buckets "B1" and "B2" of the partition "_main" and the sub-directory 1105C can correspond to bucket "B1" of the partition "_test." Accordingly, even though there are two buckets "B1," as each "B1" bucket associated with a different partition (and corresponding directory 1103), the system 108 can uniquely identify them.

Although illustrated as buckets "B1" and "B2," it will be understood that the buckets (and/or corresponding sub-directories 1105) can be named in a variety of ways. In certain embodiments, the bucket (or sub-directory) names can include information about the bucket. For example, the bucket name can include the name of the partition with which the bucket is associated, a time range of the bucket, etc.

As described herein, each bucket can have one or more files associated with it, including, but not limited to one or more raw machine data files, bucket summary files, filter files, inverted indexes, high performance indexes, permissions files, configuration files, etc. In the illustrated embodiment of FIG. 11B, the files associated with a particular bucket can be stored in the sub-directory corresponding to the particular bucket. Accordingly, the files stored in the sub-directory 1105A can correspond to or be associated with bucket "B1," of partition "_main," the files stored in the sub-directory 1105B can correspond to or be associated with bucket "B2" of partition "_main," and the files stored in the sub-directory 1105C can correspond to or be associated with bucket "B1" of partition "_test."

In the illustrated embodiment of FIG. 11B, each sub-directory 1105A-1105C of the partition-specific directories 1103A and 1103B includes an inverted index 1107A, 1107B, 1107C, respectively (generically referred to as inverted index(es) 1107). The inverted indexes 1107 can be keyword indexes or field-value pair indexes described herein and can include less or more information than depicted in FIG. 11B.

In some embodiments, the inverted indexes 1107 can correspond to distinct time-series buckets stored in common storage 216, a search node 506, or an indexing node 404 and that contains events corresponding to the relevant partition (e.g., _main partition, _test partition). As such, each inverted index 1107 can correspond to a particular range of time for a partition. In the illustrated embodiment of FIG. 11B, each inverted index 1107 corresponds to the bucket associated with the sub-directory 1103 in which the inverted index 1107 is located. In some embodiments, an inverted index 1107 can correspond to multiple time-series buckets (e.g., include information related to multiple buckets) or inverted indexes 1107 can correspond to a single time-series bucket.

In the illustrated embodiment of FIG. 11B, each sub-directory 1105 includes additional files. In the illustrated embodiment, the additional files include raw data files 1108A-1108C, high performance indexes 1109A-1109C, and filter files 1110A-110C. However, it will be understood that each bucket can be associated with fewer or more files and each sub-directory can store fewer or more files.

Each inverted index 1107 can include one or more entries, such as keyword (or token) entries or field-value pair entries. Furthermore, in certain embodiments, the inverted indexes 1107 can include additional information, such as a time range 1123 associated with the inverted index or a partition identifier 1125 identifying the partition associated with the inverted index 1107. It will be understood that each inverted index 1107 can include less or more information than depicted.

Token entries, such as token entries 1111 illustrated in inverted index 1107B, can include a token 1111A (e.g., "error," "itemID," etc.) and event references 1111B indicative of events that include the token. For example, for the token "error," the corresponding token entry includes the token "error" and an event reference, or unique identifier, for each event stored in the corresponding time-series bucket that includes the token "error." In the illustrated embodiment of FIG. 11B, the error token entry includes the identifiers 3, 5, 6, 8, 11, and 12 corresponding to events located in the time-series bucket associated with the inverted index 1107B that is stored in common storage 216, a search node 506, or an indexing node 404 and is associated with the partition "main," which in turn is associated with the directory 1103A.

In some cases, some token entries can be default entries, automatically determined entries, or user specified entries. In some embodiments, the indexing system 212 can identify each word or string in an event as a distinct token and generate a token entry for the identified word or string. In some cases, the indexing system 212 can identify the beginning and ending of tokens based on punctuation, spaces, as described in greater detail herein. In certain cases, the indexing system 212 can rely on user input or a configuration file to identify tokens for token entries 1111, etc. It will be understood that any combination of token entries can be included as a default, automatically determined, or included based on user-specified criteria.

Similarly, field-value pair entries, such as field-value pair entries 1113 shown in inverted index 1107B, can include a field-value pair 1113A and event references 1113B indicative of events that include a field value that corresponds to the field-value pair. For example, for a field-value pair sourcetype:sendmail, a field-value pair entry can include the field-value pair sourcetype:sendmail and a unique identifier, or event reference, for each event stored in the corresponding time-series bucket that includes a sendmail sourcetype.

In some cases, the field-value pair entries 1113 can be default entries, automatically determined entries, or user specified entries. As a non-limiting example, the field-value pair entries for the fields host, source, and sourcetype can be included in the inverted indexes 1107 as a default. As such, all of the inverted indexes 1107 can include field-value pair entries for the fields host, source, sourcetype. As yet another non-limiting example, the field-value pair entries for the IP_address field can be user specified and may only appear in the inverted index 1107B based on user-specified criteria. As another non-limiting example, as the indexing system 212 indexes the events, it can automatically identify field-value pairs and create field-value pair entries. For example, based on the indexing system's 212 review of events, it can identify IP_address as a field in each event and add the IP_address field-value pair entries to the inverted index 1107B. It will be understood that any combination of field-value pair entries can be included as a default, automatically determined, or included based on user-specified criteria.

With reference to the event reference array 1115, each unique identifier 1117, or event reference, can correspond to a unique event located in the time series bucket. However, the same event reference can be located in multiple entries of an inverted index. For example, if an event has a sourcetype "splunkd," host "www1" and token "warning," then the unique identifier for the event will appear in the field-value pair entries sourcetype:splunkd and host:www1, as well as the token entry "warning." With reference to the illustrated embodiment of FIG. 11B and the event that corresponds to the event reference 3, the event reference 3 is found in the field-value pair entries 1113 host:hostA, source:sourceB, sourcetype:sourcetypeA, and IP_address: 91.205.189.15 indicating that the event corresponding to the event references is from hostA, sourceB, of sourcetypeA, and includes 91.205.189.15 in the event data.

For some fields, the unique identifier is located in only one field-value pair entry for a particular field. For example, the inverted index may include four sourcetype field-value pair entries corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 11B, since the event reference 7 appears in the field-value pair entry sourcetype:sourcetypeA, then it does not appear in the other field-value pair entries for the sourcetype field, including sourcetype:sourcetypeB, sourcetype:sourcetypeC, and sourcetype:sourcetypeD.

The event references 1117 can be used to locate the events in the corresponding bucket. For example, the inverted index can include, or be associated with, an event reference array 1115. The event reference array 1115 can include an array entry 1117 for each event reference in the inverted index 1107B. Each array entry 1117 can include location information 1119 of the event corresponding to the unique identifier (non-limiting example: seek address of the event), a timestamp 1121 associated with the event, or additional information regarding the event associated with the event reference, etc.

For each token entry 1111 or field-value pair entry 1113, the event reference 1101B or unique identifiers can be listed in chronological order or the value of the event reference can be assigned based on chronological data, such as a timestamp associated with the event referenced by the event reference. For example, the event reference 1 in the illustrated embodiment of FIG. 11B can correspond to the first-in-time event for the bucket, and the event reference 12 can correspond to the last-in-time event for the bucket. However, the event references can be listed in any order, such as reverse chronological order, ascending order, descending order, or some other order, etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 11B, the entries are sorted first by entry type and then alphabetically.

As a non-limiting example of how the inverted indexes 1107 can be used during a data categorization request command, the query system 214 can receive filter criteria indicating data that is to be categorized and categorization criteria indicating how the data is to be categorized. Example filter criteria can include, but is not limited to, indexes (or partitions), hosts, sources, sourcetypes, time ranges, field identifier, tenant and/or user identifiers, keywords, etc.

Using the filter criteria, the query system 214 identifies relevant inverted indexes to be searched. For example, if the filter criteria includes a set of partitions (also referred to as indexes), the query system 214 can identify the inverted indexes stored in the directory corresponding to the particular partition as relevant inverted indexes. Other means can be used to identify inverted indexes associated with a partition of interest. For example, in some embodiments, the query system 214 can review an entry in the inverted indexes, such as a partition-value pair entry 1113 to determine if a particular inverted index is relevant. If the filter criteria does not identify any partition, then the query system 214 can identify all inverted indexes managed by the query system 214 as relevant inverted indexes.

Similarly, if the filter criteria includes a time range, the query system 214 can identify inverted indexes corresponding to buckets that satisfy at least a portion of the time range as relevant inverted indexes. For example, if the time range is last hour then the query system 214 can identify all inverted indexes that correspond to buckets storing events associated with timestamps within the last hour as relevant inverted indexes.

When used in combination, an index filter criterion specifying one or more partitions and a time range filter criterion specifying a particular time range can be used to identify a subset of inverted indexes within a particular directory (or otherwise associated with a particular partition) as relevant inverted indexes. As such, the query system 214 can focus the processing to only a subset of the total number of inverted indexes in the data intake and query system 108.

Once the relevant inverted indexes are identified, the query system 214 can review them using any additional filter criteria to identify events that satisfy the filter criteria. In some cases, using the known location of the directory in which the relevant inverted indexes are located, the query system 214 can determine that any events identified using the relevant inverted indexes satisfy an index filter criterion. For example, if the filter criteria includes a partition main, then the query system 214 can determine that any events identified using inverted indexes within the partition main directory (or otherwise associated with the partition main) satisfy the index filter criterion.

Furthermore, based on the time range associated with each inverted index, the query system 214 can determine that any events identified using a particular inverted index satisfies a time range filter criterion. For example, if a time range filter criterion is for the last hour and a particular inverted index corresponds to events within a time range of 50 minutes ago to 35 minutes ago, the query system 214 can determine that any events identified using the particular inverted index satisfy the time range filter criterion. Conversely, if the particular inverted index corresponds to events within a time range of 59 minutes ago to 62 minutes ago, the query system 214 can determine that some events identified using the particular inverted index may not satisfy the time range filter criterion.

Using the inverted indexes, the query system 214 can identify event references (and therefore events) that satisfy the filter criteria. For example, if the token "error" is a filter criterion, the query system 214 can track all event references within the token entry "error." Similarly, the query system 214 can identify other event references located in other token entries or field-value pair entries that match the filter criteria. The system can identify event references located in all of the entries identified by the filter criteria. For example, if the filter criteria include the token "error" and field-value pair sourcetype:web_ui, the query system 214 can track the event references found in both the token entry "error" and the field-value pair entry sourcetype:web_ui. As mentioned previously, in some cases, such as when multiple values are identified for a particular filter criterion (e.g., multiple sources for a source filter criterion), the system can identify event references located in at least one of the entries corresponding to the multiple values and in all other entries identified by the filter criteria. The query system 214 can determine that the events associated with the identified event references satisfy the filter criteria.

In some cases, the query system 214 can further consult a timestamp associated with the event reference to determine whether an event satisfies the filter criteria. For example, if an inverted index corresponds to a time range that is partially outside of a time range filter criterion, then the query system 214 can consult a timestamp associated with the event reference to determine whether the corresponding event satisfies the time range criterion. In some embodiments, to identify events that satisfy a time range, the query system 214 can review an array, such as the event reference array 1115 that identifies the time associated with the events. Furthermore, as mentioned above using the known location of the directory in which the relevant inverted indexes are located (or other partition identifier), the query system 214 can determine that any events identified using the relevant inverted indexes satisfy the index filter criterion.

In some cases, based on the filter criteria, the query system 214 reviews an extraction rule. In certain embodiments, if the filter criteria includes a field name that does not correspond to a field-value pair entry in an inverted index, the query system 214 can review an extraction rule, which may be located in a configuration file, to identify a field that corresponds to a field-value pair entry in the inverted index.

For example, the filter criteria includes a field name "sessionID" and the query system 214 determines that at least one relevant inverted index does not include a field-value pair entry corresponding to the field name sessionID, the query system 214 can review an extraction rule that identifies how the sessionID field is to be extracted from a particular host, source, or sourcetype (implicitly identifying the particular host, source, or sourcetype that includes a sessionID field). The query system 214 can replace the field name "sessionID" in the filter criteria with the identified host, source, or sourcetype. In some cases, the field name "sessionID" may be associated with multiples hosts, sources, or sourcetypes, in which case, all identified hosts, sources, and sourcetypes can be added as filter criteria. In some cases, the identified host, source, or sourcetype can replace or be appended to a filter criterion, or be excluded. For example, if the filter criteria includes a criterion for source S1 and the "sessionID" field is found in source S2, the source S2 can replace S1 in the filter criteria, be appended such that the filter criteria includes source S1 and source S2, or be excluded based on the presence of the filter criterion source S1. If the identified host, source, or sourcetype is included in the filter criteria, the query system 214 can then identify a field-value pair entry in the inverted index that includes a field value corresponding to the identity of the particular host, source, or sourcetype identified using the extraction rule.

Once the events that satisfy the filter criteria are identified, the query system 214 can categorize the results based on the categorization criteria. The categorization criteria can include categories for grouping the results, such as any combination of partition, source, sourcetype, or host, or other categories or fields as desired.

The query system 214 can use the categorization criteria to identify categorization criteria-value pairs or categorization criteria values by which to categorize or group the results. The categorization criteria-value pairs can correspond to one or more field-value pair entries stored in a relevant inverted index, one or more partition-value pairs based on a directory in which the inverted index is located or an entry in the inverted index (or other means by which an inverted index can be associated with a partition), or other criteria-value pair that identifies a general category and a particular value for that category. The categorization criteria values can correspond to the value portion of the categorization criteria-value pair.

As mentioned, in some cases, the categorization criteria-value pairs can correspond to one or more field-value pair entries stored in the relevant inverted indexes. For example, the categorization criteria-value pairs can correspond to field-value pair entries of host, source, and sourcetype (or other field-value pair entry as desired). For instance, if there are ten different hosts, four different sources, and five different sourcetypes for an inverted index, then the inverted index can include ten host field-value pair entries, four source field-value pair entries, and five sourcetype field-value pair entries. The query system 214 can use the nineteen distinct field-value pair entries as categorization criteria-value pairs to group the results.

Specifically, the query system 214 can identify the location of the event references associated with the events that satisfy the filter criteria within the field-value pairs, and group the event references based on their location. As such, the query system 214 can identify the particular field value associated with the event corresponding to the event reference. For example, if the categorization criteria include host and sourcetype, the host field-value pair entries and sourcetype field-value pair entries can be used as categorization criteria-value pairs to identify the specific host and sourcetype associated with the events that satisfy the filter criteria.

In addition, as mentioned, categorization criteria-value pairs can correspond to data other than the field-value pair entries in the relevant inverted indexes. For example, if partition or index is used as a categorization criterion, the inverted indexes may not include partition field-value pair entries. Rather, the query system 214 can identify the categorization criteria-value pair associated with the partition based on the directory in which an inverted index is located, information in the inverted index, or other information that associates the inverted index with the partition, etc. As such a variety of methods can be used to identify the categorization criteria-value pairs from the categorization criteria.

Accordingly based on the categorization criteria (and categorization criteria-value pairs), the query system 214 can generate groupings based on the events that satisfy the filter criteria. As a non-limiting example, if the categorization criteria includes a partition and sourcetype, then the groupings can correspond to events that are associated with each unique combination of partition and sourcetype. For instance, if there are three different partitions and two different sourcetypes associated with the identified events, then the six different groups can be formed, each with a unique partition value-sourcetype value combination. Similarly, if the categorization criteria includes partition, sourcetype, and host and there are two different partitions, three sourcetypes, and five hosts associated with the identified events, then the query system 214 can generate up to thirty groups for the results that satisfy the filter criteria. Each group can be associated with a unique combination of categorization criteria-value pairs (e.g., unique combinations of partition value sourcetype value, and host value).

In addition, the query system 214 can count the number of events associated with each group based on the number of events that meet the unique combination of categorization criteria for a particular group (or match the categorization criteria-value pairs for the particular group). With continued reference to the example above, the query system 214 can count the number of events that meet the unique combination of partition, sourcetype, and host for a particular group.

The query system 214, such as the search head 504 can aggregate the groupings from the buckets, or search nodes 506, and provide the groupings for display. In some cases, the groups are displayed based on at least one of the host, source, sourcetype, or partition associated with the groupings. In some embodiments, the query system 214 can further display the groups based on display criteria, such as a display order or a sort order as described in greater detail above.

As a non-limiting example and with reference to FIG. 11B, consider a request received by the query system 214 that includes the following filter criteria: keyword=error, partition=_main, time range=3/1/17 16:22.00.000-16:28.00.000, sourcetype=sourcetypeC, host=hostB, and the following categorization criteria: source.

Based on the above criteria, a search node 506 of the query system 214 that is associated with the data store 1101 identifies _main directory 1103A and can ignore _test directory 1103B and any other partition-specific directories. The search node 506 determines that inverted index 1107B is a relevant index based on its location within the _main directory 1103A and the time range associated with it. For sake of simplicity in this example, the search node 506 determines that no other inverted indexes in the _main directory 1103A, such as inverted index 1107A satisfy the time range criterion.

Having identified the relevant inverted index 1107B, the search node 506 reviews the token entries 1111 and the field-value pair entries 1113 to identify event references, or events that satisfy all of the filter criteria.

With respect to the token entries 1111, the search node 506 can review the error token entry and identify event references 3, 5, 6, 8, 11, 12, indicating that the term "error" is found in the corresponding events. Similarly, the search node 506 can identify event references 4, 5, 6, 8, 9, 10, 11 in the field-value pair entry sourcetype:sourcetypeC and event references 2, 5, 6, 8, 10, 11 in the field-value pair entry host:hostB. As the filter criteria did not include a source or an IP_address field-value pair, the search node 506 can ignore those field-value pair entries.

In addition to identifying event references found in at least one token entry or field-value pair entry (e.g., event references 3, 4, 5, 6, 8, 9, 10, 11, 12), the search node 506 can identify events (and corresponding event references) that satisfy the time range criterion using the event reference array 1115 (e.g., event references 2, 3, 4, 5, 6, 7, 8, 9, 10). Using the information obtained from the inverted index 1107B (including the event reference array 1115), the search node 506 can identify the event references that satisfy all of the filter criteria (e.g., event references 5, 6, 8).

Having identified the events (and event references) that satisfy all of the filter criteria, the search node 506 can group the event references using the received categorization criteria (source). In doing so, the search node 506 can determine that event references 5 and 6 are located in the field-value pair entry source:sourceD (or have matching categorization criteria-value pairs) and event reference 8 is located in the field-value pair entry source:sourceC. Accordingly, the search node 506 can generate a sourceC group having a count of one corresponding to reference 8 and a sourceD group having a count of two corresponding to references 5 and 6. This information can be communicated to the search head 504. In turn the search head 504 can aggregate the results from the various search nodes 506 and display the groupings. As mentioned above, in some embodiments, the groupings can be displayed based at least in part on the categorization criteria, including at least one of host, source, sourcetype, or partition.

It will be understood that a change to any of the filter criteria or categorization criteria can result in different groupings. As a one non-limiting example, consider a request received by a search node 506 that includes the following filter criteria: partition=_main, time range=3/1/17 3/1/17 16:21:20.000-16:28:17.000, and the following categorization criteria: host, source, sourcetype can result in the search node 506 identifying event references 1-12 as satisfying the filter criteria. The search node 506 can generate up to 24 groupings corresponding to the 24 different combinations of the categorization criteria-value pairs, including host (hostA, hostB), source (sourceA, sourceB, sourceC, sourceD), and sourcetype (sourcetypeA, sourcetypeB, sourcetypeC). However, as there are only twelve events identifiers in the illustrated embodiment and some fall into the same grouping, the search node 506 generates eight groups and counts as follows:

Group 1 (hostA, sourceA, sourcetypeA): 1 (event reference 7)
Group 2 (hostA, sourceA, sourcetypeB): 2 (event references 1, 12)
Group 3 (hostA, sourceA, sourcetypeC): 1 (event reference 4)
Group 4 (hostA, sourceB, sourcetypeA): 1 (event reference 3)
Group 5 (hostA, sourceB, sourcetypeC): 1 (event reference 9)
Group 6 (hostB, sourceC, sourcetypeA): 1 (event reference 2)
Group 7 (hostB, sourceC, sourcetypeC): 2 (event references 8, 11)
Group 8 (hostB, sourceD, sourcetypeC): 3 (event references 5, 6, 10)

As noted, each group has a unique combination of categorization criteria-value pairs or categorization criteria values. The search node 506 communicates the groups to the search head 504 for aggregation with results received from other search nodes 506. In communicating the groups to the search head 504, the search node 506 can include the categorization criteria-value pairs for each group and the count. In some embodiments, the search node 506 can include more or less information. For example, the search node 506 can include the event references associated with each group and other identifying information, such as the search node 506 or inverted index used to identify the groups.

As another non-limiting example, consider a request received by an search node 506 that includes the following filter criteria: partition=main, time range=3/1/17 3/1/17 16:21:20.000-16:28:17.000, source=sourceA, sourceD, and keyword=itemID and the following categorization criteria: host, source, sourcetype can result in the search node 506 identifying event references 4, 7, and 10 as satisfying the filter criteria, and generate the following groups:

Group 1 (hostA, sourceA, sourcetypeC): 1 (event reference 4)
Group 2 (hostA, sourceA, sourcetypeA): 1 (event reference 7)
Group 3 (hostB, sourceD, sourcetypeC): 1 (event references 10)

The search node 506 communicates the groups to the search head 504 for aggregation with results received from other search node 506s. As will be understand there are myriad ways for filtering and categorizing the events and event references. For example, the search node 506 can review multiple inverted indexes associated with a partition or review the inverted indexes of multiple partitions, and categorize the data using any one or any combination of partition, host, source, sourcetype, or other category, as desired.

Further, if a user interacts with a particular group, the search node 506 can provide additional information regarding the group. For example, the search node 506 can perform a targeted search or sampling of the events that satisfy the filter criteria and the categorization criteria for the selected group, also referred to as the filter criteria corresponding to the group or filter criteria associated with the group.

In some cases, to provide the additional information, the search node 506 relies on the inverted index. For example, the search node 506 can identify the event references associated with the events that satisfy the filter criteria and the categorization criteria for the selected group and then use the event reference array 1115 to access some or all of the identified events. In some cases, the categorization criteria values or categorization criteria-value pairs associated with the group become part of the filter criteria for the review.

With reference to FIG. 11B for instance, suppose a group is displayed with a count of six corresponding to event references 4, 5, 6, 8, 10, 11 (i.e., event references 4, 5, 6, 8, 10, 11 satisfy the filter criteria and are associated with matching categorization criteria values or categorization criteria-value pairs) and a user interacts with the group (e.g., selecting the group, clicking on the group, etc.). In response, the search head 504 communicates with the search node 506 to provide additional information regarding the group.

In some embodiments, the search node 506 identifies the event references associated with the group using the filter criteria and the categorization criteria for the group (e.g., categorization criteria values or categorization criteria-value pairs unique to the group). Together, the filter criteria and the categorization criteria for the group can be referred to as the filter criteria associated with the group. Using the filter criteria associated with the group, the search node 506 identifies event references 4, 5, 6, 8, 10, 11.

Based on a sampling criteria, discussed in greater detail above, the search node 506 can determine that it will analyze a sample of the events associated with the event references 4, 5, 6, 8, 10, 11. For example, the sample can include analyzing event data associated with the event references 5, 8, 10. In some embodiments, the search node 506 can use the event reference array 1115 to access the event data associated with the event references 5, 8, 10. Once accessed, the search node 506 can compile the relevant information and provide it to the search head 504 for aggregation with results from other search nodes. By identifying events and sampling event data using the inverted indexes, the search node can reduce the amount of actual data this is analyzed and the number of events that are accessed in order to generate the summary of the group and provide a response in less time.

4.5. Query Processing Flow

Figure 12A:
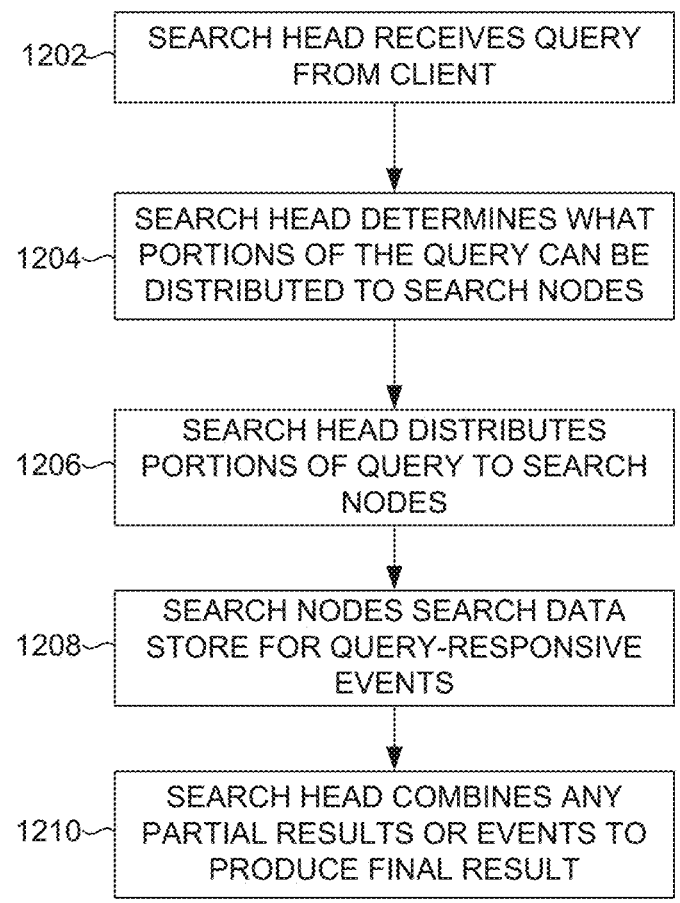
FIG. 12A is a flow diagram of an example method that illustrates how a search head and indexers perform a search query, in accordance with example embodiments.

FIG. 12A is a flow diagram illustrating an embodiment of a routine implemented by the query system 214 for executing a query. At block 1202, a search head 504 receives a search query. At block 1204, the search head 504 analyzes the search query to determine what portion(s) of the query to delegate to search nodes 506 and what portions of the query to execute locally by the search head 504. At block 1206, the search head distributes the determined portions of the query to the appropriate search nodes 506. In some embodiments, a search head cluster may take the place of an independent search head 504 where each search head 504 in the search head cluster coordinates with peer search heads 504 in the search head cluster to schedule jobs, replicate search results, update configurations, fulfill search requests, etc. In some embodiments, the search head 504 (or each search head) consults with a resource catalog 510 that provides the search head with a list of search nodes 506 to which the search head can distribute the determined portions of the query. A search head 504 may communicate with the resource catalog 510 to discover the addresses of active search nodes 506.

At block 1208, the search nodes 506 to which the query was distributed, search data stores associated with them for events that are responsive to the query. To determine which events are responsive to the query, the search node 506 searches for events that match the criteria specified in the query. These criteria can include matching keywords or specific values for certain fields. The searching operations at block 1208 may use the late-binding schema to extract values for specified fields from events at the time the query is processed. In some embodiments, one or more rules for extracting field values may be specified as part of a source type definition in a configuration file. The search nodes 506 may then either send the relevant events back to the search head 504, or use the events to determine a partial result, and send the partial result back to the search head 504.

At block 1210, the search head 504 combines the partial results and/or events received from the search nodes 506 to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head 504 can also perform various operations to make the search more efficient. For example, before the search head 504 begins execution of a query, the search head 504 can determine a time range for the query and a set of common keywords that all matching events include. The search head 504 may then use these parameters to query the search nodes 506 to obtain a superset of the eventual results. Then, during a filtering stage, the search head 504 can perform field-extraction operations on the superset to produce a reduced set of search results. This speeds up queries, which may be particularly helpful for queries that are performed on a periodic basis.

4.6. Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|". In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command (also referred to herein as a query command) and one or more corresponding search terms (also referred to as a query term) at the beginning of the pipeline (search/query commands and search/query terms can be generically referred to as query parameters or search parameters—thus a query can include multiple query parameters, some of which can be query commands and others of which can be query terms). Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

Figure 12B:
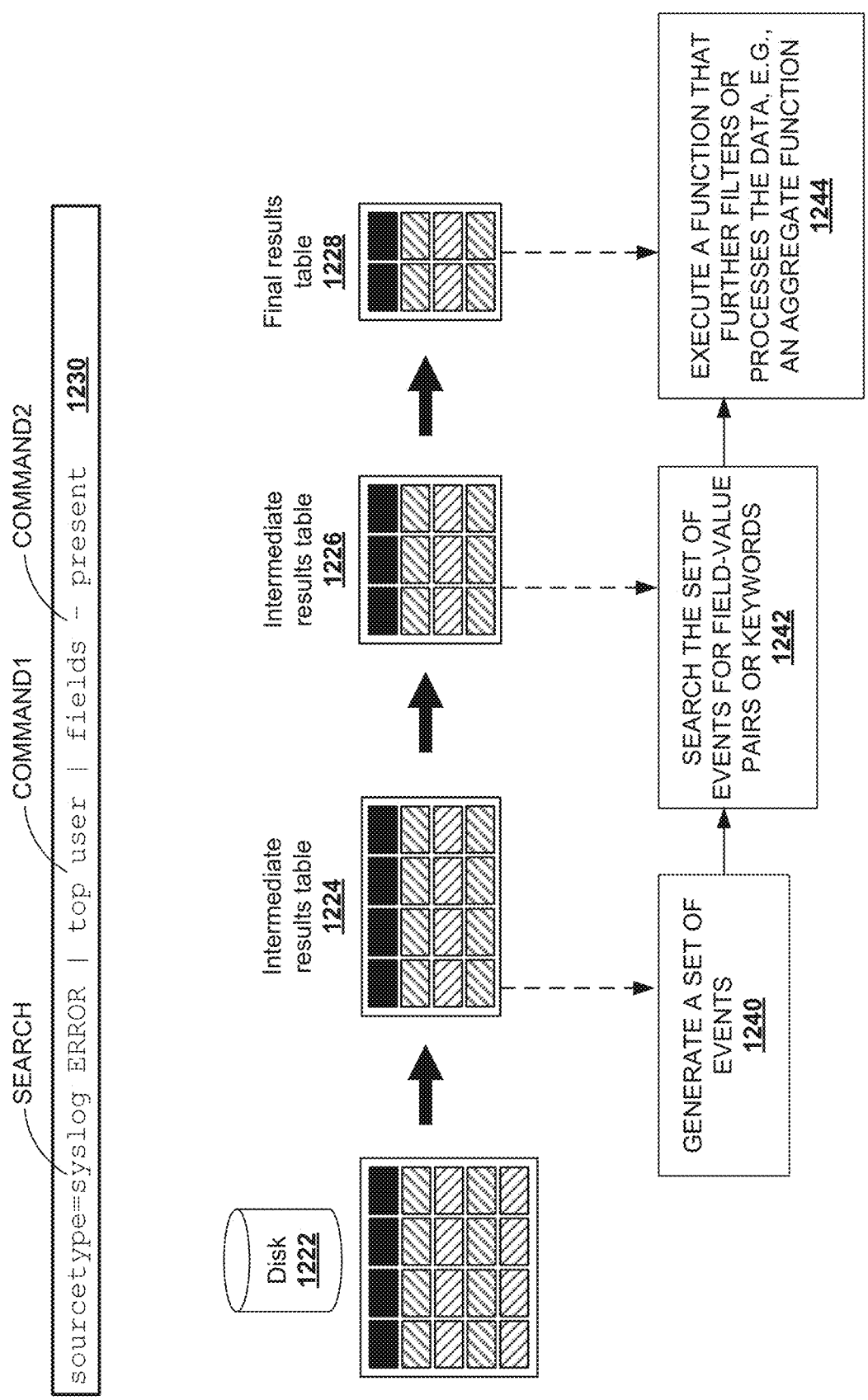
FIG. 12B provides a visual representation of an example manner in which a pipelined command language or query operates, in accordance with example embodiments.

FIG. 12B provides a visual representation of the manner in which a pipelined command language or query operates in accordance with the disclosed embodiments. The query 1230 can be inputted by the user into a search. The query comprises a search, the results of which are piped to two commands (namely, command 1 and command 2) that follow the search step.

Disk 1222 represents the event data in the raw record data store.

When a user query is processed, a search step will precede other queries in the pipeline in order to generate a set of events at block 1240. For example, the query can comprise search terms "sourcetype=syslog ERROR" at the front of the pipeline as shown in FIG. 12B. Intermediate results table 1224 shows fewer rows because it represents the subset of events retrieved from the index that matched the search terms "sourcetype=syslog ERROR" from search command 1230. By way of further example, instead of a search step, the set of events at the head of the pipeline may be generating by a call to a pre-existing inverted index (as will be explained later).

At block 1242, the set of events generated in the first part of the query may be piped to a query that searches the set of events for field-value pairs or for keywords. For example, the second intermediate results table 1226 shows fewer columns, representing the result of the top command, "top user" which summarizes the events into a list of the top 10 users and displays the user, count, and percentage.

Finally, at block 1244, the results of the prior stage can be pipelined to another stage where further filtering or processing of the data can be performed, e.g., preparing the data for display purposes, filtering the data based on a condition, performing a mathematical calculation with the data, etc. As shown in FIG. 12B, the "fields-percent" part of command 1230 removes the column that shows the percentage, thereby, leaving a final results table 1228 without a percentage column. In different embodiments, other query languages, such as the Structured Query Language ("SQL"), can be used to create a query.

4.7. Field Extraction

The query system 214 allows users to search and visualize events generated from machine data received from heterogeneous data sources. The query system 214 also allows users to search and visualize events generated from machine data received from heterogeneous data sources. The query system 214 includes various components for processing a query, such as, but not limited to a query system manager 502, one or more search heads 504 having one or more search masters 512 and search managers 514, and one or more search nodes 506. A query language may be used to create a query, such as any suitable pipelined query language. For example, Splunk Processing Language (SPL) can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, a search head 504 (e.g., a search master 512 or search manager 514) can use extraction rules to extract values for fields in the events being searched. The search head 504 can obtain extraction rules that specify how to extract a value for fields from an event. Extraction rules can comprise regex rules that specify how to extract values for the fields corresponding to the extraction rules. In addition to specifying how to extract field values, the extraction rules may also include instructions for deriving a field value by performing a function on a character string or value retrieved by the extraction rule. For example, an extraction rule may truncate a character string or convert the character string into a different data format. In some cases, the query itself can specify one or more extraction rules.

The search head 504 can apply the extraction rules to events that it receives from search nodes 506. The search nodes 506 may apply the extraction rules to events in an associated data store or common storage 216. Extraction rules can be applied to all the events in a data store or common storage 216 or to a subset of the events that have been filtered based on some criteria (e.g., event time stamp values, etc.). Extraction rules can be used to extract one or more values for a field from events by parsing the portions of machine data in the events and examining the data for one or more patterns of characters, numbers, delimiters, etc., that indicate where the field begins and, optionally, ends.

Figure 13A:
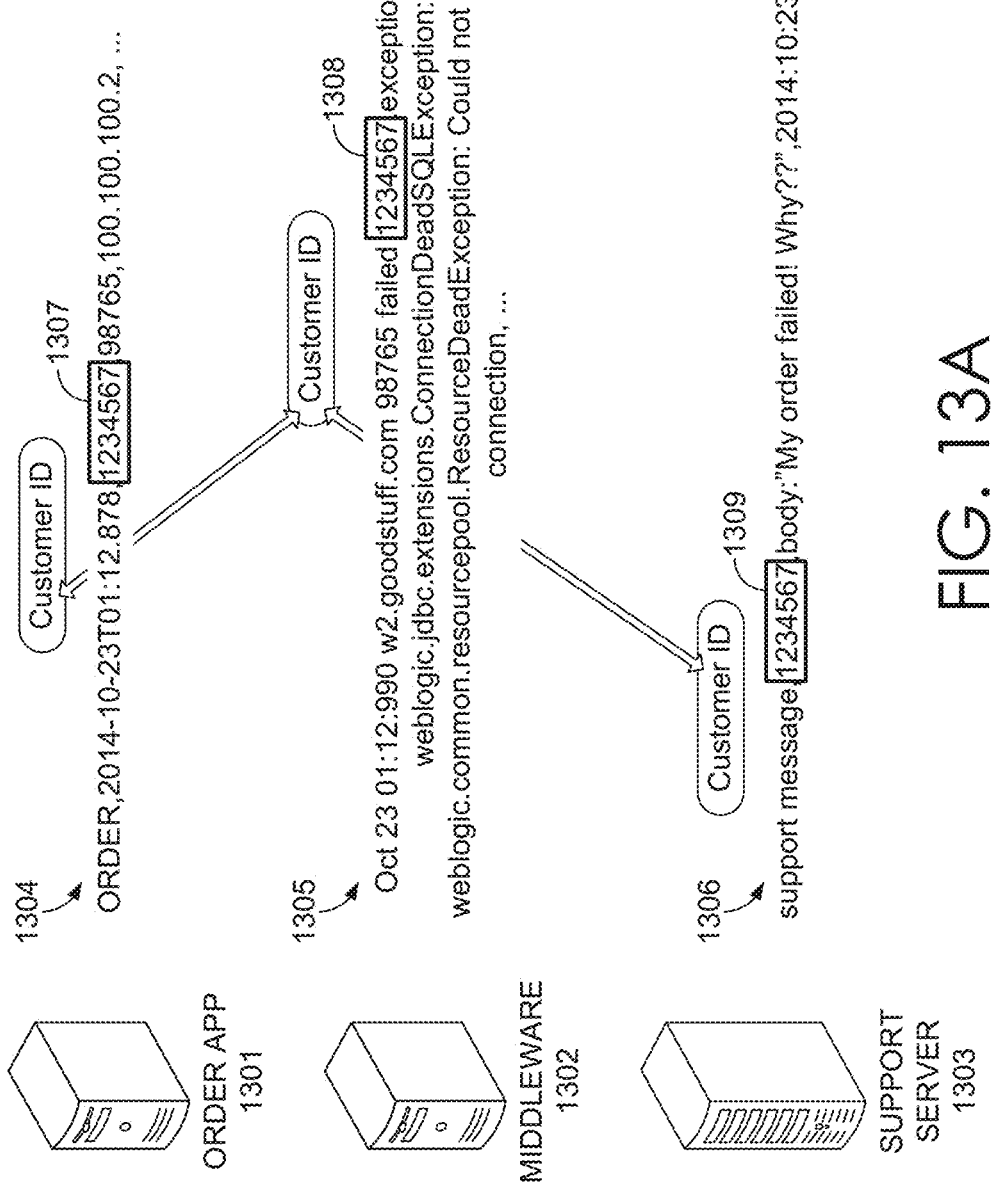
FIG. 13A is a diagram of an example scenario where a common customer identifier is found among log data received from three disparate data sources, in accordance with example embodiments.

FIG. 13A is a diagram of an example scenario where a common customer identifier is found among log data received from three disparate data sources, in accordance with example embodiments. In this example, a user submits an order for merchandise using a vendor's shopping application program 1301 running on the user's system. In this example, the order was not delivered to the vendor's server due to a resource exception at the destination server that is detected by the middleware code 1302. The user then sends a message to the customer support server 1303 to complain about the order failing to complete. The three systems 1301, 1302, and 1303 are disparate systems that do not have a common logging format. The order application 1301 sends log data 1304 to the data intake and query system 108 in one format, the middleware code 1302 sends error log data 1305 in a second format, and the support server 1303 sends log data 1306 in a third format.

Using the log data received at the data intake and query system 108 from the three systems, the vendor can uniquely obtain an insight into user activity, user experience, and system behavior. The query system 214 allows the vendor's administrator to search the log data from the three systems, thereby obtaining correlated information, such as the order number and corresponding customer ID number of the person placing the order. The system also allows the administrator to see a visualization of related events via a user interface. The administrator can query the query system 214 for customer ID field value matches across the log data from the three systems that are stored in common storage 216. The customer ID field value exists in the data gathered from the three systems, but the customer ID field value may be located in different areas of the data given differences in the architecture of the systems. There is a semantic relationship between the customer ID field values generated by the three systems. The query system 214 requests events from the one or more data stores 218 to gather relevant events from the three systems. The search head 504 then applies extraction rules to the events in order to extract field values that it can correlate. The search head 504 may apply a different extraction rule to each set of events from each system when the event format differs among systems. In this example, the user interface can display to the administrator the events corresponding to the common customer ID field values 1307, 1308, and 1309, thereby providing the administrator with insight into a customer's experience.

Note that query results can be returned to a client, a search head 504, or any other system component for further processing. In general, query results may include a set of one or more events, a set of one or more values obtained from the events, a subset of the values, statistics calculated based on the values, a report containing the values, a visualization (e.g., a graph or chart) generated from the values, and the like.

Figure 13B:
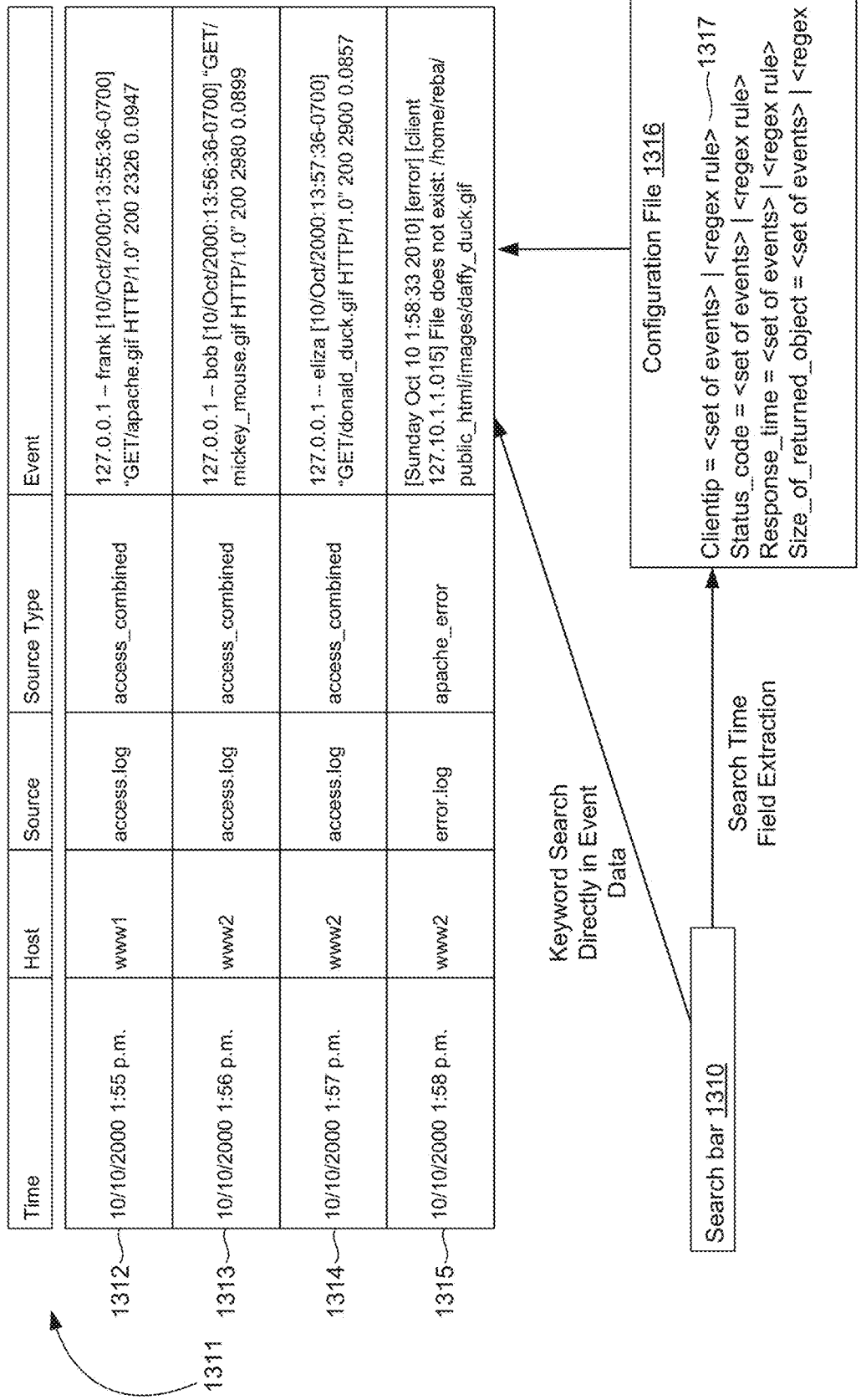
FIG. 13B illustrates an example of processing keyword searches and field searches, in accordance with disclosed embodiments.

The query system 214 enables users to run queries against the stored data to retrieve events that meet criteria specified in a query, such as containing certain keywords or having specific values in defined fields. FIG. 13B illustrates the manner in which keyword searches and field searches are processed in accordance with disclosed embodiments.

If a user inputs a search query into search bar 1310 that includes only keywords (also known as "tokens"), e.g., the keyword "error" or "warning", the query system 214 of the data intake and query system 108 can search for those keywords directly in the event data 1311 stored in the raw record data store. Note that while FIG. 13B only illustrates four events 1312, 1313, 1314, 1315, the raw record data store (corresponding to data store 208 in FIG. 2) may contain records for millions of events.

As disclosed above, the indexing system 212 can optionally generate a keyword index to facilitate fast keyword searching for event data. The indexing system 212 can include the identified keywords in an index, which associates each stored keyword with reference pointers to events containing that keyword (or to locations within events where that keyword is located, other location identifiers, etc.). When the query system 214 subsequently receives a keyword-based query, the query system 214 can access the keyword index to quickly identify events containing the keyword. For example, if the keyword "HTTP" was indexed by the indexing system 212 at index time, and the user searches for the keyword "HTTP", the events 1312, 1313, and 1314, will be identified based on the results returned from the keyword index. As noted above, the index contains reference pointers to the events containing the keyword, which allows for efficient retrieval of the relevant events from the raw record data store.

If a user searches for a keyword that has not been indexed by the indexing system 212, the data intake and query system 108 may nevertheless be able to retrieve the events by searching the event data for the keyword in the raw record data store directly as shown in FIG. 13B. For example, if a user searches for the keyword "frank", and the name "frank" has not been indexed at search time, the query system 214 can search the event data directly and return the first event 1312. Note that whether the keyword has been indexed at index time or search time or not, in both cases the raw data with the events 1311 is accessed from the raw data record store to service the keyword search. In the case where the keyword has been indexed, the index will contain a reference pointer that will allow for a more efficient retrieval of the event data from the data store. If the keyword has not been indexed, the query system 214 can search through the records in the data store to service the search.

In most cases, however, in addition to keywords, a user's search will also include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the search, "status=404". This search query finds events with "status" fields that have a value of "404." When the search is run, the query system 214 does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "November 15 09:33:22 evaemerson."

The data intake and query system 108 advantageously allows for search time field extraction. In other words, fields can be extracted from the event data at search time using late-binding schema as opposed to at data ingestion time, which was a major limitation of the prior art systems.

In response to receiving the search query, a search head 504 of the query system 214 can use extraction rules to extract values for the fields associated with a field or fields in the event data being searched. The search head 504 can obtain extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

FIG. 13B illustrates the manner in which configuration files may be used to configure custom fields at search time in accordance with the disclosed embodiments. In response to receiving a search query, the data intake and query system 108 determines if the query references a "field." For example, a query may request a list of events where the "clientip" field equals "127.0.0.1." If the query itself does not specify an extraction rule and if the field is not a metadata field, e.g., time, host, source, source type, etc., then in order to determine an extraction rule, the query system 214 may, in one or more embodiments, need to locate configuration file 1316 during the execution of the search as shown in FIG. 13B.

Configuration file 1316 may contain extraction rules for all the various fields that are not metadata fields, e.g., the "clientip" field. The extraction rules may be inserted into the configuration file in a variety of ways. In some embodiments, the extraction rules can comprise regular expression rules that are manually entered in by the user. Regular expressions match patterns of characters in text and are used for extracting custom fields in text.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system can then generate a regular expression that extracts those fields from similar events and store the regular expression as an extraction rule for the associated field in the configuration file 1316.

In some embodiments, the indexing system 212 can automatically discover certain custom fields at index time and the regular expressions for those fields will be automatically generated at index time and stored as part of extraction rules in configuration file 1316. For example, fields that appear in the event data as "key=value" pairs may be automatically extracted as part of an automatic field discovery process. Note that there may be several other ways of adding field definitions to configuration files in addition to the methods discussed herein.

The search head 504 can apply the extraction rules derived from configuration file 1316 to event data that it receives from search nodes 506. The search nodes 506 may apply the extraction rules from the configuration file to events in an associated data store or common storage 216. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

In one more embodiments, the extraction rule in configuration file 1316 will also need to define the type or set of events that the rule applies to. Because the raw record data store will contain events from multiple heterogeneous sources, multiple events may contain the same fields in different locations because of discrepancies in the format of the data generated by the various sources. Furthermore, certain events may not contain a particular field at all. For example, event 1315 also contains "clientip" field, however, the "clientip" field is in a different format from events 1312, 1313, and 1314. To address the discrepancies in the format and content of the different types of events, the configuration file will also need to specify the set of events that an extraction rule applies to, e.g., extraction rule 1317 specifies a rule for filtering by the type of event and contains a regular expression for parsing out the field value. Accordingly, each extraction rule can pertain to only a particular type of event. If a particular field, e.g., "clientip" occurs in multiple types of events, each of those types of events can have its own corresponding extraction rule in the configuration file 1316 and each of the extraction rules would comprise a different regular expression to parse out the associated field value. The most common way to categorize events is by source type because events generated by a particular source can have the same format.

The field extraction rules stored in configuration file 1316 perform search-time field extractions. For example, for a query that requests a list of events with source type "access_combined" where the "clientip" field equals "127.0.0.1," the query system 214 can first locate the configuration file 1316 to retrieve extraction rule 1317 that allows it to extract values associated with the "clientip" field from the event data 1320 "where the source type is "access_combined. After the "clientip" field has been extracted from all the events comprising the "clientip" field where the source type is "access_combined," the query system 214 can then execute the field criteria by performing the compare operation to filter out the events where the "clientip" field equals "127.0.0.1." In the example shown in FIG. 13B, the events 1312, 1313, and 1314 would be returned in response to the user query. In this manner, the query system 214 can service queries containing field criteria in addition to queries containing keyword criteria (as explained above).

In some embodiments, the configuration file 1316 can be created during indexing. It may either be manually created by the user or automatically generated with certain predetermined field extraction rules. As discussed above, the events may be distributed across several data stores in common storage 216, wherein various indexing nodes 404 may be responsible for storing the events in the common storage 216 and various search nodes 506 may be responsible for searching the events contained in common storage 216.

The ability to add schema to the configuration file at search time results in increased efficiency. A user can create new fields at search time and simply add field definitions to the configuration file. As a user learns more about the data in the events, the user can continue to refine the late-binding schema by adding new fields, deleting fields, or modifying the field extraction rules in the configuration file for use the next time the schema is used by the system. Because the data intake and query system 108 maintains the underlying raw data and uses late-binding schema for searching the raw data, it enables a user to continue investigating and learn valuable insights about the raw data long after data ingestion time.

The ability to add multiple field definitions to the configuration file at search time also results in increased flexibility. For example, multiple field definitions can be added to the configuration file to capture the same field across events generated by different source types. This allows the data intake and query system 108 to search and correlate data across heterogeneous sources flexibly and efficiently.

Further, by providing the field definitions for the queried fields at search time, the configuration file 1316 allows the record data store to be field searchable. In other words, the raw record data store can be searched using keywords as well as fields, wherein the fields are searchable name/value pairings that distinguish one event from another and can be defined in configuration file 1316 using extraction rules. In comparison to a search containing field names, a keyword search does not need the configuration file and can search the event data directly as shown in FIG. 13B.

It should also be noted that any events filtered out by performing a search-time field extraction using a configuration file 1316 can be further processed by directing the results of the filtering step to a processing step using a pipelined search language. Using the prior example, a user can pipeline the results of the compare step to an aggregate function by asking the query system 214 to count the number of events where the "clientip" field equals "127.0.0.1."

4.8. Data Models

A data model is a hierarchically structured search-time mapping of semantic knowledge about one or more datasets. It encodes the domain knowledge used to build a variety of specialized searches of those datasets. Those searches, in turn, can be used to generate reports.

A data model is composed of one or more "objects" (or "data model objects") that define or otherwise correspond to a specific set of data. An object is defined by constraints and attributes. An object's constraints are search criteria that define the set of events to be operated on by running a search having that search criteria at the time the data model is selected. An object's attributes are the set of fields to be exposed for operating on that set of events generated by the search criteria.

Objects in data models can be arranged hierarchically in parent/child relationships. Each child object represents a subset of the dataset covered by its parent object. The top-level objects in data models are collectively referred to as "root objects."

Child objects have inheritance. Child objects inherit constraints and attributes from their parent objects and may have additional constraints and attributes of their own. Child objects provide a way of filtering events from parent objects. Because a child object may provide an additional constraint in addition to the constraints it has inherited from its parent object, the dataset it represents may be a subset of the dataset that its parent represents. For example, a first data model object may define a broad set of data pertaining to e-mail activity generally, and another data model object may define specific datasets within the broad dataset, such as a subset of the e-mail data pertaining specifically to e-mails sent. For example, a user can simply select an "e-mail activity" data model object to access a dataset relating to e-mails generally (e.g., sent or received), or select an "e-mails sent" data model object (or data sub-model object) to access a dataset relating to e-mails sent.

Because a data model object is defined by its constraints (e.g., a set of search criteria) and attributes (e.g., a set of fields), a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. A user can iteratively applies a model development tool to prepare a query that defines a subset of events and assigns an object name to that subset. A child subset is created by further limiting a query that generated a parent subset.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. Pat. No. 9,128,980, entitled "GENERATION OF A DATA MODEL APPLIED TO QUERIES", issued on 8 Sep. 2015, and U.S. Pat. No. 9,589,012, entitled "GENERATION OF A DATA MODEL APPLIED TO OBJECT QUERIES", issued on 7 Mar. 2017, each of which is hereby incorporated by reference in its entirety for all purposes.

A data model can also include reports. One or more report formats can be associated with a particular data model and be made available to run against the data model. A user can use child objects to design reports with object datasets that already have extraneous data pre-filtered out. In some embodiments, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes. Data visualizations also can be generated in a variety of formats, by reference to the data model. Reports, data visualizations, and data model objects can be saved and associated with the data model for future use. The data model object may be used to perform searches of other data, generate reports, etc. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

4.9. Acceleration Techniques

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, the data intake and query system 108 also employs a number of unique acceleration techniques that have been developed to speed up analysis operations performed at search time. These techniques include: (1) performing search operations in parallel using multiple search nodes 506; (2) using a keyword index; (3) using a high performance analytics store; and (4) accelerating the process of generating reports. These novel techniques are described in more detail below.

4.9.1. Aggregation Technique

Figure 14:
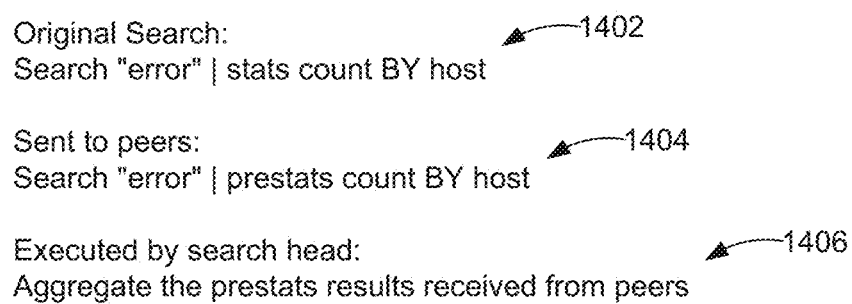
FIG. 14 is an example search query received from a client and executed by search peers, in accordance with example embodiments.

To facilitate faster query processing, a query can be structured such that multiple search nodes 506 perform the query in parallel, while aggregation of search results from the multiple search nodes 506 is performed at the search head 504. For example, FIG. 14 is an example search query received from a client and executed by search nodes 506, in accordance with example embodiments. FIG. 14 illustrates how a search query 1402 received from a client at a search head 504 can split into two phases, including: (1) subtasks 1404 (e.g., data retrieval or simple filtering) that may be performed in parallel by search nodes 506 for execution, and (2) a search results aggregation operation 1406 to be executed by the search head 504 when the results are ultimately collected from the search nodes 506.

During operation, upon receiving search query 1402, a search head 504 determines that a portion of the operations involved with the search query may be performed locally by the search head 504. The search head 504 modifies search query 1402 by substituting "stats" (create aggregate statistics over results sets received from the search nodes 506 at the search head 504) with "prestats" (create statistics by the search node 506 from local results set) to produce search query 1404, and then distributes search query 1404 to distributed search nodes 506, which are also referred to as "search peers" or "peer search nodes." Note that search queries may generally specify search criteria or operations to be performed on events that meet the search criteria. Search queries may also specify field names, as well as search criteria for the values in the fields or operations to be performed on the values in the fields. Moreover, the search head 504 may distribute the full search query to the search peers, or may alternatively distribute a modified version (e.g., a more restricted version) of the search query to the search peers. In this example, the search nodes 506 are responsible for producing the results and sending them to the search head 504. After the search nodes 506 return the results to the search head 504, the search head 504 aggregates the received results 1406 to form a single search result set. By executing the query in this manner, the system effectively distributes the computational operations across the search nodes 506 while minimizing data transfers.

4.9.2. Keyword Index

As described herein, the data intake and query system 108 can construct and maintain one or more keyword indexes to quickly identify events containing specific keywords. This technique can greatly speed up the processing of queries involving specific keywords. As mentioned above, to build a keyword index, an indexing node 404 first identifies a set of keywords. Then, the indexing node 404 includes the identified keywords in an index, which associates each stored keyword with references to events containing that keyword, or to locations within events where that keyword is located. When the query system 214 subsequently receives a keyword-based query, the indexer can access the keyword index to quickly identify events containing the keyword.

4.9.3. High Performance Analytics Store

To speed up certain types of queries, some embodiments of data intake and query system 108 create a high performance analytics store, which is referred to as a "summarization table," that contains entries for specific field-value pairs. Each of these entries keeps track of instances of a specific value in a specific field in the events and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a summarization table for the common storage 216, one or more data stores 218 of the common storage 216, buckets cached on a search node 506, etc. The different summarization tables can include entries for the events in the common storage 216, certain data stores 218 in the common storage 216, or data stores associated with a particular search node 506, etc.

The summarization table can be populated by miming a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", issued on 8 Sep. 2015, and U.S. patent application Ser. No. 14/815,973, entitled "GENERATING AND STORING SUMMARIZATION TABLES FOR SETS OF SEARCHABLE EVENTS", filed on 1 Aug. 2015, each of which is hereby incorporated by reference in its entirety for all purposes.

To speed up certain types of queries, e.g., frequently encountered queries or computationally intensive queries, some embodiments of data intake and query system 108 create a high performance analytics store, which is referred to as a "summarization table," (also referred to as a "lexicon" or "inverted index") that contains entries for specific field-value pairs. Each of these entries keeps track of instances of a specific value in a specific field in the event data and includes references to events containing the specific value in the specific field. For example, an example entry in an inverted index can keep track of occurrences of the value "94107" in a "ZIP code" field of a set of events and the entry includes references to all of the events that contain the value "94107" in the ZIP code field. Creating the inverted index data structure avoids needing to incur the computational overhead each time a statistical query needs to be run on a frequently encountered field-value pair. In order to expedite queries, in certain embodiments, the query system 214 can employ the inverted index separate from the raw record data store to generate responses to the received queries.

Note that the term "summarization table" or "inverted index" as used herein is a data structure that may be generated by the indexing system 212 that includes at least field names and field values that have been extracted and/or indexed from event records. An inverted index may also include reference values that point to the location(s) in the field searchable data store where the event records that include the field may be found. Also, an inverted index may be stored using various compression techniques to reduce its storage size.

Further, note that the term "reference value" (also referred to as a "posting value") as used herein is a value that references the location of a source record in the field searchable data store. In some embodiments, the reference value may include additional information about each record, such as timestamps, record size, meta-data, or the like. Each reference value may be a unique identifier which may be used to access the event data directly in the field searchable data store. In some embodiments, the reference values may be ordered based on each event record's timestamp. For example, if numbers are used as identifiers, they may be sorted so event records having a later timestamp always have a lower valued identifier than event records with an earlier timestamp, or vice-versa. Reference values are often included in inverted indexes for retrieving and/or identifying event records.

In one or more embodiments, an inverted index is generated in response to a user-initiated collection query. The term "collection query" as used herein refers to queries that include commands that generate summarization information and inverted indexes (or summarization tables) from event records stored in the field searchable data store.

Note that a collection query is a special type of query that can be user-generated and is used to create an inverted index. A collection query is not the same as a query that is used to call up or invoke a pre-existing inverted index. In one or more embodiments, a query can comprise an initial step that calls up a pre-generated inverted index on which further filtering and processing can be performed. For example, referring back to FIG. 12B, a set of events can be generated at block 1240 by either using a "collection" query to create a new inverted index or by calling up a pre-generated inverted index. A query with several pipelined steps will start with a pre-generated index to accelerate the query.

FIG. 13C illustrates the manner in which an inverted index is created and used in accordance with the disclosed embodiments. As shown in FIG. 13C, an inverted index 1322 can be created in response to a user-initiated collection query using the event data 1323 stored in the raw record data store. For example, a non-limiting example of a collection query may include "collect clientip=127.0.0.1" which may result in an inverted index 1322 being generated from the event data 1323 as shown in FIG. 13C. Each entry in inverted index 1322 includes an event reference value that references the location of a source record in the field searchable data store. The reference value may be used to access the original event record directly from the field searchable data store.

In one or more embodiments, if one or more of the queries is a collection query, the one or more search nodes 506 may generate summarization information based on the fields of the event records located in the field searchable data store. In at least one of the various embodiments, one or more of the fields used in the summarization information may be listed in the collection query and/or they may be determined based on terms included in the collection query. For example, a collection query may include an explicit list of fields to summarize. Or, in at least one of the various embodiments, a collection query may include terms or expressions that explicitly define the fields, e.g., using regex rules. In FIG. 13C, prior to running the collection query that generates the inverted index 1322, the field name "clientip" may need to be defined in a configuration file by specifying the "access_combined" source type and a regular expression rule to parse out the client IP address. Alternatively, the collection query may contain an explicit definition for the field name "clientip" which may obviate the need to reference the configuration file at search time.

In one or more embodiments, collection queries may be saved and scheduled to run periodically. These scheduled collection queries may periodically update the summarization information corresponding to the query. For example, if the collection query that generates inverted index 1322 is scheduled to run periodically, one or more search nodes 506 can periodically search through the relevant buckets to update inverted index 1322 with event data for any new events with the "clientip" value of "127.0.0.1."

In some embodiments, the inverted indexes that include fields, values, and reference value (e.g., inverted index 1322) for event records may be included in the summarization information provided to the user. In other embodiments, a user may not be interested in specific fields and values contained in the inverted index, but may need to perform a statistical query on the data in the inverted index. For example, referencing the example of FIG. 13C rather than viewing the fields within the inverted index 1322, a user may want to generate a count of all client requests from IP address "127.0.0.1." In this case, the query system 214 can simply return a result of "4" rather than including details about the inverted index 1322 in the information provided to the user.

The pipelined search language, e.g., SPL of the SPLUNK® ENTERPRISE system can be used to pipe the contents of an inverted index to a statistical query using the "stats" command for example. A "stats" query refers to queries that generate result sets that may produce aggregate and statistical results from event records, e.g., average, mean, max, min, rms, etc. Where sufficient information is available in an inverted index, a "stats" query may generate their result sets rapidly from the summarization information available in the inverted index rather than directly scanning event records. For example, the contents of inverted index 1322 can be pipelined to a stats query, e.g., a "count" function that counts the number of entries in the inverted index and returns a value of "4." In this way, inverted indexes may enable various stats queries to be performed absent scanning or search the event records. Accordingly, this optimization technique enables the system to quickly process queries that seek to determine how many events have a particular value for a particular field. To this end, the system can examine the entry in the inverted index to count instances of the specific value in the field without having to go through the individual events or perform data extractions at search time.

In some embodiments, the system maintains a separate inverted index for each of the above-described time-specific buckets that stores events for a specific time range. A bucket-specific inverted index includes entries for specific field-value combinations that occur in events in the specific bucket. Alternatively, the system can maintain a separate inverted index for one or more data stores 218 of common storage 216, an indexing node 404, or a search node 506. The specific inverted indexes can include entries for the events in the one or more data stores 218 or data store associated with the indexing nodes 404 or search node 506. In some embodiments, if one or more of the queries is a stats query, a search node 506 can generate a partial result set from previously generated summarization information. The partial result sets may be returned to the search head 504 that received the query and combined into a single result set for the query As mentioned above, the inverted index can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination. In some embodiments, if summarization information is absent from a search node 506 that includes responsive event records, further actions may be taken, such as, the summarization information may be generated on the fly, warnings may be provided the user, the collection query operation may be halted, the absence of summarization information may be ignored, or the like, or combination thereof.

In one or more embodiments, an inverted index may be set up to update continually. For example, the query may ask for the inverted index to update its result periodically, e.g., every hour. In such instances, the inverted index may be a dynamic data structure that is regularly updated to include information regarding incoming events.

4.9.3.1. Extracting Event Data Using Posting

In one or more embodiments, if the system needs to process all events that have a specific field-value combination, the system can use the references in the inverted index entry to directly access the events to extract further information without having to search all of the events to find the specific field-value combination at search time. In other words, the system can use the reference values to locate the associated event data in the field searchable data store and extract further information from those events, e.g., extract further field values from the events for purposes of filtering or processing or both.

The information extracted from the event data using the reference values can be directed for further filtering or processing in a query using the pipeline search language. The pipelined search language will, in one embodiment, include syntax that can direct the initial filtering step in a query to an inverted index. In one embodiment, a user would include syntax in the query that explicitly directs the initial searching or filtering step to the inverted index.

Referencing the example in FIG. 11C, if the user determines that she needs the user id fields associated with the client requests from IP address "127.0.0.1," instead of incurring the computational overhead of performing a brand new search or re-generating the inverted index with an additional field, the user can generate a query that explicitly directs or pipes the contents of the already generated inverted index 1322 to another filtering step requesting the user ids for the entries in inverted index 1322 where the server response time is greater than "0.0900" microseconds. The query system 214 can use the reference values stored in inverted index 1322 to retrieve the event data from the field searchable data store, filter the results based on the "response time" field values and, further, extract the user id field from the resulting event data to return to the user. In the present instance, the user ids "frank" and "eliza" would be returned to the user from the generated results table 1325.

In one embodiment, the same methodology can be used to pipe the contents of the inverted index to a processing step. In other words, the user is able to use the inverted index to efficiently and quickly perform aggregate functions on field values that were not part of the initially generated inverted index. For example, a user may want to determine an average object size (size of the requested gif) requested by clients from IP address "127.0.0.1." In this case, the query system 214 can again use the reference values stored in inverted index 1322 to retrieve the event data from the field searchable data store and, further, extract the object size field values from the associated events 1331, 1332, 1333 and 1334. Once, the corresponding object sizes have been extracted (i.e. 2326, 2900, 2920, and 5000), the average can be computed and returned to the user.

In one embodiment, instead of explicitly invoking the inverted index in a user-generated query, e.g., by the use of special commands or syntax, the SPLUNK® ENTERPRISE system can be configured to automatically determine if any prior-generated inverted index can be used to expedite a user query. For example, the user's query may request the average object size (size of the requested gif) requested by clients from IP address "127.0.0.1." without any reference to or use of inverted index 1322. The query system 214, in this case, can automatically determine that an inverted index 1322 already exists in the system that could expedite this query. In one embodiment, prior to running any search comprising a field-value pair, for example, a query system 214 can search though all the existing inverted indexes to determine if a pre-generated inverted index could be used to expedite the search comprising the field-value pair. Accordingly, the query system 214 can automatically use the pre-generated inverted index, e.g., index 1322 to generate the results without any user-involvement that directs the use of the index.

Using the reference values in an inverted index to be able to directly access the event data in the field searchable data store and extract further information from the associated event data for further filtering and processing is highly advantageous because it avoids incurring the computation overhead of regenerating the inverted index with additional fields or performing a new search.

The data intake and query system 108 includes an intake system 210 that receives data from a variety of input data sources, and an indexing system 212 that processes and stores the data in one or more data stores or common storage 216. By distributing events among the data stores 218 of common storage 213, the query system 214 can analyze events for a query in parallel. In some embodiments, the data intake and query system 108 can maintain a separate and respective inverted index for each of the above-described time-specific buckets that stores events for a specific time range. A bucket-specific inverted index includes entries for specific field-value combinations that occur in events in the specific bucket. As explained above, a search head 504 can correlate and synthesize data from across the various buckets and search nodes 506.

This feature advantageously expedites searches because instead of performing a computationally intensive search in a centrally located inverted index that catalogues all the relevant events, a search node 506 is able to directly search an inverted index stored in a bucket associated with the time-range specified in the query. This allows the search to be performed in parallel across the various search nodes 506. Further, if the query requests further filtering or processing to be conducted on the event data referenced by the locally stored bucket-specific inverted index, the search node 506 is able to simply access the event records stored in the associated bucket for further filtering and processing instead of needing to access a central repository of event records, which would dramatically add to the computational overhead.

In one embodiment, there may be multiple buckets associated with the time-range specified in a query. If the query is directed to an inverted index, or if the query system 214 automatically determines that using an inverted index can expedite the processing of the query, the search nodes 506 can search through each of the inverted indexes associated with the buckets for the specified time-range. This feature allows the High Performance Analytics Store to be scaled easily.

Figure 13D:
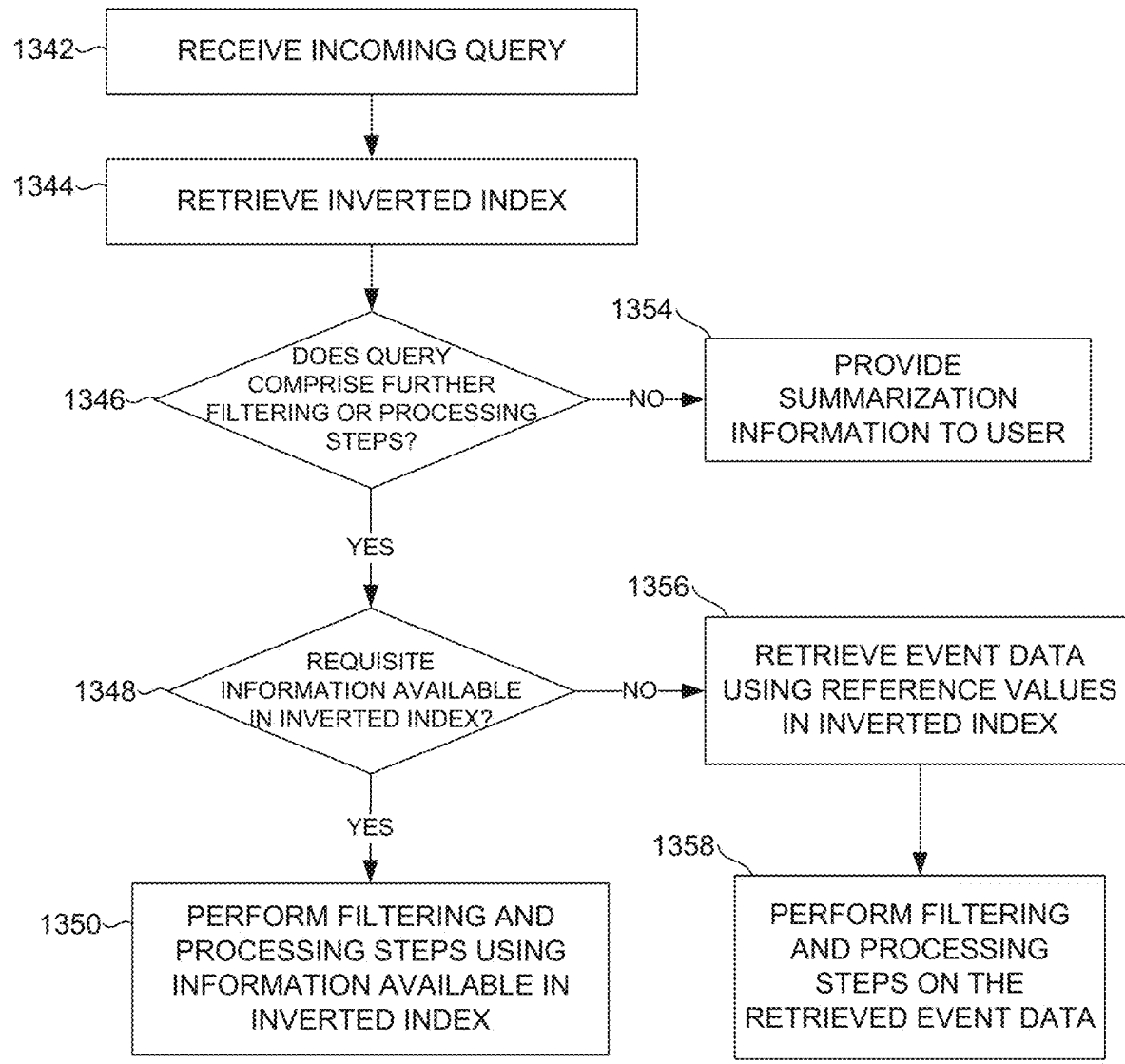
FIG. 13D is a flow diagram of an example use of an inverted index in a pipelined search query, in accordance with example embodiments.

FIG. 13D is a flow diagram illustrating an embodiment of a routine implemented by one or more computing devices of the data intake and query system for using an inverted index in a pipelined search query to determine a set of event data that can be further limited by filtering or processing. For example, the routine can be implemented by any one or any combination of the search head 504, search node 506, search master 512, or search manager 514, etc. However, for simplicity, reference below is made to the query system 214 performing the various steps of the routine.

At block 1342, a query is received by a data intake and query system 108. In some embodiments, the query can be received as a user generated query entered into search bar of a graphical user search interface. The search interface also includes a time range control element that enables specification of a time range for the query.

At block 1344, an inverted index is retrieved. Note, that the inverted index can be retrieved in response to an explicit user search command inputted as part of the user generated query. Alternatively, a query system 214 can be configured to automatically use an inverted index if it determines that using the inverted index would expedite the servicing of the user generated query. Each of the entries in an inverted index keeps track of instances of a specific value in a specific field in the event data and includes references to events containing the specific value in the specific field. In order to expedite queries, in some embodiments, the query system 214 employs the inverted index separate from the raw record data store to generate responses to the received queries.

At block 1346, the query system 214 determines if the query contains further filtering and processing steps. If the query contains no further commands, then, in one embodiment, summarization information can be provided to the user at block 1354.

If, however, the query does contain further filtering and processing commands, then at block 1348, the query system 214 determines if the commands relate to further filtering or processing of the data extracted as part of the inverted index or whether the commands are directed to using the inverted index as an initial filtering step to further filter and process event data referenced by the entries in the inverted index. If the query can be completed using data already in the generated inverted index, then the further filtering or processing steps, e.g., a "count" number of records function, "average" number of records per hour etc. are performed and the results are provided to the user at block 1350.

If, however, the query references fields that are not extracted in the inverted index, the query system 214 can access event data pointed to by the reference values in the inverted index to retrieve any further information required at block 1356. Subsequently, any further filtering or processing steps are performed on the fields extracted directly from the event data and the results are provided to the user at step 1358.

4.9.4. Accelerating Report Generation

In some embodiments, a data server system such as the data intake and query system 108 can accelerate the process of periodically generating updated reports based on query results. To accelerate this process, a summarization engine can automatically examine the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period may only include events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query system 214 determines whether intermediate summaries have been generated covering portions of the time period covered by the report update. If so, then the report is generated based on the information contained in the summaries. Also, if additional event data has been received and has not yet been summarized, and is required to generate the complete report, the query can be run on these additional events. Then, the results returned by this query on the additional events, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer events needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety for all purposes.

4.10. Security Features

The data intake and query system 108 provides various schemas, dashboards, and visualizations that simplify developers' tasks to create applications with additional capabilities. One such application is an enterprise security application, such as SPLUNK® ENTERPRISE SECURITY, which performs monitoring and alerting operations and includes analytics to facilitate identifying both known and unknown security threats based on large volumes of data stored by the data intake and query system 108. The enterprise security application provides the security practitioner with visibility into security-relevant threats found in the enterprise infrastructure by capturing, monitoring, and reporting on data from enterprise security devices, systems, and applications. Through the use of the data intake and query system 108 searching and reporting capabilities, the enterprise security application provides a top-down and bottom-up view of an organization's security posture.

The enterprise security application can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. Pat. No. 9,215,240, entitled "INVESTIGATIVE AND DYNAMIC DETECTION OF POTENTIAL SECURITY-THREAT INDICATORS FROM EVENTS IN BIG DATA", issued on 15 Dec. 2015, U.S. Pat. No. 9,173,801, entitled "GRAPHIC DISPLAY OF SECURITY THREATS BASED ON INDICATIONS OF ACCESS TO NEWLY REGISTERED DOMAINS", issued on 3 Nov. 2015, U.S. Pat. No. 9,248,068, entitled "SECURITY THREAT DETECTION OF NEWLY REGISTERED DOMAINS", issued on 2 Feb. 2016, U.S. Pat. No. 9,426, 172, entitled "SECURITY THREAT DETECTION USING DOMAIN NAME ACCESSES", issued on 23 Aug. 2016, and U.S. Pat. No. 9,432,396, entitled "SECURITY THREAT DETECTION USING DOMAIN NAME REGISTRATIONS", issued on 30 Aug. 2016, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

Figure 15:
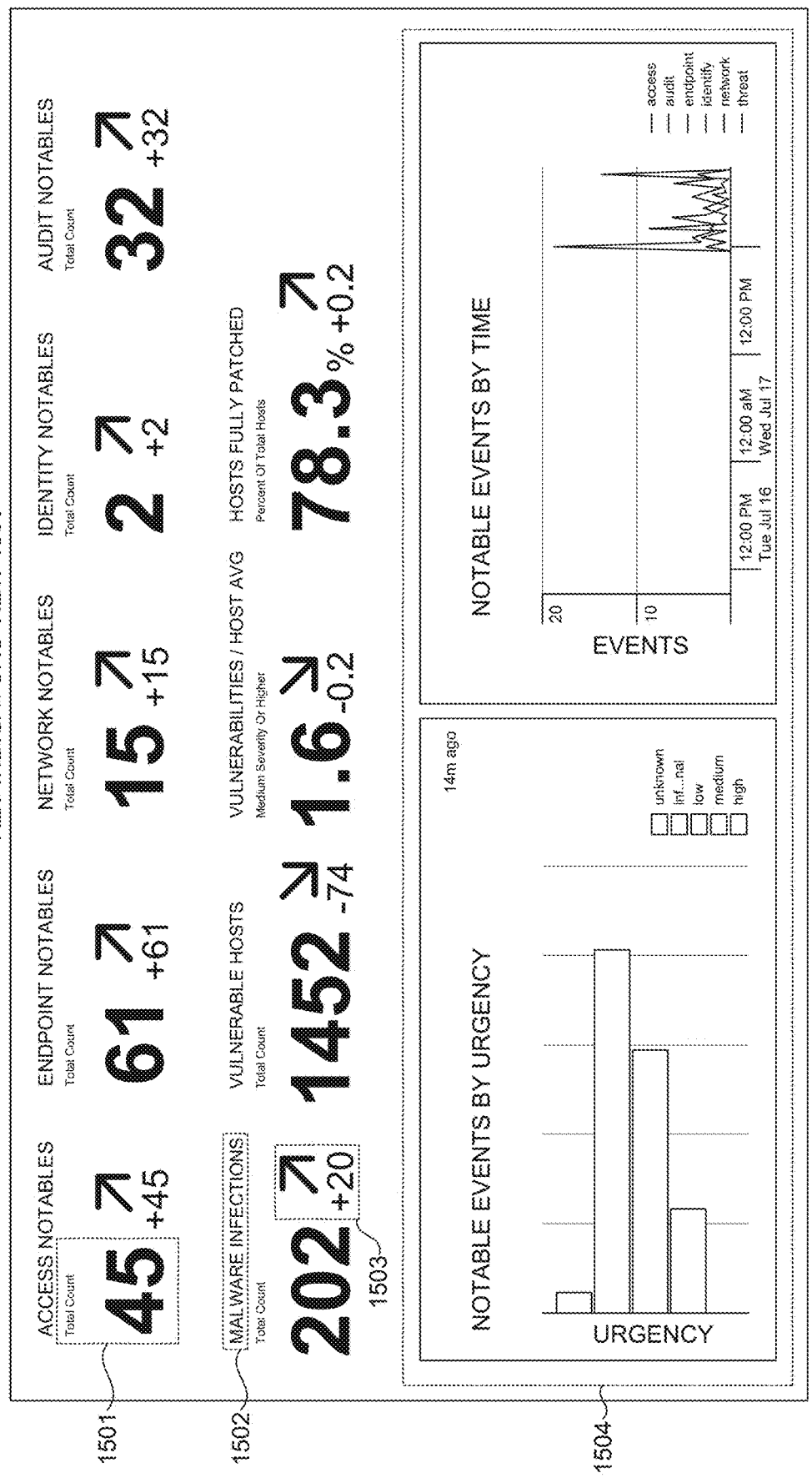
FIG. 15 is an interface diagram of an example user interface of a key indicators view, in accordance with example embodiments.

The enterprise security application provides various visualizations to aid in discovering security threats, such as a "key indicators view" that enables a user to view security metrics, such as counts of different types of notable events. For example, FIG. 15 illustrates an example key indicators view 1500 that comprises a dashboard, which can display a value 1501, for various security-related metrics, such as malware infections 1502. It can also display a change in a metric value 1503, which indicates that the number of malware infections increased by 63 during the preceding interval. Key indicators view 1500 additionally displays a histogram panel 1504 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes. Additional disclosure regarding the security features is described in U.S. application Ser. No. 16/512,899, incorporated by reference herein in its entirety.

4.11. Data Center Monitoring

As mentioned above, the data intake and query platform provides various features that simplify the developer's task to create various applications, including for data center monitoring. One such application is a virtual machine monitoring application, such as SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks. Additional disclosure regarding the data center monitoring is described in U.S. application Ser. No. 16/512,899, incorporated by reference herein in its entirety.

Additional disclosure regarding the use of performance metrics for data center monitoring is described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes. Additional disclosure regarding a proactive monitoring tree is described in further detail in U.S. Pat. No. 9,185,007, entitled "PROACTIVE MONITORING TREE WITH SEVERITY STATE SORTING", issued on 10 Nov. 2015, and U.S. Pat. No. 9,426,045, also entitled "PROACTIVE MONITORING TREE WITH SEVERITY STATE SORTING", issued on 23 Aug. 2016, each of which is hereby incorporated by reference in its entirety for all purposes. Additional disclosure regarding a user interface that can be used for data center monitoring is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

4.12. IT Service Monitoring

As previously mentioned, the data intake and query platform provides various schemas, dashboards and visualizations that make it easy for developers to create applications to provide additional capabilities. One such application is an IT monitoring application, such as SPLUNK® IT SERVICE INTELLIGENCE™, which performs monitoring and alerting operations. The IT monitoring application also includes analytics to help an analyst diagnose the root cause of performance problems based on large volumes of data stored by the data intake and query system 108 as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

Additional disclosure regarding IT Service Monitoring is described in U.S. application Ser. No. 16/512,899, incorporated by reference herein in its entirety.

4.13. Other Architectures

In view of the description above, it will be appreciated that the architecture disclosed herein, or elements of that architecture, may be implemented independently from, or in conjunction with, other architectures. For example, the Incorporated Applications disclose a variety of architectures wholly or partially compatible with the architecture of the present disclosure.

Generally speaking, one or more components of the data intake and query system 108 of the present disclosure can be used in combination with or to replace one or more components of the data intake and query system 108 of the Incorporated Applications. For example, depending on the embodiment, the operations of the forwarder 204 and the ingestion buffer 4802 of the Incorporated Applications can be performed by or replaced with the intake system 210 of the present disclosure. The parsing, indexing, and storing operations (or other non-searching operations) of the indexers 206, 230 and indexing cache components 254 of the Incorporated Applications can be performed by or replaced with the indexing nodes 404 of the present disclosure. The storage operations of the data stores 208 of the Incorporated Applications can be performed using the data stores 412 of the present disclosure (in some cases with the data not being moved to common storage 216). The storage operations of the common storage 4602, cloud storage 256, or global index 258 can be performed by the common storage 216 of the present disclosure. The storage operations of the query acceleration data store 3308 can be performed by the query acceleration data store 222 of the present disclosure.

As continuing examples, the search operations of the indexers 206, 230 and indexing cache components 254 of the Incorporated Applications can be performed by or replaced with the indexing nodes 404 in some embodiments or by the search nodes 506 in certain embodiments. For example, in some embodiments of certain architectures of the Incorporated Applications (e.g., one or more embodiments related to FIGS. 2, 3, 4, 18, 25, 27, 33, 46), the indexers 206, 230 and indexing cache components 254 of the Incorporated Applications may perform parsing, indexing, storing, and at least some searching operations, and in embodiments of some architectures of the Incorporated Applications (e.g., one more embodiments related to FIG. 48), indexers 206, 230 and indexing cache components 254 of the Incorporated Applications perform parsing, indexing, and storing operations, but do not perform searching operations. Accordingly, in some embodiments, some or all of the searching operations described as being performed by the indexers 206, 230 and indexing cache components 254 of the Incorporated Applications can be performed by the search nodes 506. For example, in embodiments described in the Incorporated Applications in which worker nodes 214, 236, 246, 3306 perform searching operations in place of the indexers 206, 230 or indexing cache components 254, the search nodes 506 can perform those operations. In certain embodiments, some or all of the searching operations described as being performed by the indexers 206, 230 and indexing cache components 254 of the Incorporated Applications can be performed by the indexing nodes 404. For example, in embodiments described in the Incorporated Applications in which the indexers 206, 230 and indexing cache components 254 perform searching operations, the indexing nodes 404 can perform those operations.

As a further example, the query operations performed by the search heads 210, 226, 244, daemons 210, 232, 252, search master 212, 234, 250, search process master 3302, search service provider 216, and query coordinator 3304 of the Incorporated Applications, can be performed by or replaced with any one or any combination of the query system manager 502, search head 504, search master 512, search manager 514, resource monitor 508, and/or the resource catalog 510. For example, these components can handle and coordinate the intake of queries, query processing, identification of available nodes and resources, resource allocation, query execution plan generation, assignment of query operations, combining query results, and providing query results to a user or a data store.

In certain embodiments, the query operations performed by the worker nodes 214, 236, 246, 3306 of the Incorporated Applications can be performed by or replaced with the search nodes 506 of the present disclosure. In some embodiments, the intake or ingestion operations performed by the worker nodes 214, 236, 246, 3306 of the Incorporated Applications can be performed by or replaced with one or more components of the intake system 210.

Furthermore, it will be understood that some or all of the components of the architectures of the Incorporated Applications can be replaced with components of the present disclosure. For example, in certain embodiments, the intake system 210 can be used in place of the forwarders 204 and/or ingestion buffer 4802 of one or more architectures of the Incorporated Applications, with all other components of the one or more architecture of the Incorporated Applications remaining the same. As another example, in some embodiments the indexing nodes 404 can replace the indexer 206 of one or more architectures of the Incorporated Applications with all other components of the one or more architectures of the Incorporated Applications remaining the same. Accordingly, it will be understood that a variety of architectures can be designed using one or more components of the data intake and query system 108 of the present disclosure in combination with one or more components of the data intake and query system 108 of the Incorporated Applications.

Illustratively, the architecture depicted at FIG. 2 of the Incorporated Applications may be modified to replace the forwarder 204 of that architecture with the intake system 210 of the present disclosure. In addition, in some cases, the indexers 206 of the Incorporated Applications can be replaced with the indexing nodes 404 of the present disclosure. In such embodiments, the indexing nodes 404 can retain the buckets in the data stores 412 that they create rather than store the buckets in common storage 216. Further, in the architecture depicted at FIG. 2 of the Incorporated Applications, the indexing nodes 404 of the present disclosure can be used to execute searches on the buckets stored in the data stores 412. In some embodiments, in the architecture depicted at FIG. 2 of the Incorporated Applications, the partition manager 408 can receive data from one or more forwarders 204 of the Incorporated Applications. As additional forwarders 204 are added or as additional data is supplied to the architecture depicted at FIG. 2 of the Incorporated Applications, the indexing node 404 can spawn additional partition manager 408 and/or the indexing manager system 402 can spawn additional indexing nodes 404. In addition, in certain embodiments, the bucket manager 414 may merge buckets in the data store 414 or be omitted from the architecture depicted at FIG. 2 of the Incorporated Applications.

Furthermore, in certain embodiments, the search head 210 of the Incorporated Applications can be replaced with the search head 504 of the present disclosure. In some cases, as described herein, the search head 504 can use the search master 512 and search manager 514 to process and manager the queries. However, rather than communicating with search nodes 506 to execute a query, the search head 504 can, depending on the embodiment, communicate with the indexers 206 of the Incorporated Applications or the search nodes 404 to execute the query.

Similarly, the architecture of FIG. 3 of the Incorporated Applications may be modified in a variety of ways to include one or more components of the data intake and query system 108 described herein. For example, the architecture of FIG. 3 of the Incorporated Applications may be modified to include an intake system 210 in accordance with the present disclosure within the cloud-based data intake and query system 1006 of the Incorporated Applications, which intake system 210 may logically include or communicate with the forwarders 204 of the Incorporated Applications. In addition, the indexing nodes 404 described herein may be utilized in place of or to implement functionality similar to the indexers described with reference to FIG. 3 of the Incorporated Applications. In addition, the architecture of FIG. 3 of the Incorporated Applications may be modified to include common storage 216 and/or search nodes 506.

With respect to the architecture of FIGS. 4A and/or 4B of the Incorporated Applications, the intake system 210 described herein may be utilized in place of or to implement functionality similar to either or both the forwarders 204 or the ERP processes 410 through 412 of the Incorporated Applications. Similarly, the indexing nodes 506 and the search head 504 described herein may be utilized in place of or to implement functionality similar to the indexer 206 and search head 210, respectively. In some cases, the search manager 514 described herein can manage the communications and interfacing between the indexer 206 and the ERP processes 410 through 412.

With respect to the flow diagrams and functionality described in FIGS. 5A-5C, 6A, 6B, 7A-7D, 8A, 8B, 9, 10, 11A-11D, 12-16, and 17A-17D of the Incorporated Applications, it will be understood that the processing and indexing operations described as being performed by the indexers 206 can be performed by the indexing nodes 404, the search operations described as being performed by the indexers 206 can be performed by the indexing nodes 404 or search nodes 506 (depending on the embodiment), and/or the searching operations described as being performed by the search head 210, can be performed by the search head 504 or other component of the query system 214.

With reference to FIG. 18 of the Incorporated Applications, the indexing nodes 404 and search heads 504 described herein may be utilized in place of or to implement functionality similar to the indexers 206 and search head 210, respectively. Similarly, the search master 512 and search manager 514 described herein may be utilized in place of or to implement functionality similar to the master 212 and the search service provider 216, respectively, described with respect to FIG. 18 of the Incorporated Applications. Further, the intake system 210 described herein may be utilized in place of or to implement ingestion functionality similar to the ingestion functionality of the worker nodes 214 of the Incorporated Applications. Similarly, the search nodes 506 described herein may be utilized in place of or to implement search functionality similar to the search functionality of the worker nodes 214 of the Incorporated Applications.

With reference to FIG. 25 of the Incorporated Applications, the indexing nodes 404 and search heads 504 described herein may be utilized in place of or to implement functionality similar to the indexers 236 and search heads 226, respectively. In addition, the search head 504 described herein may be utilized in place of or to implement functionality similar to the daemon 232 and the master 234 described with respect to FIG. 25 of the Incorporated Applications. The intake system 210 described herein may be utilized in place of or to implement ingestion functionality similar to the ingestion functionality of the worker nodes 214 of the Incorporated Applications. Similarly, the search nodes 506 described herein may be utilized in place of or to implement search functionality similar to the search functionality of the worker nodes 234 of the Incorporated Applications.

With reference to FIG. 27 of the Incorporated Applications, the indexing nodes 404 or search nodes 506 described herein may be utilized in place of or to implement functionality similar to the index cache components 254. For example, the indexing nodes 404 may be utilized in place of or to implement parsing, indexing, storing functionality of the index cache components 254, and the search nodes 506 described herein may be utilized in place of or to implement searching or caching functionality similar to the index cache components 254. In addition, the search head 504 described herein may be utilized in place of or to implement functionality similar to the search heads 244, daemon 252, and/or the master 250 described with respect to FIG. 27 of the Incorporated Applications. The intake system 210 described herein may be utilized in place of or to implement ingestion functionality similar to the ingestion functionality of the worker nodes 246 described with respect to FIG. 27 of the Incorporated Applications. Similarly, the search nodes 506 described herein may be utilized in place of or to implement search functionality similar to the search functionality of the worker nodes 234 described with respect to FIG. 27 of the Incorporated Applications. In addition, the common storage 216 described herein may be utilized in place of or to implement functionality similar to the functionality of the cloud storage 256 and/or global index 258 described with respect to FIG. 27 of the Incorporated Applications.

With respect to the architectures of FIGS. 33, 46, and 48 of the Incorporated Applications, the intake system 210 described herein may be utilized in place of or to implement functionality similar to the forwarders 204. In addition, the indexing nodes 404 of the present disclosure can perform the functions described as being performed by the indexers 206 (e.g., parsing, indexing, storing, and in some embodiments, searching) of the architectures of FIGS. 33, 46, and 48 of the Incorporated Applications; the operations of the acceleration data store 3308 of the architectures of FIGS. 33, 46, and 48 of the Incorporated Applications can be performed by the acceleration data store 222 of the present application; and the operations of the search head 210, search process maser 3302, and query coordinator 3304 of the architectures of FIGS. 33, 46, and 48 of the Incorporated Applications can be performed by the search head 504, resource catalog 510, and or resource monitor 508 of the present application. For example, the functionality of the workload catalog 3312 and node monitor 3314 of the architectures of FIGS. 33, 46, and 48 of the Incorporated Applications can be performed by the resource catalog 510 and resource monitor 508; the functionality of the search head 210 and other components of the search process master 3302 of the architectures of FIGS. 33, 46, and 48 of the Incorporated Applications can be performed by the search head 504 or search master 512; and the functionality of the query coordinator 3304 of the architectures of FIGS. 33, 46, and 48 of the Incorporated Applications can be performed by the search manager 514.

In addition, in some embodiments, the searching operations described as being performed by the worker nodes 3306 of the architectures of FIGS. 33, 46, and 48 of the Incorporated Applications can be performed by the search nodes 506 of the present application and the intake or ingestion operations performed by the worker nodes 3306 of the architectures of FIGS. 33, 46, and 48 of the Incorporated Applications can be performed by the intake system 210. However, it will be understood that in some embodiments, the search nodes 506 can perform the intake and search operations described in the Incorporated Applications as being performed by the worker nodes 3306. Furthermore, the cache manager 516 can implement one or more of the caching operations described in the Incorporated Applications with reference to the architectures of FIGS. 33, 46, and 48 of the Incorporated Applications.

With respect to FIGS. 46 and 48 of the Incorporated Applications, the common storage 216 of the present application can be used to provide the functionality with respect to the common storage 2602 of the architecture of FIGS. 46 and 48 of the Incorporated Applications. With respect to the architecture of FIG. 48 of the Incorporated Applications, the intake system 210 described herein may be utilized in place of or to implement operations similar to the forwarders 204 and ingested data buffer 4802, and may in some instances implement all or a portion of the operations described in that reference with respect to worker nodes 3306. Thus, the architecture of the present disclosure, or components thereof, may be implemented independently from or incorporated within architectures of the prior disclosures.

5.0. Data-Determinant Query Terms

The data intake and query system can execute queries on homogenous or heterogeneous data from the same or different data sources. As the query is executed and the data obtained and processed, portions or all of the records from the different data sources can form part of interim search results (described in greater detail below) or final search results. Similar to the data from which it originated, the records in the interim search results may be homogenous or heterogeneous. For example, the records of the interim search results may have the same or different structures (e.g., different fields, field identifiers, formats, etc.).

Executing query commands on or attempting to resolve the same query parameter for heterogeneous data can be difficult. For example, a user may be required to enter or provide different instructions for processing each type of heterogeneous data of the interim search results. This can be time consuming, increase the complexity of searching the data, increase the number of errors in processing the data, and/or cause the user to be unable to search the data. Furthermore, at the time of entering a query, the underlying structure of the data may not be known. As such, some of the data may be searched improperly or not searched.

To resolve this issue, the system can flexibly apply a query term depending on the structure of the data to which the query term is to be applied. For simplicity, the query term that is to be flexibly applied to data can be referred to as a data-determinant query term and the data to which a query term is to be applied, such as a data-determinant query term, can be referred to as parameter-applied data.

As a non-limiting example, consider a scenario in which the parameter-applied data includes a field that corresponds to or matches the data-determinant query term. In such a scenario, the system can treat the data-determinant query term as a field identifier.

As another example, if the parameter-applied data includes a field or a data structure that corresponds to a first portion of the data-determinant query term and a sub-field or property that corresponds to a second portion of the data-determinant query term, the system can treat the first portion of the data-determinant query term as a field identifier or data structure identifier and treat the second portion of the data-determinant query term as a sub-field identifier or property identifier. Similarly, if the parameter-applied data includes a field or a data structure that corresponds to a first portion of the data-determinant query term, the system can treat the first portion of the data-determinant query term as a field identifier or data structure identifier and parse the field or data structure to determine whether it includes a sub-field or property that matches a second portion of the data-determinant query term.

As yet another example, if the parameter-applied data does not include a field that corresponds to or matches the data-determinant query term, the system can determine whether an operation can be performed to resolve (e.g., determine how the data-determinant query term is to be interpreted and or determine a content value for the parameter-applied data that corresponds to the data-determinant query term) the data-determinant query term. In some cases, the system can determine which operation to perform based on the origin of the data from which the parameter-applied data was generated (e.g., a partition or index of the data) and/or based on a sourcetype of the data from which the parameter-applied data was generated, or other information about the parameter-applied data or data from which the parameter-applied data was generated. For example, the parameter-applied data (or data from which the parameter-applied data was generated) may be associated with one or more regex rules, lookup datasets, collection datasets, joins, etc. Based on the determined associations, the system can resolve the data-determinant query term. For example, if a lookup dataset or collection dataset is associated with the parameter-applied data (e.g., via a dataset association record as described herein at least with reference to FIG. 6), the system can perform a lookup operation using the lookup dataset or the collection dataset to resolve the data-determinant query term. As another example, if a regex rule is associated with the parameter-applied data, the system can apply the regex rule to the parameter-applied data to resolve the data-determinant query term, and so on. In certain embodiments, the system can identify the regex rule or lookup dataset or other operation to perform based on an identifier for the operation. In some cases, the system can identify the operation by determining that the data-determinant query term (or a portion thereof) matches an identifier for the operation. For example, if the data-determinant query term is "userID," and parameter-applied data is associated with a regex rule or lookup dataset identified as "userID," the system can use the identified regex rule or lookup dataset to resolve the data-determinant query term. As another example, if the data-determinant query term is "userID.location," and parameter-applied data is associated with a lookup dataset identified as "userID," the system can use the lookup dataset to resolve the data-determinant query term.

Accordingly, the system can enable the same query term to have different meanings or to refer to different fields, data structures, relationships, operations, etc. depending on the structure of the data to which the query term is to be applied. As such, the system can reduce the complexity associated with searching and processing heterogeneous data, and make it easier for a user to use the system and identify relevant data. In addition, the system is able dynamically interpret and apply query terms to heterogeneous data in real time based on the structure or fields of the data to which the query term is to be applied.

5.1. Interim Search Results Overview

During query execution, a search system, such as the data intake and query system, obtains data from datasets and then iteratively processes the obtained data according to the query commands of the query. In some cases, the system can apply filter criteria to the data as it obtains the data. In this way, the system can reduce the amount of data to be processed according to the query commands. For simplicity, the data that is processed (iteratively) by the system as part of one or more search commands will be referred to as interim search results or partial search results. The final results of the query will be referred to as the results once the search is completed. Accordingly, it will be understood that the interim search results can refer to the initial set of data obtained from a dataset (with or without filters applied to that data as it is obtained) or to the set of data at any point (or phase) during the iterative processing steps of the query.

As described herein at least with reference to FIG. 12B, in some cases, the interim search results, which may also be referred to as intermediate search results, can be organized as one or more tables in memory with each successive processing phase modifying (combining, reducing, joining, etc.) the interim search results to generate new interim search results or to generate the final search results.

In some cases, a query may result in zero, one or multiple interim search results. For example, if a query merely requests that certain data be returned, no interim search results may be generated. As another example, if the query includes one processing phase, the system may generate one interim search results before generating the final search results. As yet another example, if the query includes multiple processing, reducing, joining, or other phases, the system may generate multiple interim search results before determining the final search results. With reference to FIG. 12B, the system generates two intermediate search results in the intermediate search result tables 1224 and 1226 before generating the final results 1228.

In a distributed query processing system, each executor (non-limiting example: search node 506) may generate one or more interim search results, which may be combined with interim search results from other executors. In some cases, the executors may pass interim search results between each other to generate additional interim search results, or may pass the interim search results to a master node which can combine the interim search results from the different nodes to generate additional interim search results or to generate the final search results, etc.

5.2. Data-Determinant Query Term Overview

As described herein, the system can obtain (homogenous or heterogeneous) data from different data sources, which can result in interim search results. In some such cases, the data that forms the interim search results may be heterogeneous and have different structures. For example, one record in the interim search results may include a "user.department" field, while another record may include a field or data structure "user" with a sub-field or property "department," and yet another record may not include any reference to "user" or "department," but may be associated with an operation that can result in the resolution of "user.department" (e.g., a regex or lookup operation that enables the system to identify a value that corresponds to "user.department" in the record or to combine data from the record with data from another dataset to identify a value corresponding to "user.department." As described herein, the heterogeneous data in the interim search results may be a result of the heterogeneous nature of the data from which the interim search results are generated or based on how the data was processed to become the interim search results.

Upon receipt of a query, the search head can analyze the query and identify query terms that may be applied differently to different heterogeneous data (also referred to herein as data-determinant query terms). During execution, the search workers can obtain interim search results and determine how to apply the data-determinant query term to a record based on the structure (e.g., number of fields, field identifiers, data structure identifiers, property identifiers, etc.) of the record or other characteristic of the record. In some cases, the system can determine how to apply the data-determinant query term based on metadata associated with the record, such as a host, source, sourcetype, or index of the data obtained from a data source (e.g., event with raw machine data, etc.) that corresponds to the record.

In certain embodiments, the system can use the semantics of the query language to identify a data-determinant query term and then apply the data-determinant query term differently based on the structure of the parameter-applied data. In some cases, the system can determine that the query terms that follow certain query commands are data-determinant query terms. For example, the query term following the "select" command may refer to a field, data structure, or relationship that can be determined with reference to the metadata catalog. Accordingly, the system can determine that the string that follows the "select," "groupby," or "stats," command, etc., is to be treated as a data-determinant query term and applied differently to data with different structures.

In addition, based on the structure of the data-determinant query term, the system can determine how it can be resolved. For example, if a data-determinant query term is a string "A," (without delimiters) the system can determine that "A" can refer to a field identifier of a record or be associated with a relationship that can be determined using one or more lookups, regex rules, or other operations.

In some cases, if the data-determinant query term includes one or more delimiters with a string before or after the delimiters, the system can determine whether the strings before or after the delimiters or between the delimiters reference different objects or identifiers. For example, if the data-determinant query term is "A.B" and '.' is a delimiter, the system can determine whether "A.B" refers to a field "A.B," a data structure "A" with a property "B," or is associated with a relationship that can be determined using a lookup, regex rule, or other operation.

Additional delimiters can provide additional flexibility for how the data-determinant query term is to be resolved. For example, if the delimiter is '.' and the data-determinant query term is "A.B.C," then, for a particular record, the system can determine whether "A.B.C" refers to a field identifier "A.B.C," a field or data structure "A.B" with a property "C," a field or data structure "A" with a property "B," and sub-property "C," and/or whether "A.B.C" can be resolved using using one or more operations described in a metadata catalog 221. For example, the system may determine that using a first lookup or relationship, "A" can be determined. From there, the system can determine whether "A" identified from the relationship includes a field "B.C," a field or data structure "B" with a property "C," or whether "B.C" can be resolved based on an additional lookup or relationship. Similarly, additional delimiters can be used to refer to additional relationships, etc., and based on the delimiters and structure of the data-determinant query term, the system can iteratively parse the portions of the data-determinant query term via different fields, data structures, lookups, relationships, or other operations, until the data-determinant query term is resolved and content values can be determined.

5.3. Example Application of a Data-Determinant Query Term

FIG. 16 is a block diagram illustrating an example of interim search results that include records 1610-1618 with different structures that have heterogeneous data. For simplicity, the records 1610-1618 are shown in groups 1604A, 1604B, 1604C (generically referred to as group(s) 1604), where the records in one group 1604 have a different structure than records in another group 1604. It will be understood that the records of the interim search results can come in any order and that records with a similar structure may not be grouped together. Further, it will be understood that the groups 1604A-1604C can include fewer or more records.

In some cases, the interim search results can be generated based on a portion of the query 1602. For example, the records 1610-1618 can be generated based on the "from main select user" portion of the query 1602 and/or from other query parameters or search criteria not shown, but that precede the "group by user.department" search criteria or query parameters. In some embodiments, the records 1610-1618 can be generated during query execution by a search node 506. In some cases, the interim search results and records 1610-1618 can correspond to an intermediate results table as described herein at least with reference to FIG. 12B.

In some cases, the structure of the different records 1610-1618 can be based on the number of fields in the record, the type of the content of the fields (e.g., whether a field include a field value or a data structure with additional information/field values), the names of the fields, etc. In some cases, if two records include the same number of fields and field identifiers, and the structure of the data (but not necessarily the content) in each of the fields matches (e.g., same-named fields in each record include similarly structured field values, such as a single value or string or a data structure with one or more properties or sub-fields), then the records can have the same structure. However, if the two records have a different number of fields, different field identifiers (e.g., differently named fields), or different data structures as field values, then the records can have a different structure. In the illustrated embodiment of FIG. 16, the structure of the records of the groups 1604A-1604C includes a record identifier as well as one or more fields. However, it will be understood that the records of the groups 1604A-1604C can include fewer or more fields and the fields may have different structures or identifiers, etc.

In the illustrated embodiment, the records 1610-1612 are shown as part of group 1604A. The structure of records 1610-1612 includes three fields ("user.department," "user.name," and "user.location") and corresponding field values. The records 1613-1615 are shown as part of group 1604B. The structure of the records 1613-1615 includes one field "user," which has a data structure that includes properties (or sub-fields) and corresponding property values for the properties "department," "name," and "location." In the illustrated embodiment of FIG. 16, the data structure in the "user" field of the records 1613-1615 is a JSON data structure. However, it will be understood that a variety of data structures can be used, such as, but not limited to, YAML, XML, AXON, ConfigObj, OGDL, etc. The records 1616-1618 are shown as part of group 1604C. The structure of the records 1616-1618 includes one field "ID" and a corresponding field value.

The records and their corresponding structure can be based on or be the result of a variety of factors, such as, but not limited to the query commands of the query 1602, the structure/content of the data from which the records were generated (e.g., the structure of the data pulled or read from a disk and/or the structure of preceding interim search results, etc.), etc.

In some cases, the records in the different groups 1604A, 1604B, 1604C can correspond to different heterogeneous data stored in the same or different data stores. In certain embodiments, the heterogeneous data can correspond to data from different datasets, different dataset sources, data with different sourcetypes (from the same or different dataset sources), etc. For example, records 1610-1612 in group 1604A may correspond to (or have been generated from) events with raw machine data stored in time series buckets, records 1613-1615 in group 1604B may correspond to data obtained from an SQL database, and records in 1616-1618 in group 1604C may correspond to data from an external data store, such as HDFS or Amazon S3. As another example the records in groups 1604A-1604C may come from the same dataset source but may have different source types, structures, data, fields, etc. that results in the records in the different groups 1604A-1604C having the different structures as shown.

As another example, the data from which the records 1610-1612 and records 1616-1618 are generated may include fields "user.department," "user.name," and "user.location," and "ID," respectively, and corresponding field values and/or may be associated with one or more regex rules and/or lookup datasets or joins that can be used to determine these fields and corresponding field values. Similarly, the data from which the records 1613-1615 are generated may include a data structure associated with a field "user" and corresponding properties and property values as shown and/or may be associated with one or more regex rules and/or lookup datasets or joins that can be used to generate the data structure of the field "user."

In certain cases, the records in the different groups 1604A-1604C may have different structures due to the query commands used to extract or process the corresponding data. For example, to obtain the data for the records in group 1604A, the system may have received a query instruction to provide a different field for each "user.X" value. Accordingly, records in group 1604A each have a field value for a "user.department," "user.name," and "user.location" field. In certain embodiments, the system can determine the different fields and field values using one or more regex rules as described herein. In certain cases, the system can determine the different fields and/or field values by performing a lookup or join operation. In some cases, the metadata catalog 221 may include a rule or dataset that can be used to provide additional information or fields. For example, as described herein, at least with reference to FIGS. 6 and 10, the "main" dataset may be associated with one or lookup datasets, which can be used to identify fields and/or field values associated with data from the "main" dataset.

Similarly, to obtain the records in group 1604B, the query may have included an instruction to include all properties of "user" in a data structure, such as a JSON data structure, as shown. In certain embodiments, the system may include all data retrieved from performing a lookup in a data structure, rather than including them as different fields. Accordingly, as shown, each record in group 1604B can include a data structure with various properties (or sub-fields) with corresponding values for each property (or sub-field). In some embodiments, based on a lookup performed on previous interim search results, the system can store the results in a data structure similar to what is shown for the records in group 1604B. For example, in a previous version of the interim search results, the query command may have required the system to perform a lookup or other operation in order to determine the properties associated with "user." Based on the lookup, the system identified the properties "department," "name," and "location," and stored the data structure "user" and its properties with the records of group 1604B so that another lookup would not be required in the event the properties of "user" were referenced again.

To obtain the records in group 1604C, the query may have included an instruction to return the values of the field "ID."

Similar to group 1604C, the system may use one or more regex rules or lookups to determine the fields and field values for the field "ID."

In some embodiments, as the interim query results are generated, the system can apply one or more regex rules to the data to identify one or more fields. For example, one regex rule may provide instruction regarding how to determine an IP address from raw machine data or unstructured data and another regex rule may provide instructions regarding how to determine a user ID from the raw machine data or unstructured data. In some cases, multiple regex rules may be applied to the data as it is analyzed. Applying the regex rules to the data can be time consuming and in some cases wasteful, especially where the results of a regex rule (e.g., a particular field and field value) are not referenced by a query. Accordingly, in some embodiments, the system can pull the data without applying any regex rules and place the data in interim search results. In some such embodiments, the system can apply regex rules in an ad hoc basis depending on the query parameters. For example, if a query term in the query references a field that can be determined using a particular regex rule, the system can apply that regex rule to the interim search results and add the determined field and field value to the record. Accordingly, the system can modify the structure of a record in the interim search results during search time. In this way, if additional query terms reference the newly added field, the system can provide the information with regard to the newly added field without having to execute the regex rule again. In addition, the system can reduce the number of regex rules applied to the data used to generate the interim search results. As a non-limiting example and with reference to FIG. 16, suppose a query command references "user.title" and the system includes a regex rule for determining "user.title" for the records of group 1604A. In such a scenario, the system can apply the regex rule to the records of group 1604A and add a field "user.title" along with the determined field value to each of the records of group 1604A.

Thus, it will be understood that the different structures of the records 1610-1618 can be a result of any one or any combination of different structures or content of underlying data (from the same or different dataset sources) used to generate the records 1604, the result of different query commands performed on data, etc.

The content value (e.g., field value, property value, etc.) of the records can be based on the content of the data from which the records 1610-1618 are generated. For example, the field value for "user.department," "user.name," and "user.location," in records 1610-1615 and the field value for "ID" in records 1616-1618 can be based on the value of the data used to generate the corresponding records. In some cases, these values can correspond to a value extracted from an event (e.g., an event having raw machine data) or other data stored on disk, a value from a record in a preceding interim search result, or a combination of multiple values from multiple records, etc. As mentioned, in some cases, these content values can be extracted or determined using one or more regex rules, lookups, joins, etc.

The identifiers for the different fields can be based on the field identifiers of the data used to generate the records and/or one or more query parameters. For example, if the data (e.g. data stored on disk or record from previous interim search result) includes a particular field identifier then the corresponding record 1610-1618 can include that field identifier.

In certain embodiments, the field identifiers can be based on the query commands. For example, in some cases, a query command can specify a field identifier for a particular field. Accordingly, the field identifiers for the different fields in the records 1610-1618 can be based on the data used to generate the record and/or one or more query commands. For example, the field identifiers "user.department," "user.name," "user.location," "user," and/or "ID," can be based on field identifiers of the data used to generate the records 1610-1618 and/or based on query commands in the query 1602.

Having determined the interim search results, including the records 1610-1618, based on one portions of the query 1602, the system can determine how to process the interim search results based on another portion of the query 1602 or other search criteria of the query 1602. For example, the search criteria "group by user.department" can indicate how the interim search results (including records 1610-1618) are to be processed.

As described herein, given the different structure of the records in the groups 1604A-1604C, the system may be unable to apply the query term "user.department," in the same way to the different records 1610-1618. For example, if the system looks for a field "user.department" in the records 1610-1618, it will be unable to find one in the records of groups 1604B and 1604C. Similarly, if the system treats "user.department," as a reference to a data structure named "user" with a property "department," it will be unable to find one in the records of groups 1604A and 1604B.

Accordingly, the system can identify the query term "user.department" as a data-determinant query term. As described herein, the system can determine that the query term "user.department is a data-determinant query term in a variety of ways. In some embodiments, the system can determine that the query term "user.department" is a data-determinant query term based on the semantics of the query language, the identification of the query command that precedes "user.department," the presence of the delimiter '.' in "user.department," etc. In certain embodiments, the system can determine that the search criteria includes a data determinant query term or that the "user.department" is a data-determinant query term based on a determination that the query references heterogeneous datasets, that the query references different datasets, and/or that the records in the interim search results have different structures, are heterogeneous or include heterogeneous data. In addition, based on the presence of the delimiter '.' the system can determine that "user.department" can refer to a field or data structure/property, or be associated with a relationship that can be determined using another dataset, regex rule, operation, etc.

As described herein, the system can dynamically apply the data-determinant query term "user.department" to different records in a different way depending on the structure of the records to which it is applied. For example, if a record includes a "user.department" field, the system can treat "user.department" as a field identifier for the field of the record. If a record includes a field or data structure "user" and a property "department," the system can apply "user.department" as a data structure identifier and property identifier for the data structure "user" and the property "department."

If the record does not include a field "user.department" or field/data structure "user," the system can determine if there is a lookup dataset, regex rule, or join operation associated with the record and/or "user," that can be used to resolve "user.department." In some embodiments, the system can use the metadata catalog 221 and/or dataset association records 602 to identify associated datasets, rules, operations, etc. If the system identifies associated datasets, regex rules, or operations, the system can resolve "user.department" by determining a content value for it based on the identified relationships.

In some cases, if the system is able to resolve "user.department" using a determined relationship, it can store the results (e.g., the content values) of the determined relationship in a data structure or field with properties or sub-fields so that if the data is referred to again at a different location in the query, the system can access the data via the data structure as opposed to determining the relationship and performing the corresponding operation again. In this way, the system can reduce the amount of processing during query execution. In some embodiments, the system can store the results of the lookup or regex rule in a data structure similar to the data structure shown for the records of group 1604B.

With continued reference to FIG. 16, the system can scan the records 1610-1618 to determine their structure. In some embodiments, the system can scan the records 1610-1618 to determine the number of fields, field identifiers for the fields, and/or data structures within the fields, etc. In certain embodiments, the system can scan the records 1610-1618 to determine their structure based on the data-determinant query term. For example, the system can determine which of the records 1610-1618 include a field "user.department," which of the records 1610-1618 include a field or data structure "user" with a property "department," and which of the records do not include a field "user.department" or a field or data structure "user" with a sub-field or property "department." With reference to the records 1610-1618, the system can determine that records 1610-1612 include the field "user.department," the records 1613-1615 include a field or data structure "user" (and/or determine that the data structure includes a property "department"), and that the records 1616-1618 do not include a field "user.department," or a field or data structure "user" with a property "department."

Based on the determined structure of the records, the system can process the records. For example, based on the determination that the records 1610-1612 include a field "user.department," the system can obtain the corresponding field value for each of the records 1610-1612 ("Engineering," "Engineering," "HR," respectively). Based on the determination that the records 1613-1615 include a field or data structure "user," the system can parse the data structure to determine whether the data structure includes a property "department," and if so obtain the property value corresponding to the property "department." Alternatively, based on the determination that the records 1613-1615 include a field or data structure "user," with a sub-field or property "department," the system can parse the data structure to obtain the sub-field or property value corresponding to the sub-field or property "department" ("Engineering," "HR," "IT," respectively).

Based on a determination that the records 1616-1618 do not include a field "user.department" or a field or data structure "user" with a sub-field or property "department," the system can perform one or more additional operations to determine whether "user.department" can be resolved for the records 1616-1618. For example, the system can determine whether the records 1616-1618 (and/or "user.department") are associated with one or more regex rules, lookup datasets, collection datasets, joins, or other operations or relationships.

As described herein, in some embodiments, different datasets can be related or a rule can be associated with a particular dataset or data having a particular sourcetype, etc. Accordingly, the system can determine whether those datasets or rules can be used to resolve the meaning of "user.department." For example and with reference to FIG. 16, the system can consult a metadata catalog 221 to determine whether there are any datasets or rules associated with the dataset "main," and/or the records 1616-1618 and also associated with "user." In certain embodiments, the system can consult a dataset associate record 602 or dataset configuration record 604 associated with the records 1616-1618 to identify related datasets or rules. In some cases, the system can identify dataset associate record 602 or dataset configuration record 604 associated with the records 1616-1618 based on a dataset from which the data in the records 1616-1618 originated.

In certain embodiments, the system can use the data-determinant query term to identify a particular regex rule, dataset, or operation from a list of regex rules, datasets, and/or operation associated with the record. For example, with reference to FIG. 16, the system can look for a regex rule, dataset, or operation associated with records 1616-1618 and identified as "user," and use the identified regex rule, dataset, or operation to resolve "user.department."

As a non-limiting example, and with reference to FIG. 16, the metadata catalog 221 may include a lookup dataset that can use the field "ID," from the dataset "main," to determine "user.department." For example, the field "ID," may correspond to a field "user" in another dataset that includes a property or sub-field "department." As another example, the field "ID," may correspond to a field "user" in another dataset that is associated with another lookup dataset "department." In either case, the system can parse the content of the metadata catalog 221 to resolve "user.department," and identify a content value for "user.department," with reference to records 1616-1618.

In some embodiments, the system may be unable to resolve "user.department" for one or more of the records 1610-1618. For example, the field value for the "user.department" field or the property value for the property "department," of the data structure "user" for a particular record may be null or blank, the data structure "user" of a particular record may not include a "department" property, and/or there may not be a dataset or rule in the metadata catalog 221 that enables the system to determine the meaning of or resolve "user.department" for a particular record. In some such cases, the system can return a null value or provide an error, etc.

Having resolved the data-determinant query term "user.department" for the records 1610-1618, the system can proceed to process the query command "group by" and apply the query command "group by" to the content value corresponding to "user.department." As described herein, as the system processes the records 1610-1618 it can generate additional interim search results and/or final search results, which can be different from what is shown and described with respect to FIG. 16. It will be understood that the system can continue to use the structure of records in interim search results to determine how a particular data-determinant query term is to be applied.

In certain embodiments, if the system performs a lookup or otherwise consults the metadata catalog 221 to resolve the meaning of a particular data-determinant query term for a given record (e.g., "user.department), the system can add data to a record or associate the record with additional data. For example, if based on information obtained from the metadata catalog 221, the system is able to determine an additional field for the record (e.g., by using a regex rule to parse data, such as raw machine data, in the record), the additional field can be added to the record. As another example, if based on information obtained from the metadata catalog 221, the system is able to obtain different pieces of information related to the record, the system can include that additional information as a field or data structure associated with the record. For example, if after parsing the metadata catalog 221, the system determines that "user" is associated with the field "ID," and user include various properties, such as "department," "name," "last login date," etc., the system can generate and associate a data structure "user," with the records 1616-1618. In some such cases, if the system uses the records 1616-1618 again and references "user" or one of its properties, the system can access the information from the data structure "user" that includes the properties "department," "name," "last login date," etc., as opposed to executing another lookup or join operation. By storing the information in the data structure and relying on the data structure for additional processing, the system can reduce the amount of processing used to generate final search results.

In the illustrated embodiment of FIG. 16, the system uses the '.' character as a delimiter between the strings "user" and "department." As described herein, the use of a delimiter can increase the potential meaning or methods to resolve the data-determinant query term. For example, use of one delimiter can indicate that a data-determinant query term (e.g., "A.B") refers to a field of a record, a field/data structure and a sub-field/property of the record, or to a relationship associated with the record that can be determined using a lookup, regex rule, join, or other operation. However, it will be understood that any one or any combination of characters or symbols can be used to identify a query term as potentially having a different meaning for different data. In addition, as described herein, in some cases, the data-determinant query term can include multiple delimiters, which can increase the possibilities of how the data-determinant query term is to be resolved.

Further, as described herein, in some cases, the data-determinant query term may not have a delimiter, which may reduce the number of possible meanings for the data-determinant query term. For example, if the system determines that "A" is a data-determinant query term, it may attempt to resolve it as a field identifier or as being associated with a relationship that can be resolved using a lookup, regex rule, join, or other operation, etc.

5.4. Data-Determinant Query Term Flow

Figure 17:
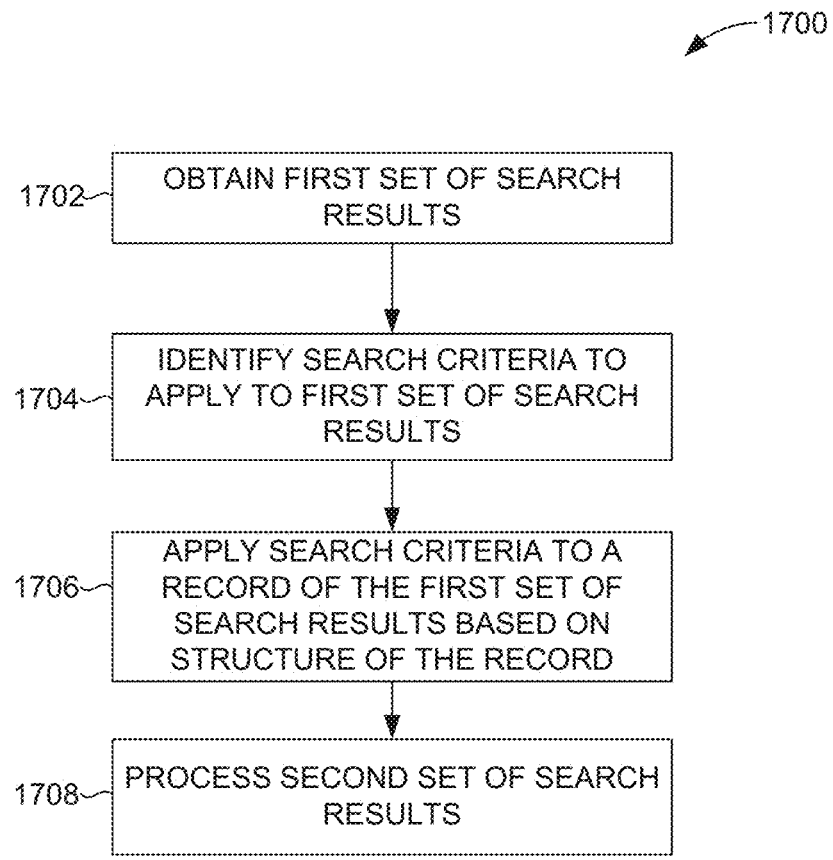
FIG. 17 is a flow diagram illustrative of an embodiment of a routine implemented by the query system to apply search criteria to a set of search results

FIG. 17 is a flow diagram illustrative of an embodiment of a routine 1700 implemented by the query system 214 to apply search criteria to a set of search results. Although described as being implemented by the system, it will be understood that the elements outlined for routine 1700 can be implemented by one or more computing devices/components that are associated with the data intake and query system 108, such as, but not limited to, the query system manager 502, the search head 504, the search master 512, the search manager 514, the search nodes 506, etc. Thus, the following illustrative embodiment should not be construed as limiting.

At block 1702, the system obtains a first set of search results. As described herein, the system can obtain the first set of search results based on a received query. The first set of search results, in some cases, can correspond to interim search results and can include records with heterogeneous data or records with different structures, such as a different number of fields, different field identifiers, different data structures in the fields, etc. In some cases, the heterogeneous data in the different records may correspond to different dataset sources that store heterogeneous data or the same dataset source that stores heterogeneous data. For example, data in one record may have been generated from raw machine data in a time series bucket and data from another record may have been generated from structured data in a table entry of a relational database, etc. In certain cases, the heterogeneous data in the different records may correspond to the same dataset source or from different dataset sources that store homogenous data. In some such cases, as the system executes the query and processes the homogeneous data, it may generate records with heterogeneous data, which become part of the interim search results.

In some cases, the system obtains the first set of search results by applying filter criteria to stored data. As described herein, filter criteria can include, but is not limited to, one or more identifiers for indexes (or partitions), hosts, sources, sourcetypes, time ranges, field identifier, tenant and/or user identifiers, keywords, etc. In certain embodiments, as the system scans data during query execution, it can apply the filter criteria to the data that is scanned. If the data satisfies the filter criteria it can be added to the interim search results. The system can process the interim search results based on the query parameters until final search results are generated. Each time, the system processes the interim search results it may generate another set of interim search results. Accordingly, in some case, each phase of a query can correspond to a set of interim search results. Accordingly, the first set of search results can correspond to any one of the interim search results of a query.

In some embodiments, as the system processes the interim search results, it can add additional fields, data structures, etc. For example, based on the application of a regex rule or lookup operation (e.g., using a lookup dataset to identify inter-related fields or other data) on a record, the system can add a field or data structure to a particular record of the interim search results, etc.

At block 1704, the system identifies second search criteria to be applied to the first set of search results. As described herein, the system can iteratively process the interim search results or apply query terms and query commands to the interim search results based on the query parameters of a query. Accordingly, the system can determine the second search criteria that is to be applied to the first set of search results based on the query parameters of the query. As described herein, the second set of search criteria can include one or more query parameters, including one or more query commands and one or more query terms or an identifier to be used to identify which part of which records are to be processed according to the query command. In addition, as part of identifying the second search criteria, the system can identify a data-determinant query term. As described herein, the system can identify the data-determinant query term in a variety of ways, including, but not limited to, based on the semantics of the query language, the query command that forms part of the second search criteria, a format or structure of the data-determinant query term (e.g., the presence of a qualifier that indicates a particular query term is a data-determinant query term or delimiter, etc.), etc. In certain embodiments, the system can determine that a data-determinant query term is to be used based on the records of the first set of search results. For example, the system can determine that a data-determinant query term is to be used based on a determination that the first set of search results includes heterogeneous data or that the records of the first set of search results have different structures, such as, but not limited to, different field identifiers, different number of fields, or that the structure of the data in the fields is different (e.g., one field may have a single field value whereas another field may include a data structure, such as a JSON object, etc.). In certain embodiments, the system can determine that a data-determinant query term is to be used based on a determination that the query references data from different dataset sources or references heterogeneous data.

At block 1706, the system applies the second search criteria to a record of the interim search results based on the structure of the record. As described herein, the data-determinant query term can be resolved differently and refer to different parts of a record depending on the structure of the record. Accordingly, in some embodiments, the system determines the structure of the record and resolves the data-determinant query term based on the determined structure of the record to which the data-determinant query term is to be applied.

In some embodiments, the system determines the structure of the record by determining whether the record includes an identifier that matches all or a portion of the data-determinant query term. If a match is found, the system can interpret the data-determinant query term as having the same type as the type of the matching identifier. For example, if the data-determinant query term matches a field identifier of the record, the system can interpret the data-determinant query term as a field identifier, and resolve the data-determinant query term by obtaining the corresponding field value of the record. Similarly, if the data-determinant query term matches a data structure and property identifier, the system can interpret the data-determinant query term as a data structure and property identifier, and resolve the data-determinant query term by obtaining the corresponding property value. In addition, if the data-determinant query term does not match a field identifier or data structure and property identifier of the record, the system can determine whether the record is associated with a relationship/regex rule/lookup (which in turn matches or is otherwise associated with the data-determinant query term, or a portion thereof). If the system identifies an associated relationship/regex rule/lookup, or other operation as a relationship/regex rule/lookup identifier and resolve the data-determinant query term (e.g., by determining a content value for the record that corresponds to the data-determinant query term) by performing a lookup, regex rule, or other operation, etc.

In certain embodiments, the system determines the structure of the record by determining whether the record includes a field identifier that matches the data-determinant query term or whether the record includes a field/data structure identifier and sub-field/property identifier that matches the data-determinant query term. If the record includes a field identifier that matches the data-determinant query term, the system can treat the data-determinant query term as a field identifier for that record. If the record includes a field/data structure identifier and sub-field/property identifier that matches the data-determinant query term, the system can treat the data-determinant query term as a field/data structure identifier and sub-field/property identifier. If the record does not include a field identifier that matches the data-determinant query term or a field/data structure identifier and sub-field/property identifier that match the data-determinant query term (e.g. the data-determinant query term does not match any of the field identifiers, field/sub-field identifiers, or data structure/property identifiers of the record), the system can determine whether the record is associated with a regex rule, lookup dataset, collection dataset, or other operation that can be used to resolve the data-determinant query term and/or identify a content value for the data-determinant query term for the record.

In some embodiments, the system can resolve the data-determinant query term (e.g., determine how the data-determinant query term is to be interpreted and/or determine a content value for the record that corresponds to the data-determinant query term) for a particular record of the interim search results before resolving the data-determinant query term for the next record of the interim search results. For example, with reference to FIG. 16, the system can determine whether record 1616 includes a field identifier that matches the data-determinant query term, includes a data structure identifier and property identifier that matches the data-determinant query term, or is associated with an operation that can be used to identify a content value for the data-determinant query term (and in some cases, determine a corresponding content value for the record that corresponds to the data-determinant query term) before analyzing record 1618.

In certain embodiments, the system can concurrently resolve the data-determinant query term for the records of the interim search results. For example, and again with reference to FIG. 16, the system can determine which of the records 1610-1618 include a field identifier that matches the data-determinant query term, then determine which of the records 1610-1618 include a data structure identifier and property identifier that match the data-determinant query term, and then determine which of the records 1610-1618 are associated with an operation that can be used to determine a content value for the data-determinant query term. It will be understood that the system can concurrently resolve the data-determinant query term for the records of the interim search results in any order as desired.

The system can apply the search command of the second search criteria to the records based on the resolution of the data-determinant query term for the records. For example, if the data-determinant query term matches a field identifier, the system can use the corresponding field value for the search command, such as, by applying the search command to the field value. Similarly, if the data-determinant query term matches a field/data structure identifier and property identifier, the system can use the property value for the search command, etc. If the data-determinant query term does not match a field identifier, field/sub-field identifiers, or data structure/property identifiers of the record, but the system is able to resolve the data-determinant query term using a regex rule, lookup dataset, or other operation, the system can use the content value obtained from the operation for the query command. Based on the processing of the first set of search results according to the query command, the system can generate the second search results.

At block 1708, the system processes the second set of search results. As described herein, the system can process the second set of search results based on the query commands of the query. In some cases, the system can use a data-determinant query term and the structure of the records of the second set of search results to process the second set of search results. In certain cases, the second set of search results may correspond to or be processed as final search results, which can be provided to a user. In some embodiments, the second set of search results can be processed to generate final search results. However, it will be understood that, based on the query, multiple sets of search results may be generated before the final search results are generated.

Fewer, more, or different blocks can be used as part of the routine 1700. In some cases, one or more blocks can be omitted. In addition, it will be understood that the various blocks described herein with reference to FIG. 16 can be implemented in a variety of orders, or implemented concurrently.

In some embodiments, if the system performs a lookup or other operation to resolve the data-determinant query term, the information obtained from the lookup can be included with or as part of the second set of search results or used to modify the first set of search results. For example and with reference to FIG. 16, assuming the system performs a lookup to resolve "user.department" for the records of group 1604C, the system can include the results of the lookup with the records of group 1604C. For example, the system can add a field "user.department" and corresponding field value to the records of group 1604C as part of the second set of search results (or modify the first set of search results to include the field and field value). As another example, the system can add a field or data structure "user" and sub-field or property "department" with a corresponding property value for the records of group 1604C. In certain embodiments, the system can determine if there are other properties that can be determined from the lookup. If so, the additional properties can be included. For example, if properties "last login," "location," and "name" are found for "user," the system can include a data structure "user" with the properties "department," "last login," "location," and "name," etc., for the corresponding record. In this way, if any of the properties of user are referenced later on in the query as another data-determinant query term, the system can use the relevant fields or data structures to resolve the data-determinant query term rather than performing the lookup or join again. Accordingly, in certain embodiments, a record in the second set of search results can include additional fields, field values, or data structures compared to a corresponding record in the first set of search results (in addition to any changes based on the query commands). In certain embodiments, the additional information may be not be included in the record, but be associated with it in the event it is referenced in the query.

Similarly, the system can modify records in the first set of search results based on regex rules lookups, or other operations applied to the records. For example, rather than applying regex rules as the data is initially obtained or pulled from disk for processing, the system can pull an entire record and then apply the regex rules based on the query parameters in the query. When a regex rule is applied to a particular record, the system can generate or add a field and corresponding field value to the particular record based on the regex rule. Similarly, if a lookup, join, or other operation is applied to a particular record, the resulting data can be added to the record as an additional field/field value, data structure, etc. In certain embodiments, the obtained information can be kept as a reference apart from the record and can be used if the query references the obtained data.

Although described herein as data-determinant query terms, it will be understood that any data-determinant query parameter can be used. In certain embodiments, the system can use data-determinant query commands whose execution varies depending on the structure of the underlying data. For example, the same query command may perform one function on a particular record based on the underlying structure of the particular record and a different function on a different record based on the underlying structure of the different record.

6.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method, comprising:
   obtaining a first set of search results based on application of a portion of a query received by a query system to a set of data, wherein the first set of search results comprises records with a plurality of formats;
   identifying a data-determinant query term of the query to be applied to the first set of search results;
   applying the data-determinant query term to the first set of search results to generate a second set of search results, wherein the data-determinant query term is applied to different fields of different records of the first set of search results depending on a respective format of the different records, and wherein applying the data-determinant query term to the first set of search results comprises:

determining a first record of the records has a first format, applying the data-determinant query term to a first field of the first record based on determining the first record has the first format, determining a second record of the records has a second format that is different from the first format, applying the data-determinant query term to a second field of the second record based on determining the second record has the second format;

generating at least a portion of the second set of search results based on applying the data-determinant query term to the first field of the first record and the second field of the second record; and processing the second set of search results based on the query to obtain query results.

2. The method of claim 1, wherein the first set of search results includes data obtained from a time series data store that has been filtered based on one or more filter criteria of the query.

3. The method of claim 1, wherein the first set of search results includes data obtained from an external data source that has been filtered based on one or more filter criteria of the query.

4. The method of claim 1, wherein the first set of search results includes data obtained from an external data source that has been filtered based on one or more filter criteria of the query and processed based on one or more query commands of the query.

5. The method of claim 1, wherein the first set of search results includes data obtained from a time series data store that has been filtered based on one or more filter criteria of the query and processed based on one or more query commands of the query.

6. The method of claim 1, wherein the first set of search results includes heterogeneous data.

7. The method of claim 1, wherein the first record includes a first set of fields with corresponding field values and the second record includes a second set of fields with corresponding field values, and wherein the first set of fields and the second set of fields are distinct.

8. The method of claim 1, wherein the first record includes a first set of field identifiers for fields of the first record, wherein the second record includes a second set of field identifiers for fields of the second record, wherein the first set of field identifiers and the second set of field identifiers are distinct.

9. The method of claim 1, wherein the first record includes a first quantity of fields and the second record includes a second quantity of fields, wherein the first quantity of fields and the second quantity of fields are distinct.

10. The method of claim 1, wherein the first record includes a single field value for the first field and the second record includes a data structure comprising a plurality of properties and property values for the second field.

11. The method of claim 1, wherein the data-determinant query term includes one or more query commands and one or more query terms.

12. The method of claim 1, wherein applying the data-determinant query term to the first field of the first record includes determining how to apply the data-determinant query term based on metadata associated with the first record.

13. The method of claim 1, wherein applying the data-determinant query term to the first field of the first record includes determining how to apply the data-determinant query term based on metadata associated with the first record, including a host, source, source-type, or index of data obtained from a data source that corresponds to the first record.

14. The method of claim 1, wherein identifying the data-determinant query term comprises identifying the data-determinant query term based on an identification of a query command that precedes the data-determinant query term.

15. The method of claim 1, wherein identifying the data-determinant query term comprises identifying the data-determinant query term based on a format of the data-determinant query term.

16. The method of claim 1, wherein identifying the data-determinant query term comprises identifying the data-determinant query term based on a determination that the first set of search results includes heterogeneous data.

17. The method of claim 1, wherein identifying the data-determinant query term comprises identifying the data-determinant query term based on a determination that the first record has the first format and the second record has the second format that is different from the first format.

18. The method of claim 1, wherein identifying the data-determinant query term includes a determination that the first record includes a first set of fields with corresponding field values and the second record includes a second set of fields with corresponding field values, wherein the first set of fields and the second set of fields are distinct.

19. The method of claim 1, wherein applying the data-determinant query term to the first field of the first record comprises:

determining that the data-determinant query term matches a field identifier for the first field of the first record; and applying a search command of the data-determinant query term to a field value of the first field of the first record.

20. The method of claim 1, wherein applying the data-determinant query term to the first field of the first record comprises determining that a first portion of the data-determinant query term matches a field identifier for the first field of the first record, and wherein applying the data-determinant query term to the second field of the second record comprises determining that a second portion of the data-determinant query term matches a sub-field identifier for a sub-field of the second field of the first record.

21. The method of claim 1, wherein applying the data-determinant query term to the second field of the second record comprises:

determining that a first portion of the data-determinant query term matches a data structure identifier of the second record and a second portion of the data-determinant query term matches a property identifier for a property of a data structure corresponding to the data structure identifier; and applying a search command of the data-determinant query term to a property value of the property.

22. The method of claim 1, wherein applying the data-determinant query term to the second field of the second record comprises:

determining that the data-determinant query term does not match a field identifier of the second record;

identifying a dataset associated with the second record based on the data-determinant query term;

determining a content value for the second record based on a lookup operation using the dataset associated with the second record; and applying a search command of the data-determinant query term to the content value.

23. The method of claim 1, wherein applying the data-determinant query term to the second field of the second record comprises:
   determining that the data-determinant query term does not match a field identifier of the second record;
   identifying a dataset associated with the second record based on the data-determinant query term;
   determining a content value for the second record based on a lookup operation using the dataset associated with the second record; and
   applying a search command of the data-determinant query term to the content value,
   wherein the second set of search results includes a third record that corresponds to the second record of the first set of search results, and wherein the third record includes a data structure identifier and a property identifier that correspond to the data-determinant query term and a property value that corresponds to the content value.

24. The method of claim 1, wherein applying the data-determinant query term to the second field of the second record comprises:
   determining that the data-determinant query term does not match a field identifier of the second record;
   identifying a dataset associated with the second record based on the data-determinant query term;
   determining a content value for the second record based on a lookup operation using the dataset associated with the second record; and
   applying a search command of the data-determinant query term to the content value,
   wherein the second set of search results includes a third record that corresponds to the second record of the first set of search results, and wherein the third record includes a field identifier that corresponds to the data-determinant query term and a field value that corresponds to the content value.

25. The method of claim 1, wherein applying the data-determinant query term to the second field of the second record comprises:
   determining that the data-determinant query term does not match a field identifier of the second record;
   identifying a regular expression rule associated with the second record based on the data-determinant query term;
   determining a first field value of the second field of the second record based on the regular expression rule; and
   applying a search command of the data-determinant query term to the first field value,
   wherein the second set of search results includes a third record that corresponds to the second record of the first set of search results, and wherein the third record includes a field identifier that corresponds to the data-determinant query term and a second field value that corresponds to the first field value.

26. The method of claim 1, wherein applying the data-determinant query term to the second field of the second record comprises:
   determining that the data-determinant query term does not match any field identifier of the second record;
   identifying a regular expression rule associated with the second record based on the data-determinant query term;
   determining a first field value of the second field of the second record based on the regular expression rule;
   generating a field identifier for the second record, the generated field identifier corresponding to the second field;
   adding the first field value to the second record in association with the generated field identifier; and
   applying a search command of the data-determinant query term to the first field value.

27. A computing system of a data intake and query system, the computing system comprising:
   memory; and
   one or more processing devices coupled to the memory and configured to:
      obtain a first set of search results based on application of a portion of a query received by a query system to a set of data, wherein the first set of search results comprises records with a plurality of formats;
      identify a data-determinant query term of the query to be applied to the first set of search results;
      apply the data-determinant query term to the first set of search results to generate a second set of search results, wherein the data-determinant query term is applied to different fields of different records of the first set of search results depending on a respective format of the different records, and wherein to apply the data-determinant query term to the first set of search results, the one or more processing devices are further configured to:
      determine a first record of the records has a first format,
      apply the data-determinant query term to a first field of the first record based on determining the first record has the first format,
      determine a second record of the records has a second format that is different from the first format,
      apply the data-determinant query term to a second field of the second record based on determining the second record has the second format;
      generate at least a portion of the second set of search results based on applying the data-determinant query term to the first field of the first record and the second field of the second record; and
      process the second set of search results based on the query to obtain query results.

28. Non-transitory computer readable media comprising computer-executable instructions that, when executed by a computing system of a query system, cause the computing system to:
   obtain a first set of search results based on application of a portion of a query received by a query system to a set of data, wherein the first set of search results comprises records with a plurality of formats;
   identify a data-determinant query term of the query to be applied to the first set of search results;
   apply the data-determinant query term to the first set of search results to generate a second set of search results, wherein the data-determinant query term is applied to different fields of different records of the first set of search results depending on a respective format of the different records, and wherein to apply the data-determinant query term to the first set of search results, execution of the computer-executable instructions by the computing system further cause the computing system to:
   determine a first record of the records has a first format,
   apply the data-determinant query term to a first field of the first record based on determining the first record has the first format, determine a second record of the records has a second format that is different from the first format,
apply the data-determinant query term to a second field of the second record based on determining the second record has the second format;
generate at least a portion of the second set of search results based on applying the data-determinant query term to the first field of the first record and the second field of the second record; and
process the second set of search results based on the query to obtain query results.

* * * * *